United States Patent
Bourassa et al.

(10) Patent No.: US 12,168,811 B2
(45) Date of Patent: Dec. 17, 2024

(54) PROCESSES FOR PREPARING LITHIUM CARBONATE

(71) Applicant: NEMASKA LITHIUM INC., Montréal (CA)

(72) Inventors: Guy Bourassa, Québec (CA); Gary Pearse, Ottawa (CA); Stephen Charles Mackie, Peterborough (CA); Mykolas Gladkovas, Toronto (CA); Peter Symons, Williamsville, NY (US); J. David Genders, Elma, NY (US); Jean-François Magnan, Neuville (CA); Geneviève Clayton, Pierrefonds (CA)

(73) Assignee: NEMASKA LITHIUM INC., Montréal (CA)

( * ) Notice: Subject to any disclaimer, the term of this patent is extended or adjusted under 35 U.S.C. 154(b) by 0 days.

(21) Appl. No.: 18/213,844

(22) Filed: Jun. 25, 2023

(65) Prior Publication Data
US 2023/0416874 A1 Dec. 28, 2023

Related U.S. Application Data

(63) Continuation of application No. 16/185,973, filed on Nov. 9, 2018, now Pat. No. 11,697,861, which is a continuation of application No. 15/031,746, filed as application No. PCT/CA2014/000768 on Oct. 23, 2014, now Pat. No. 10,144,990.

(60) Provisional application No. 61/894,655, filed on Oct. 23, 2013.

(51) Int. Cl.
*C22B 26/12* (2006.01)
*B01D 61/42* (2006.01)
(Continued)

(52) U.S. Cl.
CPC ............ *C22B 26/12* (2013.01); *B01D 61/422* (2013.01); *B01D 61/445* (2013.01); *C01D 7/07* (2013.01);
(Continued)

(58) Field of Classification Search
None
See application file for complete search history.

(56) References Cited

U.S. PATENT DOCUMENTS

| 2,331,838 A | 10/1943 | Lindblad et al. |
| 2,516,109 A | 7/1950 | Ellestad et al. |

(Continued)

FOREIGN PATENT DOCUMENTS

| AU | 2012211033 | 8/2012 |
| AU | 2012248126 | 11/2012 |

(Continued)

OTHER PUBLICATIONS

English Translation—Machine Translated of JP2012234732A, "Lithium Recovery Method", published on Nov. 29, 2012.
(Continued)

*Primary Examiner* — J. Christopher Ball
(74) *Attorney, Agent, or Firm* — SMART & BIGGAR LP

(57) ABSTRACT

There are provided processes comprising submitting an aqueous composition comprising lithium sulphate and/or bisulfate to an electrolysis or an electrodialysis for converting at least a portion of said sulphate into lithium hydroxide. During electrolysis or electrodialysis, the aqueous composition is at least substantially maintained at a pH having a value of about 1 to about 4; and converting said lithium hydroxide into lithium carbonate. Alternatively, lithium sulfate and/or lithium bisulfate can be submitted to a first electromembrane process that comprises a two-compartment membrane process for conversion of lithium sulfate and/or lithium bisulfate to lithium hydroxide, and obtaining a first lithium-reduced aqueous stream and a first lithium hydroxide-enriched aqueous stream; and submitting said first lithium-reduced aqueous stream to a second electromembrane process comprising a three-compartment membrane process to prepare at least a further portion of
(Continued)

lithium hydroxide and obtaining a second lithium-reduced aqueous stream and a second lithium-hydroxide enriched aqueous stream.

5 Claims, 97 Drawing Sheets

(51) Int. Cl.
| | |
|---|---|
| B01D 61/44 | (2006.01) |
| C01D 7/07 | (2006.01) |
| C22B 3/44 | (2006.01) |
| C22B 4/02 | (2006.01) |
| C25B 1/14 | (2006.01) |
| C25B 1/16 | (2006.01) |
| C25B 9/19 | (2021.01) |
| C25B 9/21 | (2021.01) |
| C25B 9/70 | (2021.01) |
| C25B 15/027 | (2021.01) |
| C25B 15/031 | (2021.01) |
| C25B 15/08 | (2006.01) |

(52) U.S. Cl.
CPC ............... *C22B 3/44* (2013.01); *C22B 4/02* (2013.01); *C25B 1/14* (2013.01); *C25B 1/16* (2013.01); *C25B 9/19* (2021.01); *C25B 9/21* (2021.01); *C25B 9/70* (2021.01); *C25B 15/027* (2021.01); *C25B 15/031* (2021.01); *C25B 15/08* (2013.01); *B01D 2311/2684* (2013.01); *C01B 2203/0283* (2013.01); *Y02E 60/36* (2013.01)

(56) References Cited

U.S. PATENT DOCUMENTS

| | | |
|---|---|---|
| 2,793,941 A | 5/1957 | Estes |
| 2,872,393 A | 2/1959 | Gardiner et al. |
| 2,882,243 A | 4/1959 | Milton |
| 3,007,771 A | 11/1961 | Mazza et al. |
| 3,214,362 A | 10/1965 | Juda |
| 3,597,340 A | 8/1971 | Honeycutt et al. |
| 3,857,920 A | 12/1974 | Grantham et al. |
| 3,899,403 A | 8/1975 | Cook, Jr. et al. |
| 4,035,713 A | 7/1977 | Kawamoto et al. |
| 4,036,713 A | 7/1977 | Brown |
| 4,207,297 A | 6/1980 | Brown et al. |
| 4,273,628 A | 6/1981 | Kidon et al. |
| 4,287,163 A | 9/1981 | Garrett et al. |
| 4,391,680 A | 7/1983 | Mani et al. |
| 4,504,373 A | 3/1985 | Mani et al. |
| 4,561,945 A | 12/1985 | Coker et al. |
| 4,613,416 A | 9/1986 | Kau et al. |
| 4,707,234 A | 11/1987 | Mori et al. |
| 4,723,962 A | 2/1988 | Mehta |
| 4,806,215 A | 2/1989 | Twardowski |
| 4,961,909 A | 10/1990 | Boateng |
| 4,999,095 A | 3/1991 | Chlanda et al. |
| 5,098,532 A | 3/1992 | Thompson et al. |
| 5,129,936 A | 7/1992 | Wilson |
| 5,198,080 A | 3/1993 | Cowley et al. |
| 5,198,081 A | 3/1993 | Kanoh et al. |
| 5,227,031 A | 7/1993 | Sundblad |
| 5,230,779 A | 7/1993 | Martin |
| 5,246,551 A | 9/1993 | Pletcher et al. |
| 5,258,106 A | 11/1993 | Habermann et al. |
| 5,401,408 A | 3/1995 | Umemura et al. |
| 5,423,959 A | 6/1995 | Sundblad et al. |
| 5,445,717 A | 8/1995 | Kärki et al. |
| 5,595,641 A | 1/1997 | Traini et al. |
| 5,788,943 A | 8/1998 | Aladjov |
| 6,004,445 A | 12/1999 | Genders et al. |
| 6,048,507 A | 4/2000 | Amouzegar et al. |
| 6,120,576 A | 9/2000 | Toshima et al. |
| 6,306,787 B1 | 10/2001 | Sato et al. |
| 6,331,236 B1 | 12/2001 | Mani |
| 6,375,824 B1 | 4/2002 | Phinney |
| 6,514,311 B1 | 2/2003 | Lin et al. |
| 6,514,640 B1 | 2/2003 | Armand et al. |
| 6,547,836 B1 | 4/2003 | Lukes |
| 6,592,832 B1 | 7/2003 | Friedrich et al. |
| 6,747,065 B1 | 6/2004 | Paszkowski |
| 6,770,187 B1 | 8/2004 | Pütter et al. |
| 7,192,564 B2 | 3/2007 | Cardarelli et al. |
| 7,695,649 B2 | 4/2010 | Paulsen et al. |
| 8,431,005 B1 | 4/2013 | Zbranek et al. |
| 8,715,482 B2 | 5/2014 | Amendola et al. |
| 8,936,711 B2 | 1/2015 | Chon et al. |
| 8,936,770 B2 | 1/2015 | Burba, III |
| 8,951,399 B2 | 2/2015 | Fischer et al. |
| 9,255,011 B2 | 2/2016 | Kawata et al. |
| 9,255,012 B2 | 2/2016 | Tiihonen et al. |
| 9,315,908 B2 | 4/2016 | Idutsu et al. |
| 9,382,126 B2 | 7/2016 | Bourassa et al. |
| 9,447,480 B2 | 9/2016 | Vaughan et al. |
| 9,493,881 B2 | 11/2016 | Kosmoski et al. |
| 9,677,181 B2 | 6/2017 | Bourassa et al. |
| 9,702,024 B2 | 7/2017 | Woghlgemuth et al. |
| 9,890,053 B2 | 2/2018 | Bourassa et al. |
| 10,036,094 B2 | 7/2018 | Magnan et al. |
| 10,066,305 B2 | 9/2018 | Bourassa et al. |
| 10,144,990 B2 | 12/2018 | Bourassa et al. |
| 10,450,630 B2 | 10/2019 | Johnson et al. |
| 10,544,512 B2 | 1/2020 | Magnan et al. |
| 10,597,305 B2 | 3/2020 | Magnan et al. |
| 10,633,748 B2 | 4/2020 | Bourassa et al. |
| 10,661,227 B2 | 5/2020 | Park et al. |
| 10,800,663 B2 | 10/2020 | Bourassa et al. |
| 11,078,582 B2 | 8/2021 | Chang et al. |
| 11,697,861 B2 | 7/2023 | Bourassa et al. |
| 2001/0040093 A1 | 11/2001 | Mani |
| 2005/0051488 A1 | 3/2005 | Nagghappan et al. |
| 2006/0105239 A1 | 5/2006 | Paulsen et al. |
| 2011/0044882 A1 | 2/2011 | Buckley et al. |
| 2011/0123427 A1 | 5/2011 | Boryta et al. |
| 2011/0182786 A1 | 7/2011 | Burba, III |
| 2011/0200508 A1 | 8/2011 | Harrison et al. |
| 2011/0203929 A1 | 8/2011 | Buckley et al. |
| 2012/0085658 A1 | 4/2012 | Bhavaraju et al. |
| 2012/0107210 A1 | 5/2012 | Harrison et al. |
| 2013/0153433 A1 | 6/2013 | Idutsu et al. |
| 2014/0010743 A1 | 1/2014 | Kosmoski et al. |
| 2014/0023572 A1 | 1/2014 | Vaughan et al. |
| 2015/0041323 A1 | 2/2015 | Faita |
| 2015/0139886 A1 | 5/2015 | Bourassa et al. |
| 2015/0247216 A1 | 9/2015 | Wohlgemuth et al. |
| 2015/0364761 A1 | 12/2015 | Fukui et al. |
| 2016/0032471 A1 | 2/2016 | Magnan et al. |
| 2016/0258071 A1 | 9/2016 | Magnan et al. |
| 2016/0265085 A1 | 9/2016 | Bourassa et al. |
| 2016/0304988 A1 | 10/2016 | Vaughan et al. |
| 2017/0233848 A1 | 8/2017 | Johnson et al. |
| 2018/0244531 A1 | 8/2018 | Magnan et al. |
| 2018/0327287 A1 | 11/2018 | Melsert |
| 2019/0032227 A1 | 1/2019 | Lipp et al. |
| 2019/0345582 A1 | 11/2019 | Bourassa et al. |
| 2020/0087804 A1 | 3/2020 | Magnan et al. |
| 2020/0115807 A1 | 4/2020 | Magnan et al. |
| 2020/0376409 A1 | 12/2020 | Magnan et al. |
| 2020/0407237 A1 | 12/2020 | Bourassa et al. |
| 2021/0024362 A1 | 1/2021 | Bourassa et al. |
| 2023/0382753 A1 | 11/2023 | Bourassa et al. |

FOREIGN PATENT DOCUMENTS

| | | |
|---|---|---|
| AU | 2012261548 | 1/2013 |
| CA | 504477 | 7/1954 |
| CA | 659894 | 3/1963 |
| CA | 1073847 | 3/1980 |
| CA | 1272982 | 8/1990 |
| CA | 2205199 | 1/1997 |
| CA | 2205493 | 1/1997 |

(56) References Cited

FOREIGN PATENT DOCUMENTS

| | | |
|---|---|---|
| CA | 2624609 C | 4/2007 |
| CA | 2624612 C | 4/2007 |
| CA | 2786317 | 7/2011 |
| CA | 2796849 | 10/2011 |
| CA | 2820112 | 6/2012 |
| CA | 2825583 | 8/2012 |
| CN | 103086405 | 5/2013 |
| CN | 106315625 | 1/2017 |
| CN | 106365181 | 2/2017 |
| CN | 109694957 | 4/2019 |
| DE | 102004012334 | 9/2005 |
| JP | 5795826 | 6/1982 |
| JP | 2000129364 A | 5/2000 |
| JP | 2008166269 | 7/2008 |
| JP | 2009298679 | 12/2009 |
| JP | 2010080394 | 4/2010 |
| JP | 2012234732 A | 11/2012 |
| JP | 2013028523 | 2/2013 |
| JP | 2013173629 | 9/2013 |
| JP | 2013227180 | 11/2013 |
| JP | 2016162601 A | 9/2016 |
| RU | 2196735 | 1/2003 |
| SU | 310538 | 8/1974 |
| WO | 9859385 | 12/1998 |
| WO | 2004040677 | 5/2004 |
| WO | 2007039665 | 4/2007 |
| WO | 2010056322 | 5/2010 |
| WO | 2010103173 | 9/2010 |
| WO | 2011114000 | 9/2011 |
| WO | 2011133165 | 10/2011 |
| WO | 2011148040 | 12/2011 |
| WO | 2011156861 | 12/2011 |
| WO | 2012145797 | 11/2012 |
| WO | 2013140039 | 9/2013 |
| WO | 2013153692 | 10/2013 |
| WO | 2013159194 | 10/2013 |
| WO | 2013182749 | 12/2013 |
| WO | 2014040138 | 3/2014 |
| WO | 2014138933 | 9/2014 |
| WO | 2015058287 | 4/2015 |
| WO | 2015081385 | 6/2015 |
| WO | 2015123762 | 8/2015 |
| WO | 2016054683 | 4/2016 |
| WO | 2017144469 | 8/2017 |
| WO | 2017157906 | 9/2017 |
| WO | 2018087697 | 5/2018 |
| WO | 2018223192 | 12/2018 |
| WO | 2018223193 | 12/2018 |
| WO | 2018227237 | 12/2018 |
| WO | 2018234614 | 12/2018 |
| WO | 2019059654 | 3/2019 |

OTHER PUBLICATIONS

English Translation—Machine Generated of CN103086405A, "Clean Production Method of Battery Level Lithium Carbonate", published on May 8, 2013.
English Translation—Machine Generated of CN109694957A, "A Lithium Ion Battery using Ion Liquid Extraction Method of the Metal Ion of the Leachate", published on Apr. 30, 2019.
English Translation—Machine Generated of JP2008166269A, "Li—Ni Compound Oxide Particle Powder for Nonaqueous Electrolyte Secondary Battery and its Manufacturing Method, as well as Nonaqueous Electrolyte Secondary Battery", published on Jul. 17, 2008.
English Translation—Machine Generated of JP2009298679A, "Production Method of Aluminum-Containing Nickel Hydroxide Particle", published on Dec. 24, 2009.
English Translation—Machine Generated of CN106315625(A), "Method for Composite Production of High-Purity Lithium Hydroxide Monohydrate, High-Purity Lithium Carbonate and Battery Grade Lithium Carbonate", published on Jan. 11, 2017.
English Translation—Machine Generated of CN106365181(A), "Method of Preparing Battery-Grade Lithium Carbonate from Lithium-Rich Solution being High in Content of Impurities", published on Feb. 1, 2017.
English Translation of WO2013153692A1, "Method for Recovering Lithium", published on Oct. 17, 2013.
English Translation—Machine Generated of WO2019059654A1, "Cathode Active Material Precursor for Secondary Battery, Cathode Active Material, and Lithium Secondary Battery Comprising Same", published on Mar. 28, 2019.
English Abstract of China Lithium Products Tech. Co., Ltd., "Lithium Hydroxide Purified Grade", Published on Jun. 6, 2011.
English Abstract of PH12013501570A1, "Improved Method of Ore Processing", published on Sep. 30, 2013.
English Abstract of Scribd, "Extraction, Properties and Use of Lithium", Published on Feb. 2, 2009.
English Abstract of Sun et al., "Preparation of Li2CO3 by Gas-Liquid Reactive Crystallization of LiOH and CO2", Published on Jan. 31, 2012.
Tipping et al., "Conditions Required for the Precipitation of Aluminium in Acidic Natural Waters", Wat. Res. vol. 22, No. 5, pp. 585-592, 1988. (The year of publication is sufficiently earlier than the effective U.S. filing date so that the particular month of publication is not an issue).
Communication pursuant to Rule 114(2) EPC—Third Party Observation for application No. EP20140764466 dated Jan. 13, 2021.
English Abstract of CL2012002968(A1), "Method for preparing lithium carbonate from brines containing lithium chloride which comprises contacting the salumera with sodium hydroxide and then contacting with carbon dioxide", published on Jan. 11, 2013.
English Abstract of CN102030346 (A), "Preparation method for lithium carbonate", Published on Apr. 27, 2011.
English Abstract of CN106315625A, "Method for Composite Production of High-Purity Lithium Hydroxide Monohydrate, High-Purity Lithium Carbonate and Battery Grade Lithium Carbonate", published on Jan. 11, 2017.
English Abstract of CN106365181A, "Method of Preparing Battery-Grade Lithium Carbonate from Lithium-Rich Solution Being High in Content of Impurities", published on Feb. 1, 2017.
English Abstract of JP62161973A, "Production of High-Purity Lithium Carbonate", Published on Jul. 17, 1987.
English Abstract of JP2004196606(A), "Method for Manufacturing High Purity Lithium Carbonate", Published on Jul. 15, 2004.
English Abstract of JP2004196607(A), "Method for Manufacturing High Purity Lithium Carbonate", Published on Jul. 15, 2004.
English Abstract of JP2009046390(A), "Production Method of High Purity Lithium Carbonate", Published on Mar. 5, 2009.
English Abstract of JP2009057278(A), "Method of Manufacturing High Purity Lithium Carbonate", Published on Mar. 19, 2009.
English Abstract of JP2009270188(A), "Method of Manufacturing High-Purity Lithium Hydroxide", published on Nov. 19, 2009.
English Abstract of JP2009270189A, "Method of Manufacturing High-Purity Lithium Hydroxide", published on Nov. 19, 2009.
English Abstract of JP2010029797 (A), "Lithium Isotope Separation and Condensation Method, Apparatus, Measure, Lithium Ion Selective Permeation Membrane, and Lithium Isotope Concentrate", Published on Feb. 12, 2010.
English Abstract of JP2011031232, "Method of Manufacturing Lithium Hydroxide", published on Feb. 17, 2011.
English Abstract of JP2013173629A, "Method of Producing High-Purity Lithium Hydroxide", Published on Sep. 5, 2013.
English Abstract of JPS5443174(A), "Preparation of Lithium Hydroxide", Published on Apr. 5, 1979.
English Abstract of KR20130092323(A), "Lithium Compound Recovering Device, Method for Recovering Lithium Compound and Lithium Compound Recovering System", published on Aug. 20, 2013.
English Abstract—Machine Translation of JP2013227180A, "Method for Producing Lithium Sulfide", published on Nov. 7, 2013.
English Abstract—Machine Translation of JPS5798826A, "Manufacture of High Purity Lithium Salt of Mineral Acid", published on Jun. 14, 1982.

(56) References Cited

OTHER PUBLICATIONS

English Abstract of Helmold v. Plessen, Heinz Kau, "Utilization of sodium sulphate", Chem.-Ing.-Tech. 61 (1989) 12, pp. 933-940. (The year of publication is sufficiently earlier than the effective U.S. filing date so that the particular month of publication is not an issue).
English Translation—Machine Generated of JP2010080394A, "Positive Electrode Active Material for Nonaqueous Electrolyte Secondary Battery and Manufacturing Method Therefor, and Nonaqueous Electrolyte Secondary Battery", Published on Apr. 8, 2010.
English Translation of RU2196735C1, "Method for Producing High Purity Lithium Hydroxide Monohydrate From Materials Containing Lithium Carbonate", Published on Jan. 20, 2003.
Koter et al., "Electromembrane Processes in Environment Protection", Polish Journal of Environmental Studies vol. 9, No. 1 (2000), 45-56.
John Jacco Krol, "Monopolar and Bipolar Ion Exchange Membranes", Mass Transport Limitations, published on Aug. 25, 1969.
Ogawa et al., "Effects of the Chemical Compositions of Salars de Uyuni and Atacama Brines on Lithium Concentration during Evaporation" Resource Geology, vol. 64, No. 2: 91-101, Mar. 2014.
Ryabtsev et al., "Preparation of High-Purity Lithium Hydroxide Monohydrate from Technical-Grade Lithium Carbonate by Membrane Electrolysis", Russian Journal of Applied Chemistry, vol. 77, No. 7 (Feb. 2004).
Sitando et al., "Processing of a Zimbabwean Petalite to Obtain Lithium Carbonate", International Journal of Mineral Processing, 102-103 (2012) 45-50 (Available Online: Oct. 1, 2011).
Tongwen Xu, "Ion exchange membranes: State of their development and perspective", Journal of Membrane Science 263 (2005) 1-29.
Ulrich Joachim, "Crystallization", Kirk Othmer Encyclopedia of Chemical Technology, vol. 8 (Aug. 16, 2002), pp. 95-147.
Walesh, S.G. (Feb. 21, 1989) Sedimentation Basin Design, in Urban Surface Water Management, pp. 297-313, John Wiley & Sons, Inc., Hoboken, NJ, USA, DOI: 10.002/9780470172810.
Liang et al., "Co-precipitation synthesis of $Ni_{0.6}Co_{0.2}Mn_{0.2}(OH)_2$ precursors and characterization of $LiNi_{0.6}Co_{0.2}O_2$ cathode material for secondary lithium batteries", Electrochimica Acta 130 (Mar. 3, 2014) 82-89.
Kim et al., "Synthesis of High-Density Nickel Cobalt Aluminum Hydroxide by Continuous Coprecipitation Method", ACS Appl. Mater. Interfaces (Jan. 10, 2012), 4, 586-589.
English Translation—Machine Generated of Abstract JP2013028523A, "Method for Producing Manganese Oxide", published on Feb. 7, 2013.
English Translation—Machine Generated of Description SU310538A1, published on Aug. 5, 1974.
English Translation—Machine Translation of JP2016162601A, "Method of Manufacturing Positive Electrode Material for Lithium Ion Battery, Positive Electrode Active Material for Lithium Ion Battery, Positive Electrode for Lithium Battery, and Lithium Ion Battery", published on Sep. 5, 2016.
English Translation—Machine Translation of JP2000129364A, "Method for Recovering Metal", published on May 9, 2000.
Communication pursuant to Rule 114(2) EPC—Third Party Observation for application No. EP3713877 dated Apr. 17, 2023.
English Translation—Machine Translation of DE102004012334A1, "Method for preparing metal hydroxide from sparingly soluble salt, useful particularly for making lithium hydroxide, uses an electrodialysis cell, supplied with concentrated aqueous salt solution", published on Sep. 22, 2005.

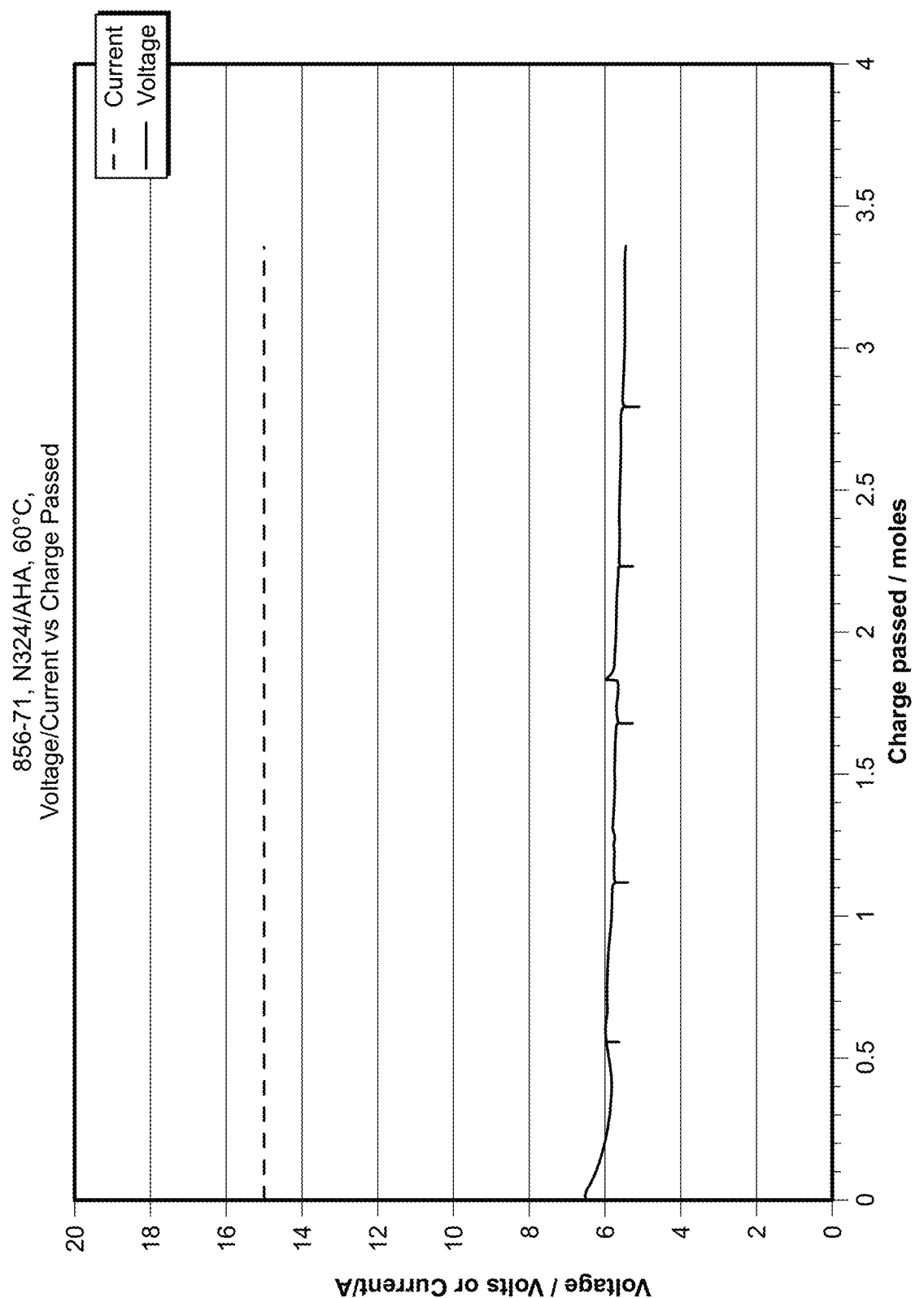

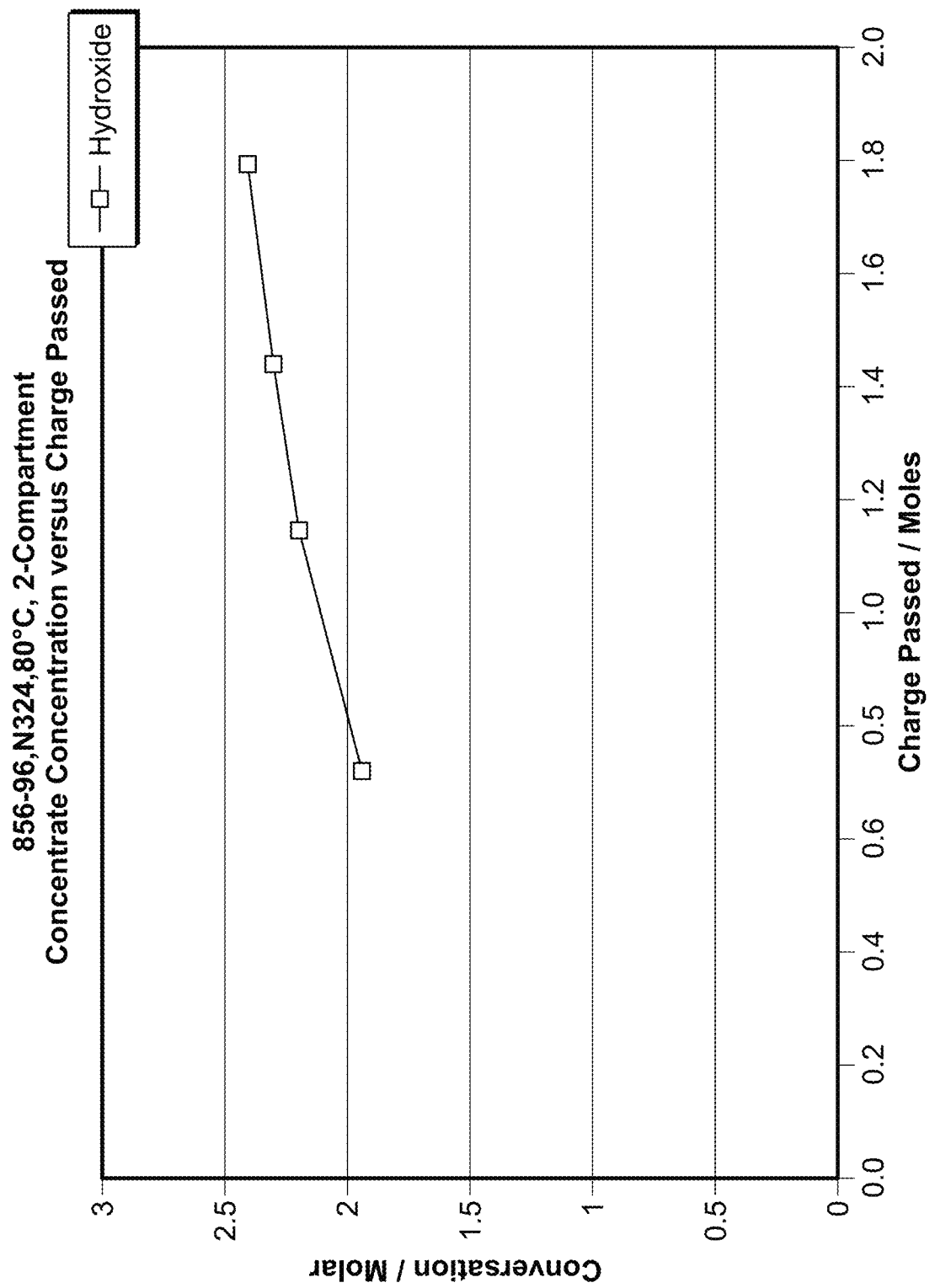

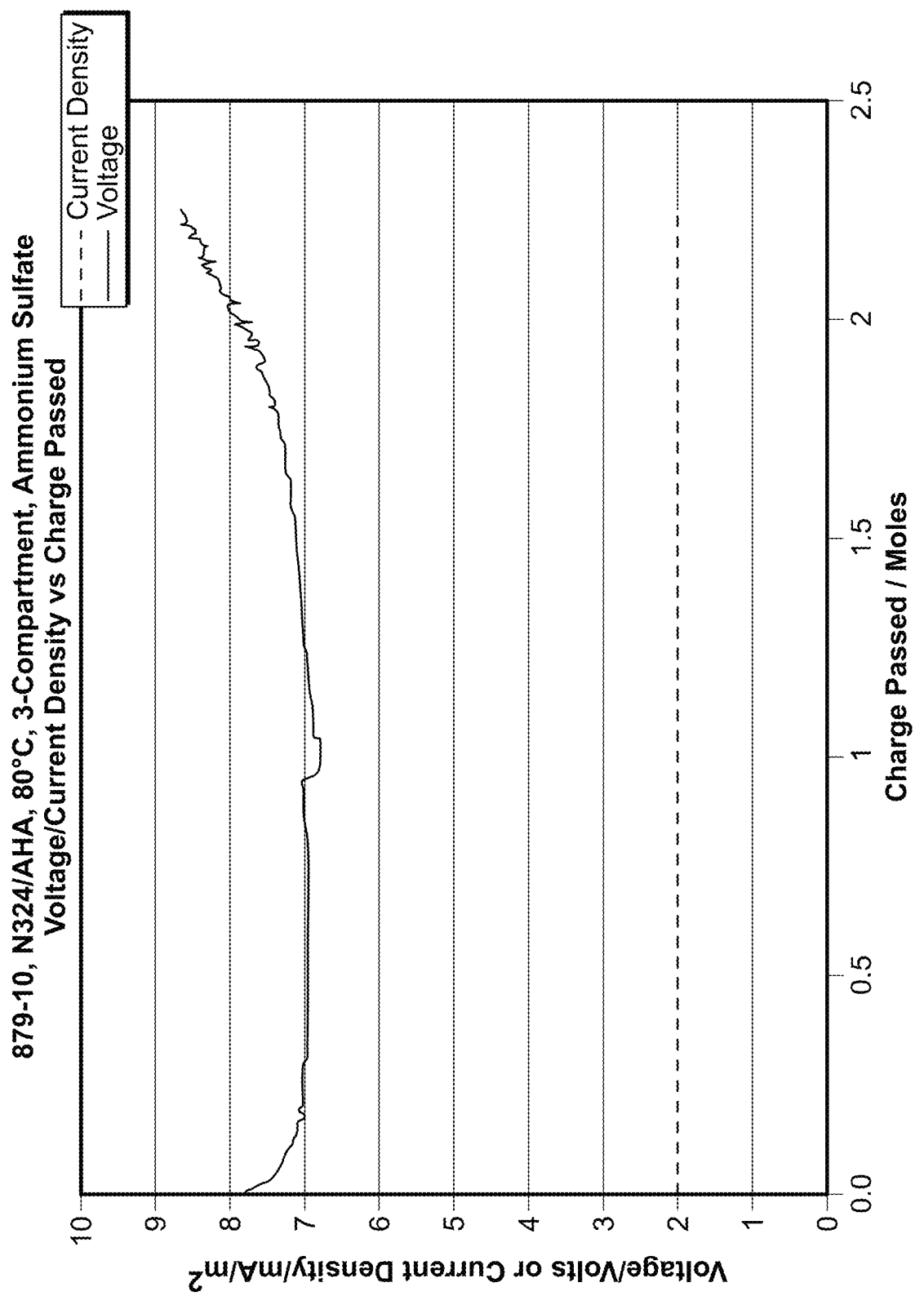

PROCESSES FOR PREPARING LITHIUM CARBONATE

The present disclosure is a continuation of U.S. patent application Ser. No. 16/185,973 filed on Nov. 9, 2018, that is a continuation of U.S. patent application Ser. No. 15/031,746 filed on Apr. 24, 2016 (issued as U.S. Pat. No. 10,144,990 on Dec. 4, 2018), that is a 35 USC 371 national stage entry of PCT/CA2014/000768 filed on Oct. 23, 2014 and that claims priority from U.S. provisional application No. 61/894,655 filed on Oct. 23, 2013. These documents are hereby incorporated by reference in their entirety.

The present disclosure relates to improvements in the field of chemistry applied to the manufacture of lithium carbonate. For example, such processes are useful for preparing lithium carbonate from lithium-containing materials. For example, the disclosure also relates to the production of other lithium products such as lithium hydroxide and lithium sulphate.

The demand for lithium carbonate is growing rapidly. The market for lithium carbonate is expanding and the current world production capacity will likely not meet the expected increase in demand. For example, lithium carbonate is used as an additive in aluminum molten salt electrolysis and in enamels and glasses. Lithium carbonate can also be used to control manic depression, in the production of electronic grade crystals of lithium niobate, tantalate and fluoride as well as in the emerging technology of lithium batteries.

Lithium batteries have become the battery of choice in several existing and proposed new applications due to their high energy density to weight ratio, as well as their relatively long useful life when compared to other types of batteries. Lithium batteries are used for several applications such as laptop computers, cell phones, medical devices and implants (for example cardiac pacemakers). Lithium batteries are also an interesting option in the development of new automobiles, e.g., hybrid and electric vehicles, which are both environmentally friendly and "green" because of the reduced emissions and decreased reliance on hydrocarbon fuels.

High purity can be required for lithium carbonate that is used, for example, for various battery applications. There is a limited number of lithium carbonate producers. As a direct result of increased demand for lithium products, battery manufacturers are looking for additional and reliable sources of high quality lithium products, for example lithium carbonate.

Few methods have been proposed so far for preparing lithium carbonate. Lithium carbonate can be prepared, for example by using lithium-containing brines or using sea water. Some proposed methods involve several purifying steps of the produced lithium carbonate. For example, methods have been proposed that require precipitation with sodium carbonate and involve several purifying steps of the produced lithium carbonate.

There is thus a need for providing an alternative to the existing solutions for preparing lithium carbonate.

According to one aspect, there is provided a process for preparing lithium carbonate, the process comprising:
submitting an aqueous composition comprising lithium sulphate to an electrolysis or an electrodialysis under conditions suitable for converting at least a portion of the lithium sulphate into lithium hydroxide, wherein during the electrolysis or the electrodialysis, the aqueous composition comprising lithium sulphate is at least substantially maintained at a pH having a value of about 1 to about 4; and converting the lithium hydroxide into lithium carbonate.

According to another aspect, there is provided a process for preparing lithium carbonate, the process comprising:
submitting an aqueous composition comprising a lithium compound to an electrolysis or an electrodialysis under conditions suitable for converting at least a portion of the lithium compound into lithium hydroxide; and
converting the lithium hydroxide into lithium carbonate.

According to another aspect, there is provided a process for preparing lithium carbonate, the process comprising
leaching an acid roasted lithium-containing material with water so as to obtain an aqueous composition comprising $Li^+$ and at least one metal ion;
reacting the aqueous composition comprising $Li^+$ and the at least one metal ion with a base so as to obtain a pH of about 4.5 to about 6.5 and thereby at least partially precipitating the at least one metal ion under the form of at least one hydroxide so as to obtain a precipitate comprising the at least one hydroxide and an aqueous composition comprising $Li^+$ and having a reduced content of the at least one metal ion, and separating the aqueous composition from the precipitate;
optionally reacting the aqueous composition comprising $Li^+$ and having the reduced content of the at least one metal ion with another base so as to obtain a pH of about 9.5 to about 11.5, and with optionally at least one metal carbonate, thereby at least partially precipitating at least one metal ion optionally under the form of at least one carbonate so as to obtain a precipitate optionally comprising the at least one carbonate and an aqueous composition comprising $Li^+$ and having a reduced content of the at least one metal ion, and separating the aqueous composition from the precipitate;
contacting the aqueous composition comprising $Li^+$ and having a reduced content of the at least one metal ion with an ion exchange resin so as to at least partially remove at least one metal ion from the composition, thereby obtaining an aqueous composition comprising a lithium compound;
submitting the aqueous composition comprising the lithium compound to an electrodialysis or an electrolysis; and
converting the lithium hydroxide into lithium carbonate.

According to another aspect, there is provided a process for preparing lithium carbonate, the process comprising
leaching an acid roasted lithium-containing material with water so as to obtain an aqueous composition comprising $Li^+$ and at least one metal ion;
reacting the aqueous composition comprising $Li^+$ and the at least one metal ion with a base so as to obtain a pH of about 4.5 to about 6.5 and thereby at least partially precipitating the at least one metal ion under the form of at least one hydroxide so as to obtain a precipitate comprising the at least one hydroxide and an aqueous composition comprising $Li^+$ and having a reduced content of the at least one metal ion, and separating the aqueous composition from the precipitate;
optionally reacting the aqueous composition comprising $Li^+$ and having the reduced content of the at least one metal ion with another base so as to obtain a pH of about 9.5 to about 11.5, and with optionally at least one metal carbonate, thereby at least partially precipitating at least one metal ion optionally under the form of at least one carbonate so as to obtain a precipitate optionally comprising the at least one carbonate and an aqueous composition comprising $Li^+$ and having a reduced content of the at least one metal ion, and separating the aqueous composition from the precipitate;

contacting the aqueous composition comprising Li$^+$ and having a reduced content of the at least one metal ion with an ion exchange resin so as to at least partially remove at least one metal ion from the composition, thereby obtaining an aqueous composition comprising a lithium compound;

submitting the aqueous composition comprising the lithium compound to an electrodialysis or an electrolysis according to a process as defined in the present disclosure; and converting the lithium hydroxide into lithium carbonate as defined in the present disclosure.

Therefore according to an aspect of the present disclosure, there is provided a process for preparing lithium hydroxide, the process comprising:

submitting an aqueous composition comprising a lithium compound to a first electromembrane process under suitable conditions for conversion of the lithium compound to lithium hydroxide, and obtaining a first lithium-reduced aqueous stream and a first lithium hydroxide-enriched aqueous stream; and submitting the first lithium-reduced aqueous stream to a second electromembrane process under suitable conditions to prepare at least a further portion of lithium hydroxide and obtaining a second lithium-reduced aqueous stream and a second lithium-hydroxide enriched aqueous stream.

The present disclosure also includes a process for preparing lithium hydroxide, the process comprising:

submitting an aqueous composition comprising a lithium compound to a first electromembrane process under suitable conditions for conversion of the lithium compound to lithium hydroxide to proceed to a pre-determined extent, and obtaining a first lithium-reduced aqueous stream and a first lithium hydroxide-enriched aqueous stream; and submitting the first lithium-reduced aqueous stream to a second electromembrane process under suitable conditions to prepare at least a further portion of lithium hydroxide and obtaining a second lithium-reduced aqueous stream and a second lithium-hydroxide enriched aqueous stream.

The present disclosure also includes a process for preparing lithium hydroxide, the process comprising:

submitting an aqueous composition comprising lithium sulfate and/or lithium bisulfate to a first electromembrane process under suitable conditions for conversion of the lithium sulfate and/or lithium bisulfate to lithium hydroxide, and obtaining a first lithium-reduced aqueous stream and a first lithium hydroxide-enriched aqueous stream; and submitting the first lithium-reduced aqueous stream to a second electromembrane process under suitable conditions to prepare at least a further portion of lithium hydroxide and obtaining a second lithium-reduced aqueous stream and a second lithium-hydroxide enriched aqueous stream.

The present disclosure also includes a process for preparing lithium hydroxide, the process comprising:

submitting an aqueous composition comprising lithium sulfate and/or lithium bisulfate to a first electromembrane process under suitable conditions for conversion of the lithium sulfate and/or lithium bisulfate to lithium hydroxide to proceed to a pre-determined extent, and obtaining a first lithium-reduced aqueous stream and a first lithium hydroxide-enriched aqueous stream; and submitting the first lithium-reduced aqueous stream to a second electromembrane process under suitable conditions to prepare at least a further portion of lithium hydroxide and obtaining a second lithium-reduced aqueous stream and a second lithium-hydroxide enriched aqueous stream.

The present disclosure also includes a process for preparing lithium hydroxide, the process comprising:

submitting an aqueous composition comprising lithium sulfate and/or lithium bisulfate to a first electromembrane process that comprises a two-compartment membrane process under suitable conditions for conversion of the lithium sulfate and/or lithium bisulfate to lithium hydroxide, and obtaining a first lithium-reduced aqueous stream and a first lithium hydroxide-enriched aqueous stream; and submitting the first lithium-reduced aqueous stream to a second electromembrane process that comprises a three-compartment membrane process under suitable conditions to prepare at least a further portion of lithium hydroxide and obtaining a second lithium-reduced aqueous stream and a second lithium-hydroxide enriched aqueous stream.

The present disclosure also includes a process for preparing lithium hydroxide, the process comprising:

submitting an aqueous composition comprising lithium sulfate and/or lithium bisulfate to a first electromembrane process that comprises a two-compartment membrane process under suitable conditions for conversion of the lithium sulfate and/or lithium bisulfate to lithium hydroxide to proceed to a pre-determined extent, and obtaining a first lithium-reduced aqueous stream and a first lithium hydroxide-enriched aqueous stream; and submitting the first lithium-reduced aqueous stream to a second electromembrane process that comprises a three-compartment membrane process under suitable conditions to prepare at least a further portion of lithium hydroxide and obtaining a second lithium-reduced aqueous stream and a second lithium-hydroxide enriched aqueous stream.

The present disclosure also includes a process for preparing lithium hydroxide, the process comprising:

submitting an aqueous composition comprising a lithium compound to a two-compartment monopolar or bipolar membrane electrolysis process carried out in a first electrochemical cell comprising an anolyte compartment separated from a catholyte compartment by a cation exchange membrane under suitable conditions for conversion of the lithium compound to lithium hydroxide, and obtaining a first lithium-reduced aqueous stream and a first lithium hydroxide-enriched aqueous stream; and submitting the first lithium-reduced aqueous stream to a three-compartment monopolar or bipolar membrane electrolysis process carried out in a second electrochemical cell comprising an anolyte compartment separated from a central compartment by an anion exchange membrane and a catholyte compartment separated from the central compartment by a cation exchange membrane under suitable conditions to prepare at least a further portion of lithium hydroxide and obtaining a second lithium-reduced aqueous stream and a second lithium-hydroxide enriched aqueous stream.

The present disclosure also includes a process for preparing lithium hydroxide, the process comprising:

submitting an aqueous composition comprising lithium sulfate and/or lithium bisulfate to a two-compartment monopolar or bipolar membrane electrolysis process carried out in a first electrochemical cell comprising an anolyte compartment separated from a catholyte compartment by a cation exchange membrane under suitable conditions for conversion of the lithium sulfate and/or lithium bisulfate to lithium hydroxide, and obtaining a first lithium-reduced aqueous stream and a first lithium hydroxide-enriched aqueous stream; and submitting the first lithium-reduced aqueous stream to a three-compartment monopolar or bipolar membrane electrolysis process carried out in a second electrochemical cell comprising an anolyte compartment separated from a central compartment by an anion exchange membrane and a catholyte compartment separated from the central compartment by a cation exchange membrane under suitable conditions to prepare at least a further portion of lithium hydroxide and obtaining a second lithium-reduced aqueous stream and a second lithium-hydroxide enriched aqueous stream.

The present disclosure also includes a process for preparing lithium hydroxide, the process comprising:

submitting an aqueous composition comprising a lithium compound to a two-compartment monopolar or bipolar membrane electrolysis process carried out in a first electrochemical cell comprising an anolyte compartment separated from a catholyte compartment by a cation exchange membrane under suitable conditions for conversion of the lithium compound to lithium hydroxide to proceed to a pre-determined extent, and obtaining a first lithium-reduced aqueous stream and a first lithium hydroxide-enriched aqueous stream; and submitting the first lithium-reduced aqueous stream to a three-compartment monopolar or bipolar membrane electrolysis process carried out in a second electrochemical cell comprising an anolyte compartment separated from a central compartment by an anion exchange membrane and a catholyte compartment separated from the central compartment by a cation exchange membrane under suitable conditions to prepare at least a further portion of lithium hydroxide and obtaining a second lithium-reduced aqueous stream and a second lithium-hydroxide enriched aqueous stream.

The present disclosure also includes a process for preparing lithium hydroxide, the process comprising:

submitting an aqueous composition comprising lithium sulfate and/or lithium bisulfate to a two-compartment monopolar or bipolar membrane electrolysis process carried out in a first electrochemical cell comprising an anolyte compartment separated from a catholyte compartment by a cation exchange membrane under suitable conditions for conversion of the lithium sulfate and/or lithium bisulfate to lithium hydroxide to proceed to a pre-determined extent, and obtaining a first lithium-reduced aqueous stream and a first lithium hydroxide-enriched aqueous stream; and submitting the first lithium-reduced aqueous stream to a three-compartment monopolar or bipolar membrane electrolysis process carried out in a second electrochemical cell comprising an anolyte compartment separated from a central compartment by an anion exchange membrane and a catholyte compartment separated from the central compartment by a cation exchange membrane under suitable conditions to prepare at least a further portion of lithium hydroxide and obtaining a second lithium-reduced aqueous stream and a second lithium-hydroxide enriched aqueous stream.

Therefore according to an aspect of the present disclosure, there is provided a process for preparing lithium carbonate, the process comprising:

submitting an aqueous composition comprising a lithium compound to a first electromembrane process under suitable conditions for conversion of the lithium compound to lithium hydroxide, and obtaining a first lithium-reduced aqueous stream and a first lithium hydroxide-enriched aqueous stream;

submitting the first lithium-reduced aqueous stream to a second electromembrane process under suitable conditions to prepare at least a further portion of lithium hydroxide and obtaining a second lithium-reduced aqueous stream and a second lithium-hydroxide enriched aqueous stream; and converting the lithium hydroxide into lithium carbonate;

The present disclosure also includes a process for preparing lithium carbonate, the process comprising:

submitting an aqueous composition comprising a lithium compound to a first electromembrane process under suitable conditions for conversion of the lithium compound to lithium hydroxide to proceed to a pre-determined extent, and obtaining a first lithium-reduced aqueous stream and a first lithium hydroxide-enriched aqueous stream;

submitting the first lithium-reduced aqueous stream to a second electromembrane process under suitable conditions to prepare at least a further portion of lithium hydroxide and obtaining a second lithium-reduced aqueous stream and a second lithium-hydroxide enriched aqueous stream;

converting the lithium hydroxide into lithium carbonate;

The present disclosure also includes a process for preparing lithium carbonate, the process comprising:

submitting an aqueous composition comprising lithium sulfate and/or lithium bisulfate to a first electromembrane process under suitable conditions for conversion of the lithium sulfate and/or lithium bisulfate to lithium hydroxide, and obtaining a first lithium-reduced aqueous stream and a first lithium hydroxide-enriched aqueous stream;

submitting the first lithium-reduced aqueous stream to a second electromembrane process under suitable conditions to prepare at least a further portion of lithium hydroxide and obtaining a second lithium-reduced aqueous stream and a second lithium-hydroxide enriched aqueous stream;

converting the lithium hydroxide into lithium carbonate;

The present disclosure also includes a process for preparing lithium carbonate, the process comprising:

submitting an aqueous composition comprising lithium sulfate and/or lithium bisulfate to a first electromembrane process under suitable conditions for conversion of the lithium sulfate and/or lithium bisulfate to lithium hydroxide to proceed to a pre-determined extent, and obtaining a first lithium-reduced aqueous stream and a first lithium hydroxide-enriched aqueous stream;

submitting the first lithium-reduced aqueous stream to a second electromembrane process under suitable conditions to prepare at least a further portion of lithium hydroxide and obtaining a second lithium-reduced aqueous stream and a second lithium-hydroxide enriched aqueous stream; and converting the lithium hydroxide into lithium carbonate;

The present disclosure also includes a process for preparing lithium carbonate, the process comprising:
- submitting an aqueous composition comprising lithium sulfate and/or lithium bisulfate to a first electromembrane process that comprises a two-compartment membrane process under suitable conditions for conversion of the lithium sulfate and/or lithium bisulfate to lithium hydroxide, and obtaining a first lithium-reduced aqueous stream and a first lithium hydroxide-enriched aqueous stream;
- submitting the first lithium-reduced aqueous stream to a second electromembrane process that comprises a three-compartment membrane process under suitable conditions to prepare at least a further portion of lithium hydroxide and obtaining a second lithium-reduced aqueous stream and a second lithium-hydroxide enriched aqueous stream; and
- converting the lithium hydroxide into lithium carbonate;

The present disclosure also includes a process for preparing lithium carbonate, the process comprising:
- submitting an aqueous composition comprising lithium sulfate and/or lithium bisulfate to a first electromembrane process that comprises a two-compartment membrane process under suitable conditions for conversion of the lithium sulfate and/or lithium bisulfate to lithium hydroxide to proceed to a pre-determined extent, and obtaining a first lithium-reduced aqueous stream and a first lithium hydroxide-enriched aqueous stream;
- submitting the first lithium-reduced aqueous stream to a second electromembrane process that comprises a three-compartment membrane process under suitable conditions to prepare at least a further portion of lithium hydroxide and obtaining a second lithium-reduced aqueous stream and a second lithium-hydroxide enriched aqueous stream; and
- converting the lithium hydroxide into lithium carbonate;

The present disclosure also includes a process for preparing lithium carbonate, the process comprising:
- submitting an aqueous composition comprising a lithium compound to a two-compartment monopolar or bipolar membrane electrolysis process carried out in a first electrochemical cell comprising an anolyte compartment separated from a catholyte compartment by a cation exchange membrane under suitable conditions for conversion of the lithium compound to lithium hydroxide, and obtaining a first lithium-reduced aqueous stream and a first lithium hydroxide-enriched aqueous stream;
- submitting the first lithium-reduced aqueous stream to a three-compartment monopolar or bipolar membrane electrolysis process carried out in a second electrochemical cell comprising an anolyte compartment separated from a central compartment by an anion exchange membrane and a catholyte compartment separated from the central compartment by a cation exchange membrane under suitable conditions to prepare at least a further portion of lithium hydroxide and obtaining a second lithium-reduced aqueous stream and a second lithium-hydroxide enriched aqueous stream; and
- converting the lithium hydroxide into lithium carbonate;

The present disclosure also includes a process for preparing lithium carbonate, the process comprising:
- submitting an aqueous composition comprising lithium sulfate and/or lithium bisulfate to a two-compartment monopolar or bipolar membrane electrolysis process carried out in a first electrochemical cell comprising an anolyte compartment separated from a catholyte compartment by a cation exchange membrane under suitable conditions for conversion of the lithium sulfate and/or lithium bisulfate to lithium hydroxide, and obtaining a first lithium-reduced aqueous stream and a first lithium hydroxide-enriched aqueous stream;
- submitting the first lithium-reduced aqueous stream to a three-compartment monopolar or bipolar membrane electrolysis process carried out in a second electrochemical cell comprising an anolyte compartment separated from a central compartment by an anion exchange membrane and a catholyte compartment separated from the central compartment by a cation exchange membrane under suitable conditions to prepare at least a further portion of lithium hydroxide and obtaining a second lithium-reduced aqueous stream and a second lithium-hydroxide enriched aqueous stream; and
- converting the lithium hydroxide into lithium carbonate;

The present disclosure also includes a process for preparing lithium carbonate, the process comprising:
- submitting an aqueous composition comprising a lithium compound to a two-compartment monopolar or bipolar membrane electrolysis process carried out in a first electrochemical cell comprising an anolyte compartment separated from a catholyte compartment by a cation exchange membrane under suitable conditions for conversion of the lithium compound to lithium hydroxide to proceed to a pre-determined extent, and obtaining a first lithium-reduced aqueous stream and a first lithium hydroxide-enriched aqueous stream;
- submitting the first lithium-reduced aqueous stream to a three-compartment monopolar or bipolar membrane electrolysis process carried out in a second electrochemical cell comprising an anolyte compartment separated from a central compartment by an anion exchange membrane and a catholyte compartment separated from the central compartment by a cation exchange membrane under suitable conditions to prepare at least a further portion of lithium hydroxide and obtaining a second lithium-reduced aqueous stream and a second lithium-hydroxide enriched aqueous stream; and converting the lithium hydroxide into lithium carbonate;

The present disclosure also includes a process for preparing lithium carbonate, the process comprising:
- submitting an aqueous composition comprising lithium sulfate and/or lithium bisulfate to a two-compartment monopolar or bipolar membrane electrolysis process carried out in a first electrochemical cell comprising an anolyte compartment separated from a catholyte compartment by a cation exchange membrane under suitable conditions for conversion of the lithium sulfate and/or lithium bisulfate to lithium hydroxide to proceed to a pre-determined extent, and obtaining a first lithium-reduced aqueous stream and a first lithium hydroxide-enriched aqueous stream;
- submitting the first lithium-reduced aqueous stream to a three-compartment monopolar or bipolar membrane electrolysis process carried out in a second electrochemical cell comprising an anolyte compartment separated from a central compartment by an anion exchange membrane and a catholyte compartment separated from the central compartment by a cation exchange membrane under suitable conditions to prepare at least a further portion of lithium hydroxide and obtaining a second lithium-reduced aqueous stream and a second lithium-hydroxide enriched aqueous stream; and converting the lithium hydroxide into lithium carbonate;

According to another aspect, there is provided a process for preparing lithium carbonate, the process comprising:

reacting an aqueous composition comprising lithium hydroxide with $CO_2$ by sparging the $CO_2$ into the composition, the sparging being carried out at a pH of about 10 to about 12.5, thereby obtaining a precipitate comprising the lithium carbonate;

inserting at least a portion of the precipitate into a clarifier and obtaining a supernatant comprising lithium bicarbonate and a solid comprising the lithium carbonate, separating the solid from the supernatant; and heating the supernatant at a temperature of at least about 85° C. so as to at least partially convert the lithium bicarbonate into lithium carbonate.

According to another aspect, there is provided a process for preparing lithium carbonate, the process comprising:

submitting an aqueous composition comprising a lithium compound to an electrodialysis or electrolysis under conditions suitable for converting at least a portion of the lithium compound into lithium hydroxide, wherein during the electrodialysis or electrolysis, the aqueous composition comprising the lithium compound is at least substantially maintained at a pH having a value of about 9.5 to about 12.5; and converting the lithium hydroxide into lithium carbonate.

According to another aspect, there is provided a process for preparing lithium carbonate, the process comprising:

submitting an aqueous composition comprising a lithium compound to an electrodialysis or electrolysis under conditions suitable for converting at least a portion of the lithium compound into lithium hydroxide, wherein during the electrodialysis or electrolysis, the aqueous composition comprising the lithium compound has a pH of greater than 7; and converting the lithium hydroxide into lithium carbonate.

According to another aspect, there is provided a process for preparing lithium carbonate, the process comprising leaching an acid roasted lithium-containing material with water so as to obtain an aqueous composition comprising $Li^+$ and at least one metal ion;

reacting the aqueous composition comprising $Li^+$ and the at least one metal ion with a base so as to obtain a pH of about 4.5 to about 6.5 and thereby at least partially precipitating the at least one metal ion under the form of at least one hydroxide so as to obtain a precipitate comprising the at least one hydroxide and an aqueous composition comprising $Li^+$ and having a reduced content of the at least one metal ion, and separating the aqueous composition from the precipitate;

optionally reacting the aqueous composition comprising $Li^+$ and having the reduced content of the at least one metal ion with another base so as to obtain a pH of about 9.5 to about 11.5, and with optionally at least one metal carbonate, thereby at least partially precipitating at least one metal ion optionally under the form of at least one carbonate so as to obtain a precipitate optionally comprising the at least one carbonate and an aqueous composition comprising $Li^+$ and having a reduced content of the at least one metal ion, and separating the aqueous composition from the precipitate;

contacting the aqueous composition comprising $Li^+$ and having a reduced content of the at least one metal ion with an ion exchange resin so as to at least partially remove at least one metal ion from the composition, thereby obtaining an aqueous composition comprising a lithium compound;

submitting the aqueous composition comprising the lithium compound to an electrodialysis or electrolysis under conditions suitable for converting at least a portion of the lithium compound into lithium hydroxide; and converting the lithium hydroxide into lithium carbonate.

According to another aspect, there is provided a process for preparing lithium carbonate, the process comprising leaching a base-baked lithium-containing material with water so as to obtain an aqueous composition comprising $Li^+$ and at least one metal ion;

reacting the aqueous composition comprising $Li^+$ and the at least one metal ion with a base so as to obtain a pH of about 4.5 to about 6.5 and thereby at least partially precipitating the at least one metal ion under the form of at least one hydroxide so as to obtain a precipitate comprising the at least one hydroxide and an aqueous composition comprising $Li^+$ and having a reduced content of the at least one metal ion, and separating the aqueous composition from the precipitate;

optionally reacting the aqueous composition comprising $Li^+$ and having the reduced content of the at least one metal ion with another base so as to obtain a pH of about 9.5 to about 11.5, and with optionally at least one metal carbonate, thereby at least partially precipitating at least one metal ion optionally under the form of at least one carbonate so as to obtain a precipitate optionally comprising the at least one carbonate and an aqueous composition comprising $Li^+$ and having a reduced content of the at least one metal ion, and separating the aqueous composition from the precipitate;

contacting the aqueous composition comprising $Li^+$ and having a reduced content of the at least one metal ion with an ion exchange resin so as to at least partially remove at least one metal ion from the composition, thereby obtaining an aqueous composition comprising a lithium compound;

submitting the aqueous composition comprising the lithium compound to an electrodialysis or electrolysis under conditions suitable for converting at least a portion of the lithium compound into lithium hydroxide; and converting the lithium hydroxide into lithium carbonate.

According to another aspect, there is provided a process for preparing lithium carbonate, the process comprising leaching a base-baked lithium-containing material with water so as to obtain an aqueous composition comprising $Li^+$ and at least one metal ion;

optionally reacting the aqueous composition comprising $Li^+$ and the at least one metal ion with a base so as to obtain a pH of about 4.5 to about 6.5;

at least partially precipitating the at least one metal ion under the form of at least one hydroxide so as to obtain a precipitate comprising the at least one hydroxide and an aqueous composition comprising $Li^+$ and having a reduced content of the at least one metal ion, and separating the aqueous composition from the precipitate;

optionally reacting the aqueous composition comprising $Li^+$ and having the reduced content of the at least one metal ion with another base so as to obtain a pH of about 9.5 to about 11.5, and with optionally at least one metal carbonate, thereby at least partially precipitating at least one metal ion optionally under the form of at least one carbonate so as to obtain a precipitate optionally comprising the at least one carbonate and an aqueous composition comprising $Li^+$ and having a reduced content of the at least one metal ion, and separating the aqueous composition from the precipitate;

contacting the aqueous composition comprising $Li^+$ and having a reduced content of the at least one metal ion with an ion exchange resin so as to at least partially remove at least one metal ion from the composition, thereby obtaining an aqueous composition comprising a lithium compound;

submitting the aqueous composition comprising the lithium compound to an electrodialysis or electrolysis under conditions suitable for converting at least a portion of the lithium compound into lithium hydroxide; and converting the lithium hydroxide into lithium carbonate.

According to another aspect, there is provided a process for preparing lithium carbonate, the process comprising:

submitting an aqueous composition comprising lithium sulphate to an electrodialysis or electrolysis under conditions suitable for converting at least a portion of the lithium sulphate into lithium hydroxide, wherein during the electrodialysis or electrolysis, the aqueous composition comprising lithium sulphate is at least substantially maintained at a pH having a value of about 9.5 to about 12.5; and converting the lithium hydroxide into lithium carbonate.

According to another aspect, there is provided a process for preparing lithium carbonate, the process comprising:

submitting an aqueous composition comprising lithium sulphate to an electrodialysis or electrolysis under conditions suitable for converting at least a portion of the lithium sulphate into lithium hydroxide, wherein during the electrodialysis or electrolysis, the aqueous composition comprising lithium sulphate has a pH of greater than 7; and converting the lithium hydroxide into lithium carbonate.

According to another aspect, there is provided a process for preparing lithium hydroxide, the process comprising:

submitting an aqueous composition comprising a lithium compound to an electrodialysis or electrolysis under conditions suitable for converting at least a portion of the lithium compound into lithium hydroxide.

According to another aspect, there is provided a process for preparing lithium hydroxide, the process comprising submitting an aqueous composition comprising a lithium compound to an electrodialysis or electrolysis under conditions suitable for converting at least a portion of the lithium compound into lithium hydroxide, wherein during the electrodialysis or electrolysis, the aqueous composition comprising the lithium compound is at least substantially maintained at a pH having a value of about 9.5 to about 12.5.

According to another aspect, there is provided a process for preparing lithium hydroxide, the process comprising:

submitting an aqueous composition comprising lithium sulphate to an electrodialysis or electrolysis under conditions suitable for converting at least a portion of the lithium sulphate into lithium hydroxide, wherein during the electrodialysis or electrolysis, the aqueous composition comprising lithium sulphate is at least substantially maintained at a pH having a value of about 9.5 to about 12.5.

According to another aspect, there is provided a process for preparing lithium hydroxide, the process comprising:

submitting an aqueous composition comprising a lithium compound to an electrodialysis or electrolysis under conditions suitable for converting at least a portion of the lithium compound into lithium hydroxide, wherein during the electrodialysis or electrolysis, the aqueous composition comprising the lithium compound has a pH of greater than 7.

According to another aspect, there is provided a process for preparing lithium hydroxide, the process comprising:

submitting an aqueous composition comprising lithium sulphate to an electrodialysis or electrolysis under conditions suitable for converting at least a portion of the lithium sulphate into lithium hydroxide, wherein during the electrodialysis or electrolysis, the aqueous composition comprising lithium sulphate has a pH of greater than 7.

According to another aspect, there is provided a process for preparing lithium hydroxide, the process comprising:

leaching an acid roasted lithium-containing material with water so as to obtain an aqueous composition comprising $Li^+$ and at least one metal ion;

reacting the aqueous composition comprising $Li^+$ and the at least one metal ion with a base so as to obtain a pH of about 4.5 to about 6.5 and thereby at least partially precipitating the at least one metal ion under the form of at least one hydroxide so as to obtain a precipitate comprising the at least one hydroxide and an aqueous composition comprising $Li^+$ and having a reduced content of the at least one metal ion, and separating the aqueous composition from the precipitate;

contacting the aqueous composition comprising $Li^+$ and having a reduced content of the at least one metal ion with an ion exchange resin so as to at least partially remove at least one metal ion from the composition, thereby obtaining an aqueous composition comprising a lithium compound; and submitting the aqueous composition comprising the lithium compound to an electrodialysis or electrolysis under conditions suitable for converting at least a portion of the lithium compound into lithium hydroxide.

According to another aspect, there is provided a process for preparing lithium hydroxide, the process comprising:

leaching a base-baked lithium-containing material with water so as to obtain an aqueous composition comprising $Li^+$ and at least one metal ion;

reacting the aqueous composition comprising $Li^+$ and the at least one metal ion with a base so as to obtain a pH of about 4.5 to about 6.5 and thereby at least partially precipitating the at least one metal ion under the form of at least one hydroxide so as to obtain a precipitate comprising the at least one hydroxide and an aqueous composition comprising $Li^+$ and having a reduced content of the at least one metal ion, and separating the aqueous composition from the precipitate;

optionally reacting the aqueous composition comprising $Li^+$ and having the reduced content of the at least one metal ion with another base so as to obtain a pH of about 9.5 to about 11.5, and with optionally at least one metal carbonate, thereby at least partially precipitating at least one metal ion optionally under the form of at least one carbonate so as to obtain a precipitate optionally comprising the at least one carbonate and an aqueous composition comprising $Li^+$ and having a reduced content of the at least one metal ion, and separating the aqueous composition from the precipitate;

contacting the aqueous composition comprising Li$^+$ and having a reduced content of the at least one metal ion with an ion exchange resin so as to at least partially remove at least one metal ion from the composition, thereby obtaining an aqueous composition comprising a lithium compound; and submitting the aqueous composition comprising the lithium compound to an electrodialysis or electrolysis under conditions suitable for converting at least a portion of the lithium compound into lithium hydroxide.

According to another aspect, there is provided a process for preparing lithium hydroxide, the process comprising:

leaching a base-baked lithium-containing material with water so as to obtain an aqueous composition comprising Li$^+$ and at least one metal ion;

optionally reacting the aqueous composition comprising Li$^+$ and the at least one metal ion with a base so as to obtain a pH of about 4.5 to about 6.5 at least partially precipitating the at least one metal ion under the form of at least one hydroxide so as to obtain a precipitate comprising the at least one hydroxide and an aqueous composition comprising Li$^+$ and having a reduced content of the at least one metal ion, and separating the aqueous composition from the precipitate;

optionally reacting the aqueous composition comprising Li$^+$ and having the reduced content of the at least one metal ion with another base so as to obtain a pH of about 9.5 to about 11.5, and with optionally at least one metal carbonate, thereby at least partially precipitating at least one metal ion optionally under the form of at least one carbonate so as to obtain a precipitate optionally comprising the at least one carbonate and an aqueous composition comprising Li$^+$ and having a reduced content of the at least one metal ion, and separating the aqueous composition from the precipitate;

contacting the aqueous composition comprising Li$^+$ and having a reduced content of the at least one metal ion with an ion exchange resin so as to at least partially remove at least one metal ion from the composition, thereby obtaining an aqueous composition comprising a lithium compound; and submitting the aqueous composition comprising the lithium compound to an electrodialysis or electrolysis under conditions suitable for converting at least a portion of the lithium compound into lithium hydroxide.

According to another aspect, there is provided a process for preparing lithium hydroxide, the process comprising:

leaching an acid roasted lithium-containing material with water so as to obtain an aqueous composition comprising Li$^+$ and at least one metal ion;

reacting the aqueous composition comprising Li$^+$ and the at least one metal ion with a base so as to obtain a pH of about 4.5 to about 6.5 and thereby at least partially precipitating the at least one metal ion under the form of at least one hydroxide so as to obtain a precipitate comprising the at least one hydroxide and an aqueous composition comprising Li$^+$ and having a reduced content of the at least one metal ion, and separating the aqueous composition from the precipitate;

optionally reacting the aqueous composition comprising Li$^+$ and having the reduced content of the at least one metal ion with another base so as to obtain a pH of about 9.5 to about 11.5, and with optionally at least one metal carbonate, thereby at least partially precipitating at least one metal ion optionally under the form of at least one carbonate so as to obtain a precipitate optionally comprising the at least one carbonate and an aqueous composition comprising Li$^+$ and having a reduced content of the at least one metal ion, and separating the aqueous composition from the precipitate;

contacting the aqueous composition comprising Li$^+$ and having a reduced content of the at least one metal ion with an ion exchange resin so as to at least partially remove at least one metal ion from the composition, thereby obtaining an aqueous composition comprising a lithium compound; and submitting the aqueous composition comprising the lithium compound to an electrodialysis or electrolysis under conditions suitable for converting at least a portion of the lithium compound into lithium hydroxide.

According to another aspect, there is provided a process for preparing lithium sulphate, the process comprising:

leaching an acid roasted lithium-containing material with water so as to obtain an aqueous composition comprising Li$^+$ and at least one metal ion, wherein the lithium-containing material is a material that has been previously reacted with H$_2$SO$_4$;

reacting the aqueous composition comprising Li$^+$ and the at least one metal ion with a base so as to obtain a pH of about 4.5 to about 6.5 and thereby at least partially precipitating the at least one metal ion under the form of at least one hydroxide so as to obtain a precipitate comprising the at least one hydroxide and an aqueous composition comprising Li$^+$ and having a reduced content of the at least one metal ion, and separating the aqueous composition from the precipitate; and contacting the aqueous composition comprising Li$^+$ and having a reduced content of the at least one metal ion with an ion-exchange resin so as to at least partially remove at least one metal ion from the composition, thereby obtaining an aqueous composition comprising a lithium sulphate.

According to another aspect, there is provided a process for preparing lithium sulphate, the process comprising:

leaching an acid roasted lithium-containing material with water so as to obtain an aqueous composition comprising Li$^+$ and at least one metal ion, wherein the lithium-containing material is a material that has been previously reacted with H$_2$SO$_4$;

reacting the aqueous composition comprising Li$^+$ and the at least one metal ion with a base so as to obtain a pH of about 4.5 to about 6.5 and thereby at least partially precipitating the at least one metal ion under the form of at least one hydroxide so as to obtain a precipitate comprising the at least one hydroxide and an aqueous composition comprising Li$^+$ and having a reduced content of the at least one metal ion, and separating the aqueous composition from the precipitate;

optionally reacting the aqueous composition comprising Li$^+$ and having the reduced content of the at least one metal ion with another base so as to obtain a pH of about 9.5 to about 11.5 and with at least one metal carbonate thereby at least partially precipitating at least one metal ion under the form of at least one carbonate so as to obtain a precipitate comprising the at least one carbonate and an aqueous composition comprising Li$^+$ and having a reduced content of the at least one metal ion, and separating the aqueous composition from the precipitate; and contacting the aqueous composition comprising Li$^+$ and having a reduced content of the at least one metal ion with an ion-exchange resin so as to at least partially remove at least one metal ion from the composition, thereby obtaining an aqueous composition comprising a lithium sulphate.

According to another aspect, there is provided a for preparing lithium carbonate, the process comprising:

leaching a base-baked lithium-containing material with water so as to obtain an aqueous composition comprising Li$^+$ and at least one metal ion;

reacting the aqueous composition comprising Li$^+$ and the at least one metal ion with a base so as to obtain a pH of about 4.5 to about 6.5 and thereby at least partially precipitating the at least one metal ion under the form of at least one hydroxide so as to obtain a precipitate comprising the at least one hydroxide and an aqueous composition comprising Li$^+$ and having a reduced content of the at least one metal ion, and separating the aqueous composition from the precipitate;

optionally reacting the aqueous composition comprising Li$^+$ and having the reduced content of the at least one metal ion with another base so as to obtain a pH of about 9.5 to about 11.5, and with optionally at least one metal carbonate, thereby at least partially precipitating at least one metal ion optionally under the form of at least one carbonate so as to obtain a precipitate optionally comprising the at least one carbonate and an aqueous composition comprising Li$^+$ and having a reduced content of the at least one metal ion, and separating the aqueous composition from the precipitate;

contacting the aqueous composition comprising Li$^+$ and having a reduced content of the at least one metal ion with an ion exchange resin so as to at least partially remove at least one metal ion from the composition, thereby obtaining an aqueous composition comprising a lithium compound;

submitting the aqueous composition comprising the lithium compound to an electrodialysis or electrolysis under conditions suitable for converting at least a portion of the lithium compound into lithium hydroxide; and converting the lithium hydroxide into lithium carbonate; or leaching a base-baked lithium-containing material with water so as to obtain an aqueous composition comprising Li$^+$ and at least one metal ion;

optionally reacting the aqueous composition comprising Li$^+$ and the at least one metal ion with a base so as to obtain a pH of about 4.5 to about 6.5;

at least partially precipitating the at least one metal ion under the form of at least one hydroxide so as to obtain a precipitate comprising the at least one hydroxide and an aqueous composition comprising Li$^+$ and having a reduced content of the at least one metal ion, and separating the aqueous composition from the precipitate;

optionally reacting the aqueous composition comprising Li$^+$ and having the reduced content of the at least one metal ion with another base so as to obtain a pH of about 9.5 to about 11.5, and with optionally at least one metal carbonate, thereby at least partially precipitating at least one metal ion optionally under the form of at least one carbonate so as to obtain a precipitate optionally comprising the at least one carbonate and an aqueous composition comprising Li$^+$ and having a reduced content of the at least one metal ion, and separating the aqueous composition from the precipitate;

contacting the aqueous composition comprising Li$^+$ and having a reduced content of the at least one metal ion with an ion exchange resin so as to at least partially remove at least one metal ion from the composition, thereby obtaining an aqueous composition comprising a lithium compound;

submitting the aqueous composition comprising the lithium compound to an electrodialysis or electrolysis under conditions suitable for converting at least a portion of the lithium compound into lithium hydroxide; and converting the lithium hydroxide into lithium carbonate.

According to another aspect, there is provided a process for preparing lithium hydroxide, the process comprising:

submitting an aqueous composition comprising lithium sulphate to an electrolysis or electrodialysis under conditions suitable for converting at least a portion of the lithium sulphate into lithium hydroxide, wherein during the electrolysis, the aqueous composition comprising lithium sulphate has a pH of greater than 7.

According to another aspect, there is provided a process for preparing lithium hydroxide, the process comprising:

submitting an aqueous composition comprising a lithium compound to an electrolysis or electrodialysis under conditions suitable for converting at least a portion of the lithium compound into lithium hydroxide, wherein during the electrolysis or electrodialysis, the aqueous composition comprising lithium sulphate has a pH of greater than 7.

In the following drawings, which represent by way of example only, various embodiments of the disclosure:

FIG. 10 describe how an ion exchange resin is used so as to at least partially remove at least one metal ion from the composition;

Figure 11:
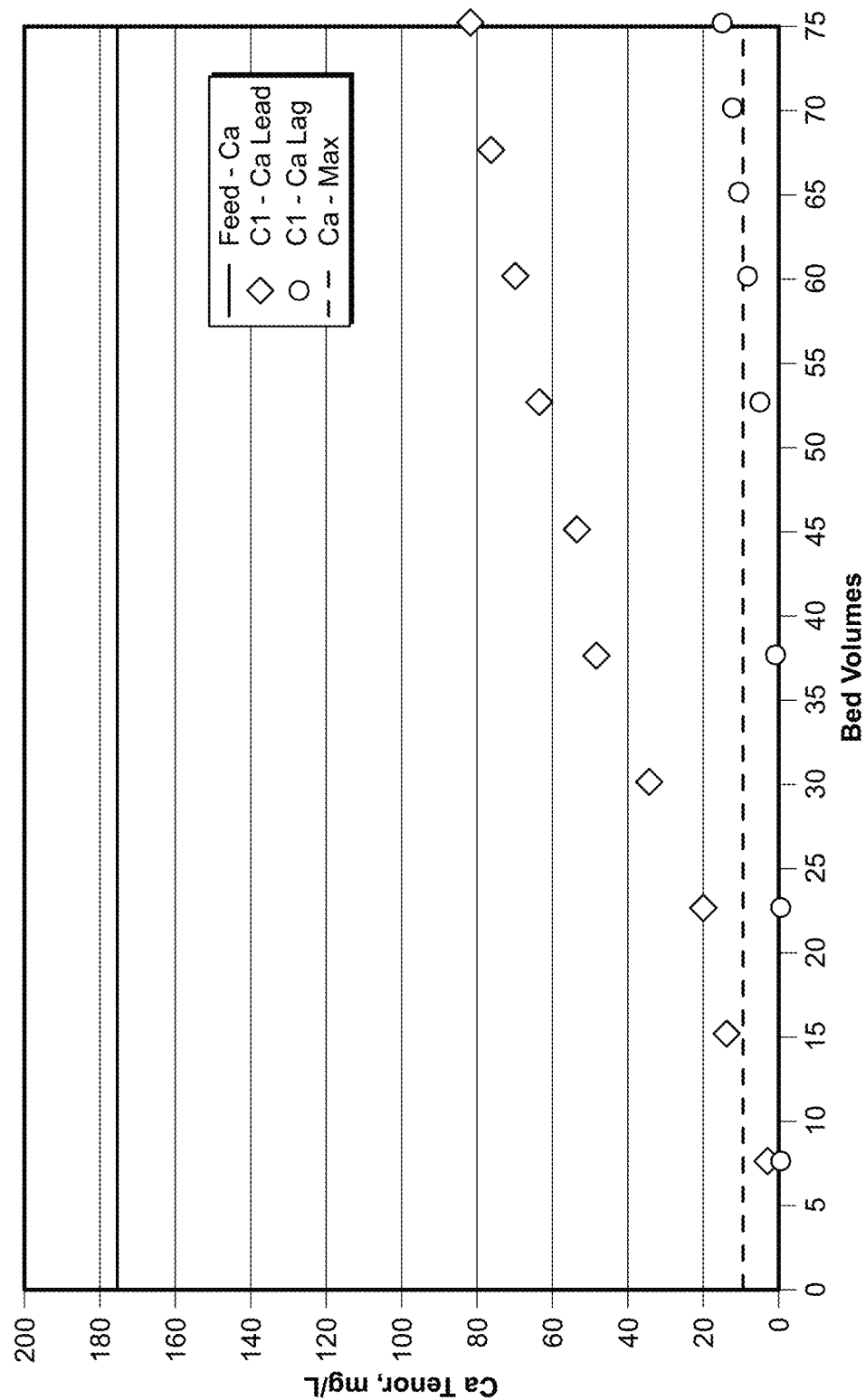
Figure 12:
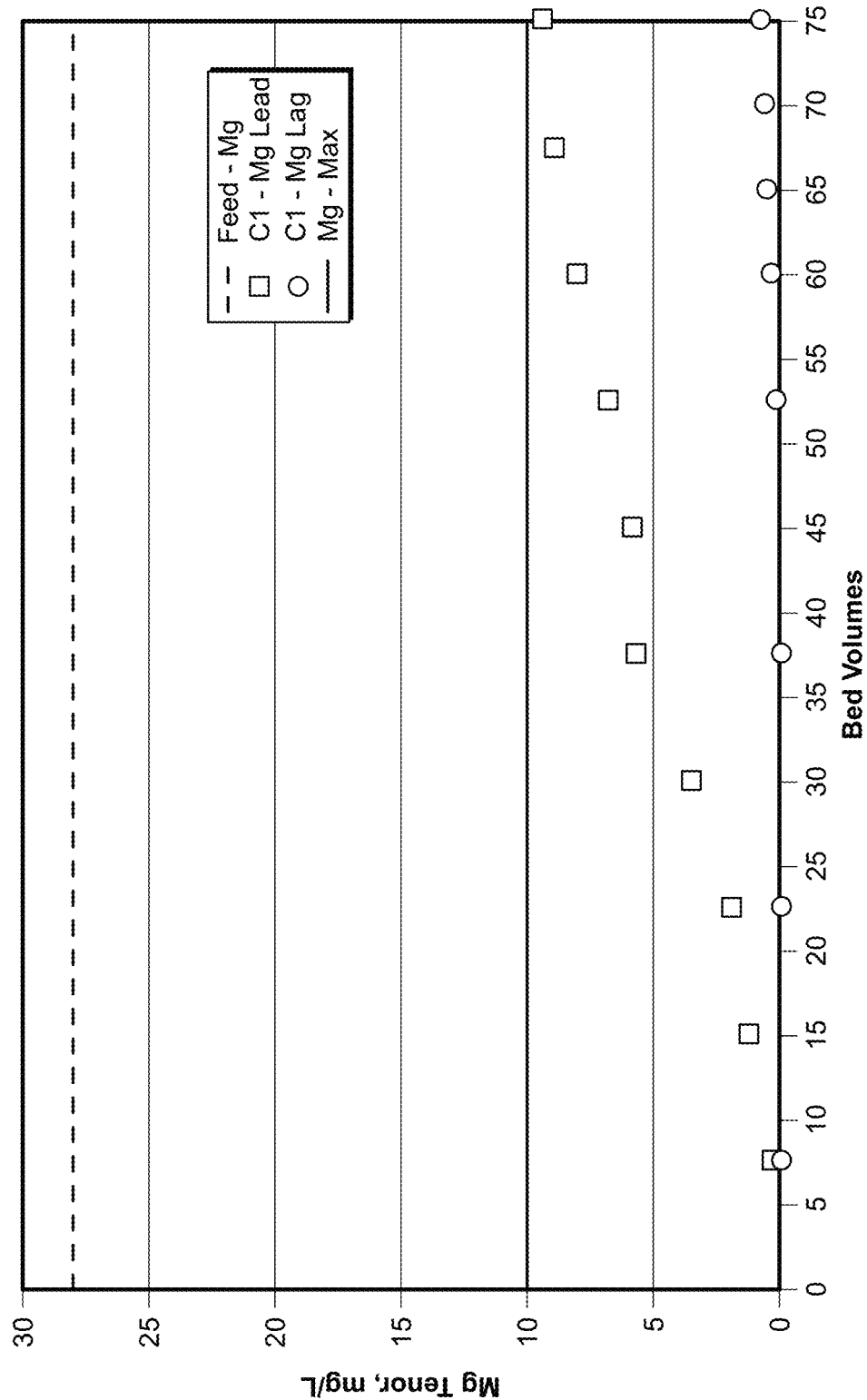
Figure 13:
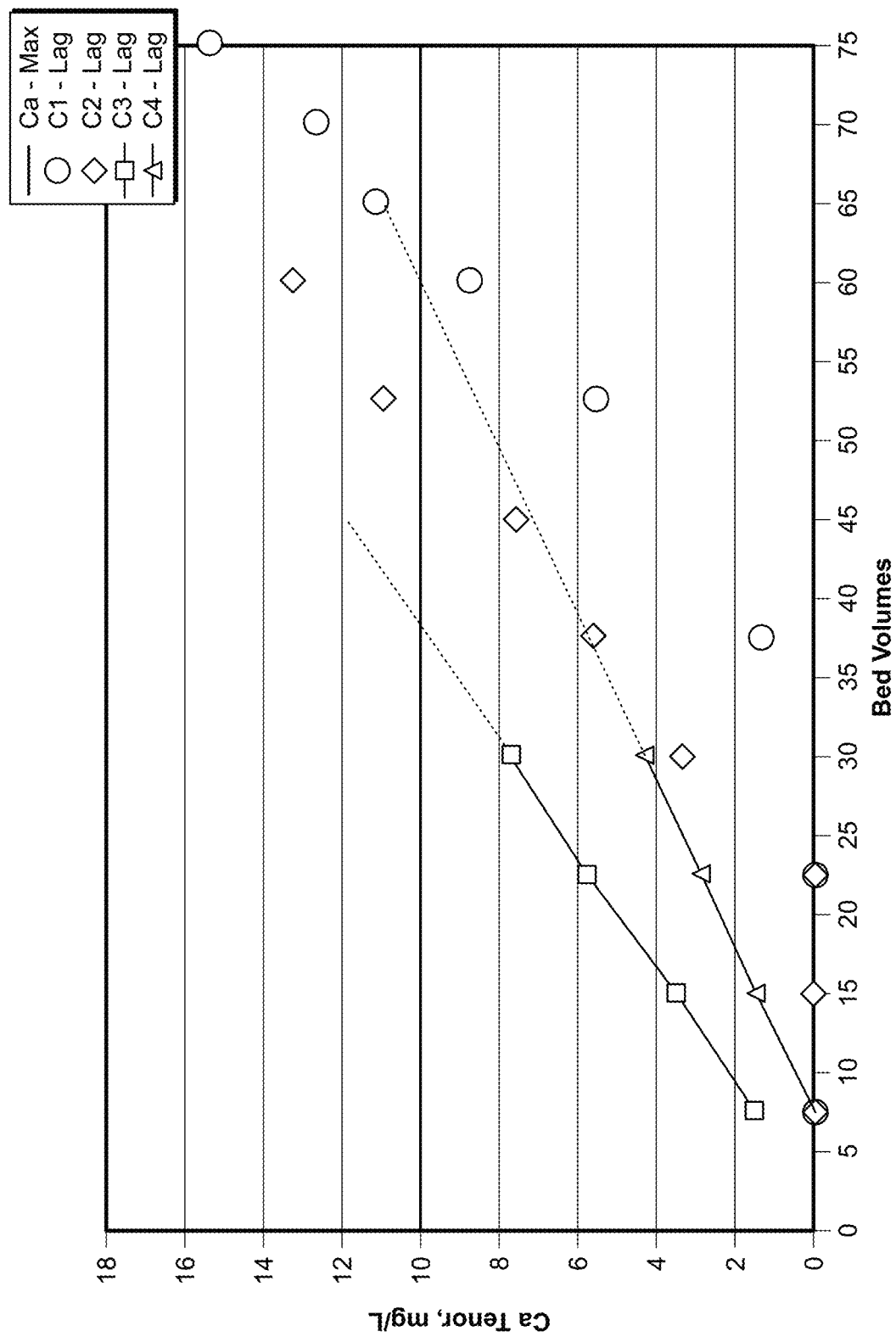
Figure 14:
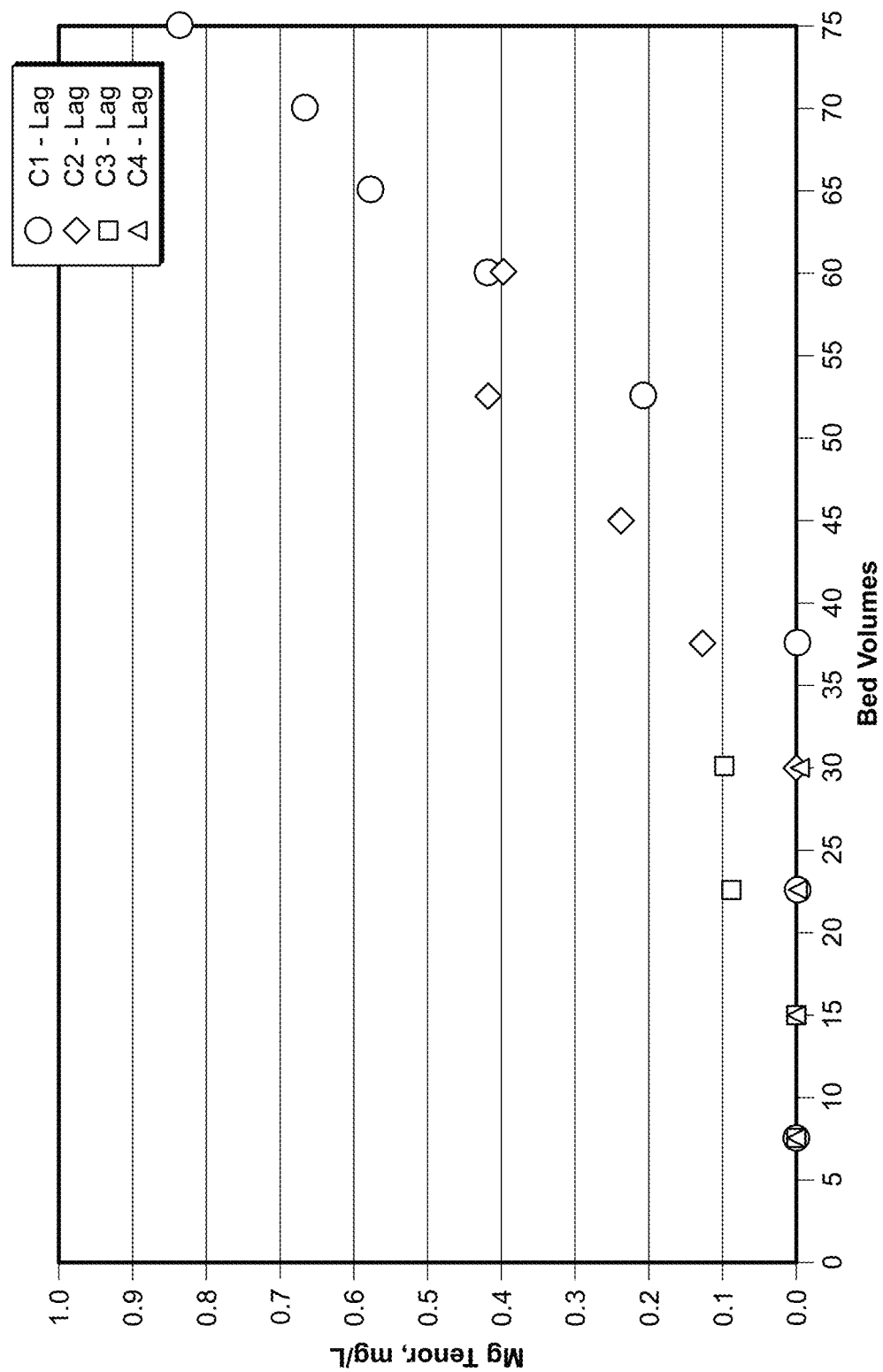
Figure 15:
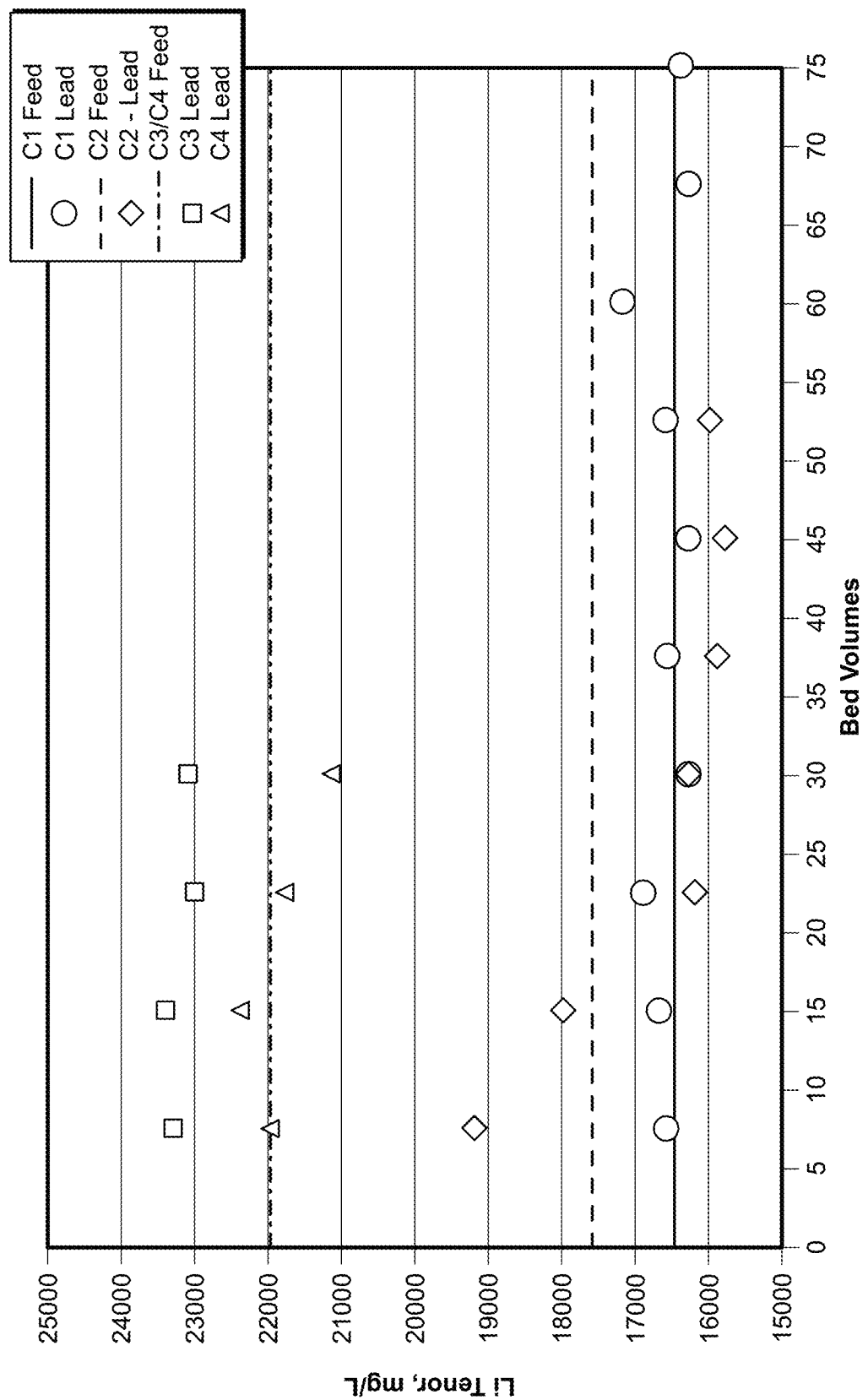
Figure 16:
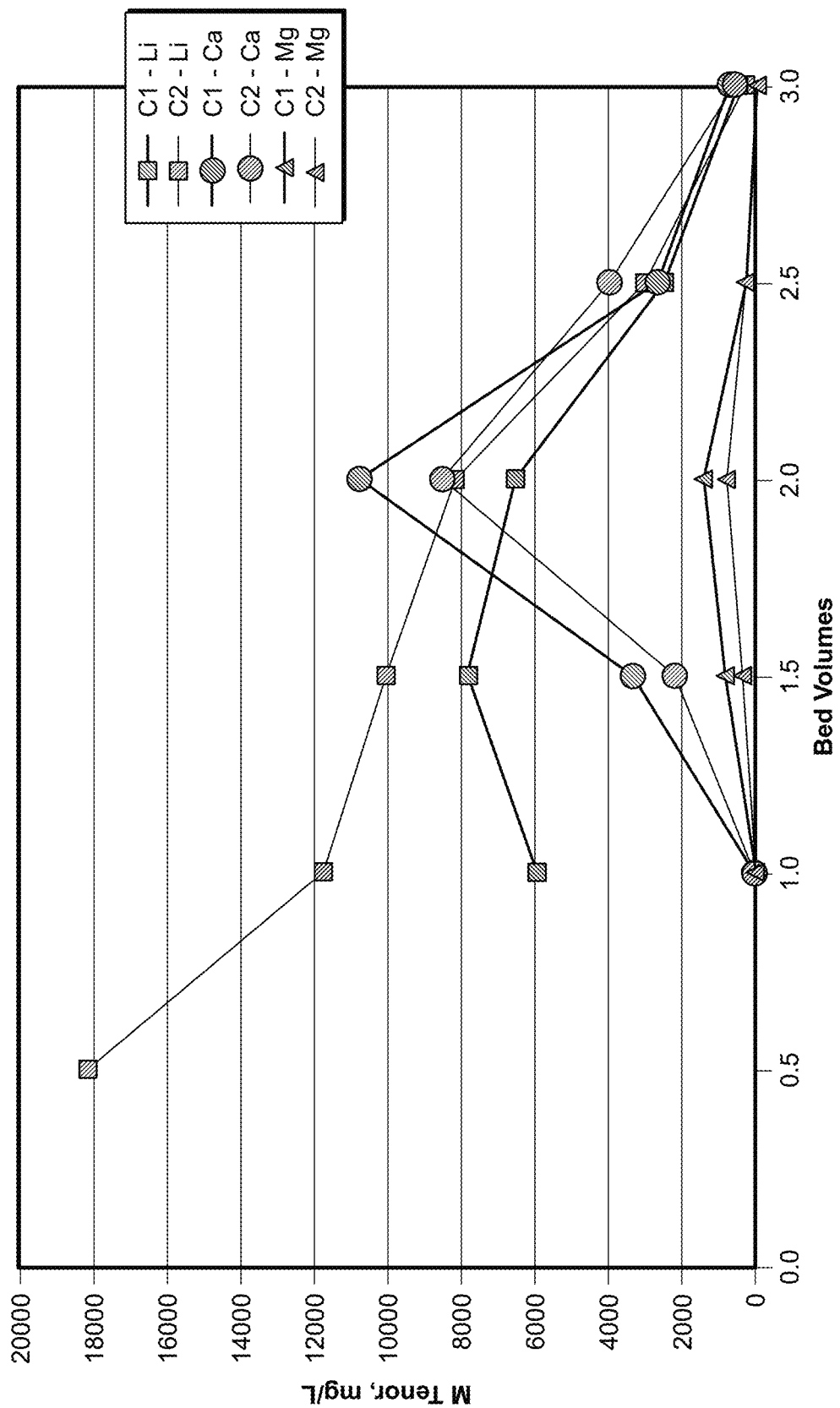
Figure 17:
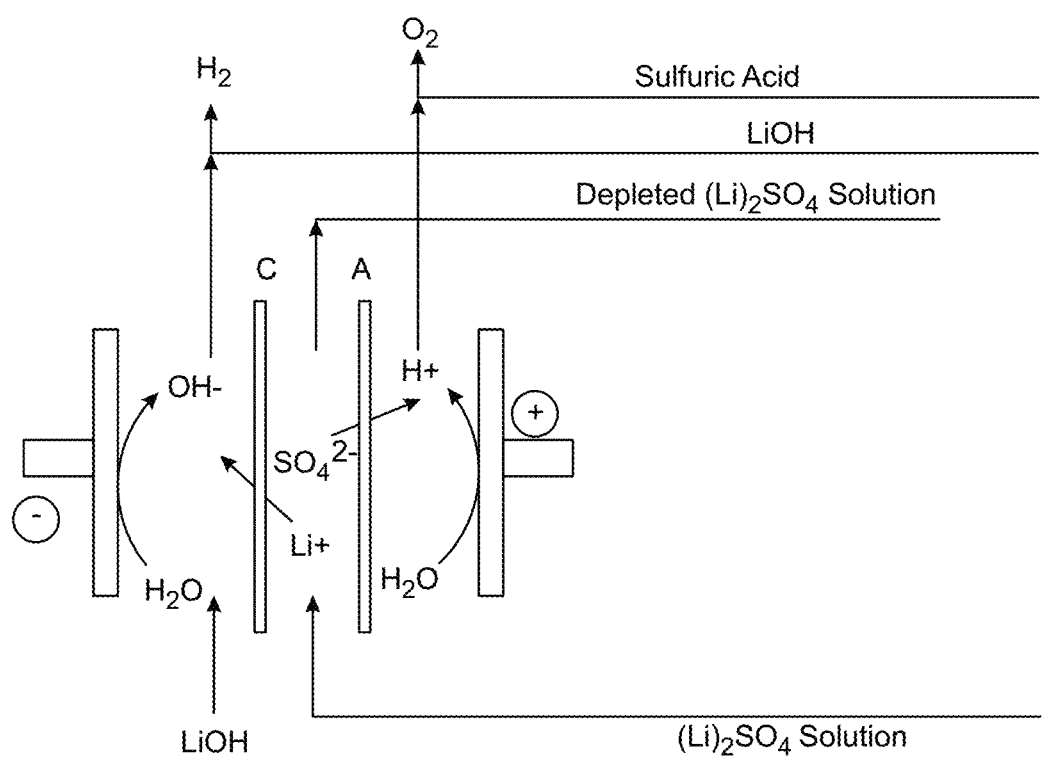
Figure 18:
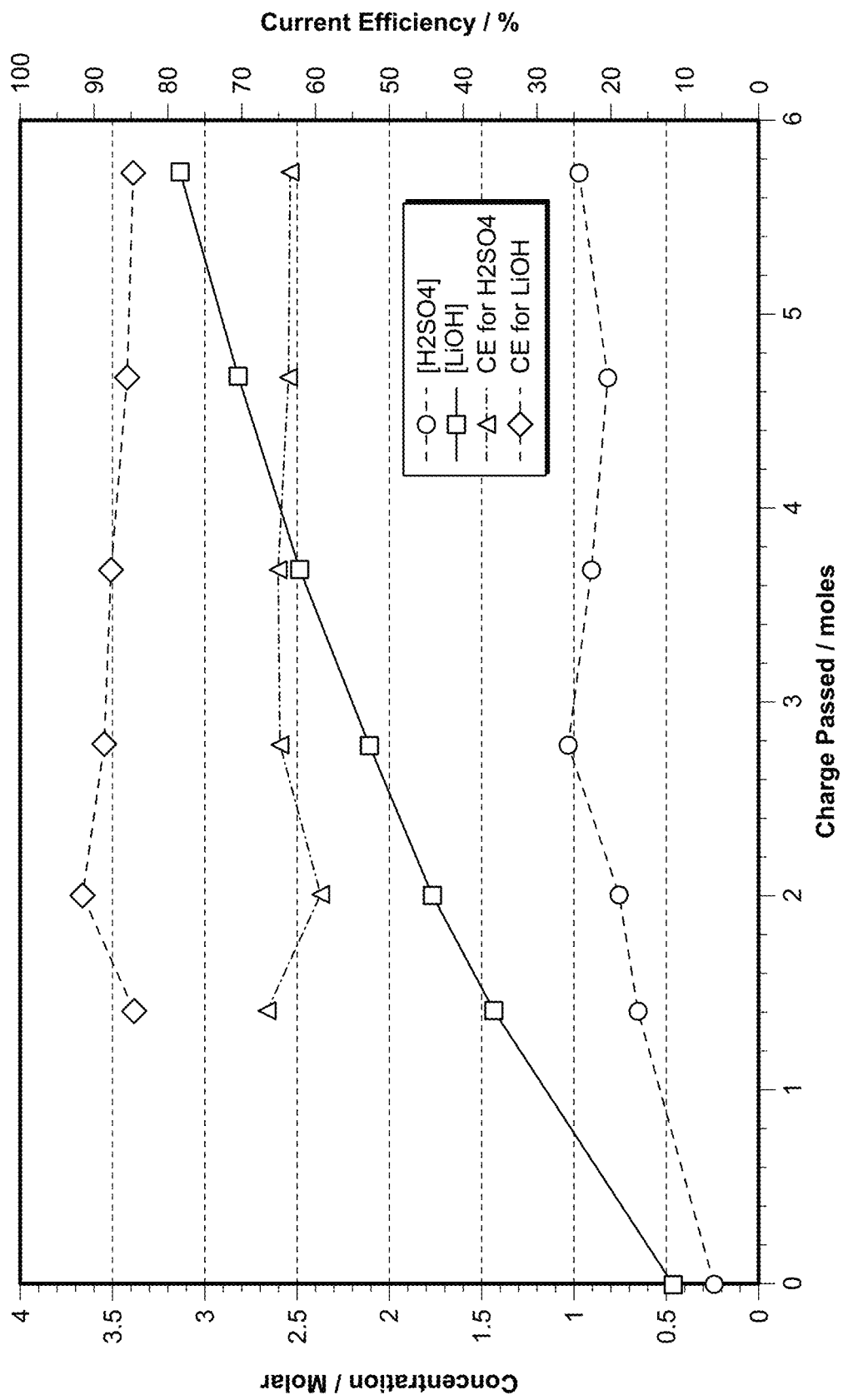
Figure 19:
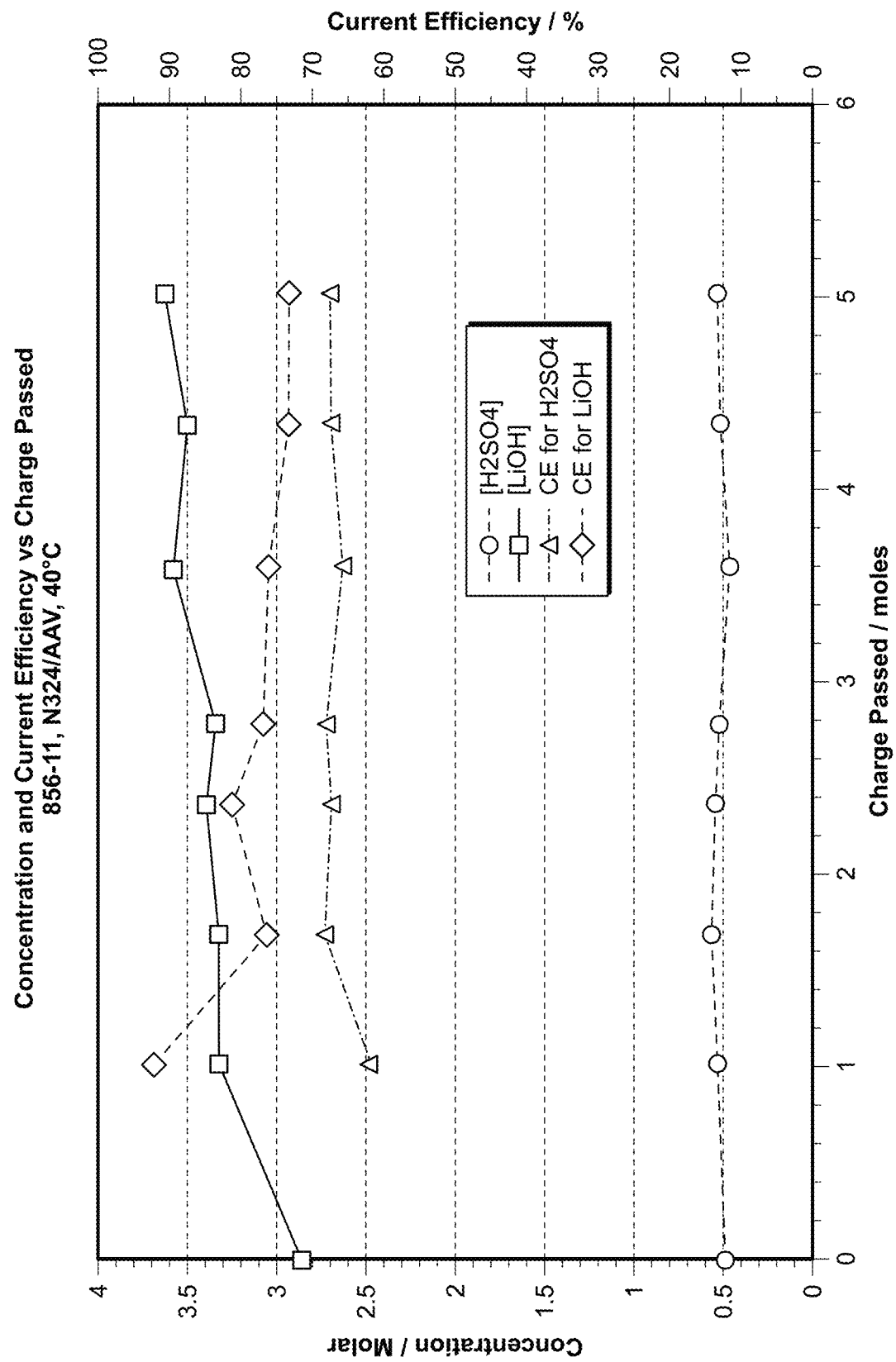
Figure 20:
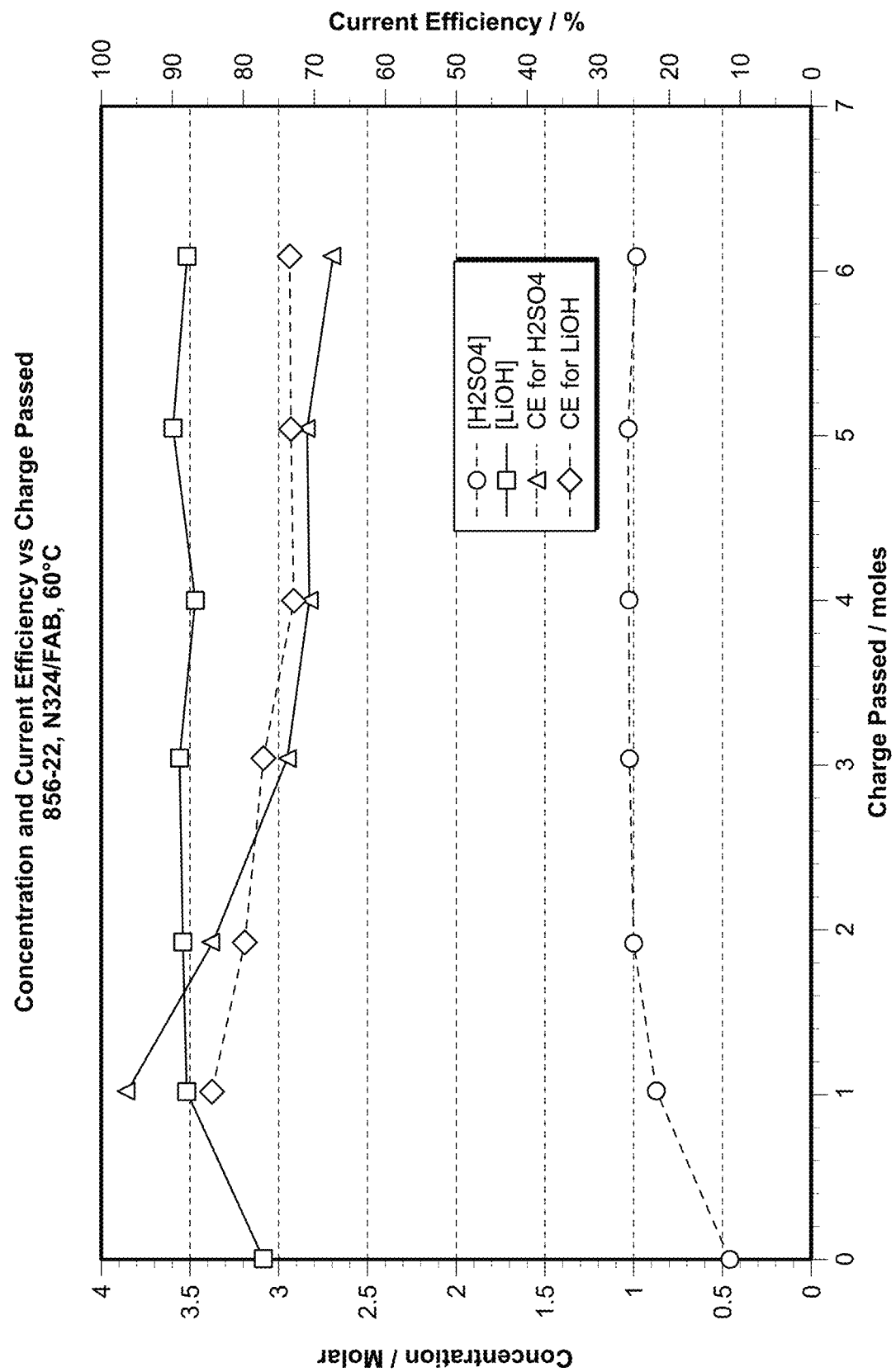
Figure 21:
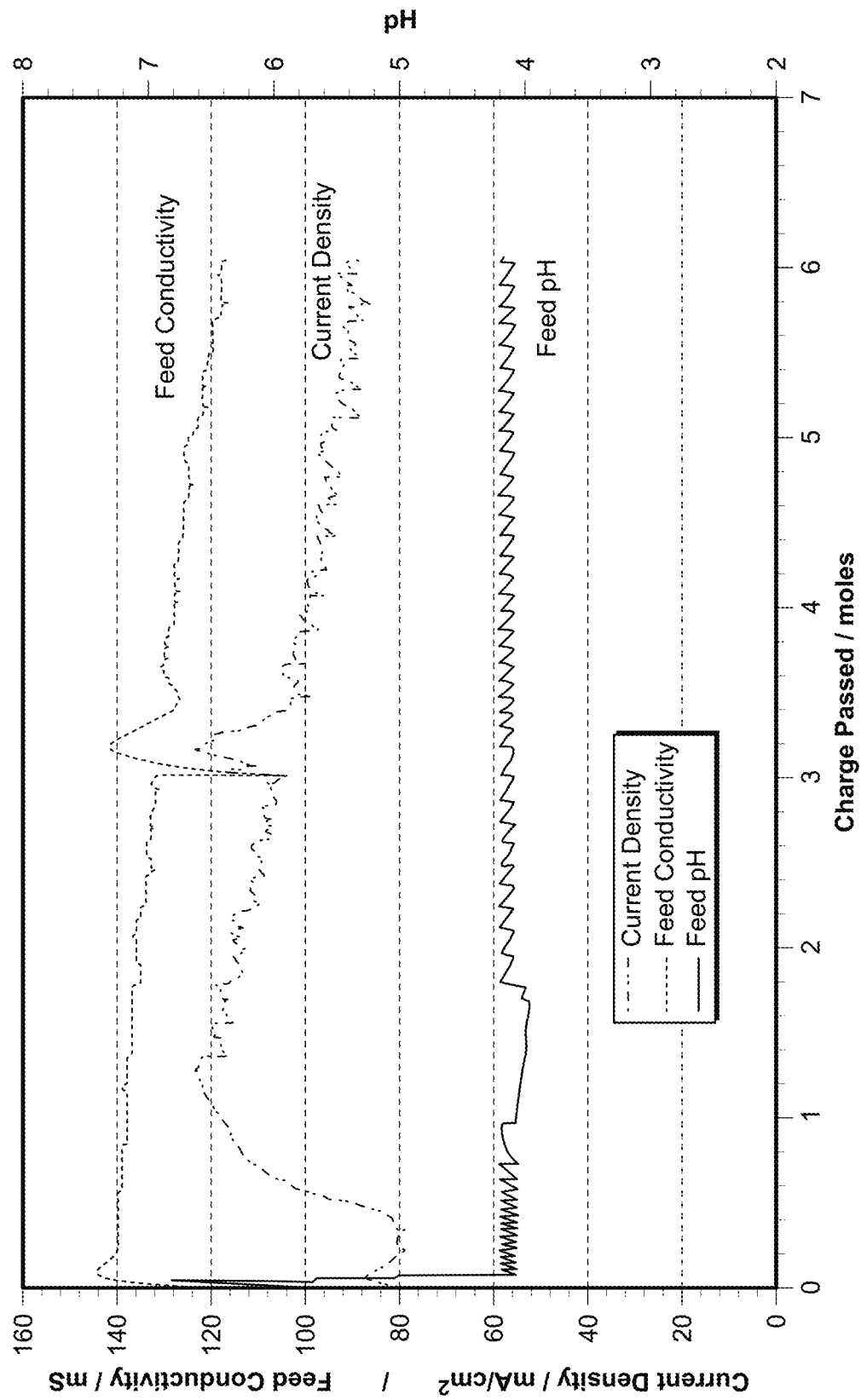
Figure 22:
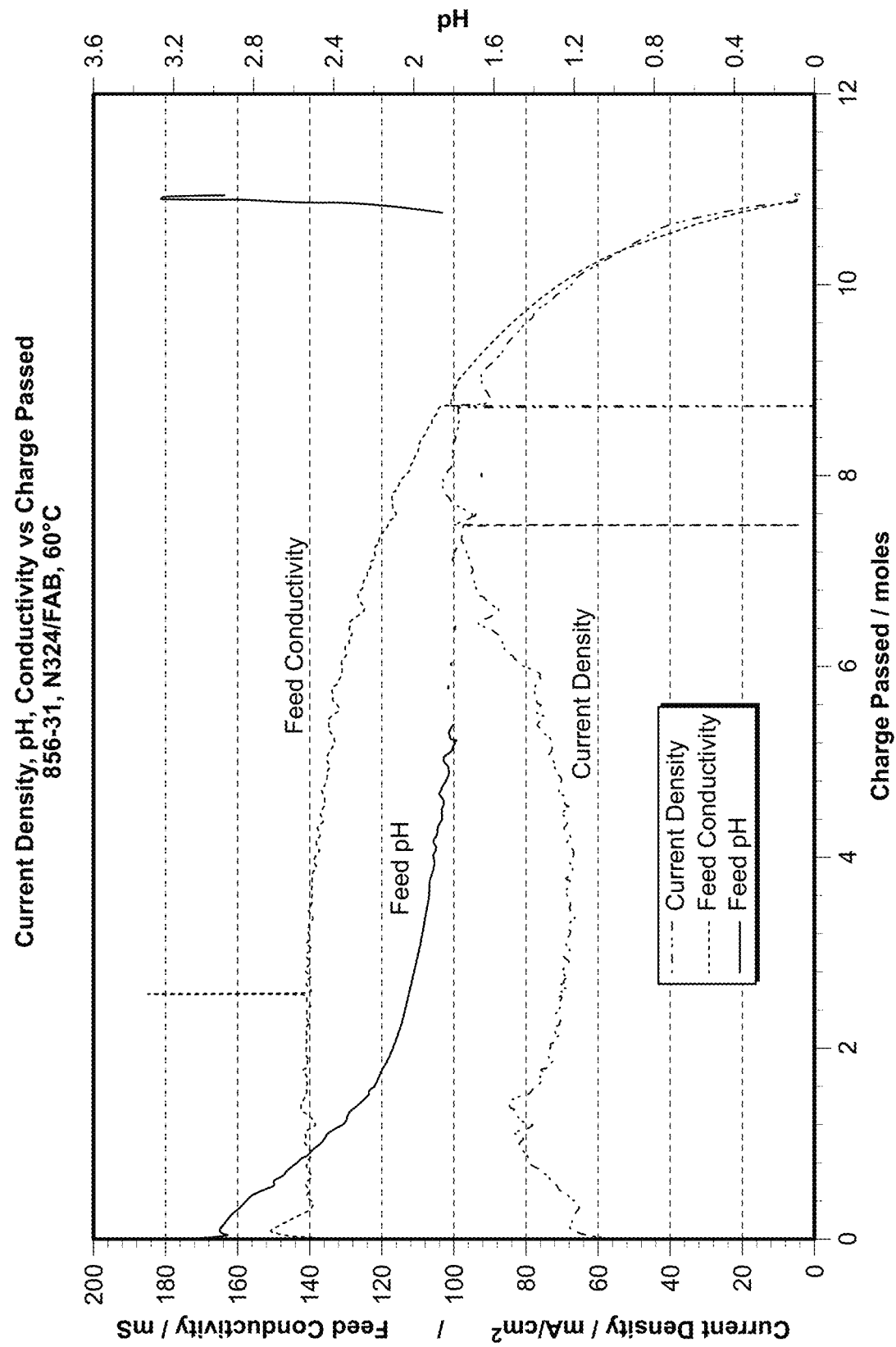
Figure 23:
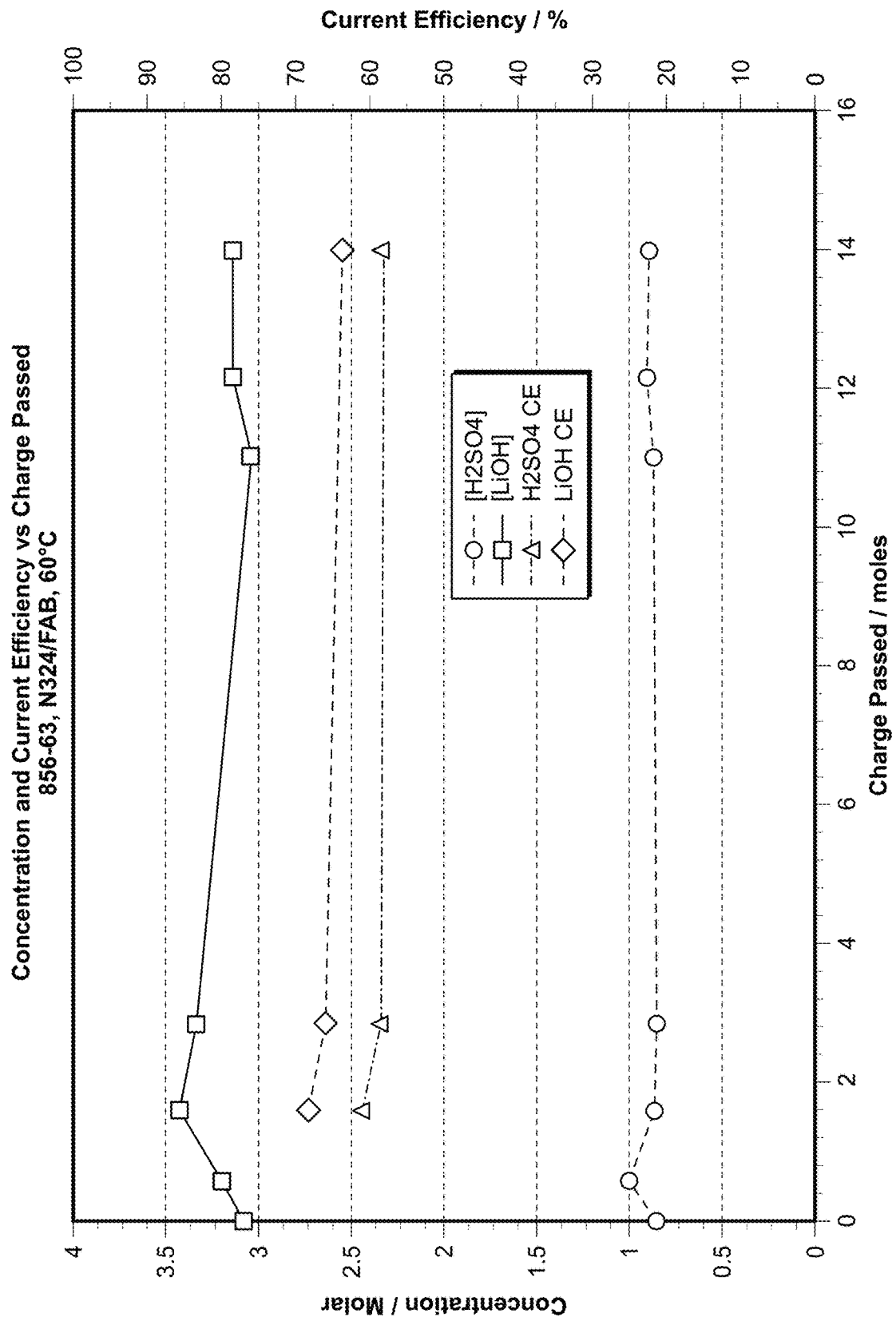
Figure 24:
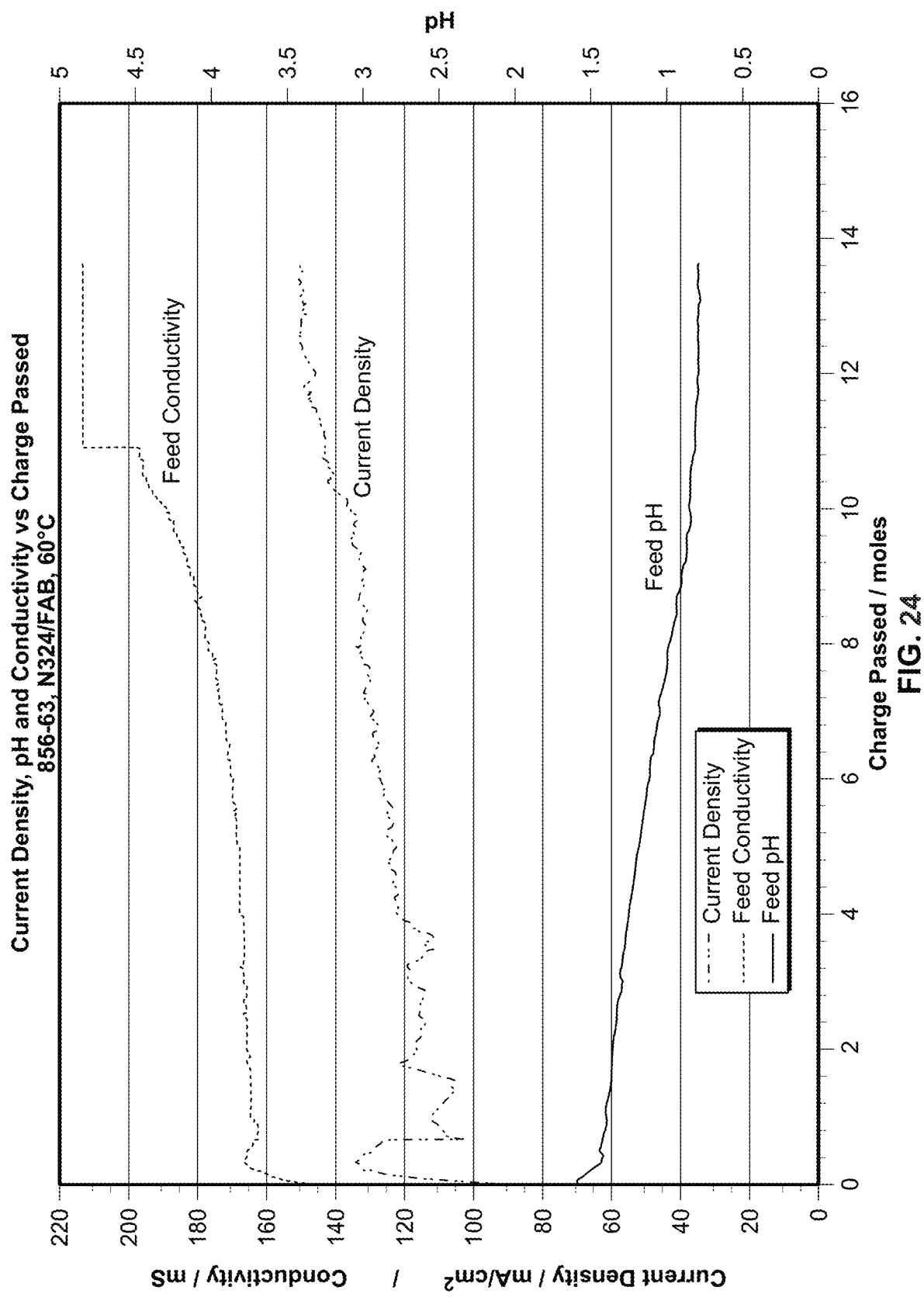
Figure 25:
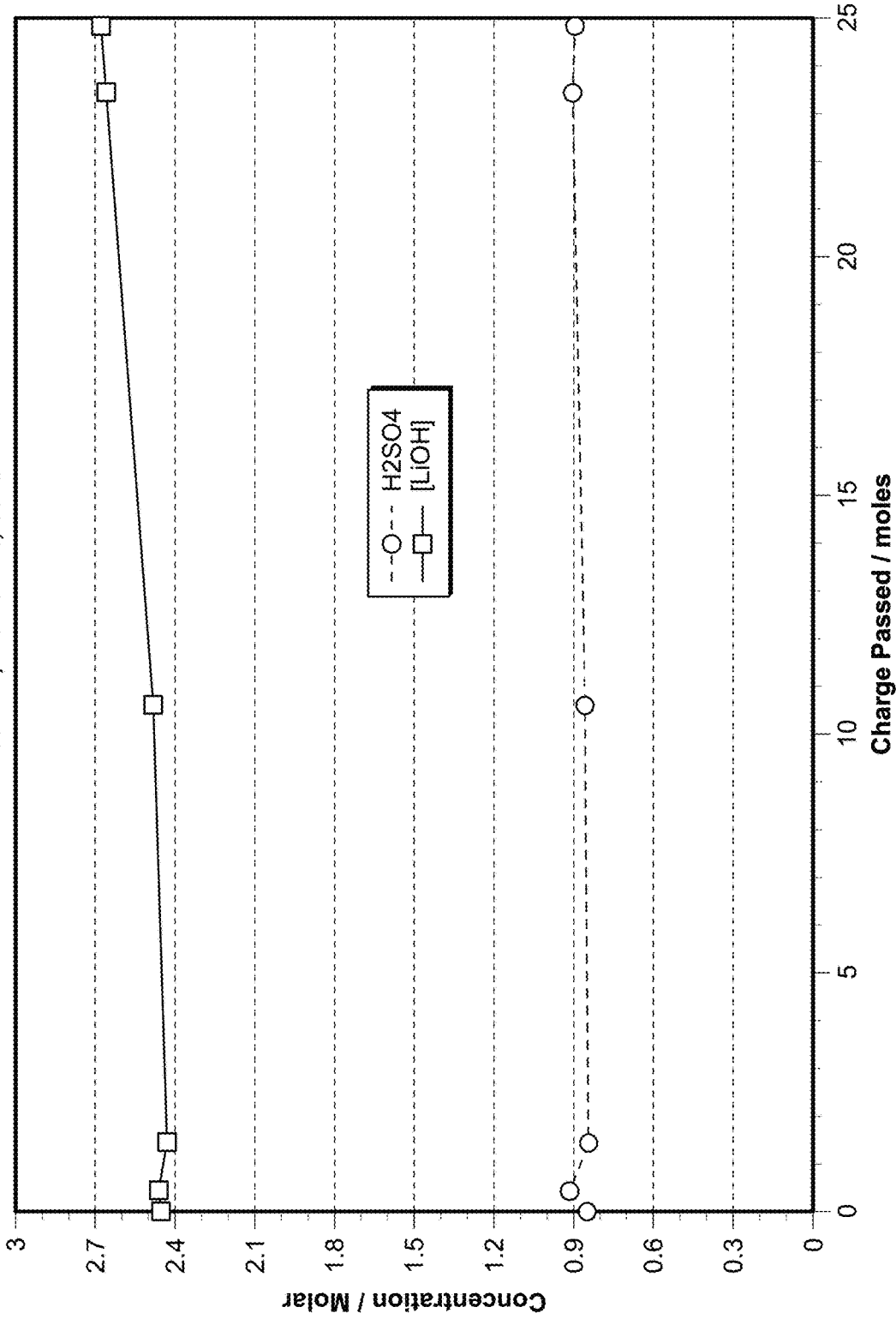
Figure 26:
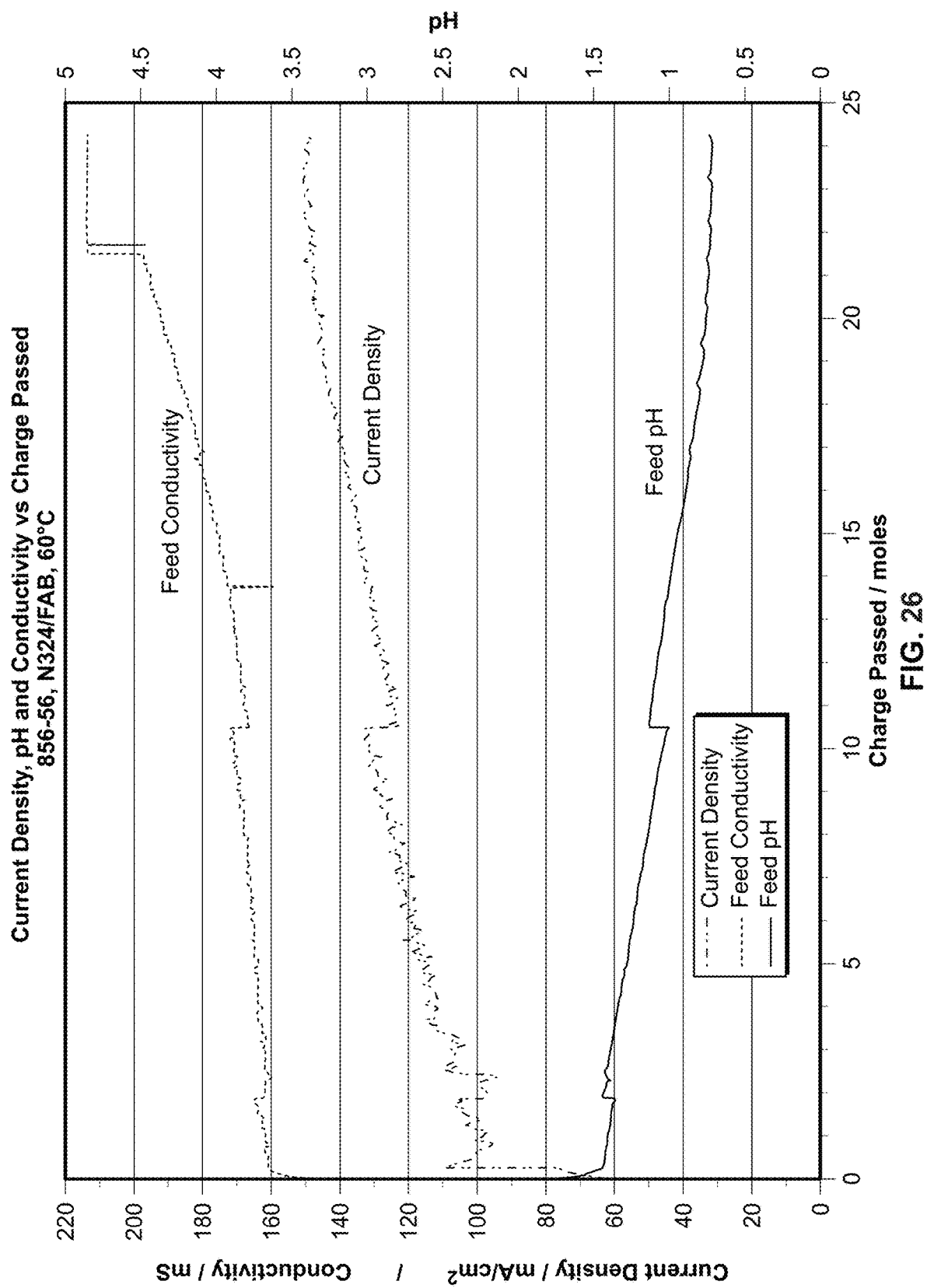
Figure 27:
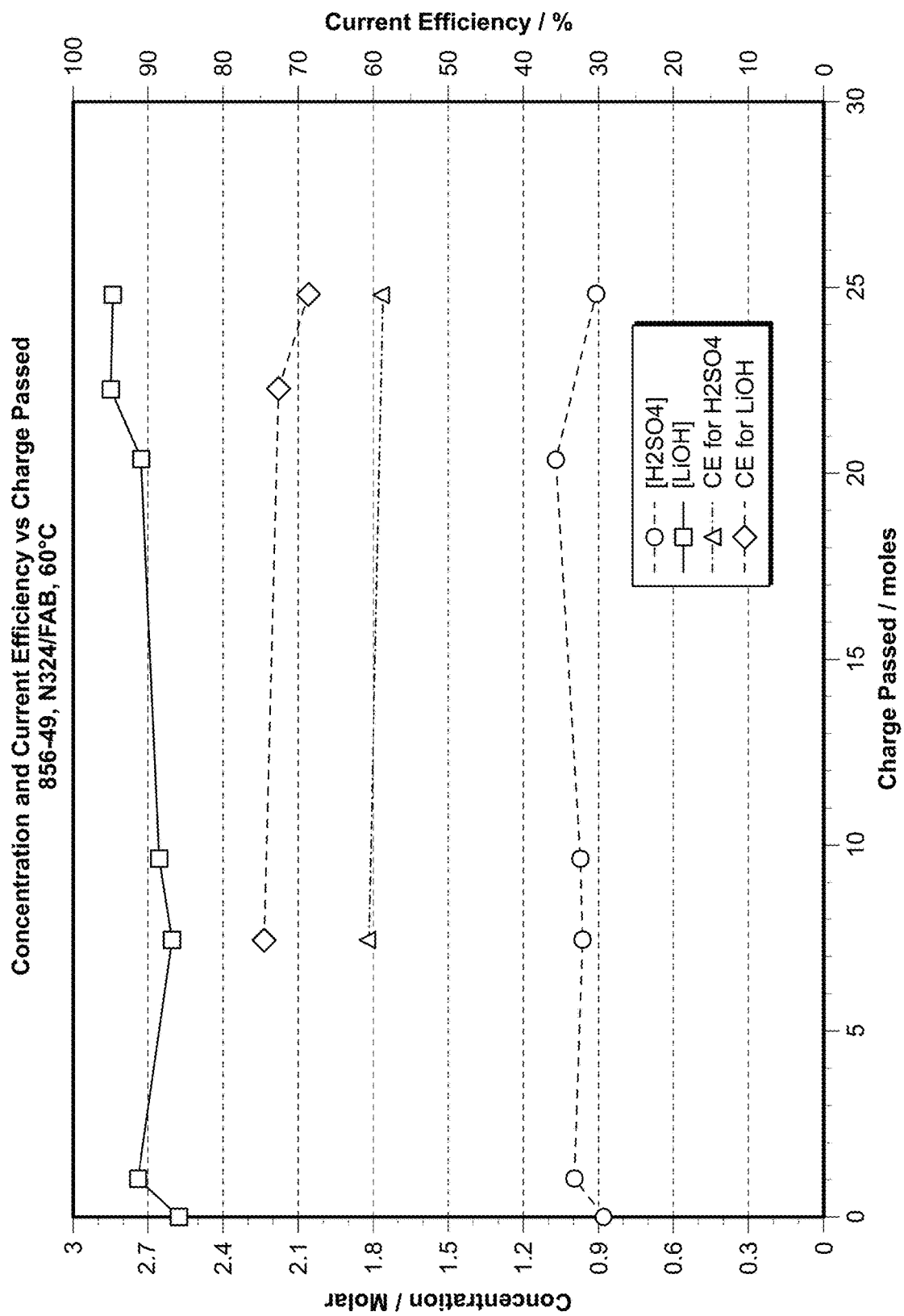
Figure 28:
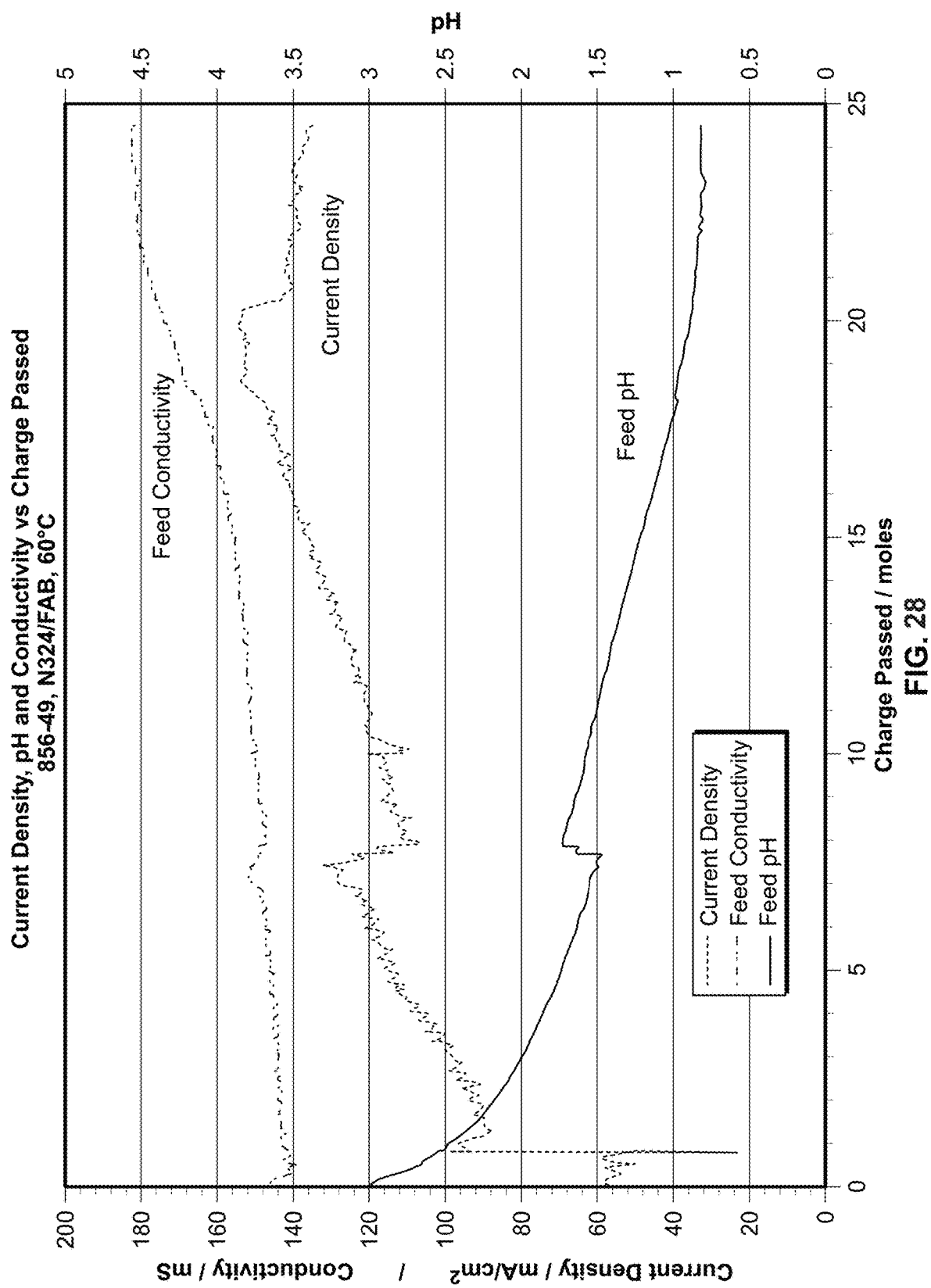
Figure 29:
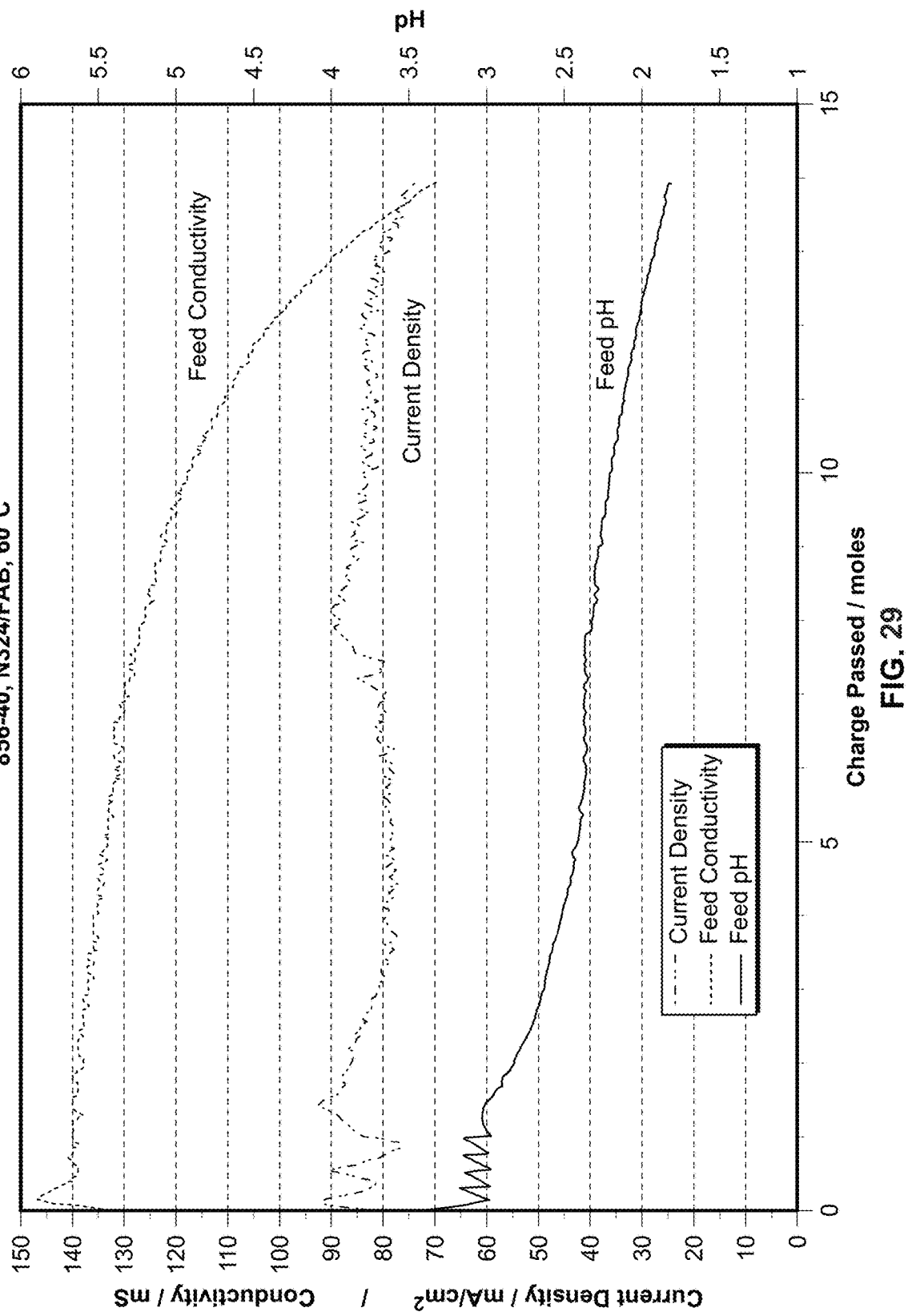
Figure 30:
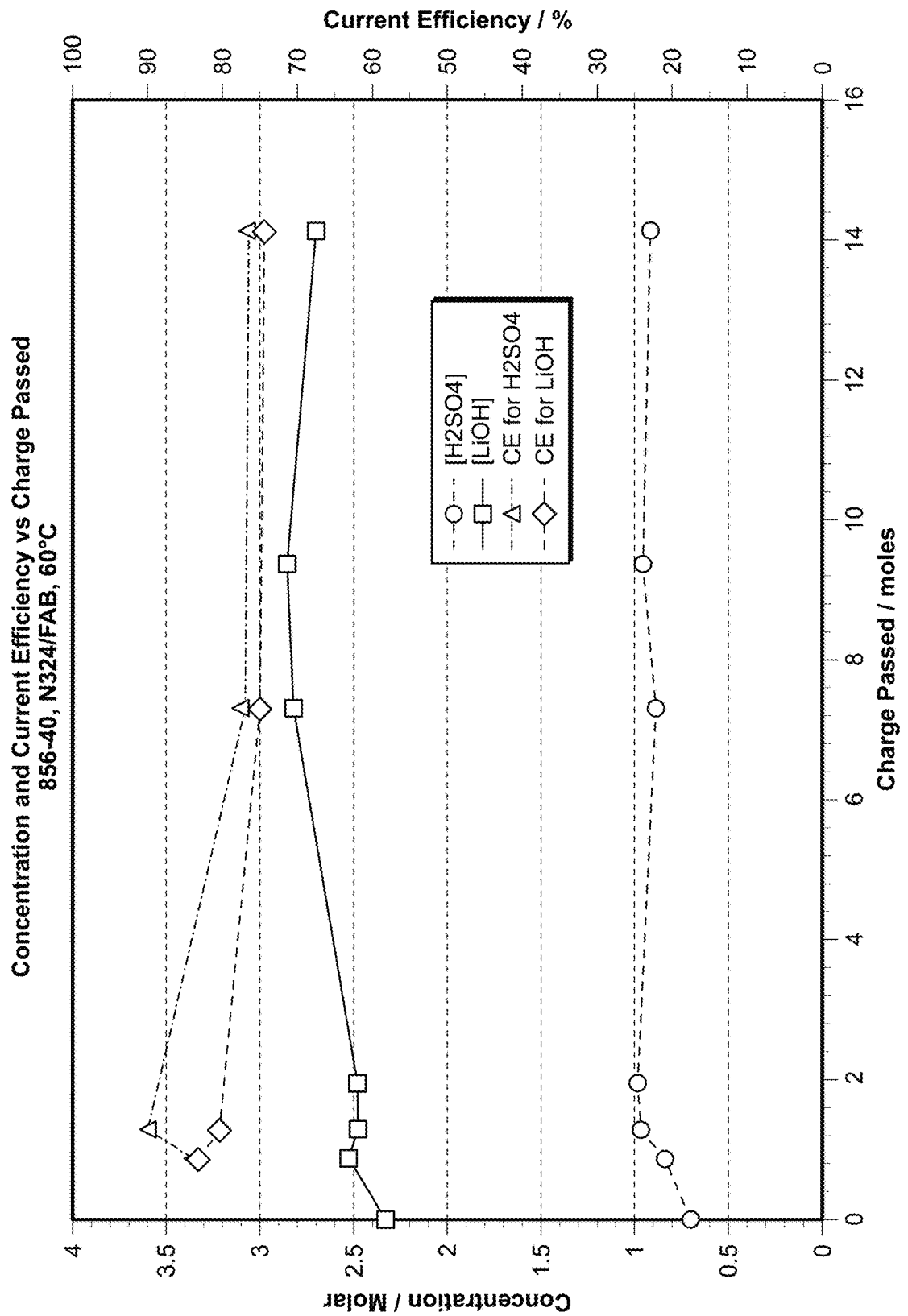
Figure 31:
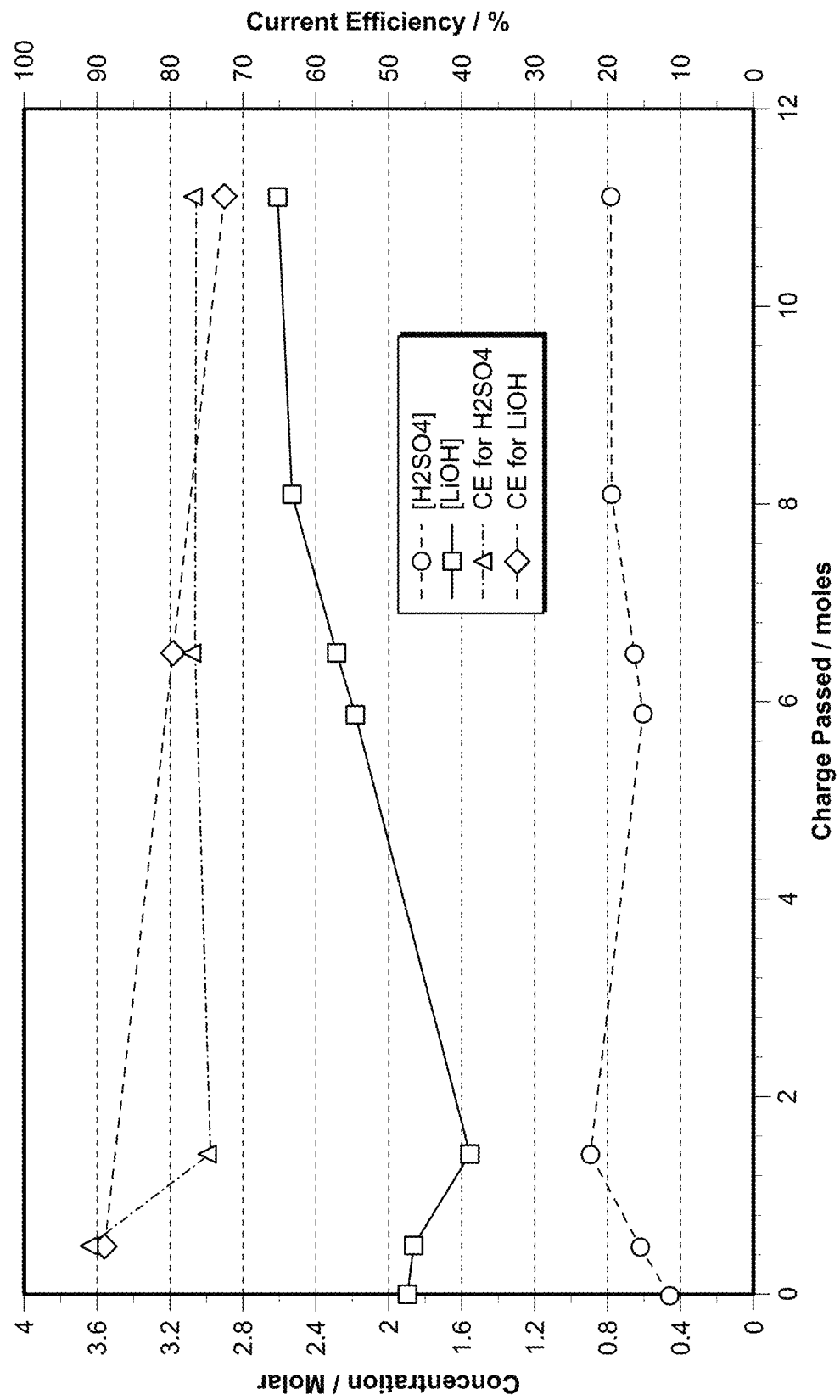
Figure 32:
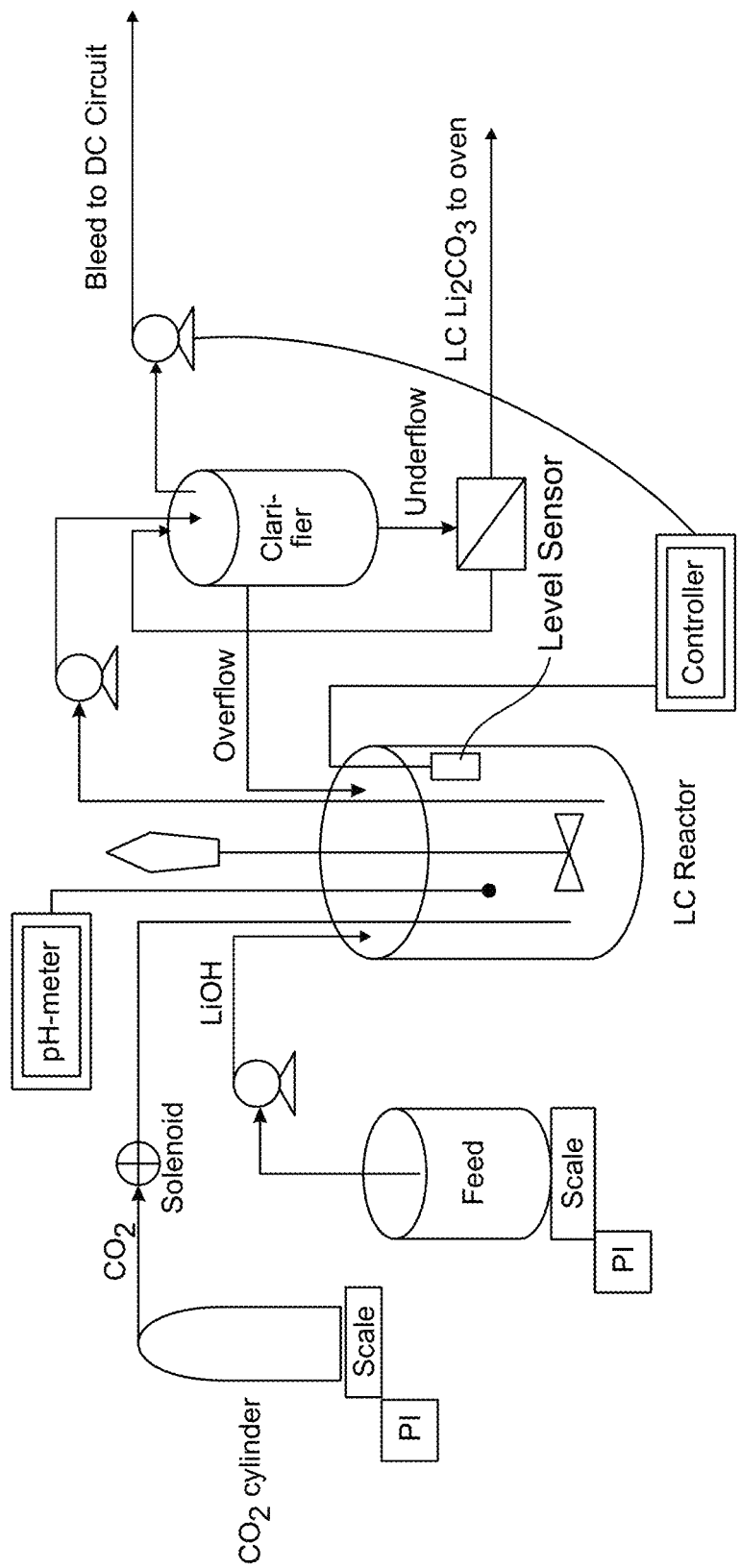
Figure 33:
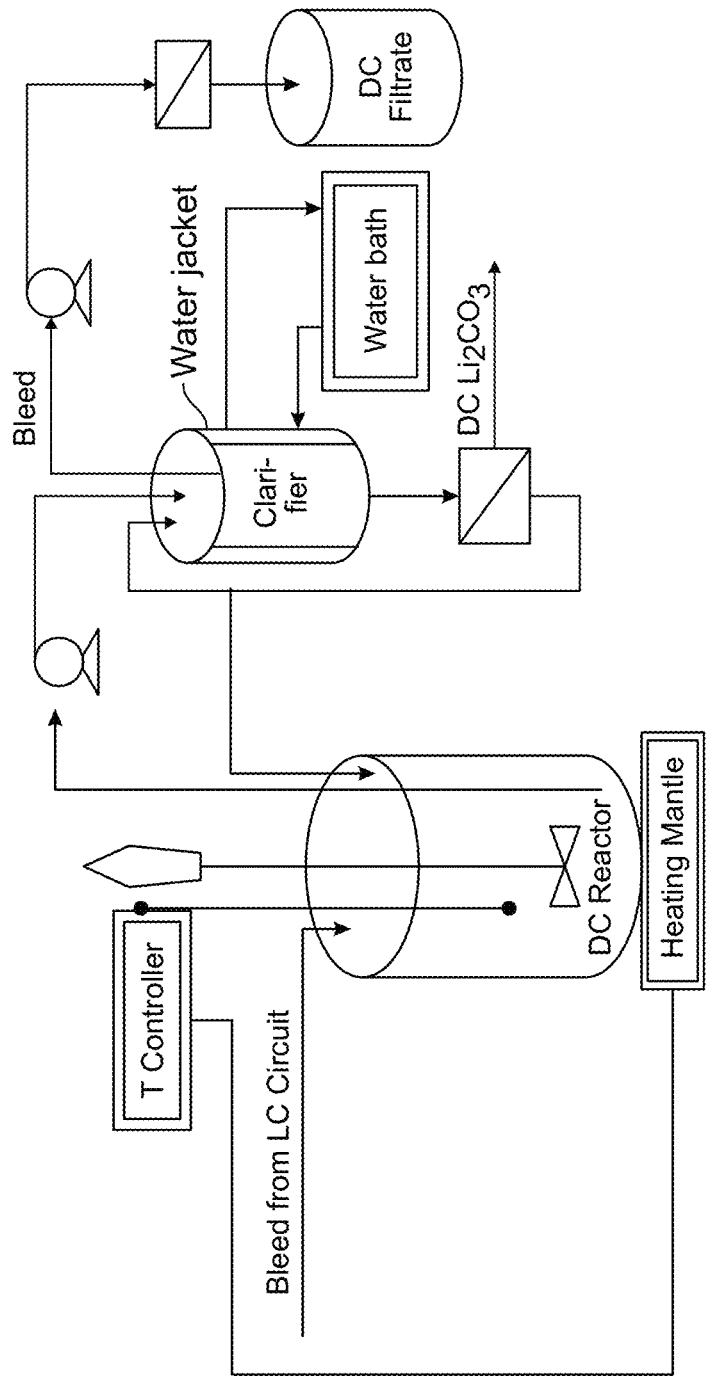
Figure 34:
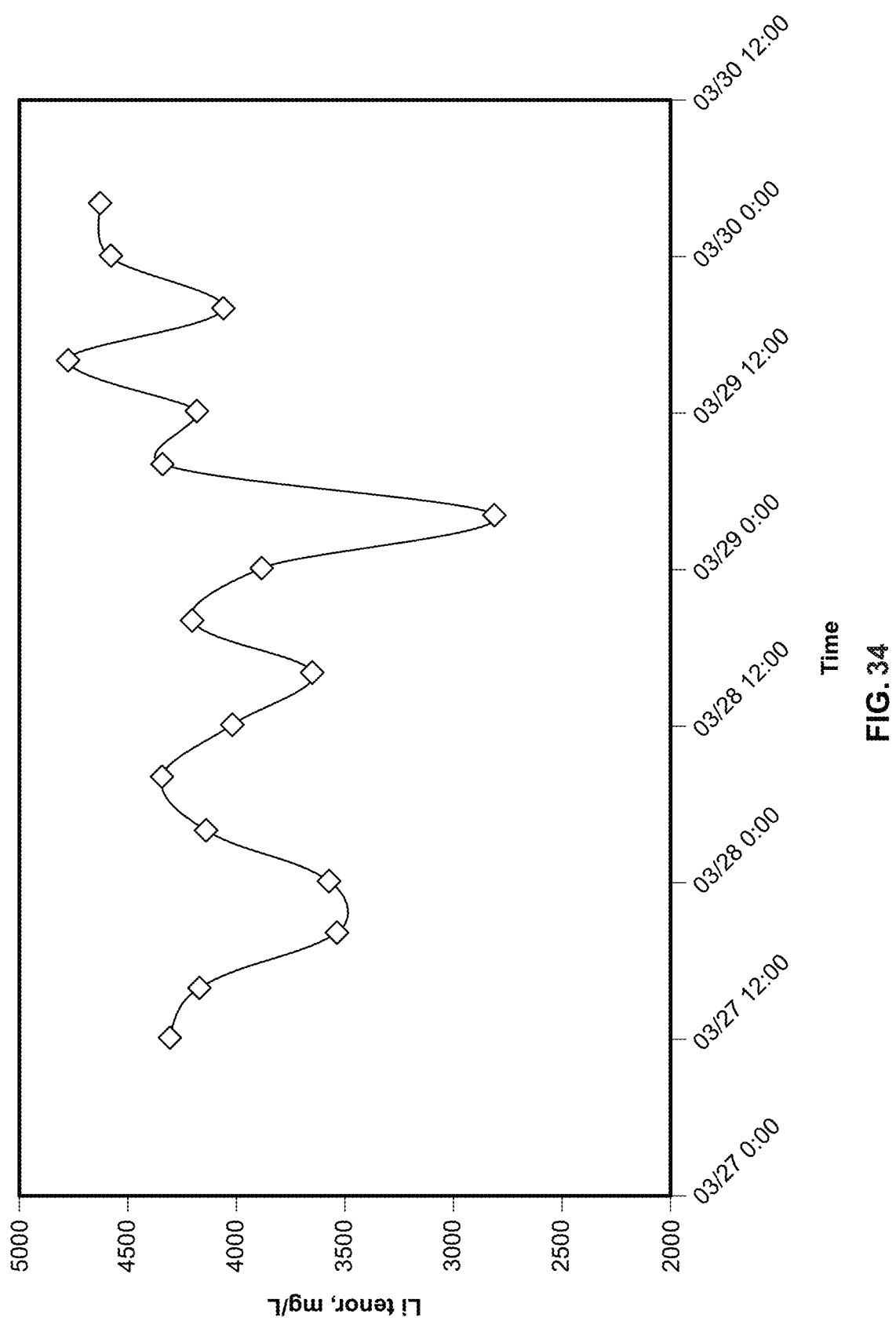
Figure 35:
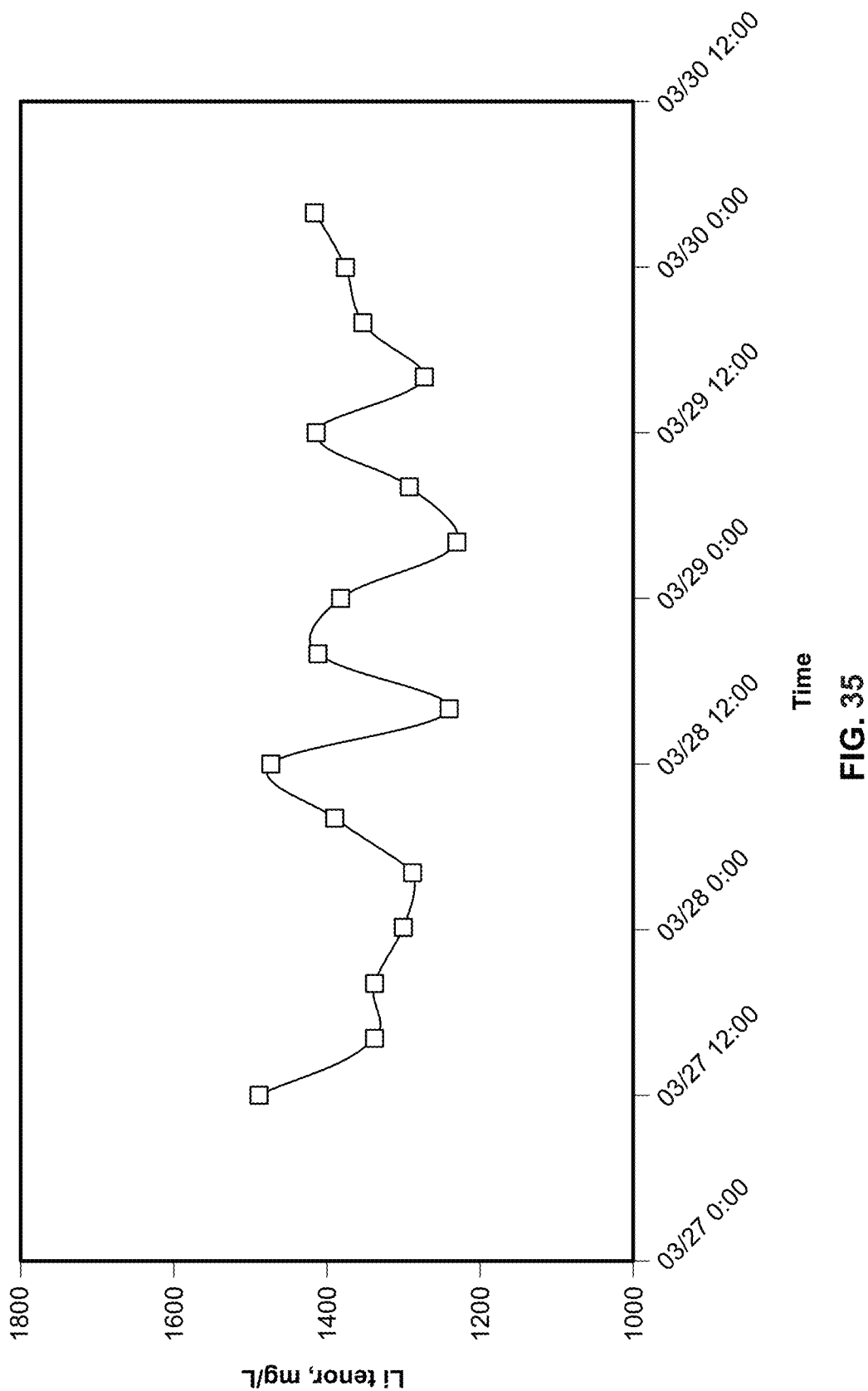
Figure 36:
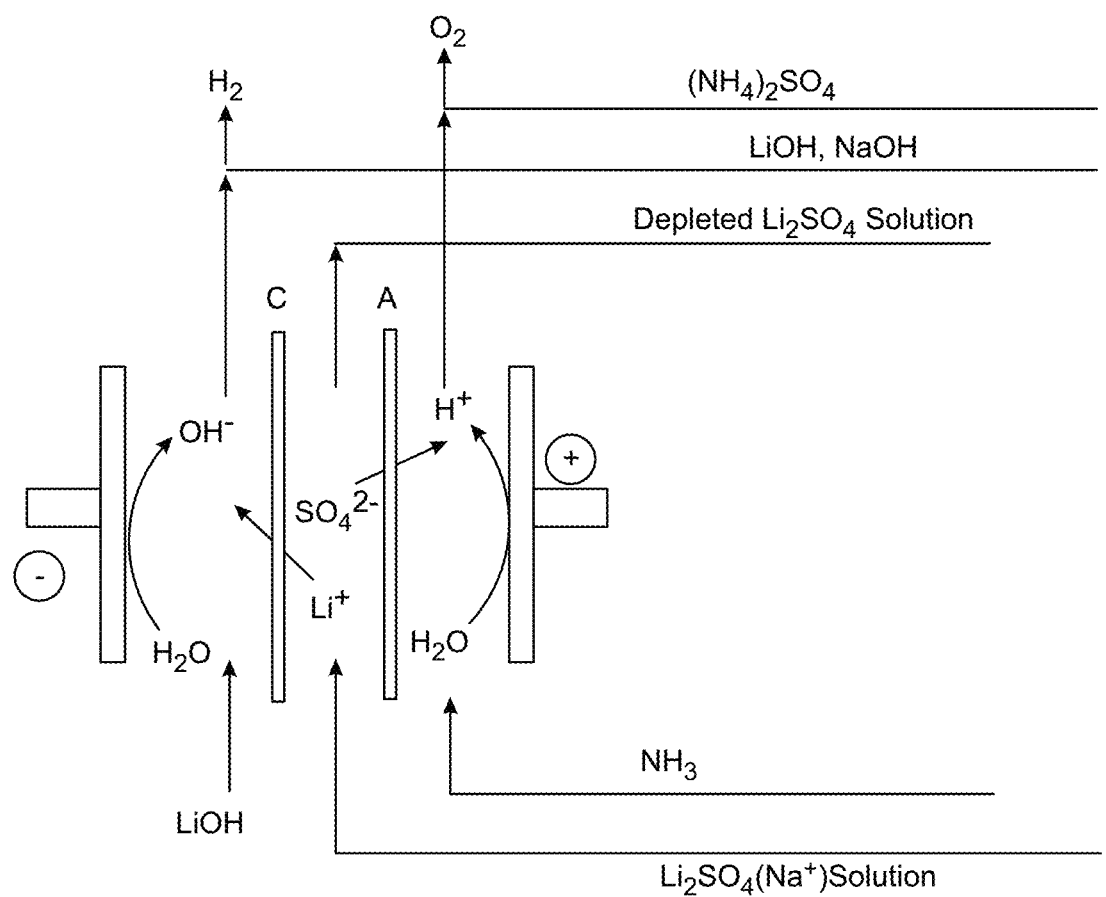
Figure 37B:
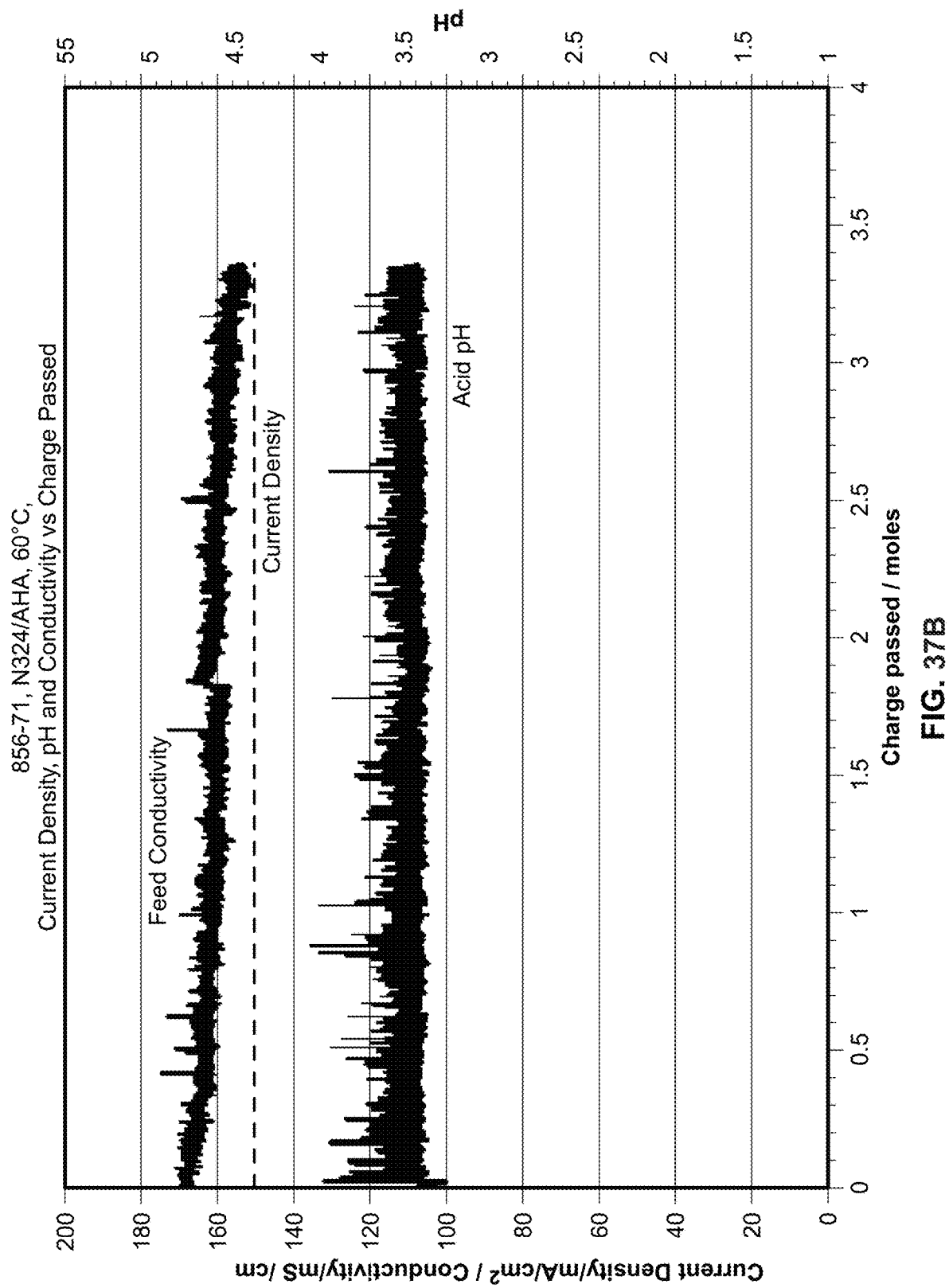
Figure 37C:
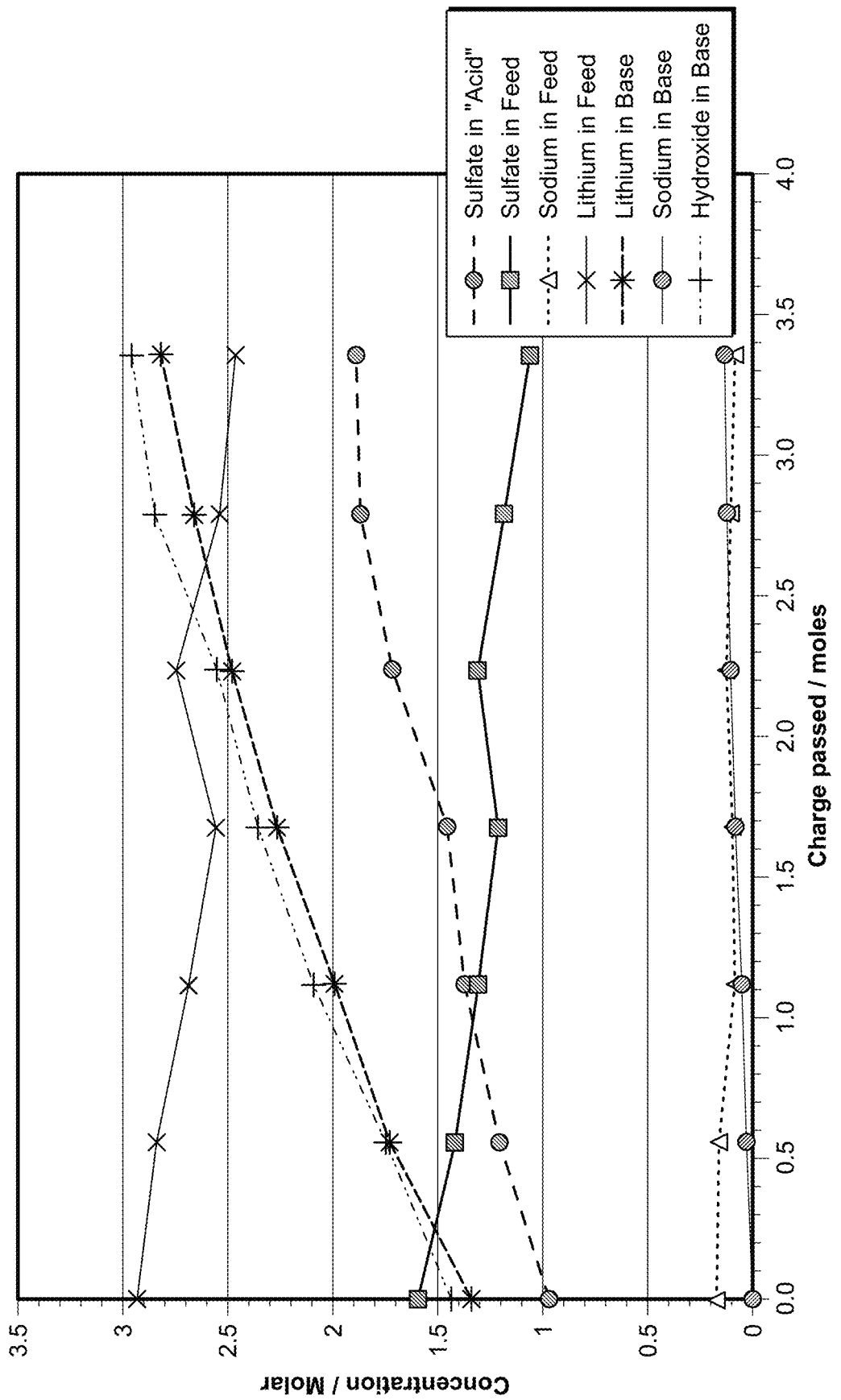
Figure 37D:
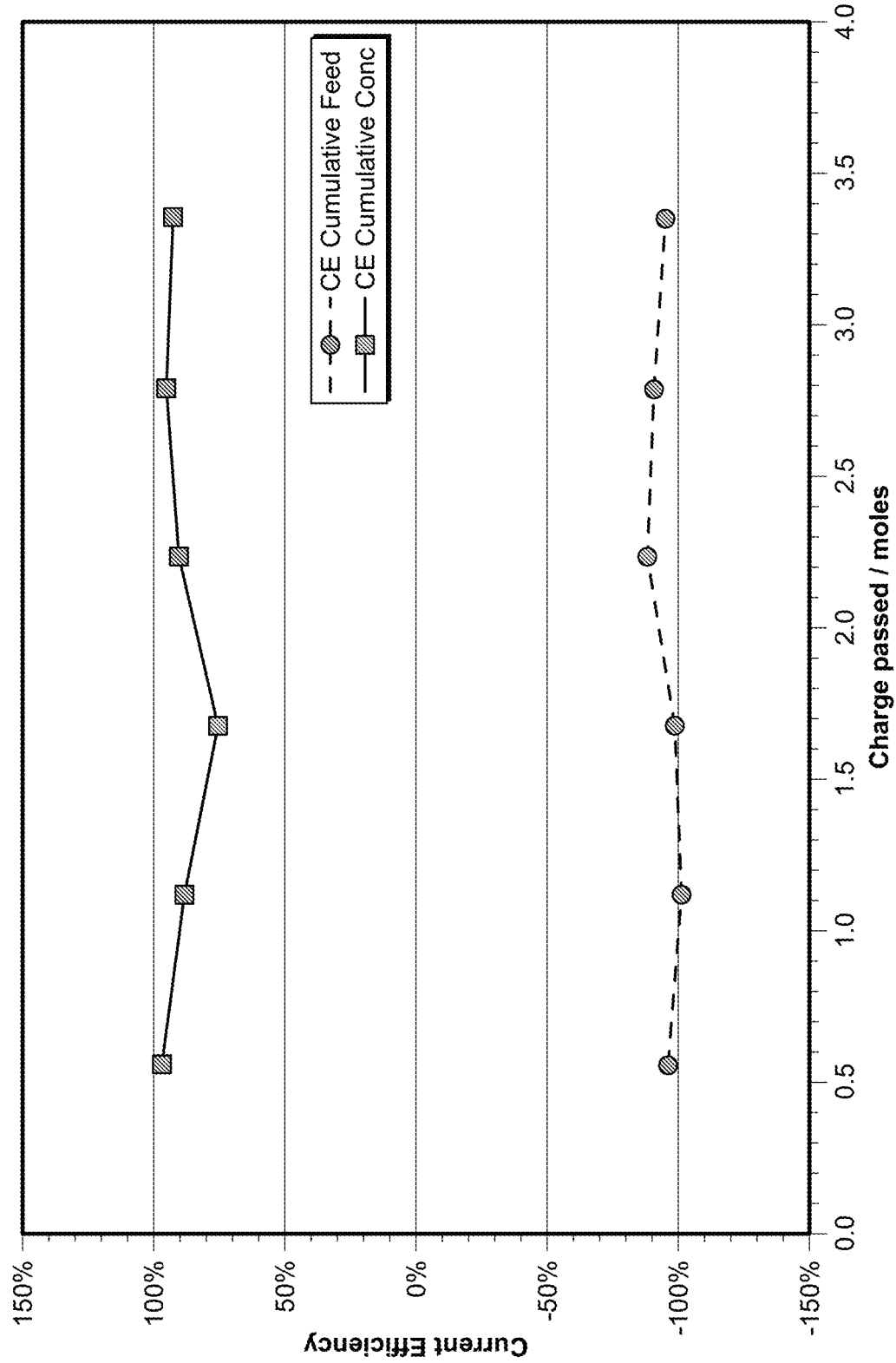
Figure 38A:
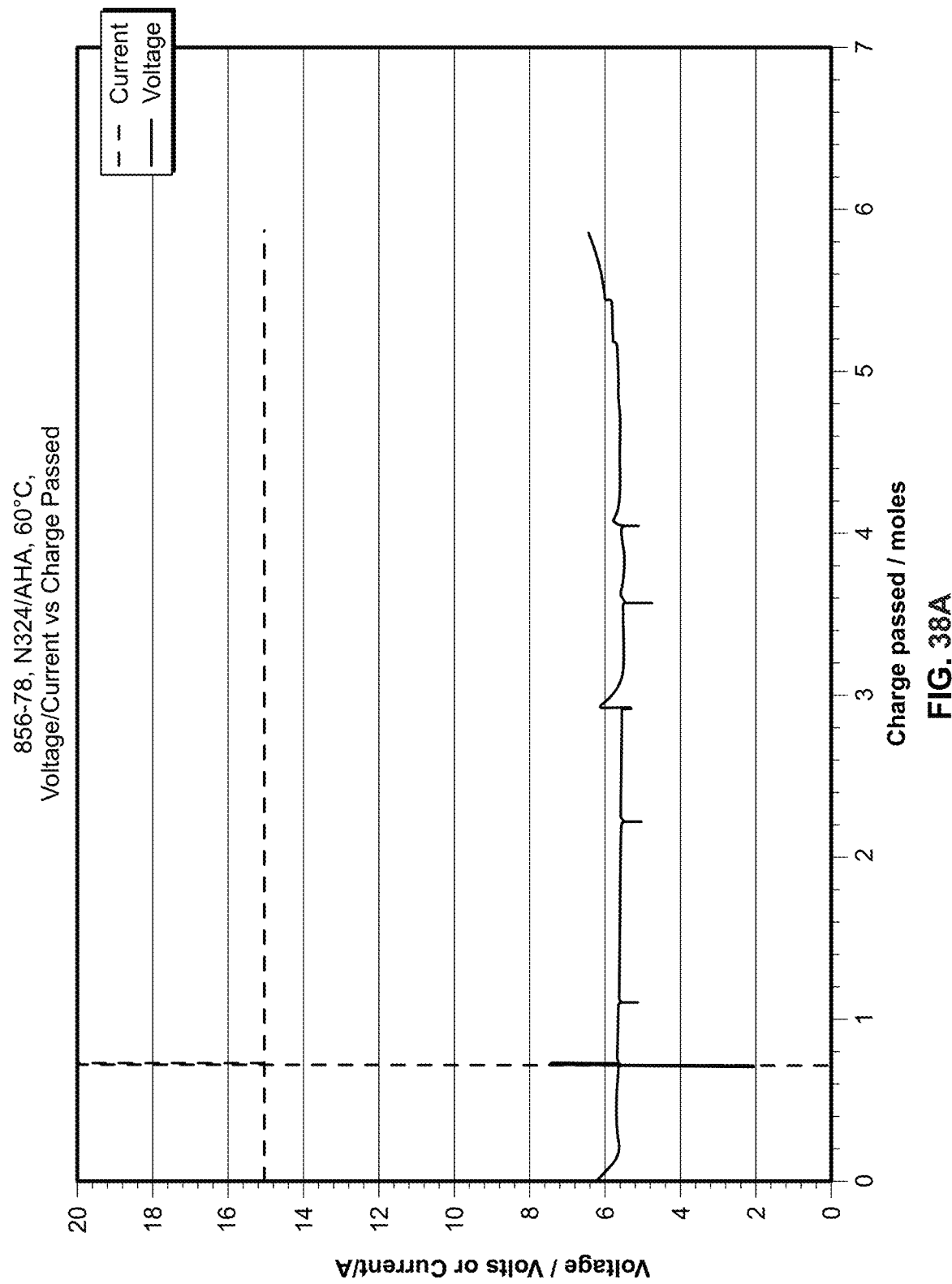
Figure 38B:
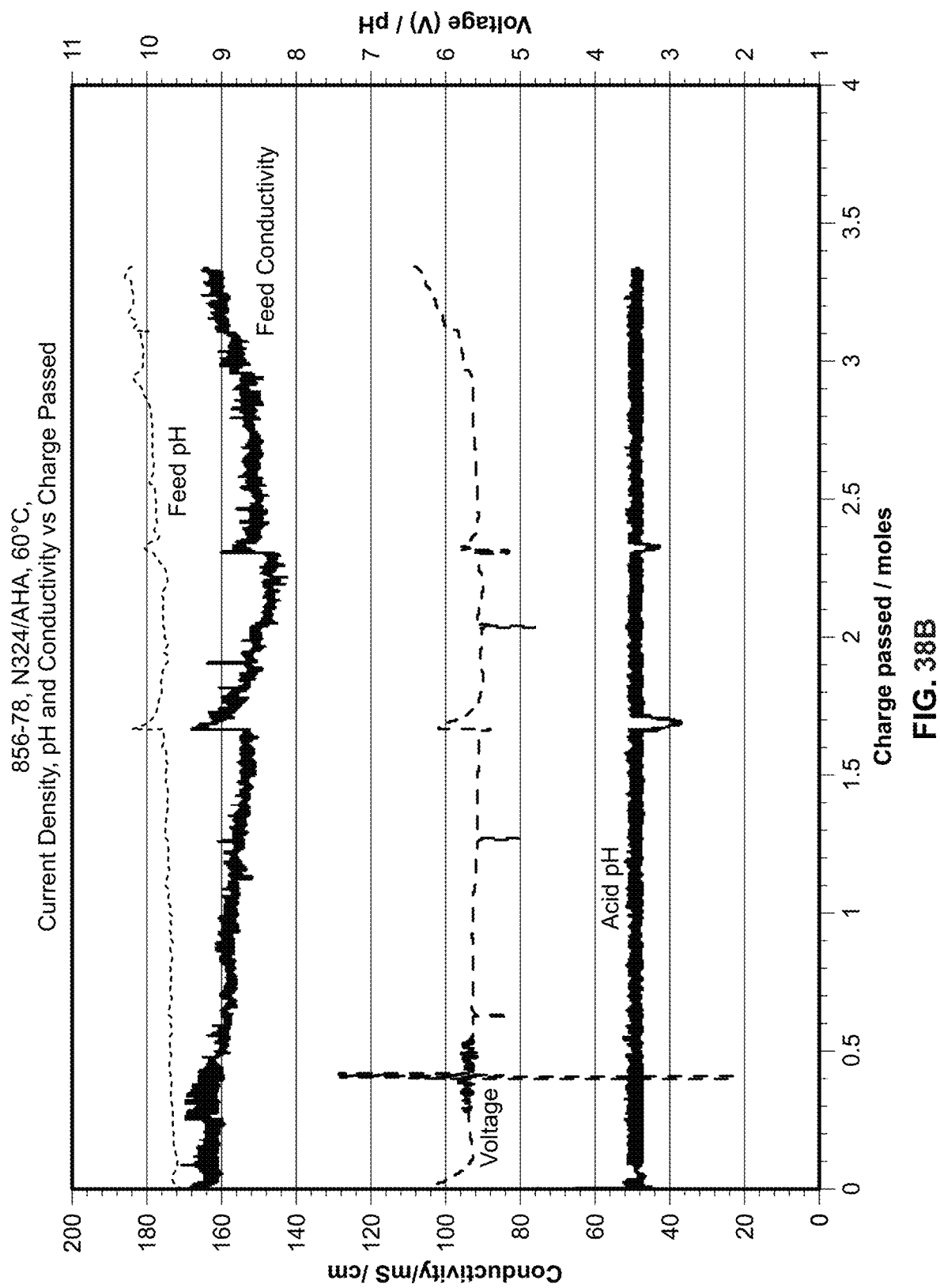
Figure 38C:
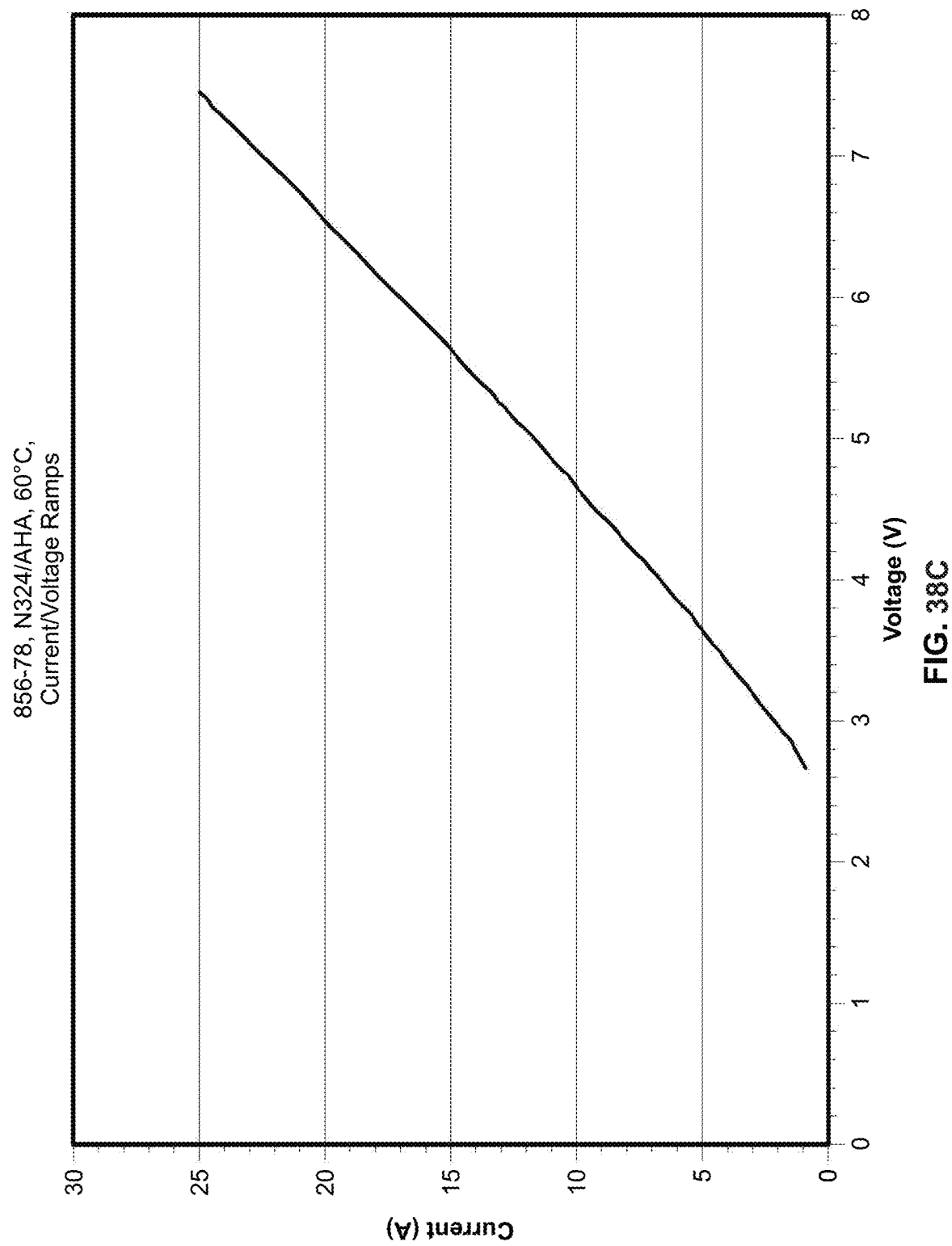
Figure 38D:
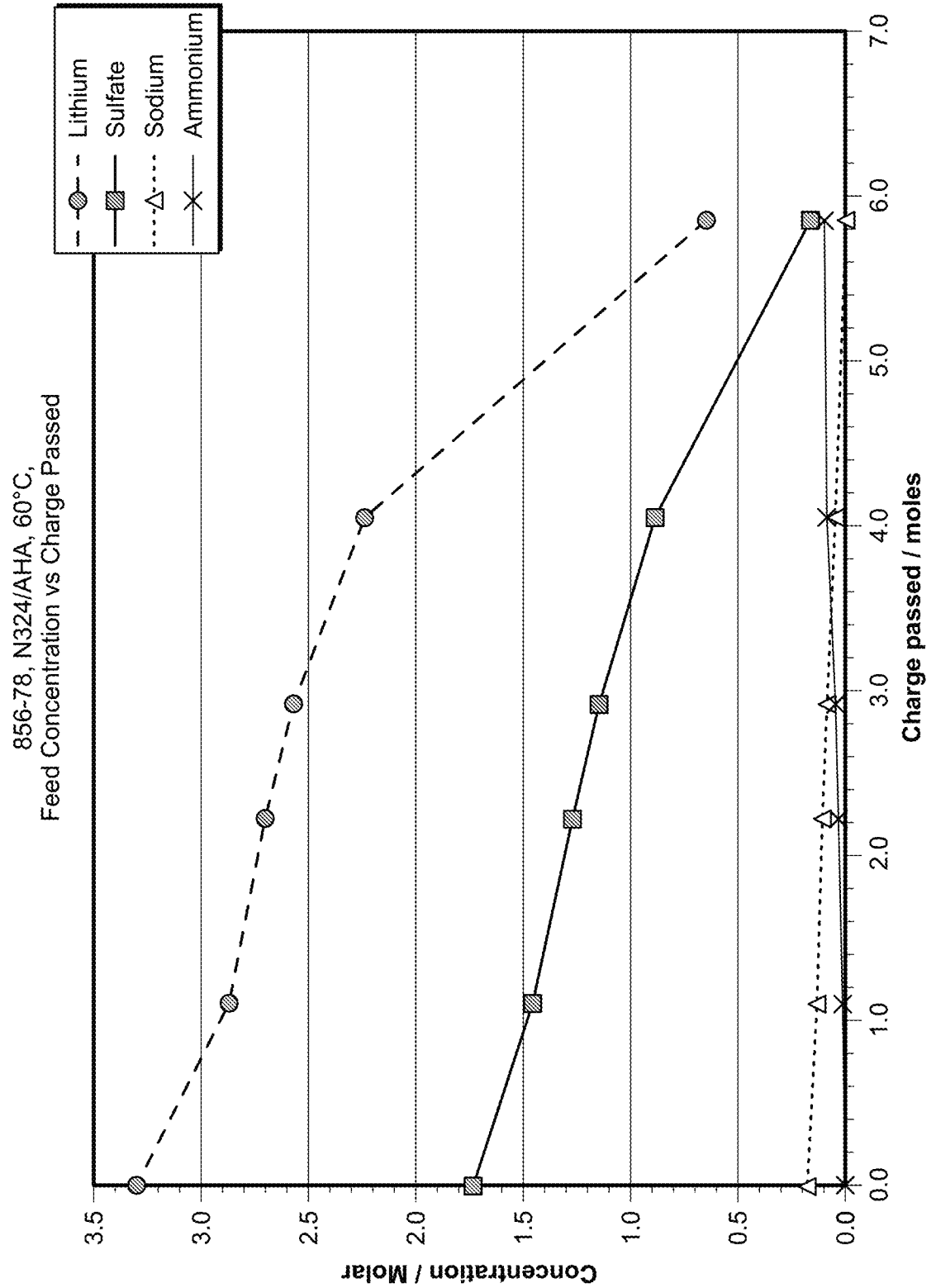
Figure 38E:
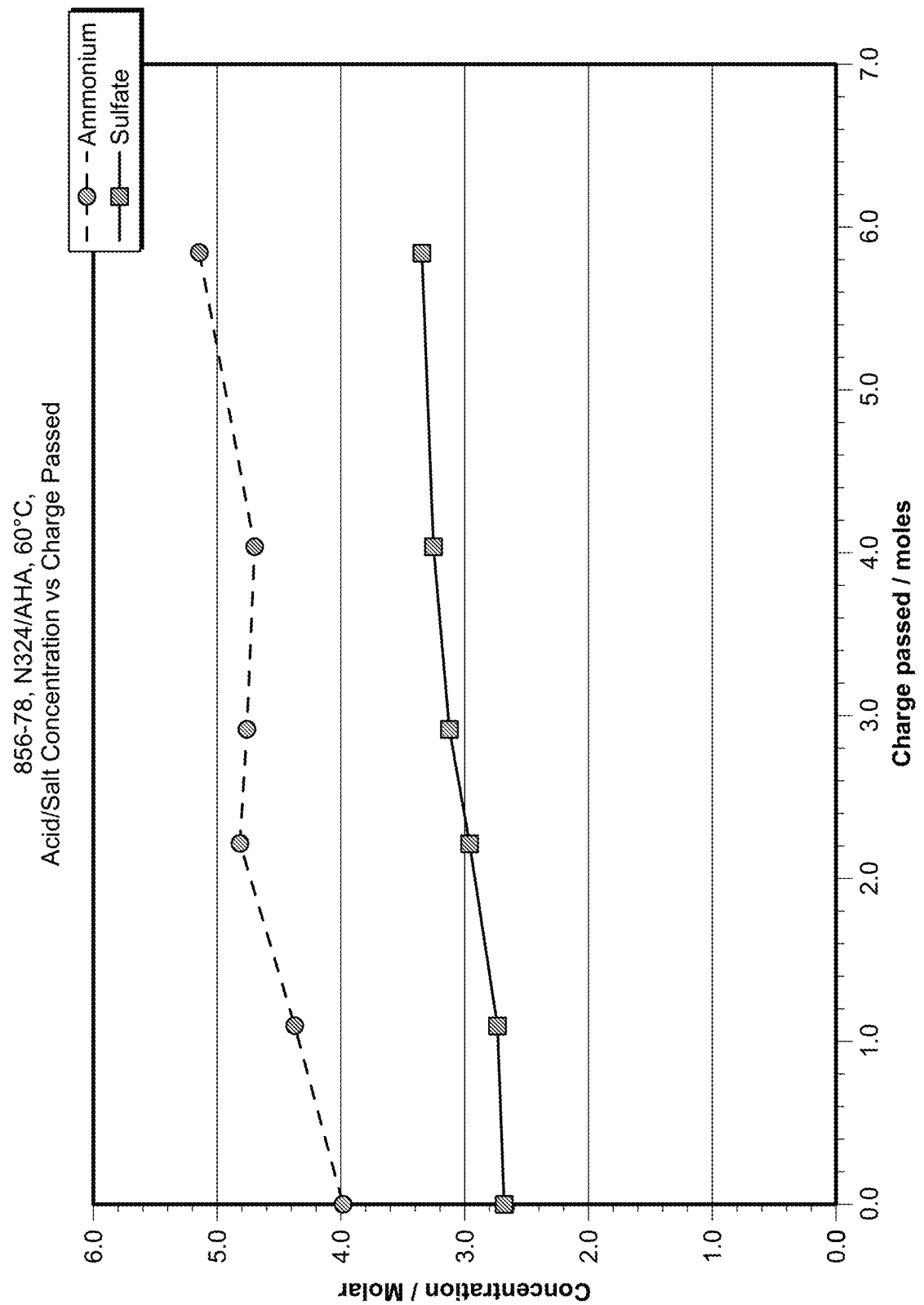
Figure 38F:
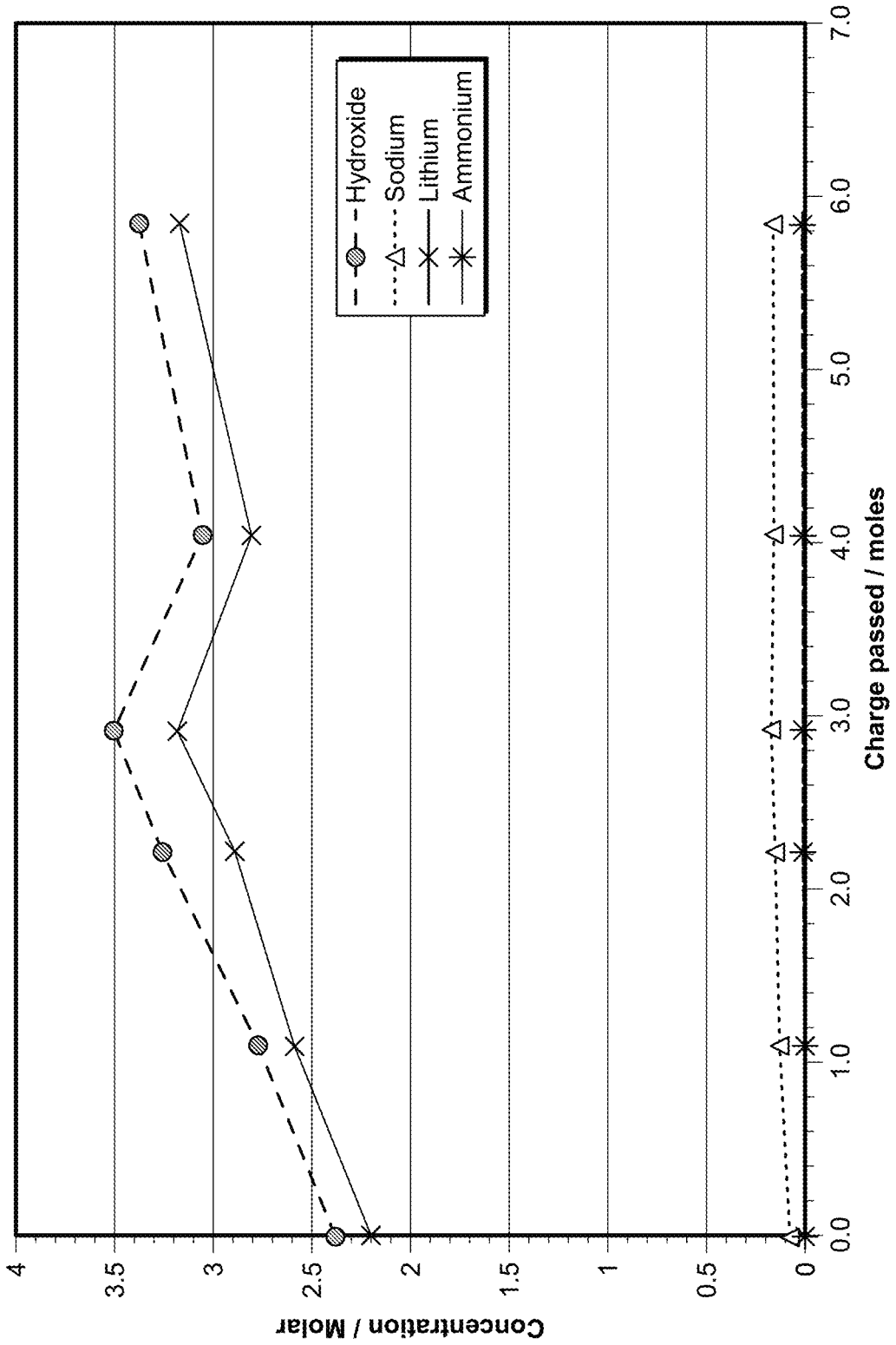
Figure 38G:
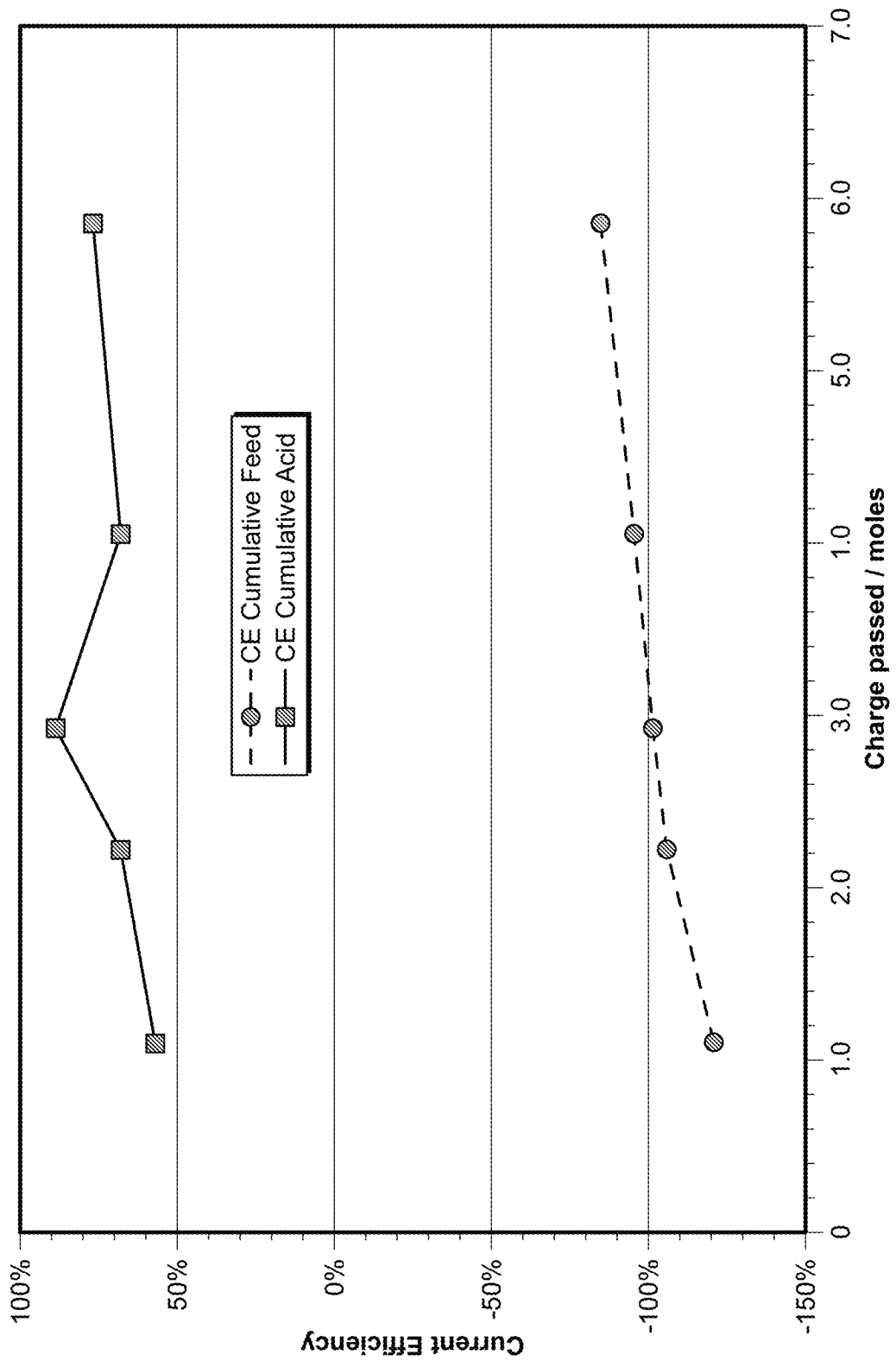
Figure 43:
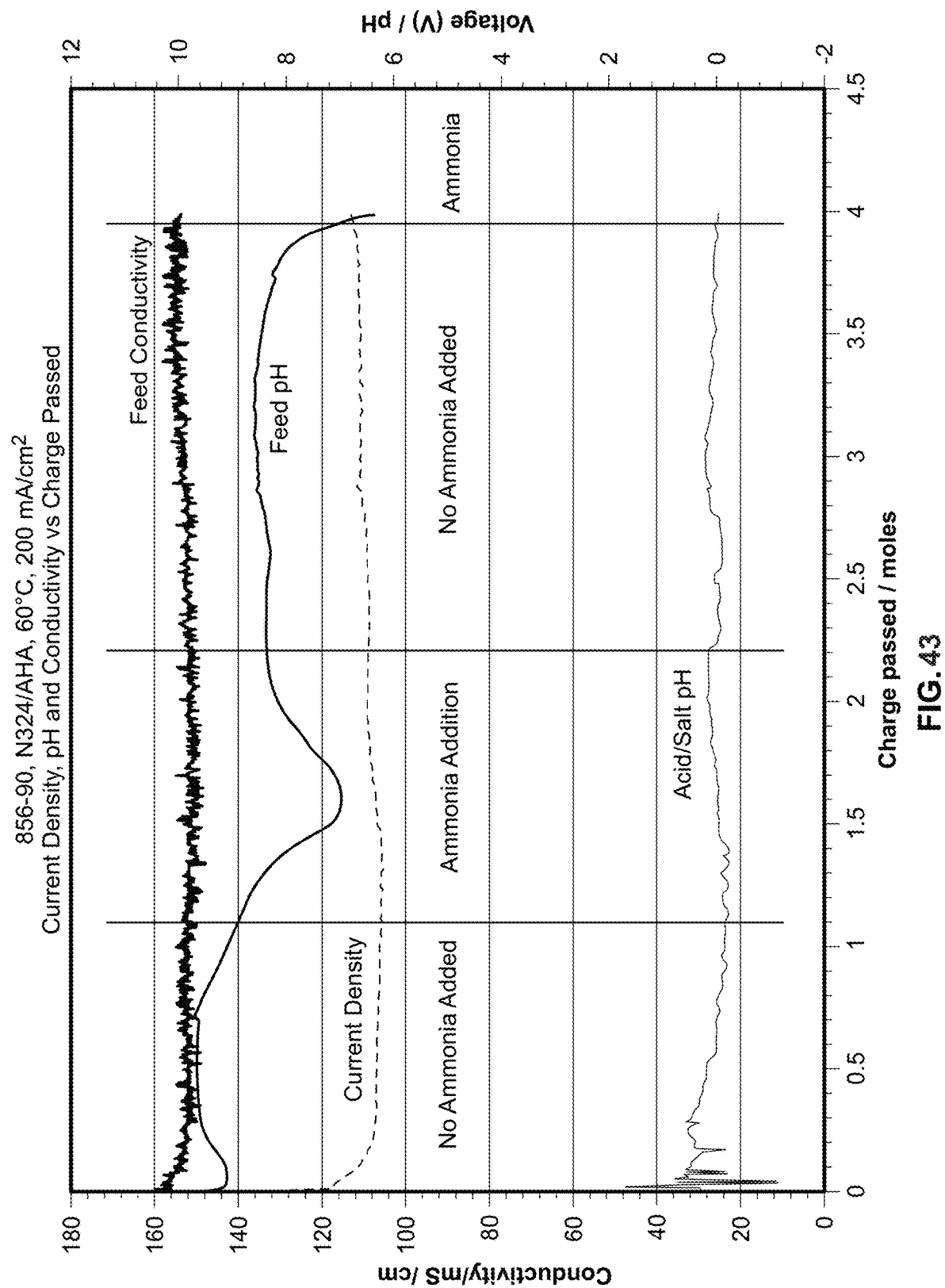
Figure 44:
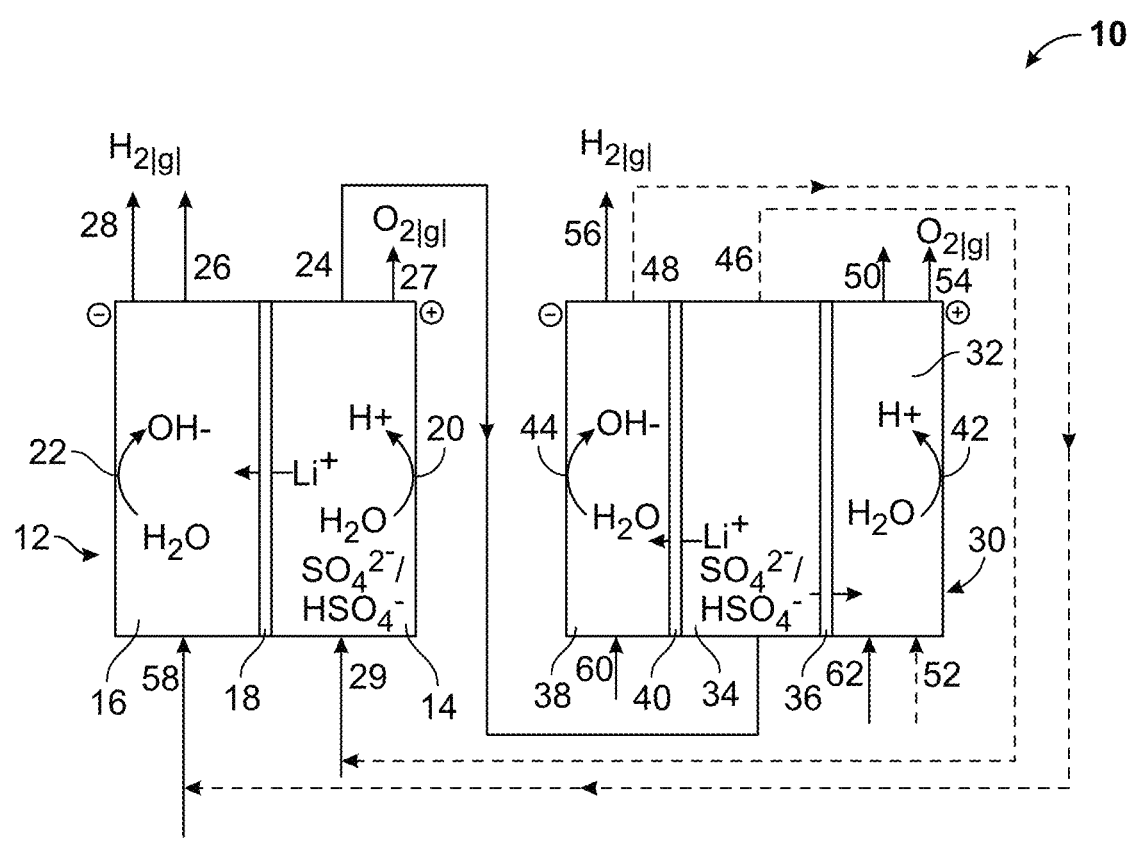
Figure 45:
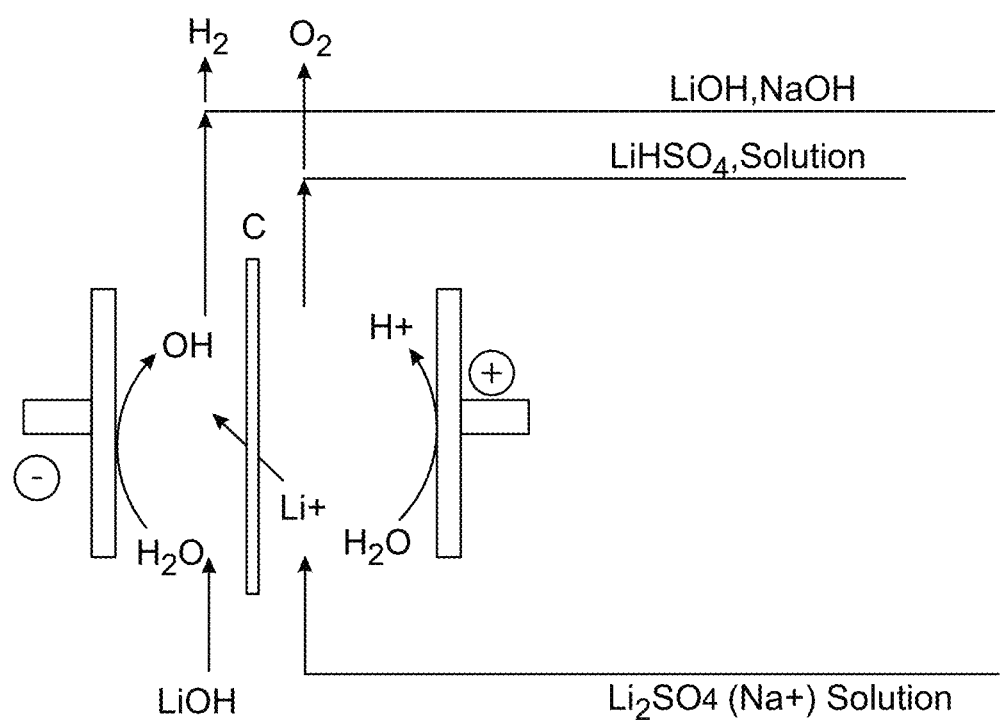
Figure 46A:
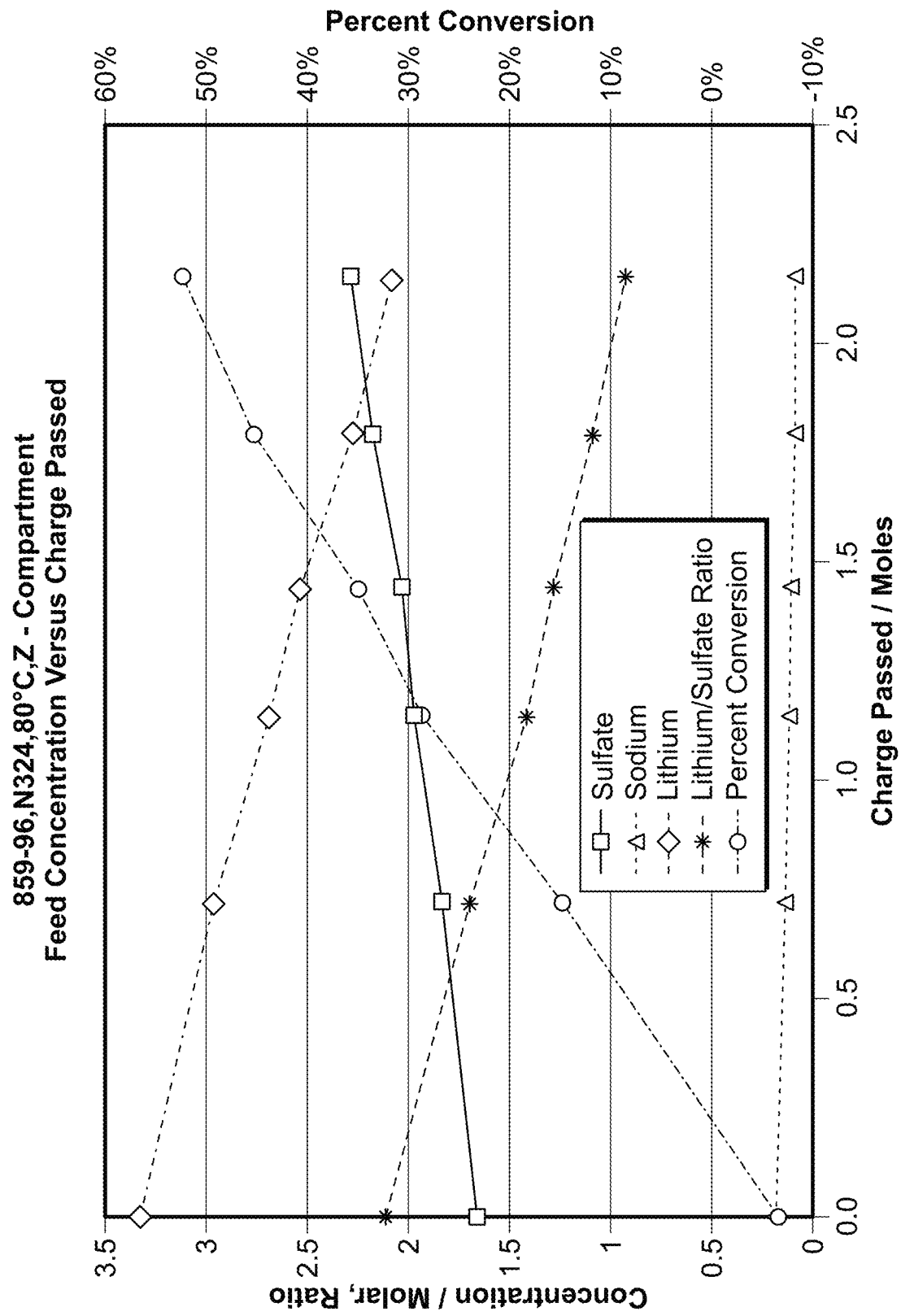
Figure 46B:
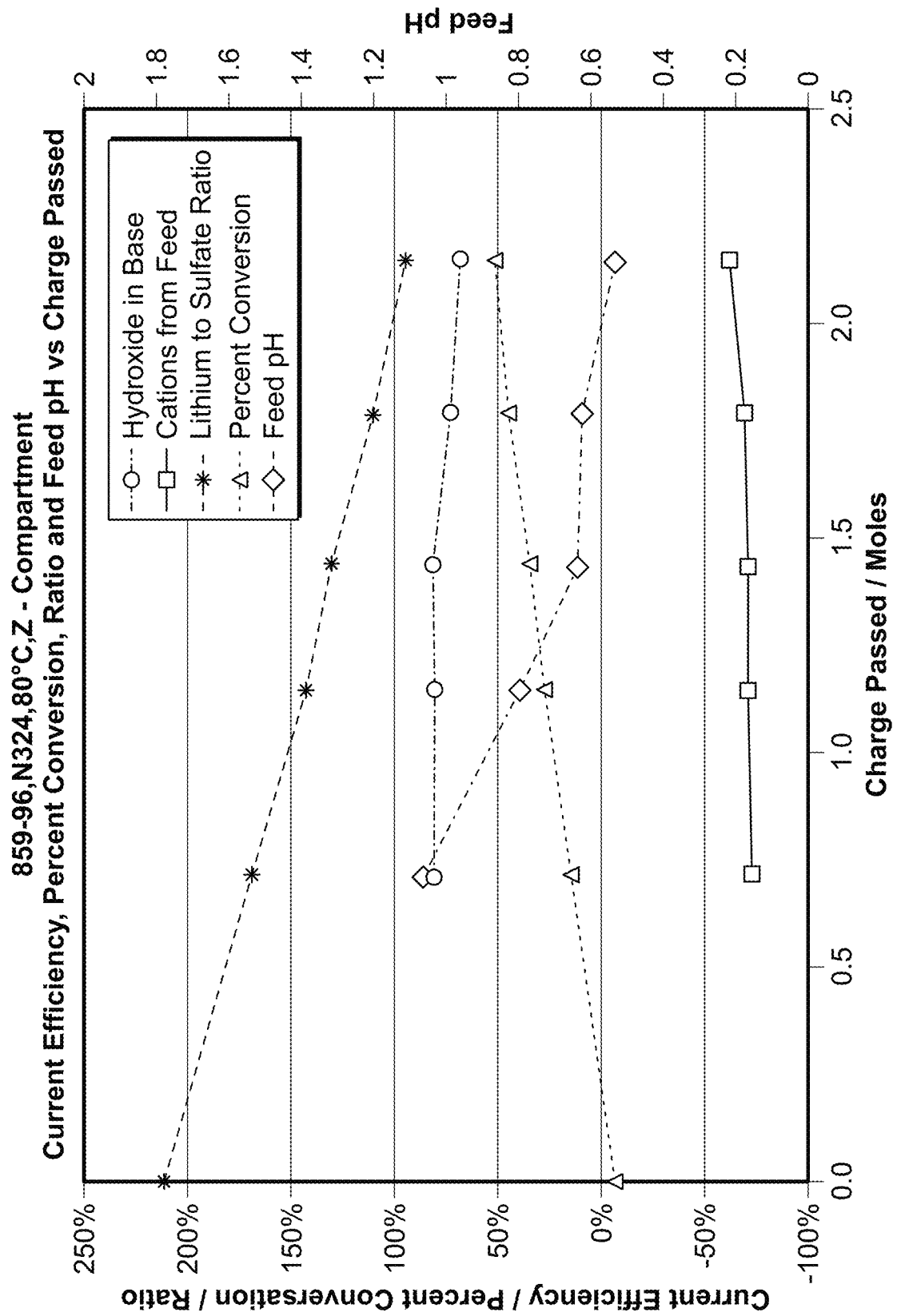
Figure 46C:
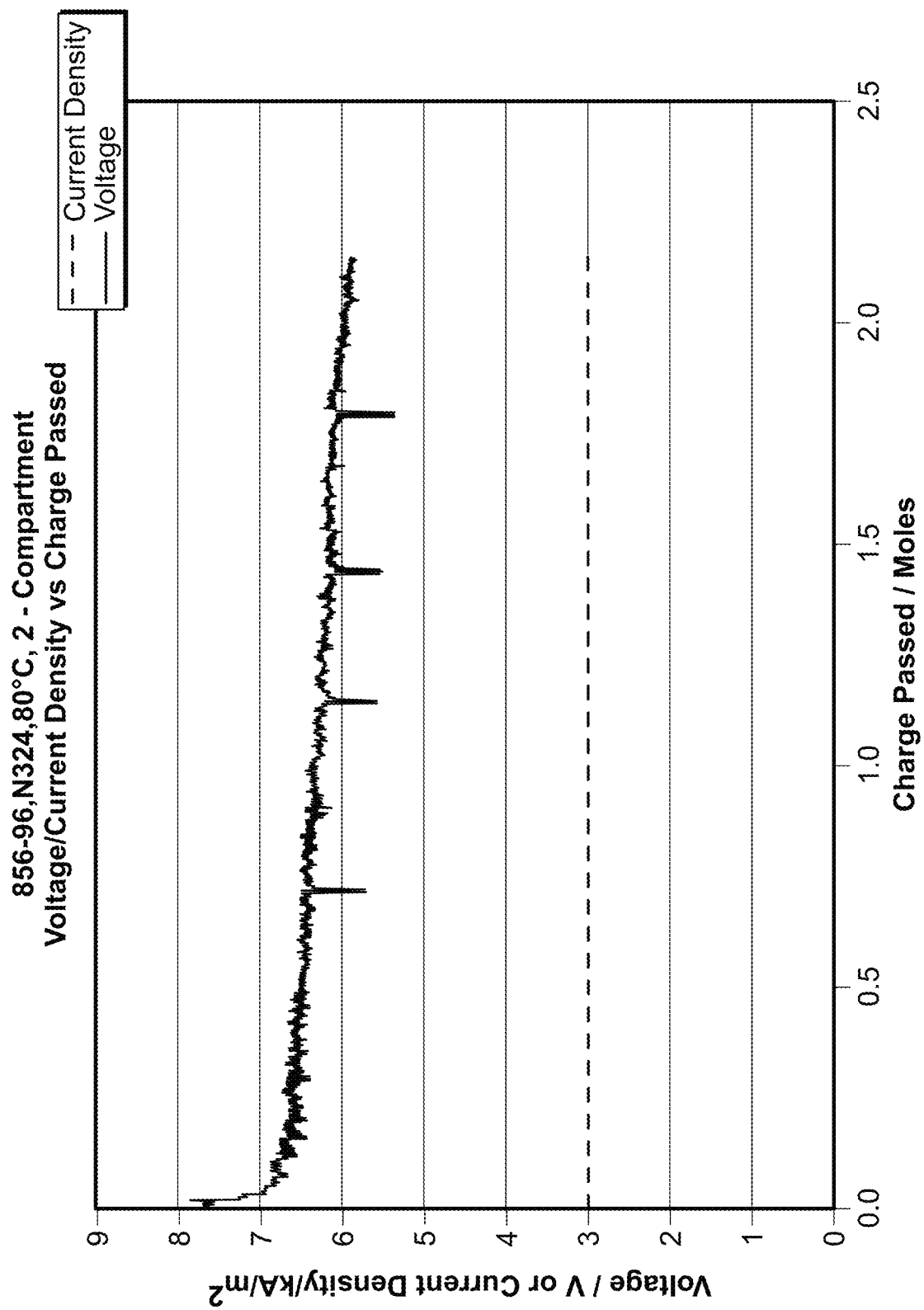
Figure 49A:
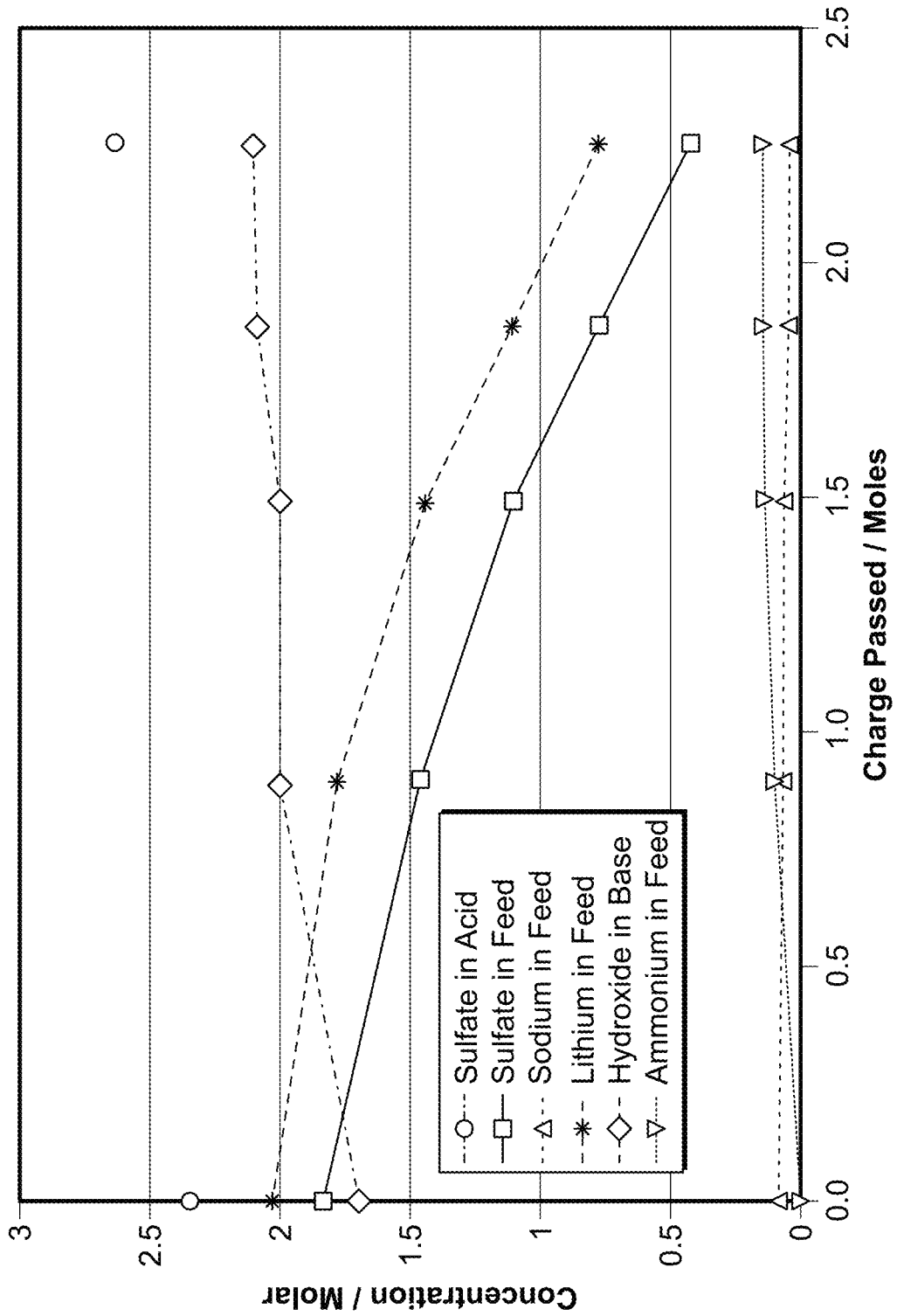
Figure 49B:
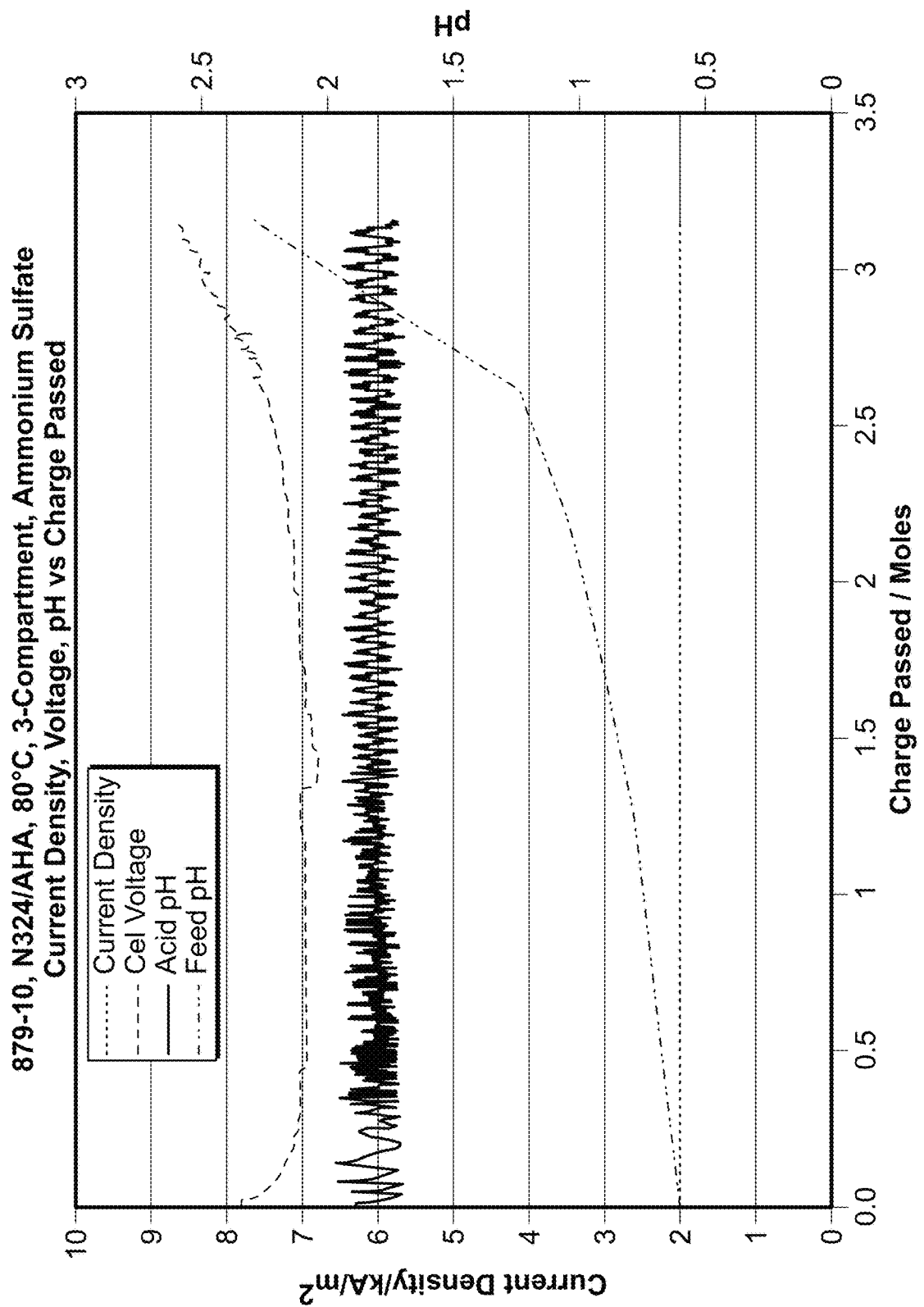
Figure 49C:
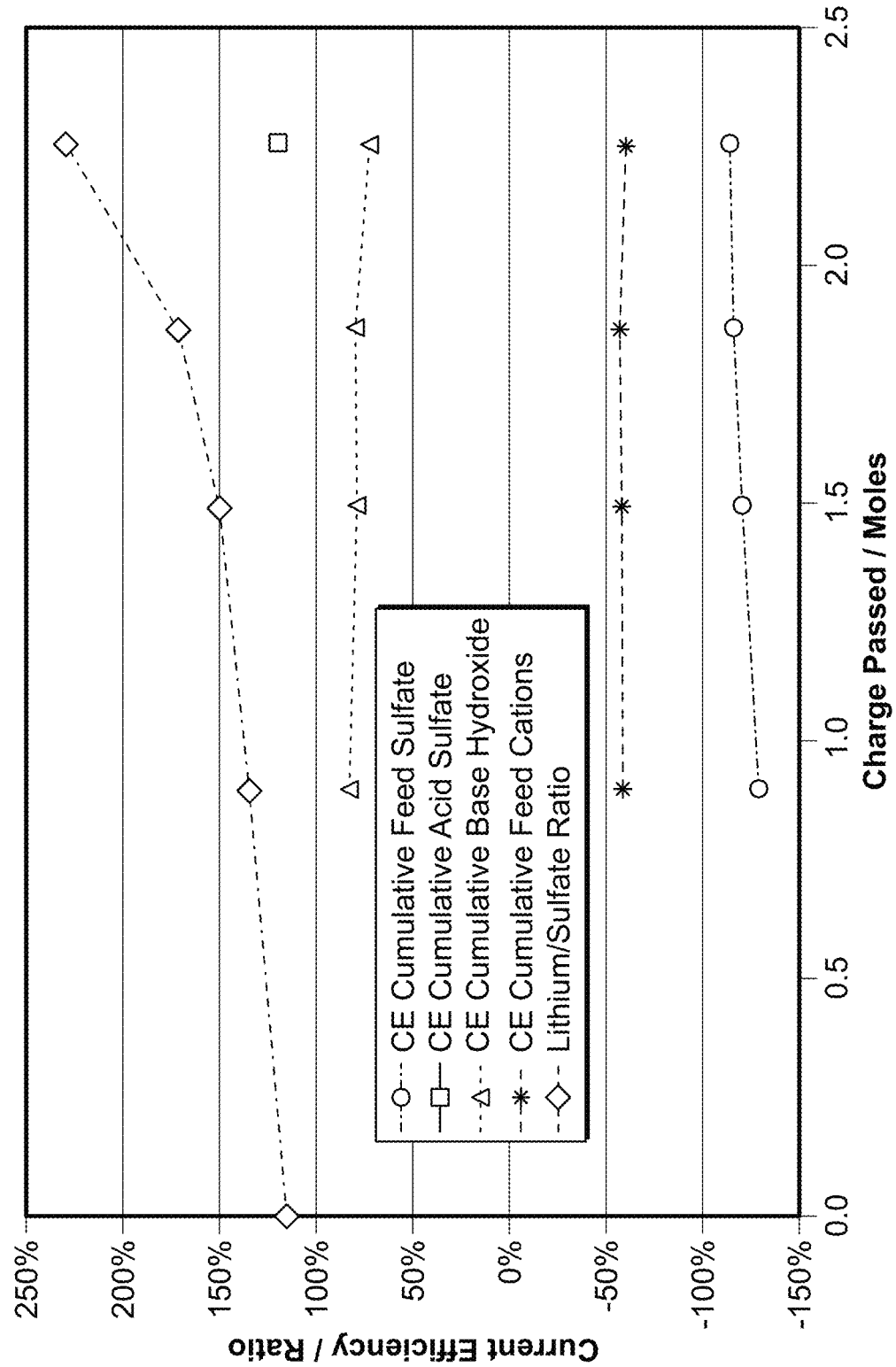
Figure 50A:
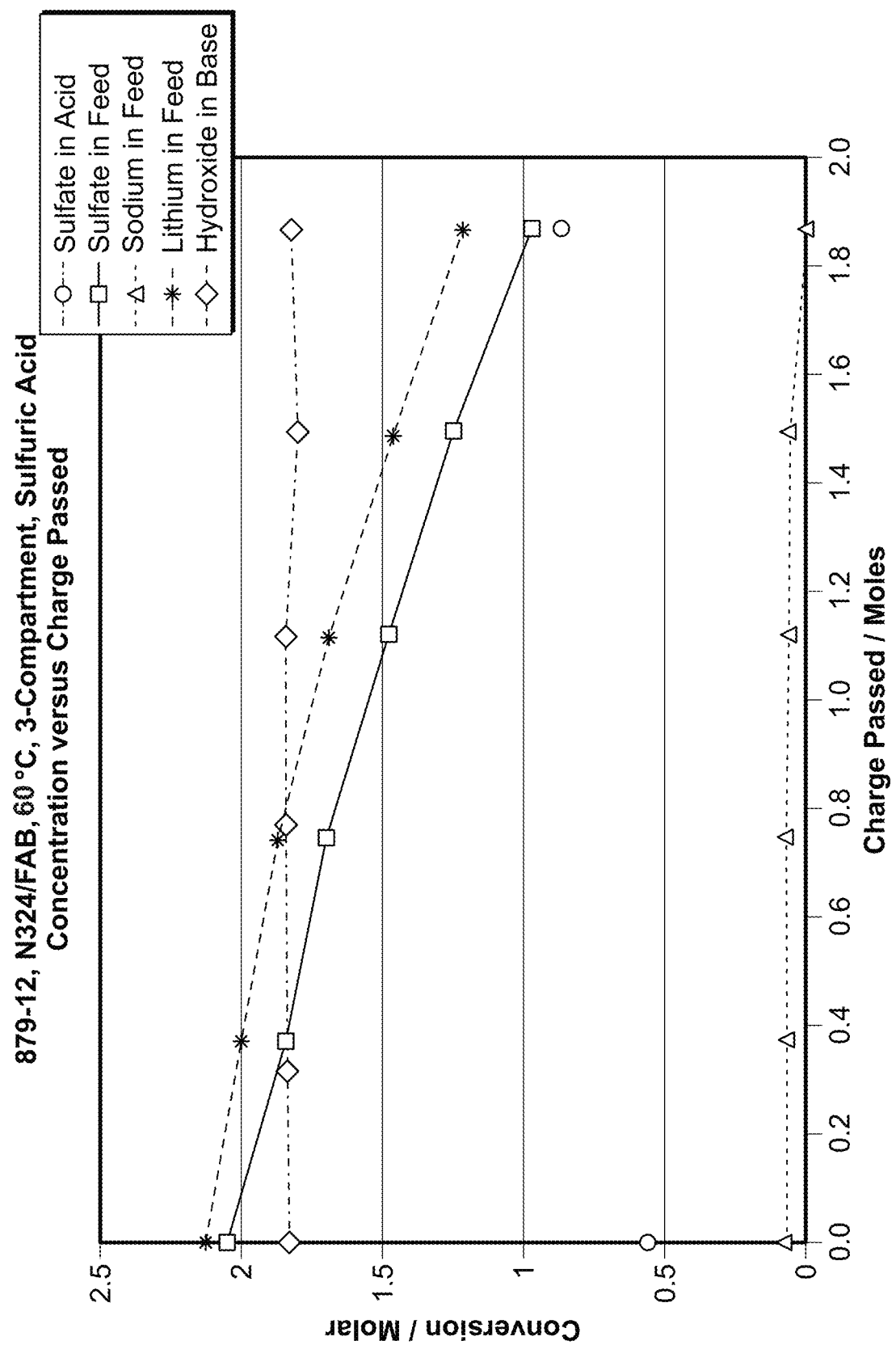
Figure 50B:
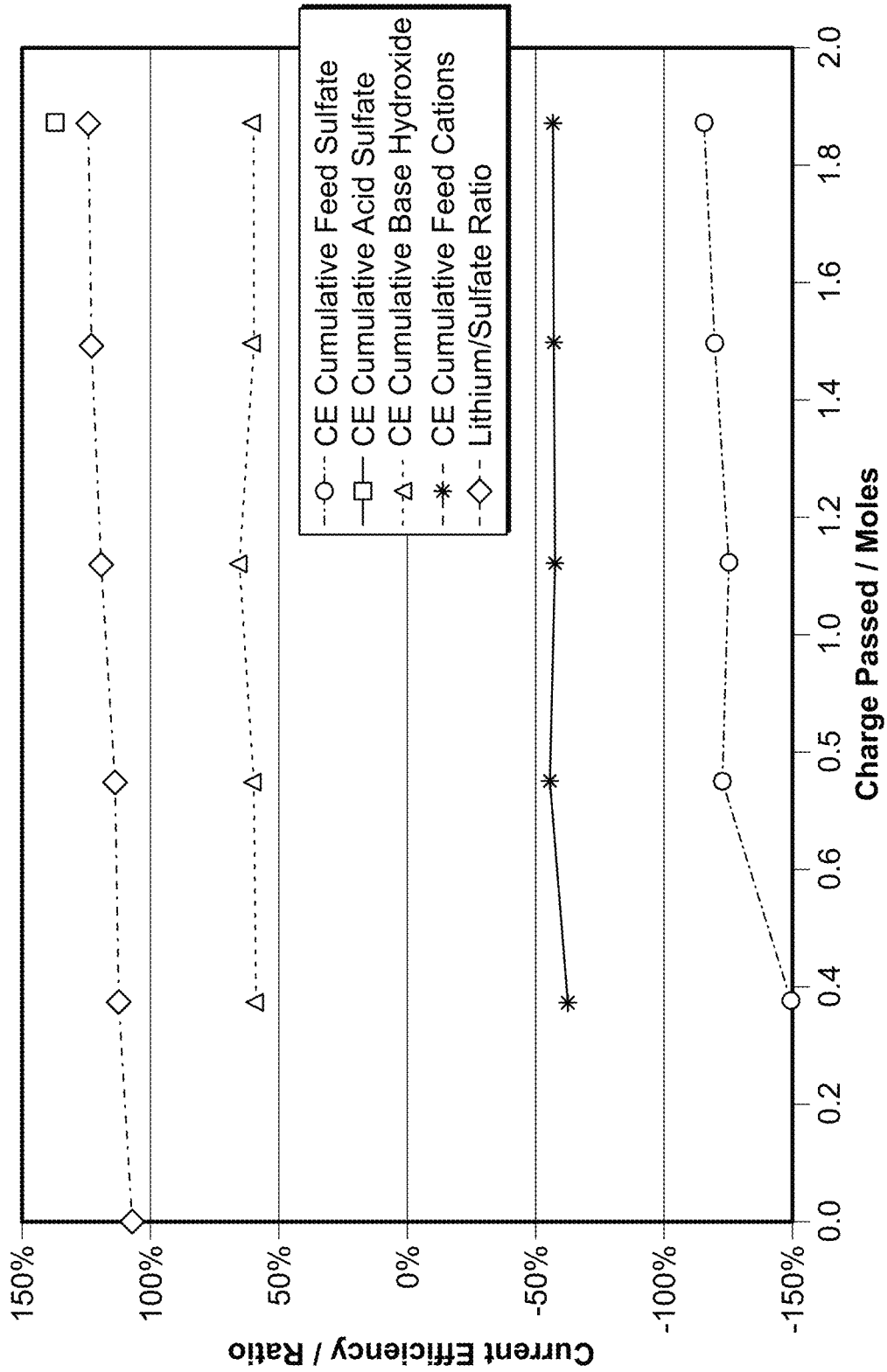
Figure 50C:
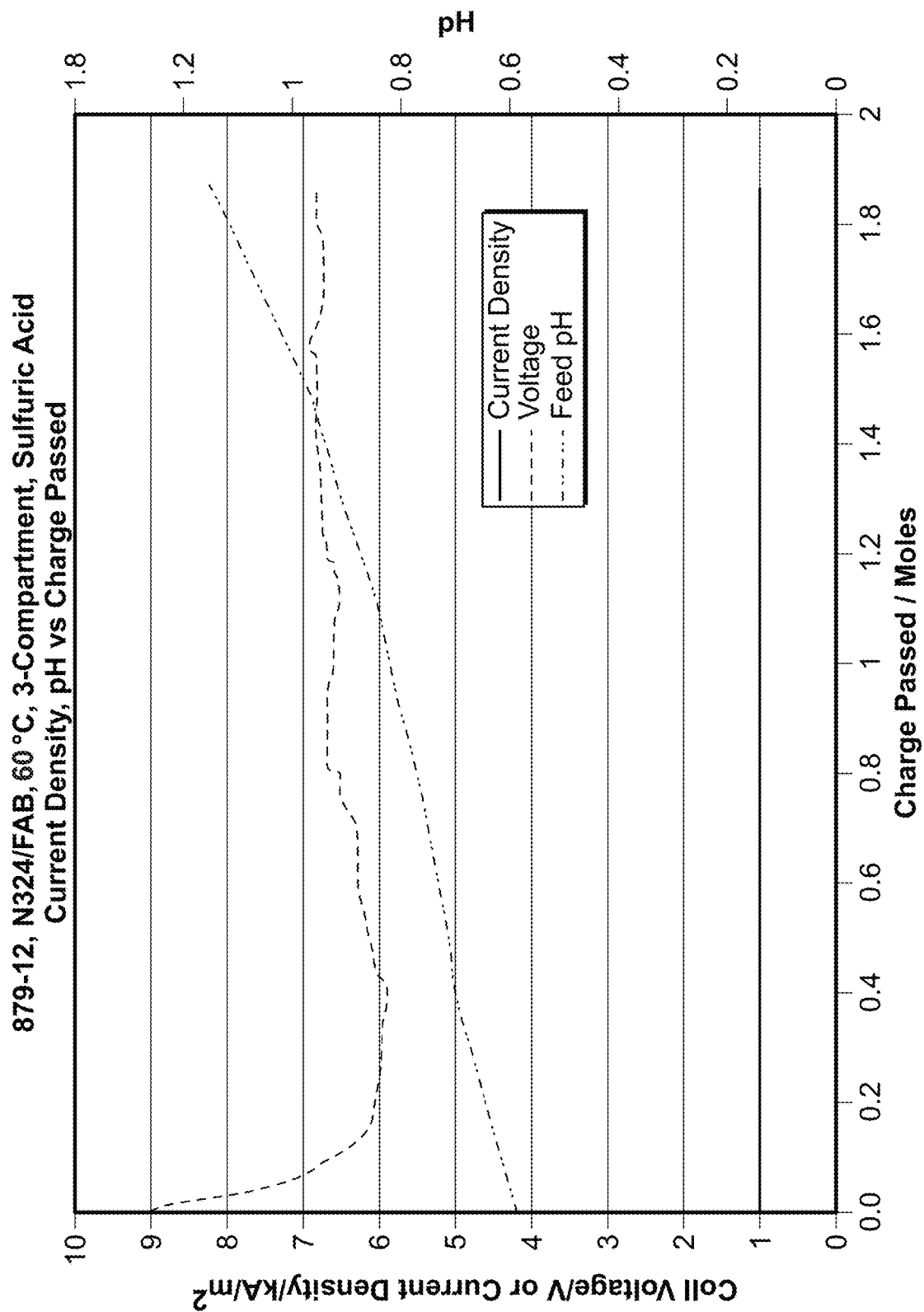
Figure 50D:
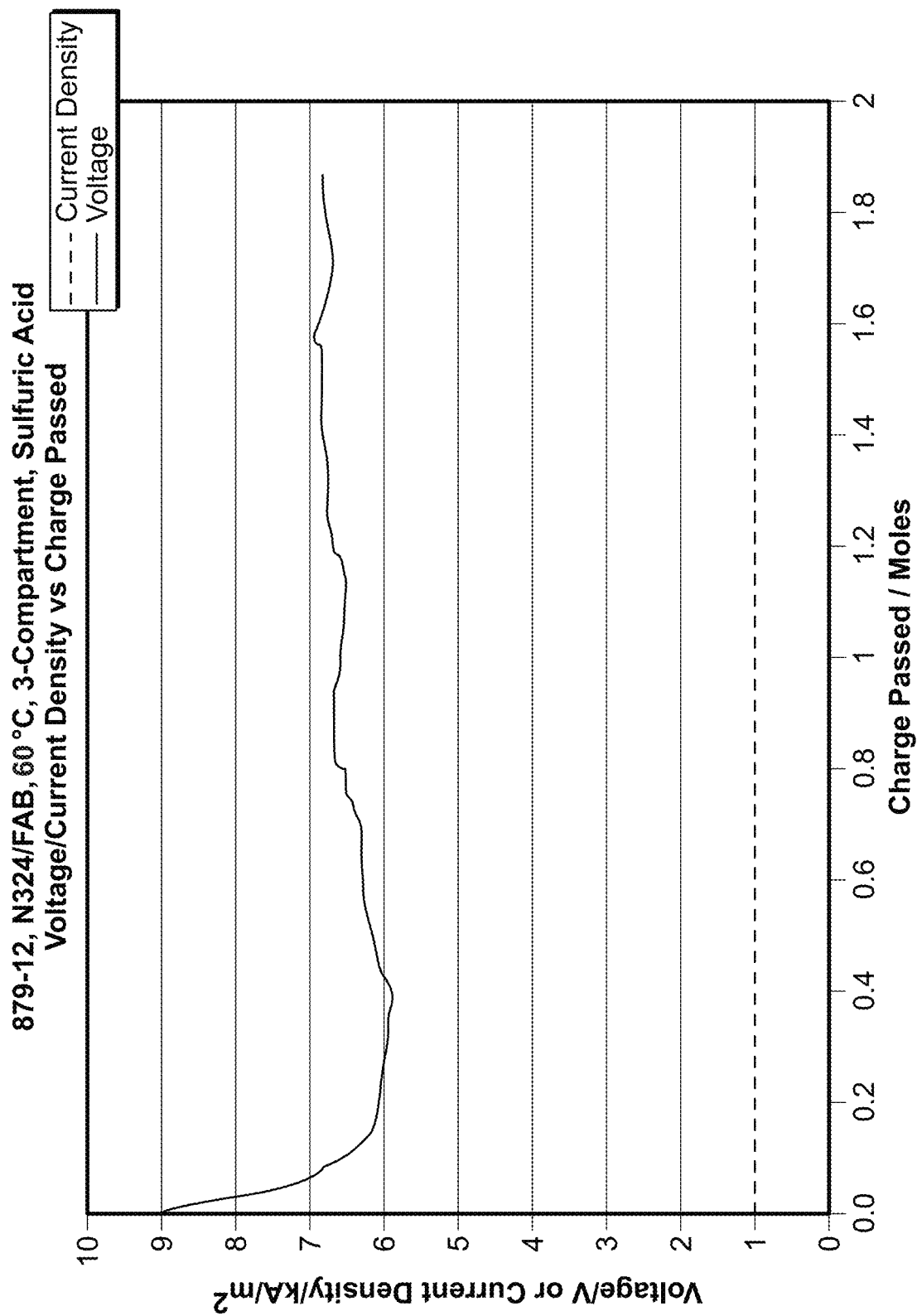

FIG. 11 is a plot showing calcium tenor as a function of bed volumes in an ion exchange process in another example of a process according to the present disclosure;

FIG. 12 is a plot showing magnesium tenor as a function of bed volumes in an ion exchange another example of a process according to the present disclosure;

FIG. 13 is a plot showing calcium tenor as a function of bed volumes in an ion exchange another example of a process according to the present disclosure;

FIG. 14 is a plot showing magnesium tenor as a function of bed volumes in an ion exchange another example of a process according to the present disclosure;

FIG. 15 is a plot showing lithium tenor as a function of bed volumes in an ion exchange another example of a process according to the present disclosure;

FIG. 16 is a plot showing various metals tenor as a function of bed volumes in an ion exchange another example of a process according to the present disclosure;

FIG. 17 is a schematic representation of an example of a monopolar membrane electrolysis cell that can be used for carrying out another example of a process according to the present disclosure;

FIG. 18 is a plot showing current efficiency and concentration of $H_2SO_4$ generated in the anolyte, concentration of LiOH generated in the catholyte compartment during monopolar membrane electrolysis at 40 degree C. as a function of charge passed in another example of a process according to the present disclosure;

FIG. 19 is a plot showing current efficiency and concentration at 40 degree C. as a function of charge passed in another example of a process according to the present disclosure;

FIG. 20 is a plot showing current efficiency and concentration as a function of charge passed in another example of a process according to the present disclosure;

FIG. 21 is a plot showing current density, pH and conductivity profiles as a function of charge passed in another example of a process according to the present disclosure;

FIG. 22 is a plot showing current density, pH and conductivity profiles as a function of charge passed in another example of a process according to the present disclosure;

FIG. 23 is a plot showing current efficiency and concentration as a function of charge passed in another example of a process according to the present disclosure;

FIG. 24 is a plot showing current efficiency and concentration as a function of charge passed in another example of a process according to the present disclosure;

FIG. 25 is a plot showing current density, pH and conductivity profiles as a function of charge passed in another example of a process according to the present disclosure;

FIG. 26 is a plot showing current density, pH and conductivity profiles as a function of charge passed in another example of a process according to the present disclosure;

FIG. 27 is a plot showing current efficiency and concentration as a function of charge passed in another example of a process according to the present disclosure;

FIG. 28 is a plot showing current density, pH and conductivity profiles as a function of charge passed in another example of a process according to the present disclosure;

FIG. 29 is a plot showing concentration as a function of charge passed in another example of a process according to the present disclosure;

FIG. 30 is a plot showing current density, pH and conductivity profiles as a function of charge passed in another example of a process according to the present disclosure;

FIG. 31 is a plot showing current efficiency and concentration as a function of charge passed in another example of a process according to the present disclosure;

FIG. 32 is a flow sheet diagram concerning another example of a process according to the present disclosure;

FIG. 33 is a flow sheet diagram concerning another example of a process according to the present disclosure;

FIG. 34 is a plot showing lithium tenor as a function of time in another example of a process according to the present disclosure;

FIG. 35 is a plot showing lithium tenor as a function of time in another example of a process according to the present disclosure;

FIG. 36 is a schematic representation of an example of a membrane electrolysis cell that can be used for carrying out another example of a process according to the present disclosure;

FIG. 37 shows plots relating to a process according to the present disclosure using N324/AHA membranes at about 60° C.: FIG. 37A is a plot showing current and voltage as a function of charge passed, FIG. 37B is a plot showing feed conductivity, current density and acid pH as a function of charge passed, FIG. 37C is a plot showing the concentration in the "acid" compartment, feed and base of various ions as a function of charge passed and FIG. 37D is a plot showing sulfate current efficiency as a function of charge passed;

FIG. 38 shows plots relating to a process according to the present disclosure using N324/AHA membranes at about 60° C.: FIG. 38A is a plot showing current and voltage as a function of charge passed, FIG. 38B is a plot showing feed conductivity, voltage, feed pH and acid pH as a function of charge passed, FIG. 38C is a plot showing a current/voltage ramp, FIG. 38D is a plot showing the concentration in the feed of various ions as a function of charge passed, FIG. 38E is a plot showing the concentration of ammonium and sulfate in the acid compartment (or anolyte compartment) as a function of charge passed, FIG. 38F is a plot showing the concentration of various ions in the base as a function of charge passed, and FIG. 38G is a plot showing sulfate current efficiency as a function of charge passed;

FIG. 39 shows plots relating to a process according to the present disclosure using N324/AHA membranes at about 60° C.: FIG. 39A is a plot showing current and voltage as a function of charge passed; FIG. 39B is a plot showing feed conductivity, voltage, feed pH and acid pH as a function of charge passed, FIG. 39C is a plot showing the concentration of various ions in the feed as a function of charge passed, FIG. 39D is a plot showing the concentration of various ions in the base as a function of charge passed, FIG. 39E is a plot showing the concentration of ammonium and sulfate in the "acid" compartment as a function of charge passed, FIG. 39F is a plot showing sulfate current efficiency as a function of charge passed, and FIG. 39G is a plot showing the concentration of various ions in the feed as a function of charge passed;

FIG. 40 shows plots relating to a process according to the present disclosure using N324/AHA membranes at about 60° C. and about 200 mA/cm$^2$: FIG. 40A is a plot showing current and voltage as a function of charge passed, FIG. 40B is a plot showing feed conductivity, voltage, feed pH and acid pH as s function of charge passed, FIG. 40C is a plot showing the concentration of various ions in the feed as a function of charge passed, FIG. 40D is a plot showing the concentration of ammonium and sulfate in the "acid" compartment as a function of charge passed, FIG. 40E is a plot showing the concentration of various ions in the base as a function of charge passed, and FIG. 40F is a plot showing sulfate current efficiency as a function of charge passed;

FIG. 41 shows plots relating to a process according to the present disclosure using N324/AHA membranes at about 80° C. and about 200 mA/cm$^2$: FIG. 41A is a plot showing current and voltage as a function of charge passed, FIG. 41B is a plot showing feed conductivity, voltage, feed pH and acid pH as a function of charge passed, FIG. 41C is a plot showing a current/voltage ramp, FIG. 41D is a plot showing the concentration of various ions in the feed as a function of charge passed, FIG. 41E is a plot showing the concentration of ammonium and sulfate in the "acid" compartment as a function of charge passed, FIG. 41F is a plot showing the concentration of various ions in the base as a function of charge passed, and FIG. 41G is a plot showing sulfate current efficiency as a function of charge passed;

FIG. 42 shows plots relating to a process according to the present disclosure using N324/AHA membranes at about 60° C. and about 200 mA/cm$^2$: FIG. 42A is a plot showing current and voltage as a function of charge passed; FIG. 42B is a plot showing the concentration of various ions in the feed as a function of charge passed, FIG. 42C is a plot showing feed conductivity, voltage, feed pH and acid pH as a function of charge passed, FIG. 42D is a plot showing the concentration of various ions in the feed as a function of charge passed, FIG. 42E is a plot showing the concentration of ammonium and sulfate in the "acid" compartment as a function of charge passed, FIG. 42F is a plot showing the concentration of various ions in the base as a function of charge passed, and FIG. 42G is a plot showing sulfate current efficiency as a function of charge passed;

FIG. 43 is a plot showing the current density, pH and conductivity as a function of charge passed in an example of a process according to the present disclosure using N324/AHA membranes at about 60° C. and about 200 mA/cm$^2$;

FIG. 44 is a schematic diagram of a process and a system according to an embodiment of the present disclosure;

FIG. 45 is a schematic representation of a two-compartment membrane cell that can be used in a process comprising the electrolysis of an aqueous solution containing a lithium compound such as lithium sulfate and/or lithium bisulfate according to an embodiment of the present disclosure;

FIG. 46 shows plots relating to an example of a process for preparing lithium hydroxide using a Nafion 324 cation exchange membrane in a two-compartment membrane electrolysis cell at a temperature of about 80° C. and a current density of about 3 kA/m$^2$: FIG. 46A is a plot showing feed concentration for various ions and percent conversion as a function of charge passed, FIG. 46B is a plot showing current efficiency, percent conversion, ratio and feed pH as a function of charge passed, FIG. 46C is a plot showing voltage and current density as a function of charge passed, and FIG. 46D is a plot showing the hydroxide concentration as a function of charge passed;

FIG. 47 shows plots relating to an example of a process for preparing lithium hydroxide using a Nafion 324 cation exchange membrane in a two-compartment membrane electrolysis cell at a temperature of about 80° C. and a current density of about 4 kA/m$^2$: FIG. 47A is a plot showing voltage and current density as a function of charge passed, FIG. 47B is a plot showing the feed concentration of various ions as a function of charge passed, FIG. 47C is a plot showing the current efficiency, percent conversion and ratio as a function of charge passed, and FIG. 47D is a plot showing the hydroxide concentration as a function of charge passed;

FIG. 48 shows plots relating to an example of a process for preparing lithium hydroxide using a Nafion 324 cation exchange membrane in a two-compartment membrane electrolysis cell at a temperature of about 80° C. and a current density of about 5 kA/m$^2$: FIG. 48A is a plot showing voltage and current density as a function of charge passed, FIG. 48B is a plot showing the feed concentration and ratio of various ions as a function of charge passed, FIG. 48C is a plot showing the current efficiency, percent conversion and ratio as a function of charge passed, and FIG. 48D is a plot showing the hydroxide concentration as a function of charge passed;

FIG. 49 shows plots relating to an example of a process for preparing lithium hydroxide coproducing ammonium sulfate using a Nafion 324 cation exchange membrane and an Astom AHA anion exchange membrane in a three-compartment membrane electrolysis cell at a temperature of about 80° C. and a current density of about 200 mA/cm$^2$: FIG. 49A is a plot showing concentrations of various ions in various compartments of the three-compartment membrane electrolysis cell as a function of charge passed, FIG. 49B is a plot showing current density, cell voltage and feed and acid pH as a function of charge passed, FIG. 49C is a plot showing current efficiencies and ratio of various compartments of the three-compartment membrane electrolysis cell as a function of charge passed, and FIG. 49D is a plot showing voltage and current density as a function of charge passed; and FIG. 50 shows plots relating to an example of a process for preparing lithium hydroxide coproducing sulfuric acid using a Nafion 324 cation exchange membrane and a Fumatech FAB anion exchange membrane in a three-compartment membrane electrolysis cell at a temperature of about 60° C. and a current density of about 100 mA/cm$^2$: FIG. 50A is a plot showing concentrations in various compartments of the three-compartment membrane electrolysis cell as a function of charge passed, FIG. 50B is a plot showing current efficiencies and ratio of various compartments of the three-compartment membrane electrolysis cell as a function of charge passed, FIG. 50C is a plot showing current density, charge passed and feed pH as a function of charge passed, and FIG. 50D is a plot showing voltage and current density as a function of charge passed.

Further features and advantages will become more readily apparent from the following description of various embodiments as illustrated by way of examples.

The term "suitable" as used herein means that the selection of the particular conditions would depend on the specific manipulation or operation to be performed, but the selection would be well within the skill of a person trained in the art. All processes described herein are to be conducted under conditions sufficient to provide the desired product.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

The expression "at least one metal ion", as used herein refers, for example, to at least one type of ion of at least one metal. For example, the at least one metal ion can be $M^{X+}$. In this example, $M^{X+}$ is an ion of the metal M, wherein X is a particular form or oxidation state of the metal M. Thus, $M^{X+}$ is at least one type of ion (oxidation state $X^+$) of at least one metal (M). For example, $M^{Y+}$ can be another type of ion of the metal M, wherein X and Y are different integers.

The expression "is at least substantially maintained" as used herein when referring to a value of a pH or a pH range that is maintained during a process of the disclosure or a portion thereof (for example sparging, heating, electrodialysis, electrolysis, etc.) refers to maintaining the value of the pH or the pH range at least 75, 80, 85, 90, 95, 96, 97, 98 or 99% of the time during the process or the portion thereof.

The expression "is at least substantially maintained" as used herein when referring to a value of a concentration or a concentration range that is maintained during a process of the disclosure or a portion thereof (for example sparging, heating, electrodialysis, electrolysis, etc.) refers to maintaining the value of the concentration or the concentration range at least 75, 80, 85, 90, 95, 96, 97, 98 or 99% of the time during the process or the portion thereof.

The expression "is at least substantially maintained" as used herein when referring to a value of a temperature or a temperature range that is maintained during a process of the disclosure or a portion thereof (for example sparging, heating, electrodialysis, electrolysis, etc.) refers to maintaining the value of the temperature or the temperature range at least 75, 80, 85, 90, 95, 96, 97, 98 or 99% of the time during the process or the portion thereof.

The expression "is at least substantially maintained" as used herein when referring to a value of an oxidation potential or an oxidation potential range that is maintained during a process of the disclosure or a portion thereof (for example sparging, heating, electrodialysis, electrolysis, etc.) refers to maintaining the value of the oxidation potential or the oxidation potential range at least 75, 80, 85, 90, 95, 96, 97, 98 or 99% of the time during the process or the portion thereof.

The expression "is at least substantially maintained" as used herein when referring to a value of an electrical current or an electrical current range that is maintained during a process of the disclosure or a portion thereof (for example electrodialysis, electrolysis, etc.) refers to maintaining the value of the electrical current or the electrical current range at least 75, 80, 85, 90, 95, 96, 97, 98 or 99% of the time during the process or the portion thereof.

The expression "is at least substantially maintained" as used herein when referring to a value of a voltage or a voltage range that is maintained during a process of the disclosure or a portion thereof (for example electrodialysis, electrolysis, etc.) refers to maintaining the value of the voltage or the voltage range at least 75, 80, 85, 90, 95, 96, 97, 98 or 99% of the time during the process or the portion thereof.

The term "electromembrane process" as used herein refers, for example to a process that uses ion-exchange membrane(s) and an electric potential difference as the driving force for ionic species. The electromembrane process can be, for example (a membrane) electrodialysis or (a membrane) electrolysis. For example, the electromembrane process can be (a membrane) electrolysis.

The below presented examples are non-limitative and are used to better exemplify the processes of the present disclosure.

The processes of the present disclosure can be effective for treating various lithium-containing materials. The lithium-containing material can be a lithium-containing ore, a lithium compound, or a recycled industrial lithium-containing entity. For example, the lithium-containing ore can be, for example, α-spodumene, β-spodumene, lepidolite, pegmatite, petalite, eucryptite, amblygonite, hectorite, jadarite, smectite, clays, or mixtures thereof. The lithium compound can be, for example, LiCl, $Li_2SO_4$, $LiHCO_3$, $Li_2CO_3$, $LiNO_3$, $LiC_2H_3O_2$ (lithium acetate), LiF, lithium stearate or lithium citrate. The lithium-containing material can also be a recycled industrial lithium-containing entity such as lithium batteries, other lithium products or derivatives thereof.

A person skilled in the art would appreciate that various reaction parameters, will vary depending on a number of factors, such as the nature of the starting materials, their level of purity, the scale of the reaction as well as all the parameters since they can be dependent from one another, and could adjust the reaction conditions accordingly to optimize yields.

For example, in the processes of the present disclosure useful for preparing lithium carbonate, the processes can comprise heating the supernatant at a temperature of at least about 85° C. so as to at least partially convert the lithium bicarbonate into lithium carbonate and precipitate any dissolved lithium carbonate contained therein.

For example, in the processes of the present disclosure useful for preparing lithium carbonate, the starting material can be, for example, lithium hydroxide. For example, it can be lithium hydroxide produced by a process as described in the present disclosure.

For example, conversion of lithium hydroxide into lithium carbonate can be carried out by:
  reacting an aqueous composition comprising the lithium hydroxide with $CO_2$ by sparging the $CO_2$ into the composition, the sparging being carried out at a pH of about 10 to about 12.5, thereby obtaining a precipitate comprising the lithium carbonate;
  inserting at least a portion of the precipitate into a clarifier and obtaining a supernatant comprising lithium bicarbonate and a solid comprising the lithium carbonate, separating the solid from the supernatant; and
  heating the supernatant at a temperature of at least about 85° C. so as to at least partially convert the lithium bicarbonate into lithium carbonate.

The processes of the present disclosure can be effective for treating various lithium-containing materials. The lithium-containing material can be a lithium-containing ore, a lithium compound or a recycled industrial lithium-containing entity. For example, the lithium-containing ore can be, for example, α-spodumene, β-spodumene, lepidolite, pegmatite, petalite, eucryptite, amblygonite, hectorite, smectite, clays, or mixtures thereof. The lithium compound can be, for example, LiCl, $Li_2SO_4$, $LiHCO_3$, $Li_2CO_3$, $LiNO_3$, $LiC_2H_3O_2$ (lithium acetate), lithium stearate, lithium citrate or LiF. The lithium-containing material can also be a recycled industrial lithium-containing entity such as lithium batteries, other lithium products or derivatives thereof.

A person skilled in the art would appreciate that various reaction parameters such as, for example, reaction time, reaction temperature, reaction pressure, reactant ratio, flow rate, reactant purity, current density, voltage, retention time, pH, oxidation/reduction potential, bed volumes, type of resin used, and/or recycle rates, will vary depending on a number of factors, such as the nature of the starting materials, their level of purity, the scale of the reaction as well as all the parameters previously mentioned since they can be dependent from one another, and could adjust the reaction conditions accordingly to optimize yields.

For example, when the process comprises heating the supernatant at the temperature of at least about 85° C. so as to at least partially convert the lithium bicarbonate into lithium carbonate, it can further comprise precipitating any dissolved lithium carbonate contained therein.

For example, when sparging, the pH can be at least substantially maintained at a value of about 10 to about 12.5, about 10.5 to about 12.0, about 10.5 to about 11.5, about 10.7 to about 11.3, about 10.8 to about 11.2, about 10.9 to about 11.1 or about 11.

For example, the supernatant can be heated at a temperature of at least about 87° C., at least about 89° C., at least about 91° C., at least about 93° C., at least about 95° C., at least about 97° C., about 85° C. to about 105° C., about 90° C. to about 100° C., about 92° C. to about 98° C., about 93° C. to about 97° C., about 94° C. to about 96° C., or about 95° C.

For example, during the processes, the aqueous composition comprising lithium hydroxide can be at least substantially maintained at a concentration of lithium hydroxide of about 30 to about 70 g/L, about 40 to about 60 g/L or about 48 to about 55 g/L.

For example, the sparging can be carried out at a temperature of about 10 to about 40° C., about 15 to about 30° C. or about 20 to about 30° C.

For example, when heating the supernatant, the latter can be maintained at a Li concentration of about 1 to about 10 g/L, about 2 to about 6 g/L or about 3 to about 5 g/L.

For example, during the electrodialysis or the electrolysis, the pH can be at least substantially maintained at a value of about 1 to about 4, about 1 to about 2, about 1 to about 3, about 2 to about 3, or about 2 to about 4. For example, during the electrolysis, the pH can be at least substantially maintained at a value of about 1 to about 4, about 2 to about 4 or about 2. For example, during the electrodialysis, the pH can be at least substantially maintained at a value of about 1 to about 4 or about 1 to about 2.

For example, the electrodialysis or the electrolysis can be carried out in a three-compartment membrane electrolysis cell.

For example, the electrodialysis or the electrolysis can be carried out in a two-compartment membrane electrolysis cell.

For example, the electrodialysis or the electrolysis can be carried out in a three-compartment membrane cell.

For example, the electrodialysis or the electrolysis can be carried out in a two-compartment membrane cell.

For example, the electrolysis can be carried out in a monopolar or bipolar electrolysis cell. For example, the electrolysis can be carried out in a monopolar or bipolar three-compartment electrolysis cell.

For example, the electrolysis can be carried out in a bipolar electrolysis cell. For example, the electrolysis can be carried out in a bipolar three-compartment electrolysis cell.

For example, the electrodialysis can be carried out in a bipolar electrodialysis cell. For example, the electrodialysis can be carried out in a bipolar three-compartment electrodialysis cell.

For example, the aqueous composition comprising the lithium sulphate or the lithium compound can be submitted to a monopolar or bipolar membrane electrolysis process.

For example, the aqueous composition comprising the lithium sulphate or the lithium compound can be submitted to a monopolar or bipolar three compartment membrane electrolysis process.

For example, the aqueous composition comprising the lithium sulphate or lithium compound can be submitted to a bipolar membrane electrodialysis process.

For example, the aqueous composition comprising the lithium sulphate or lithium compound can be submitted to a bipolar three compartment electrodialysis process.

For example, the electrodialysis or the electrolysis can be carried out in an electrolytic cell in which a cathodic compartment is separated from the central or anodic compartment by a cathodic membrane.

For example, the electrodialysis can be carried out in a bipolar membrane. For example such a membrane is a membrane that splits water molecules (H+ and OH—) and wherein acid and base solution are produced, for example, at low concentration.

For example, the electrolysis can be carried out by using a monopolar or bipolar membrane. For example, it can be carried out by using an electrolysis stack comprising three compartment cells equipped with monopolar or bipolar membranes and bipolar electrodes. For example, such electrodes are effective for evolving gaseous hydrogen ($H_2$) at the cathodic electrode and gaseous oxygen ($O_2$) or chlorine gas ($Cl_2$) at the anodic electrode. For example, such electrodes are effective for splitting water molecules.

For example, the membrane can be a perfluorinated membrane or a styrene/divinylbenzene membrane.

For example, the membrane can be a cation exchange membrane, PEEK-reinforced membrane.

For example, the electrodialysis or the electrolysis can be carried out by introducing the aqueous composition comprising the lithium compound (for example LiCl, LiF, $Li_2SO_4$, $LiHCO_3$, $Li_2CO_3$, $LiNO_3$, $LiC_2H_3O_2$ (lithium acetate), lithium stearate or lithium citrate) into a central compartment, an aqueous composition comprising lithium hydroxide into a cathodic compartment, and generating an aqueous composition comprising an acid (for example HCl, $H_2SO_4$, $HNO_3$ or acetic acid) in an anodic compartment (or acid compartment). The person skilled in the art would understand that, for example, when LiCl is introduced in the central compartment, HCl is generated in the anodic compartment, for example a monopolar or bipolar membrane electrolysis cell. For example, when LiF is used in the central compartment, HF is generated in the anodic compartment. For example, when $Li_2SO_4$ is used in the central compartment, $H_2SO_4$ is generated in the anodic compartment. For example, when $LiHCO_3$ is used in the central compartment, $H_2CO_3$ is generated in the anodic compartment. For example, when $LiNO_3$ is used in the central compartment, $HNO_3$ is generated in the anodic compartment. For example, when $LiC_2H_3O_2$ is used in the central compartment, acetic acid is generated in the anodic compartment. For example, when lithium stearate is used in the central compartment, stearic acid is generated in the anodic compartment. For example, when lithium citrate is used in the central compartment, citric acid is generated in the anodic compartment.

For example, the lithium compound can comprise, consist essentially of or consist of lithium chloride (LiCl), lithium fluoride (LiF), lithium sulfate ($Li_2SO_4$), lithium bisulfate ($LiHSO_4$), lithium bicarbonate ($LiHCO_3$), lithium carbonate ($Li_2CO_3$), lithium nitrate ($LiNO_3$), lithium acetate ($LiC_2H_3O_2$), lithium stearate and/or lithium citrate. For example, the lithium compound can comprise, consist essentially of or consist of lithium sulfate and/or lithium bisulfate.

For example, the composition comprising lithium sulfate and/or lithium bisulfate can also comprise $H_2SO_4$.

For example, the electrodialysis or the electrolysis can be carried out by introducing the lithium sulphate into a central compartment, an aqueous composition comprising lithium hydroxide into a cathodic compartment, and generating an aqueous composition comprising sulphuric acid in an anodic compartment.

For example, an anolyte used during the process can comprise ammonia, ammonium bisulfate, ammonium sulfate and/or $NH_4OH$. For example, an anolyte used during the process can comprise ammonia, ammonium bisulfate, ammonium sulfate and/or $NH_4OH$, thereby generating an ammonium salt.

For example, the process can further comprise adding ammonia and/or $NH_4OH$, for example gaseous or liquid ammonia, for example $NH_3$ and/or $NH_4OH$, in an anolyte compartment, in an acid compartment, in the anolyte, at an anode or adjacently thereof, wherein the anode is used for the process.

For example, the process can further comprise adding ammonia and/or $NH_4OH$, in an anolyte compartment, in an anolyte at an anode or adjacently thereof, thereby generating an ammonium salt, wherein the anode is used for the process.

For example, the process can further comprise adding ammonia and/or $NH_4OH$ in an anolyte compartment or in an anolyte used for the process.

For example, the process can further comprise adding ammonia and/or $NH_4OH$ in an anolyte used for the process, thereby generating an ammonium salt.

For example, the ammonium salt can be $(NH_4)_2SO_4$.

For example, concentration of the produced ammonium salt can be about 1 to about 4 M, about 1 to about 3 M, or about 1.5 M to about 2.5 M.

For example, concentration of the ammonium bisulfate present in the anolyte can be at a concentration of about 1 to about 4 M, about 1 to about 3 M, or about 1.5 M to about 3.5 M.

For example, concentration of the ammonium sulfate present in the anolyte can be at a concentration of about 1 to about 4 M, about 1 to about 3 M, or about 1.5 M to about 3.5 M.

For example, pH of the anolyte is maintained at a value of about −0.5 to about 4.0, about −0.5 to about 3.5, about −0.25 to about 1.5 or about −0.25 to about 1.0.

For example, ammonia can be added in a substoichiometric quantity as compared to sulfuric acid produced.

For example, ammonia can be added in a molar ratio ammonia sulfuric acid comprised between 0.5:1 and 2:1 or between 1:1 and 1.9:1.

For example, the electrodialysis or the electrolysis can be carried out by introducing the aqueous composition comprising the lithium compound (for example LiCl, LiF, $Li_2SO_4$, $LiHCO_3$, $Li_2CO_3$, $LiNO_3$, $LiC_2H_3O_2$ (lithium acetate), lithium stearate or lithium citrate) into a central compartment, an aqueous composition comprising lithium hydroxide into a cathodic compartment, and an aqueous composition comprising $NH_3$ into an anodic compartment. For example, when an aqueous composition comprising $NH_3$ is introduced into the anodic compartment, proton-blocking membranes may not be required and membranes which are capable, for example of running at a temperature of about 80° C. and which may, for example, have lower resistance can be used. For example, the aqueous composition comprising the lithium compound can further comprise $Na^+$.

For example, during the electrodialysis or the electrolysis, the aqueous composition comprising lithium hydroxide can be at least substantially maintained at a concentration of lithium hydroxide of about 30 to about 90 g/L, about 40 to about 90 g/L, about 35 to about 70 g/L, about 40 to about 66 g/L, about 45 to about 65 g/L, about 48 to about 62 g/L or about 50 to about 60 g/L.

For example, during the electrodialysis or the electrolysis, the aqueous composition comprising lithium hydroxide can be at least substantially maintained at a concentration of lithium hydroxide of about 1 to about 5 M, about 2 to about 4 M, about 2.5 to about 3.5 M, about 2.7 to about 3.3 M, about 2.9 to about 3.1 M or about 3 M.

For example, during the electrodialysis or the electrolysis, the aqueous composition comprising sulphuric acid can be at least substantially maintained at a concentration of sulphuric acid of about 30 to about 100 g/L, about 40 to about 100 g/L, about 60 to about 90 g/L, about 20 to about 40 g/L, about 20 to about 50 g/L, about 25 to about 35 g/L, or about 28 to about 32 g/L.

For example, during the electrodialysis or the electrolysis, the aqueous composition comprising sulphuric acid can be at least substantially maintained at a concentration of sulphuric acid of about 0.1 to about 5 M, about 0.2 to about 3 M, about 0.3 to about 2 M, about 0.3 to about 1.5 M, about 0.4 to about 1.2 M, about 0.5 to about 1 M, or about 0.75 M.

For example, during the electrodialysis or the electrolysis, the aqueous composition comprising sulphuric acid can be at least substantially maintained at a concentration of sulphuric acid of about 0.5 M to about 1.4 M, about 0.6 M to about 1.3 M, about 0.65 to about 0.85 M, about 0.7 M to about 1.2 M, about 0.8 M to about 1.1 M, about 8.5 M to about 1.05 M or about 0.9 M to about 1.0 M, about 20 to about 50 g/L or about 35 to about 70 g/L.

For example, during the electrodialysis or the electrolysis, the aqueous composition comprising lithium sulphate can be at least substantially maintained at a concentration of lithium sulphate of about 5 to about 30 g/L, about 5 to about 25 g/L, about 10 to about 20 g/L, or about 13 to about 17 g/L.

For example, during the electrodialysis or the electrolysis, the aqueous composition comprising lithium sulphate can be at least substantially maintained at a concentration of lithium sulphate of about 0.2 to about 3 M, about 0.4 to about 2.5 M, about 0.5 to about 2 M, or about 0.6 to about 1.8 M.

For example, during the electrodialysis or the electrolysis, the aqueous composition comprising lithium sulphate can be at least substantially maintained at a concentration of sulphate ($SO_4^{2-}$) of about 0.2 to about 3 M, about 0.4 to about 2.5 M, about 0.5 to about 2 M, or about 0.6 to about 1.8 M.

For example, during the electrodialysis or the electrolysis, the aqueous composition comprising lithium sulphate can comprise between about 1 to about 30%, about 1 to about 25%, about 5 to about 25%, about 10 to about 25%, by weight of sodium based on the total weight of sodium and lithium in the composition.

For example, during the electrodialysis or the electrolysis, the aqueous composition comprising lithium sulphate can comprise sodium. The ratio Li:Na (g/g) can be about 2:1 to about 10:1 or about 3:1 to about 5:1.

For example, during the electrodialysis or the electrolysis, temperature of the aqueous composition comprising lithium sulphate can be of about 20 to about 80° C., about 20 to about 60° C., about 30 to about 40° C., about 35 to about 65° C., about 40 to about 60° C., about 35 to about 45° C., about 55 to about 65° C., about 50 to about 60° C., about 50 to about 70° C., or about 46 to about 54° C.

For example, during the electrodialysis or the electrolysis, temperature of the aqueous composition comprising lithium sulphate can be at least substantially maintained at a value of about 20 to about 60° C., about 30 to about 40° C., about 50 to about 60° C., or about 46 to about 54° C. The person skilled in the art would understand that such a temperature can vary as a function of the membrane chosen in the electrolysis cell.

For example, during the electrodialysis or the electrolysis, temperature of the aqueous composition comprising lithium sulphate can be at least substantially maintained at a value of about 20 to about 80° C., about 20 to about 60° C., about 30 to about 40° C., about 35 to about 65° C., about 40 to about 60° C., about 35 to about 45° C., about 55 to about 65° C., about 50 to about 70° C., about 50 to about 60° C., or about 46 to about 54° C. For example, when an Asahi AAV or a similar anion exchange membrane is used during the electrodialysis or the electrolysis, temperature of the aqueous composition comprising lithium sulphate can be at least substantially maintained at a value of about 40° C. For example, when a Fumatech FAB or a similar anion exchange membrane is used during the electrodialysis or the electrolysis, temperature of the aqueous composition comprising lithium sulphate can be at least substantially maintained at a value of about 60° C.

For example, a Nafion 324 or a similar cation exchange resin or membrane can be used during the electrodialysis or the electrolysis. Other membranes such Nafion 902, Fumatech FKB, or Neosepta CMB may be used for hydroxide concentration.

For example, when an aqueous composition comprising $NH_3$ is introduced into the anodic compartment during the electrodialysis or the electrolysis, temperature of the aqueous composition comprising lithium sulphate can be at least substantially maintained at a value of about 20 to about 100° C., about 20 to about 95° C., about 20 to about 90° C., about 45 to about 95° C., about 65 to about 95° C., about 20 to about 80° C. about 20 to about 80° C., about 75 to about 85° C., about 20 to about 60° C., about 30 to about 40° C., about 35 to about 65° C., about 40 to about 60° C., about 35 to about 45° C., about 55 to about 65° C., about 50 to about 60° C., about 50 to about 70° C. or about 46 to about 54° C.

For example, during the electrodialysis or the electrolysis, electrical current can be at least substantially maintained at a density of about 300 to about 6000 A/m², about 2000 to about 6000 A/m², about 3500 to about 5500 A/m². about 4000 to about 5000 A/m², about 400 to about 3000 A/m², about 500 to about 2500 A/m², about 1000 to about 2000 A/m² about 400 to about 1200 A/m², about 400 to about 1000 A/m², about 300 to about 700 A/m², about 400 to about 600 A/m², about 425 to about 575 A/m² or about 450 to about 550 A/m², or about 475 to about 525 A/m².

For example, during the electrodialysis or the electrolysis, electrical current can be at least substantially maintained at a density of about 30 to about 250 mA/cm², 50 to about 250 mA/cm², about 75 to about 200 mA/cm² or about 100 to about 175 mA/cm².

For example, during the electrodialysis or the electrolysis, electrical current can be at least substantially maintained at a density of about 50 to about 150 A/m², about 60 to about 140 A/m², about 70 to about 130 A/m², about 80 to about 120 A/m², or about 90 to about 110 A/m².

For example, during the electrodialysis or the electrolysis, electrical current can be at least substantially maintained at a density of about 400 to about 3000 A/m², about 400 to about 1200 A/m², about 400 to about 1000 A/m², about 400 to about 600 A/m², about 425 to about 575 A/m² or about 450 to about 550 A/m².

For example, during the electrolysis, electrical current can be at least substantially maintained at a density of about 700 to about 1200 A/m².

For example, during the electrolysis, cell voltage can be at least substantially maintained at a value of about 2 to about 10 V, about 3.0 V to about 8.5 V, about 6.5 V to about 8 V, about 5.5 V to about 6.5 V or about 6 V.

For example, during the electrodialysis or the electrolysis, voltage can be at least substantially maintained at a value of about 4.5 V to about 8.5 V, about 6.5 V to about 8 V, about 5.5 V to about 6.5 V or about 6 V.

For example, during the electrodialysis or the electrolysis, electrical current can be at least substantially maintained at a constant value.

For example, during the electrodialysis or the electrolysis, voltage can be at least substantially maintained at a constant value.

For example, during the process, voltage can be at least substantially maintained at a constant value that is about 3 to about 10 V or about 4 to about 7 V. For example, the cell voltage can be at least substantially maintained at a value of about 1.0 V to about 8.5 V, about 1.0 V to about 3.0 V, about 2.0 V to about 3.0 V, about 3.0 V to about 8.5 V, about 6.5 V to about 8 V, about 5.5 V to about 6.5 V or about 6 V.

For example, during the electrodialysis or the electrolysis, the overall current efficiency can be about 50% to about 90%, about 60% to about 90%, about 60% to about 85%, about 60% to about 70%, about 60% to about 80%, about 65% to about 85%, about 65% to about 80%, about 65% to about 75%, about 70% to about 85% or about 70% to about 80%.

For example, during the electrodialysis or the electrolysis, the overall LiOH current efficiency can be about 50% to about 90%, about 60% to about 90%, about 60% to about 70%, about 60% to about 80%, about 65% to about 85%, about 65% to about 80%, about 65% to about 75%, about 70% to about 85% or about 70% to about 80%.

For example, during the electrodialysis or the electrolysis, the overall $H_2SO_4$ current efficiency can be about 55% to about 95%, 55% to about 90%, about 60% to about 85%, about 65% to about 80%, about 85% to about 95% or about 70% to about 80%.

For example, during the electrodialysis or the electrolysis, the overall $H_2SO_4$ current efficiency can be about 55% to about 90%, about 60% to about 85%, about 65% to about 80% or about 70% to about 80%.

For example, after generation of LiOH by means of electrolysis or electrodialysis, a mixture comprising $Li_2SO_4$ and/or $LiHSO_4$ and $H_2SO_4$ can be obtained. For example, $Li_2SO_4$ can at least be partially recovered from the mixture by carrying out an electrodialysis.

For example, the aqueous composition comprising $Li^+$ and at least one metal ion can be reacted with the base so as to obtain a pH of about 4.8 to about 6.5, about 5.0 to about 6.2, about 5.2 to about 6.0, about 5.4 to about 5.8 or about 5.6.

For example, the aqueous composition comprising $Li^+$ and at least one metal ion can be reacted with lime.

For example, the at least one metal ion comprised in the aqueous composition that is reacted with the base so as to obtain a pH of about 4.5 to about 6.5 can be chosen from $Fe^{2+}$, $Fe^{3+}$ and $Al^{3+}$.

For example, the at least one metal ion comprised in the aqueous composition that is reacted with the base so as to obtain a pH of about 4.5 to about 6.5 can comprise $Fe^{3+}$.

For example, the at least one metal ion comprised in the aqueous composition that is reacted with the base so as to obtain a pH of about 4.5 to about 6.5 can comprise $Al^{3+}$.

For example, the at least one metal ion comprised in the aqueous composition that is reacted with the base so as to obtain a pH of about 4.5 to about 6.5 can comprise $Fe^{3+}$ and $Al^{3+}$.

For example, the at least one hydroxide comprised in the precipitate can be chosen from $Al(OH)_3$ and $Fe(OH)_3$.

For example, the precipitate can comprise at least two hydroxides that are $Al(OH)_3$ and $Fe(OH)_3$.

For example, the base used so as to obtain a pH of about 4.5 to about 6.5 can be lime.

For example, lime can be provided as an aqueous composition having a concentration of about 15% by weight to about 25% by weight.

For example, the processes can further comprise maintaining the aqueous composition comprising $Li^+$ and the at least one metal ion that is reacted with a base so as to obtain a pH of about 4.5 to about 6.5 at an oxidative potential of at least about 350 mV.

For example, the aqueous composition can be at least substantially maintained at an oxidative potential of at least about 350 mV by sparging therein a gas comprising $O_2$. For example, the gas can be air. Alternatively, the gas can be $O_2$.

For example, the processes can comprise reacting the aqueous composition comprising $Li^+$ and having the reduced content of the at least one metal ion with the another base so as to obtain a pH of about 9.5 to about 11.5, about 10 to about 11, about 10 to about 10.5, about 9.8 to about 10.2 or about 10.

For example, the base used so as to obtain a pH of about 9.5 to about 11.5 can be NaOH, KOH or LiOH.

For example, the base used so as to obtain a pH of about 9.5 to about 11.5 can be NaOH.

For example, the at least one metal carbonate can be chosen from $Na_2CO_3$, $NaHCO_3$, and $(NH_4)_2CO_3$.

For example, the base and metal carbonate can be a mixture of aqueous NaOH, $NaHCO_3$, LiOH and $LiHCO_3$.

For example, the at least one metal carbonate can be $Na_2CO_3$.

For example, the aqueous composition comprising $Li^+$ and having the reduced content of the at least one metal ion can be reacted with the another base over a period of time sufficient for reducing the content of the at least one metal ion in the aqueous composition below a predetermined value. For example, the at least one metal ion can be chosen from $Mg^{2+}$, $Ca^{2+}$ and $Mn^{2+}$. For example, the reaction can be carried out over a period of time sufficient for reducing the content of $Ca^{2+}$ below about 250 mg/L, about 200 mg/L, about 150 mg/L, or about 100 mg/L. For example, the reaction can be carried out over a period of time sufficient for reducing the content of $Mg^{2+}$ below about 100 mg/L, about 50 mg/L, about 25 mg/L, about 20 mg/L, about 15 mg/L or about 10 mg/L.

For example, the ion exchange resin can be a cationic resin.

For example, the ion exchange resin can be a cationic resin that is substantially selective for divalent and/or trivalent metal ions.

For example, contacting with the ion exchange resin can allow for reducing a content of $Ca^{2+}$ of the composition below about 10 mg/L, about 5 mg/L, about 1 mg/L, or about 0.5 mg/L.

For example, contacting with the ion exchange resin can allow for reducing a content of $Mg^{2+}$ of the composition below about 10 mg/L, about 5 mg/L, about 1 mg/L, or about 0.5 mg/L.

For example, contacting with the ion exchange resin can allow for reducing total bivalent ion content such as $Ca^{2+}$, $Mg^{2+}$ and $Mn^{2+}$ of the composition below about 10 mg/L, about 5 mg/L, about 1 mg/L or about 0.5 mg/L.

For example, the acid roasted lithium-containing material can be leached with water so as to obtain the aqueous composition comprising $Li^+$ and at least three metal ions chosen from the following metals: iron, aluminum, manganese and magnesium.

For example, the acid roasted lithium-containing material can be leached with water so as to obtain the aqueous composition comprising $Li^+$ and at least three metal ions chosen from $Al^{3+}$, $Fe^{2+}$, $Fe^{3+}$, $Mg^{2+}$, $Ca^{2+}$, $Cr^{2+}$, $Cr^{3+}$, $Cr^{6+}$, $Zn^{2+}$ and $Mn^{2+}$.

For example, the acid roasted lithium-containing material can be leached with water so as to obtain the aqueous composition comprising $Li^+$ and at least four metal ions chosen from $Al^{3+}$, $Fe^{2+}$, $Fe^{3+}$, $Mg^{2+}$, $Ca^{2+}$, $Cr^{2+}$, $Cr^{3+}$, $Cr^{6+}$, $Zn^{2+}$ and $Mn^{2+}$.

For example, during the electrodialysis or the electrolysis, the pH can be at least substantially maintained at a value of about 10 to about 12, about 10.5 to about 12.5, or about 11 to about 12.

For example, during the first electromembrane process consumption of the lithium sulfate and/or lithium bisulfate to prepare lithium hydroxide can proceed to a pre-determined extent.

For example, in the processes of the present disclosure, the aqueous composition comprising the lithium compound such as lithium sulfate and/or lithium bisulfate is submitted to a first electromembrane process under suitable conditions for conversion of the lithium compound such as lithium sulfate and/or lithium bisulfate to lithium hydroxide to proceed to a pre-determined extent. The selection of a suitable pre-determined extent for a particular process of the present disclosure can be made by a person skilled in the art. For example, the aqueous composition comprising the lithium compound such as lithium sulfate and/or lithium bisulfate is submitted to a first electromembrane process under suitable conditions for consumption of the lithium compound such as lithium sulfate and/or lithium bisulfate to prepare lithium hydroxide until one or more competing side reactions proceed to a pre-determined extent, for example to an extent such that the preparation of lithium hydroxide is no longer efficient. For example, wherein the first electromembrane process is a two-compartment monopolar or bipolar membrane electrolysis process carried out in a first electrochemical cell comprising an anolyte compartment separated from a catholyte compartment by a cation exchange membrane, conversion of the lithium compound such as lithium sulfate and/or lithium bisulfate to lithium hydroxide can proceed until hydroxide current efficiency is no longer efficient, for example hydroxide current efficiency is no longer at least substantially maintained so that it decreases.

For example, wherein the first electromembrane process is a two-compartment monopolar or bipolar membrane electrolysis process carried out in a first electrochemical cell comprising an anolyte compartment separated from a catholyte compartment by a cation exchange membrane, conversion of the lithium compound such as lithium sulfate and/or lithium bisulfate to lithium hydroxide can proceed until pH in the anolyte compartment is a value of about 0.4 to about 1.2, about 0.5 to about 0.8, about 0.5 to about 0.7 or about 0.6.

For example, wherein the first electromembrane process is a two-compartment monopolar or bipolar membrane electrolysis process carried out in a first electrochemical cell comprising an anolyte compartment separated from a catholyte compartment by a cation exchange membrane, conversion of the lithium compound such as lithium sulfate and/or lithium bisulfate to lithium hydroxide can proceed until consumption of a particular amount of the lithium sulfate and/or lithium bisulfate comprised within the aqueous composition.

For example, the pre-determined extent can comprise consumption of about 30 to about 60 weight % or about 30 to about 50 weight % of the lithium sulfate and/or lithium bisulfate comprised within the aqueous composition, based on the total amount of lithium sulfate and/or lithium bisulfate contained in the aqueous composition. For example, the pre-determined extent can comprise consumption of about 35 to about 45 weight % of the lithium sulfate and/or lithium bisulfate comprised within the aqueous composition. For example, the pre-determined extent can comprise consumption of about 38 to about 42% of the lithium sulfate and/or lithium bisulfate comprised within the aqueous composition. For example, the aqueous composition can comprise lithium sulfate and the pre-determined extent can comprise consumption of about 30 to about 50% of the lithium sulfate comprised within the aqueous composition. For example, the aqueous composition can comprise lithium sulfate and the pre-determined extent can comprise consumption of about 35 to about 45% of the lithium sulfate comprised within the aqueous composition. For example, the aqueous composition can comprise lithium sulfate and the pre-determined extent can comprise consumption of about 38 to about 42% of the lithium sulfate comprised within the aqueous composition.

For example, the first electromembrane process can comprise, consist essentially of or consist of a three-compartment membrane electrolysis process, for example a three-compartment monopolar or bipolar membrane electrolysis process.

For example, the first electromembrane process can comprise, consist essentially of or consist of a two-compartment membrane electrolysis process, for example a two-compartment monopolar or bipolar membrane electrolysis process.

For example, the first electromembrane process can comprise, consist essentially of or consist of a three-compartment membrane electrolysis process, for example a three-compartment bipolar membrane electrolysis process.

For example, the first electromembrane process can comprise, consist essentially of or consist of a two-compartment membrane electrolysis process, for example a two-compartment bipolar membrane electrolysis process.

For example, the two-compartment membrane electrolysis process such as the two-compartment monopolar or bipolar membrane electrolysis process can be carried out in a first electrochemical cell comprising an anolyte compartment separated from a catholyte compartment by a cation exchange membrane.

For example, the cation exchange membrane can comprise, consist essentially of or consist of a sulfonated polytetra-fluoroethylene such as a Nafion™ 324 cation exchange membrane or other membranes used for caustic concentration such as FuMA-Tech FKB or Astom CMB cation exchange membranes. The selection of a suitable cation exchange membrane for a particular process of the present disclosure can be made by a person skilled in the art.

For example, during the two-compartment membrane electrolysis process such as the two-compartment monopolar or bipolar membrane electrolysis process, an aqueous stream comprising the lithium compound such as lithium sulfate and/or lithium bisulfate can be introduced into the anolyte compartment, the first lithium-reduced aqueous stream can be removed from the anolyte compartment and the first lithium hydroxide-enriched aqueous stream can be removed from the catholyte compartment.

For example, in the catholyte compartment of the two-compartment monopolar or bipolar membrane electrolysis process, lithium hydroxide can be at least substantially maintained at a concentration of about 2 M to about 4 M, about 2.5 to about 3.5 M, about 2.8 to about 3.2 M or about 3 M.

For example, during the two-compartment monopolar or bipolar membrane electrolysis process, the aqueous stream comprising the lithium compound such as lithium sulfate and/or lithium bisulfate can be introduced into the anolyte compartment at a temperature of about 10° C. to about 100° C., about 10° C. to about 100° C., about 10° C. to about 90° C., about 20° C. to about 85° C. or about 80° C.

For example, during the two-compartment monopolar or bipolar membrane electrolysis process, the first lithium-reduced aqueous stream can be removed from the anolyte compartment at a temperature of about 20° C. to about 100° C., about 20° C. to about 85° C., about 20° C. to about 85° C., about 60° C. to about 85° C., about 70° C. to about 85° C. or about 80° C.

For example, during the two-compartment monopolar or bipolar membrane electrolysis process, temperature in the first electrochemical cell can be at least substantially maintained at a value of about 60° C. to about 110° C., about 60° C. to about 100° C., about 60° C. to about 90° C., about 60° C. to about 85° C., about 75° C. to about 85° C., about 50 to about 70° C., about 55 to about 65° C. or about 80° C.

For example, in the two-compartment monopolar or bipolar membrane electrolysis process, current density can be at least substantially maintained at a value of from about 0.1 kA/m² to about 8000 kA/m², 0.5 kA/m² to about 6 kA/m², about 1 kA/m² to about 6 kA/m², about 2 kA/m² to about 6 kA/m² or about 3 kA/m² to about 5 kA/m². For example, current density can be at least substantially maintained at a value chosen from about 3 kA/m², about 4 kA/m² and about 5 kA/m². For example, current density can be at least substantially maintained at a value of about 4 kA/m².

For example, in the two-compartment monopolar or bipolar membrane electrolysis process, voltage can be at least substantially maintained at a value of about 3 V to about 8 V, about 5 V to about 10 V, about 4 V to about 6 V, about 4 to about 5 or about 4.5.

For example, the first electrochemical cell can have a surface area of about 100 m² to about 2000 m², about 100 m² to about 1000 m², about 400 m² to about 500 m² or about 430 m².

For example, the second electromembrane process can comprise, consist essentially of or consist of a two-compartment membrane electrolysis process, for example a two-compartment monopolar or bipolar membrane electrolysis process.

For example, the second electromembrane process can comprise, consist essentially of or consist of a three-compartment membrane electrolysis process, for example a three-compartment monopolar or bipolar membrane electrolysis process.

For example, the three-compartment membrane electrolysis process such as the three-compartment monopolar or bipolar membrane electrolysis process can be carried out in a second electrochemical cell comprising an anolyte compartment separated from a central compartment by an anion exchange membrane and a catholyte compartment separated from the central compartment by a cation exchange membrane.

For example, the cation exchange membrane can comprise, consist essentially of or consist of a sulfonated polytetra-fluoroethylene such as a Nafion™ 324 cation exchange membrane or other membranes used for caustic concentration such as FuMA-Tech FKB or Astom CMB cation exchange membranes. The selection of a suitable cation exchange membrane for a particular process of the present disclosure can be made by a person skilled in the art.

For example, during the three-compartment membrane electrolysis process such as the three-compartment monopolar or bipolar membrane electrolysis process, the first lithium-reduced aqueous stream can be introduced into the central compartment, the second lithium-reduced aqueous stream can be removed from the central compartment and the second lithium hydroxide-enriched aqueous stream can be removed from the catholyte compartment.

For example, the three-compartment membrane electrolysis process such as the three-compartment monopolar or bipolar membrane electrolysis process can further comprise producing an acid such as sulfuric acid in the anolyte compartment and removing an acid-containing aqueous stream such as a sulfuric acid-containing aqueous stream from the anolyte compartment.

The selection of a suitable anion exchange membrane for a particular process of the present disclosure can be made by a person skilled in the art. For example, it will be appreciated by a person skilled in the art that a proton-blocking membrane may, for example be useful in processes coproducing acids such as sulfuric acid. For example, in the three-compartment monopolar or bipolar membrane electrolysis process, the anion exchange membrane can be a proton-blocking membrane. For example, the proton-blocking membrane can such as a Fumatech FAB, Astom ACM or Asahi AAV anion exchange membrane.

For example, in the anolyte compartment of the three-compartment monopolar or bipolar membrane electrolysis process, the acid such as sulfuric acid can be at least substantially maintained at a concentration of acid such as sulfuric acid of about 0.1 M to about 2 M. For example, in the anolyte compartment of the three-compartment monopolar or bipolar membrane electrolysis process, the sulfuric acid can be at least substantially maintained at a concentration of sulfuric acid can be about 0.5 M to about 1.5 M, about 0.7 M to about 1.2 M, or about 0.8 M.

For example, in the catholyte compartment of the three-compartment membrane electrolysis process, the lithium hydroxide can be at least substantially maintained at a concentration of about 1 M to about 5.0 M, about 1 M to about 4.0 M, about 1.5 M to about 2.5 M, about 1.8 M to about 2.2 M, or about 2 M.

For example, during the three-compartment monopolar or bipolar membrane electrolysis process, the first lithium-reduced aqueous stream can be introduced into the central compartment at a temperature of about 20° C. to about 85° C., about 40° C. to about 85° C., about 40° C. to about 75° C., about 50° C. to about 70° C., about 50° C. to about 65° C. or about 60° C.

For example, during the three-compartment monopolar or bipolar membrane electrolysis process, the second lithium-reduced aqueous stream can be removed from the anolyte compartment at a temperature of about 20° C. to about 80° C., about 30° C. to about 70° C., about 40° C. to about 80° C. or about 60° C.

For example, during the three-compartment monopolar or bipolar membrane electrolysis process, temperature in the second electrochemical cell can be at least substantially maintained at a value of about 30° C. to about 90° C., about 40° C. to about 85° C., about 50° C. to about 80° C., about 50° C. to about 70° C., about 50° C. to about 65° C. or about 60° C.

For example, in the three-compartment monopolar or bipolar membrane electrolysis process, current density can be at least substantially maintained at a value of about 0.5 kA/m$^2$ to about 5 kA/m$^2$, about 1 kA/m$^2$ to about 2 kA/m$^2$, about 3 kA/m$^2$ to about 5 kA/m$^2$, about 4 kA/m$^2$ or about 1.5 kA/m$^2$.

For example, in the three-compartment monopolar or bipolar membrane electrolysis process, voltage can be at least substantially maintained at a value of about 5 V to about 9 V, about 6 V to about 8 V, about 6.5 V to about 7.5 V or about 7 V.

For example, the second electrochemical cell can have a cell area of about 1000 m$^2$ to about 4000 m$^2$, about 2000 m$^2$ to about 3000 m$^2$ or about 2700 m$^2$.

Alternatively, for example, in the processes of the present disclosure, the three compartment monopolar or bipolar membrane electrolysis process can further comprise introducing ammonia into the anolyte compartment, producing an ammonium compound such as ammonium sulfate in the anolyte compartment and removing an ammonium compound-containing aqueous stream such as an ammonium sulfate-containing aqueous stream from the anolyte compartment.

The selection of a suitable anion exchange membrane for a particular process of the present disclosure can be made by a person skilled in the art. For example, it will be appreciated by a person skilled in the art that in processes that do not coproduce acids such as sulfuric acid, an anion exchange membrane that is not a proton-blocking membrane may be useful as it may, for example be able to withstand higher temperatures and/or have lower resistance than a proton-blocking membrane. For example, in the three-compartment monopolar or bipolar membrane electrolysis process, the anion exchange membrane may not be a proton-blocking membrane. For example, the anion exchange membrane can be a membrane such as an Astom AHA anion exchange membrane FuMA-Tech FAP.

For example, in the anolyte compartment of the three-compartment monopolar or bipolar membrane electrolysis process, the ammonium compound such as ammonium sulfate can be at least substantially maintained at a concentration of ammonium compound such as ammonium sulfate of about 0.5 M to about 5 M, about 1 M to about 4 M or about 3 M.

For example, in the catholyte compartment of the three-compartment monopolar or bipolar membrane electrolysis process, the lithium hydroxide can be at least substantially maintained at a concentration of about 1 M to about 4.0 M, about 1.5 M to about 2.5 M or about 2 M.

For example, the processes of the present disclosure can further comprise recycling at least a portion of the second lithium-reduced aqueous stream to the first electromembrane process. For example, it is possible to re-use a two-compartment monopolar or bipolar membrane electrolysis cell to obtain a higher concentration of lithium hydroxide. It will also be appreciated by a person skilled in the art that a continuous process for preparing lithium hydroxide may also be useful.

For example, the second lithium-reduced aqueous stream can be recycled to the first electromembrane process when in the second electromembrane process, pH in the central compartment of the second electrochemical cell reaches a value of about 2 to about 12, about 3 to about 10, about 4 to about 9, about 5 to about 8 or about 8 in order to control the pH of the first lithium-reduced aqueous stream above a value of about 0.4 to about 1.2, about 0.5 to about 0.8, about 0.5 to about 0.7 or about 0.6.

For example, the process can further comprise submitting the recycled second lithium-reduced aqueous stream to the first electromembrane process until pH in the anolyte compartment is a value of about 0.4 to about 1.2, about 0.5 to about 0.8, about 0.5 to about 0.7 or about 0.6, then re-submitting the first lithium-reduced aqueous stream to the second electromembrane process.

For example, pH in the anolyte compartment of the two-compartment monopolar or bipolar membrane electrolysis process and/or the central compartment of the three-compartment monopolar or bipolar membrane electrolysis process can be at least substantially maintained. For example, pH can be at least substantially maintained by adjusting at least one of current density of the two-compartment monopolar or bipolar membrane electrolysis process, current density of the three-compartment monopolar or bipolar membrane electrolysis process, flow rate of the first lithium-reduced aqueous stream and flow rate of the second lithium-reduced aqueous stream.

For example, during the two-compartment monopolar or bipolar membrane electrolysis process conversion of the lithium sulfate and/or lithium bisulfate to lithium hydroxide can proceed to a pre-determined extent.

For example, during the two-compartment monopolar or bipolar membrane electrolysis process, an aqueous stream comprising the lithium compound such as lithium sulfate and/or lithium bisulfate can be introduced into the anolyte compartment, the first lithium-reduced aqueous stream can be removed from the anolyte compartment and the first lithium hydroxide-enriched aqueous stream can be removed from the catholyte compartment; and during the three-compartment monopolar or bipolar membrane electrolysis process, the first lithium-reduced aqueous stream can be introduced into the central compartment, the second lithium-reduced aqueous stream can be removed from the central compartment and the second lithium hydroxide-enriched aqueous stream can be removed from the catholyte compartment.

For example, the process can further comprise recycling at least a portion of the second lithium-reduced aqueous stream to the two-compartment monopolar or bipolar membrane electrolysis process.

It will be appreciated by a person skilled in the art that the process can also be varied, as appropriate, using the examples discussed herein.

For example, at least a portion of the processes of the present disclosure can be operated as a batch process.

Alternatively, for example, the processes can be operated as a continuous process or a semi-continuous process. For example, it would be appreciated by a person skilled in the art that pH in the anolyte compartment of the two-compartment monopolar or bipolar membrane electrolysis process and/or the central compartment of the three-compartment monopolar or bipolar membrane electrolysis cell can be at least substantially maintained by adjusting the current density of the two-compartment monopolar or bipolar membrane electrolysis process and/or the three-compartment monopolar or bipolar membrane electrolysis process and/or the flow rate of the streams flowing between the processes, for example as described herein.

For example, pH in the anolyte compartment of the two-compartment monopolar or bipolar membrane electrolysis process and/or the central compartment of the three-compartment monopolar or bipolar membrane electrolysis process can be at least substantially maintained.

For example, pH can be at least substantially maintained by adjusting at least one of current density of the two-compartment monopolar or bipolar membrane electrolysis process, current density of the three-compartment monopolar or bipolar membrane electrolysis process, flow rate of the first lithium-reduced aqueous stream and flow rate of the second lithium-reduced aqueous stream.

The selection of a suitable means for measuring and/or monitoring pH can be made by a person skilled in the art. The selection of a suitable current density and/or a suitable flow rate can be made by a person skilled in the art.

The processes of the present disclosure can, for example also further comprise recycling at least a portion of the second lithium hydroxide-enriched aqueous stream to the first electromembrane process.

For example, the process can further comprise removing a first hydrogen-containing stream from the catholyte compartment of the first electrochemical cell. For example, the process can further comprise removing a second hydrogen-containing stream from the catholyte compartment of the second electrochemical cell. For example, the process can further comprise removing a first oxygen-containing stream from the anolyte compartment of the first electrochemical cell. For example, the process can further comprise removing a second oxygen-containing stream from the anolyte compartment of the second electrochemical cell.

For example, the acid roasted lithium-containing material can be β-spodumene that has been previously reacted with $H_2SO_4$.

For example, the acid roasted lithium-containing material can be obtained by using a process as described in CA 504,477, which is hereby incorporated by reference in its entirety.

For example, the acid roasted lithium-containing material can be a α-spodumene, β-spodumene, lepidolite, pegmatite, petalite, amblygonite, hectorite, jadarite, smectite, clays, or mixtures thereof, that has been previously reacted with $H_2SO_4$.

For example, the base-baked lithium-containing material can be β-spodumene that has been previously reacted with $Na_2CO_3$ and with $CO_2$, and eventually heated.

For example, when carrying out the leaching of the base-baked lithium material, lithium carbonate can be formed in the baked ore (very low solubility in water). It can then be slurried and sparged with $CO_2$ (for example in an autoclave) to convert lithium carbonate to water soluble lithium bicarbonate, and heated at a temperature of about 85 to about 95° C. to drive off $CO_2$ and re-precipitate a more pure lithium carbonate. The bicarbonate step can be repeated to obtain a higher purity grade. It can be possible to bake the β-spodumene with sodium hydroxide and leach out lithium hydroxide that could need purification.

In the processes of the present disclosure, the pH can thus be controlled by further adding some base, some acid or by diluting. The ORP can be controlled as previously indicated by sparging air.

For example, when reacting the aqueous composition comprising $Li^+$ and the at least one metal ion with a base so as to obtain a pH of about 4.5 to about 6.5 and thereby at least partially precipitating the at least one metal ion under the form of at least one hydroxide so as to obtain a precipitate, the metal of the at least one metal ion can be Fe, Al, Cr, Zn or mixtures thereof.

For example, when reacting the aqueous composition comprising $Li^+$ and having the reduced content of the at least one metal ion with another base so as to obtain a pH of about 9.5 to about 11.5, and with optionally at least one metal carbonate, thereby at least partially precipitating at least one metal ion, the metal of the at least one metal ion can be Mn, Mg, Ca or mixtures thereof.

For example, when contacting the aqueous composition comprising $Li^+$ and having a reduced content of the at least one metal ion with an ion-exchange resin so as to at least partially remove at least one metal ion, the at least one metal ion can be $Mg^{2+}$, $Ca^{2+}$ or a mixture thereof.

Example 1

Figure 1:
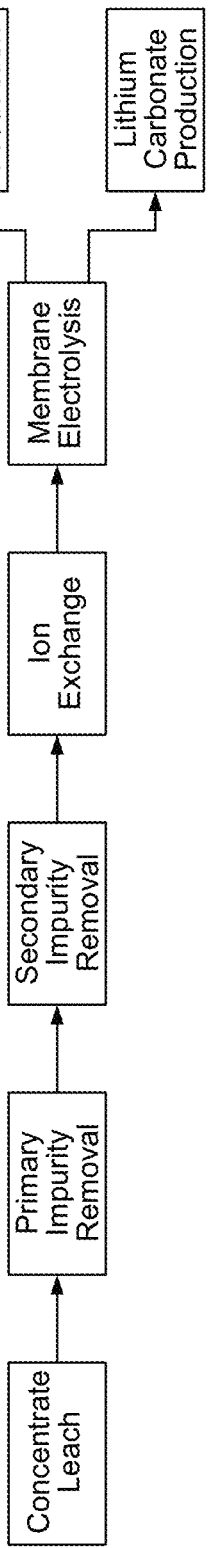
FIG. 1 is a block diagram concerning an example of a process according to the present disclosure.

As shown in FIG. 1, lithium hydroxide can be obtained, for example, by using such a process and by using a pre-leached lithium-containing material as a starting material. For example, various leached ores such as acid roasted β-spodumene can be used. The process shown in FIG. 1 can also be used for producing lithium carbonate. According to another embodiment, the starting material can be a lithium compound such as lithium sulphate, lithium chloride or lithium fluoride. In such a case, the process would be shorter and would be starting at the box entitled "membrane electrolysis".

Acid Roasted β-Spodumene (AR β-Spodumene)

Two different blends of the AR β-spodumene were tested. The samples were composed of different ratios of the flotation and dense media separation (DMS) concentrates. The samples were identified as 75/25 and 50/50. The former sample contained about 75% by weight of the flotation concentrate and about 25% by weight of the DMS concentrate. The latter sample contained substantially equal portions by mass of the two concentrates. The assay data of the feed samples is summarized in Table 1. The two samples had very similar analytical profiles. The 75/25 sample had higher levels of Fe, Mn, Mg, Ca and K than the 50/50 sample. Both samples had typical compositions for AR β-spodumene.

TABLE 1

Assay Data of the AR β-Spodumene Samples

| Sample | Li | Si | Al | Fe | Na | S |
|---|---|---|---|---|---|---|
| | % | | | | | |
| 75/25 Comp | 2.24 | 25.0 | 10.5 | 1.04 | 0.39 | 6.09 |
| 50/50 Comp | 2.29 | 24.4 | 10.4 | 0.96 | 0.36 | 6.06 |

TABLE 1-continued

Assay Data of the AR β-Spodumene Samples

| Sample | Cr | Zn | Mn | Mg | Ca | K |
|---|---|---|---|---|---|---|
| | g/t | | | | | |
| 75/25 Comp | 167 | 134 | 1962 | 1186 | 3431 | 3653 |
| 50/50 Comp | 163 | 103 | 1755 | 905 | 2311 | 3376 |

Concentrate Leach (CL) and Primary Impurity Removal (PIR)

The objectives of the Concentrate Leach (CL) and the Primary Impurity Removal (PIR) were 1) to dissolve lithium sulphate contained in the AR β-spodumene and 2) to remove the major impurities from the process solution that co-leach with lithium from the feed solids.

Figure 2:
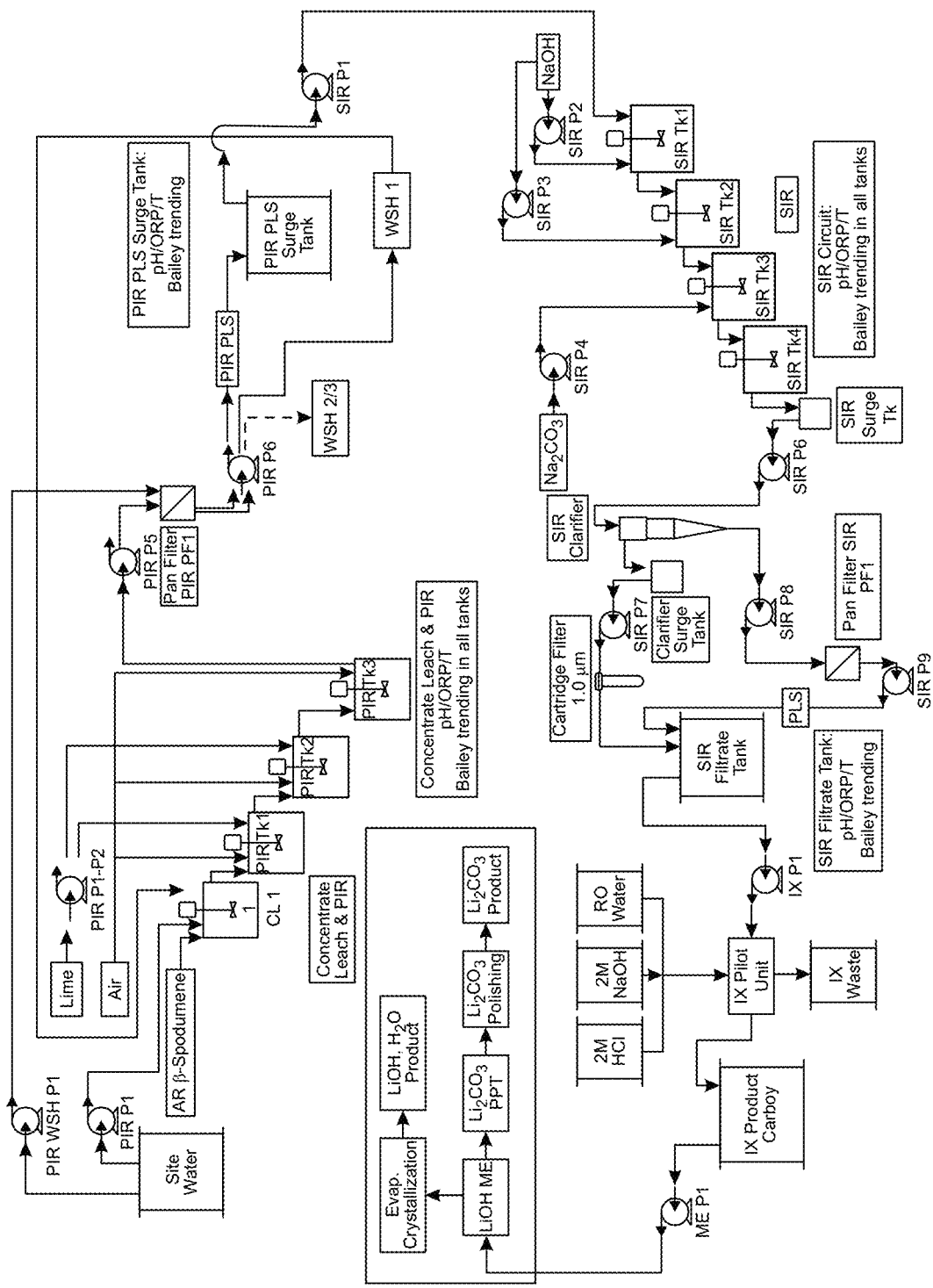
FIG. 2 is a flow sheet diagram concerning another example of a process according to the present disclosure.

A four tank cascade was used for the combined CL and PIR process circuit (see FIG. 2). The AR β-spodumene was added using a feed hopper that was equipped with a vibratory feeder. Each of the reactors was equipped with the following: an overhead mixer motor (0.5 hp) with a 4-blade pitch impeller attached, pH and ORP (Oxidation Reduction Potential) probes. The PIR reactors also had air spargers located directly below the impeller. The process slurry flowed by gravity from one reactor to the next through overflow ports. The overflow port of the CL reactor was set such that the active volume of the tank was about 32 L. The PIR reactors each had an active volume of about 14 L. The overflow from PIR Tank 3 (the last reactor of the tank train) was pumped to the filtration station.

About 1,200 kg of the 75/25 and about 1,400 kg of the 50/50 AR β-spodumene samples were leached in about 85 hours of operation. The change over from one feed to the other occurred at the 37$^{th}$ hour of operation. Time zero of the operation was when pulp began to overflow from the CL reactor.

In the CL step, water and solids were combined in an agitated tank at a 50:50 weight ratio and mixed for about 30 to about 45 minutes under ambient conditions. Lithium was extracted along with undesirable gangue metals such as, for example, iron, aluminum, silicon, manganese, and magnesium. The obtained slurry (CL slurry) thus comprised a solid composition and an aqueous (liquid) composition containing solubilized $Li^+$ (lithium ions) as well as solubilized ions of the above-mentioned metals. The CL slurry pH and ORP were monitored but not controlled. Alternatively, the pH can eventually be controlled by further adding some base, some acid or by diluting. The ORP can also be controlled as previously indicated by sparging air. The CL slurry flowed by gravity to the PIR Tank 1. The aqueous composition can alternatively be separated from the solid composition before being introduced in the PIR Tank 1. In such a case, the aqueous composition (instead of the whole CL slurry as it is the case for the present example) would be inserted into Tank 1.

After 9 hours of operation there was sufficient volume of the Wash 1 fraction (the first displacement wash fraction generated when washing the combined CL and PIR solids residue) to recycle back to the CL. The initial recycle rate of the Wash 1 was set to about 50% of the water addition requirement of the CL. After 37 hours of operation, this amount was increased to make-up 60% of the water addition to the process. This wash stream contained on average about 12 g/L Li (about 95 g/L of $Li_2SO_4$).

Primary Impurity Removal (PIR) was carried out, for example, to substantially remove Fe, Al and Si from the aqueous composition while substantially not precipitating any lithium. In this process, the pH of the concentrate leach slurry (comprising the aqueous composition and the solid composition) was elevated to about 5.6 by lime slurry addition to the three PIR tanks. The lime was added as a slurry having a concentration of about 20 wt %. The CL slurry was thus converted into a precipitate and an aqueous composition. The impurities such as Fe, Al and Si were at least substantially precipitated as insoluble metal hydroxides and found in the precipitate while the lithium ions were substantially found in the aqueous composition. The retention time for the PIR circuit was about 45 to about 60 minutes. Air was sparged into the PIR tanks in order to maintain the oxidative potential of the process slurry at or above about 350 mV. At this level, iron present in the ferrous ($Fe^{2+}$) form would likely oxidize to ferric iron ($Fe^{3+}$), a form suitable for precipitation at such a pH. Thus, a precipitate comprising, for example, metal hydroxides of Fe, Al and Si was obtained and eventually separated from the aqueous composition comprising lithium ions. In the PIR, the pH can thus be controlled by further adding some base, some acid or by diluting. The ORP can be controlled as previously indicated by sparging air.

The resulting slurry (comprising the aqueous composition and the solid composition (comprising the precipitate)) was filtered on pan filters. The filtrate (aqueous composition comprising lithium ions and having a reduced content of the above mentioned metals (such as Fe, Al and Si)) proceeded to Secondary Impurity Removal (SIR). The PIR filter cake underwent three displacement washes. The first wash fraction was collected separately from the second two washes. The first wash stream was recycled to the CL process as a portion of the water feed stream to recover the contained lithium. Wash fractions 2 and 3 were combined and stored as a solution. This solution can be used for lime slurry make-up to recover the lithium units.

Figure 3:
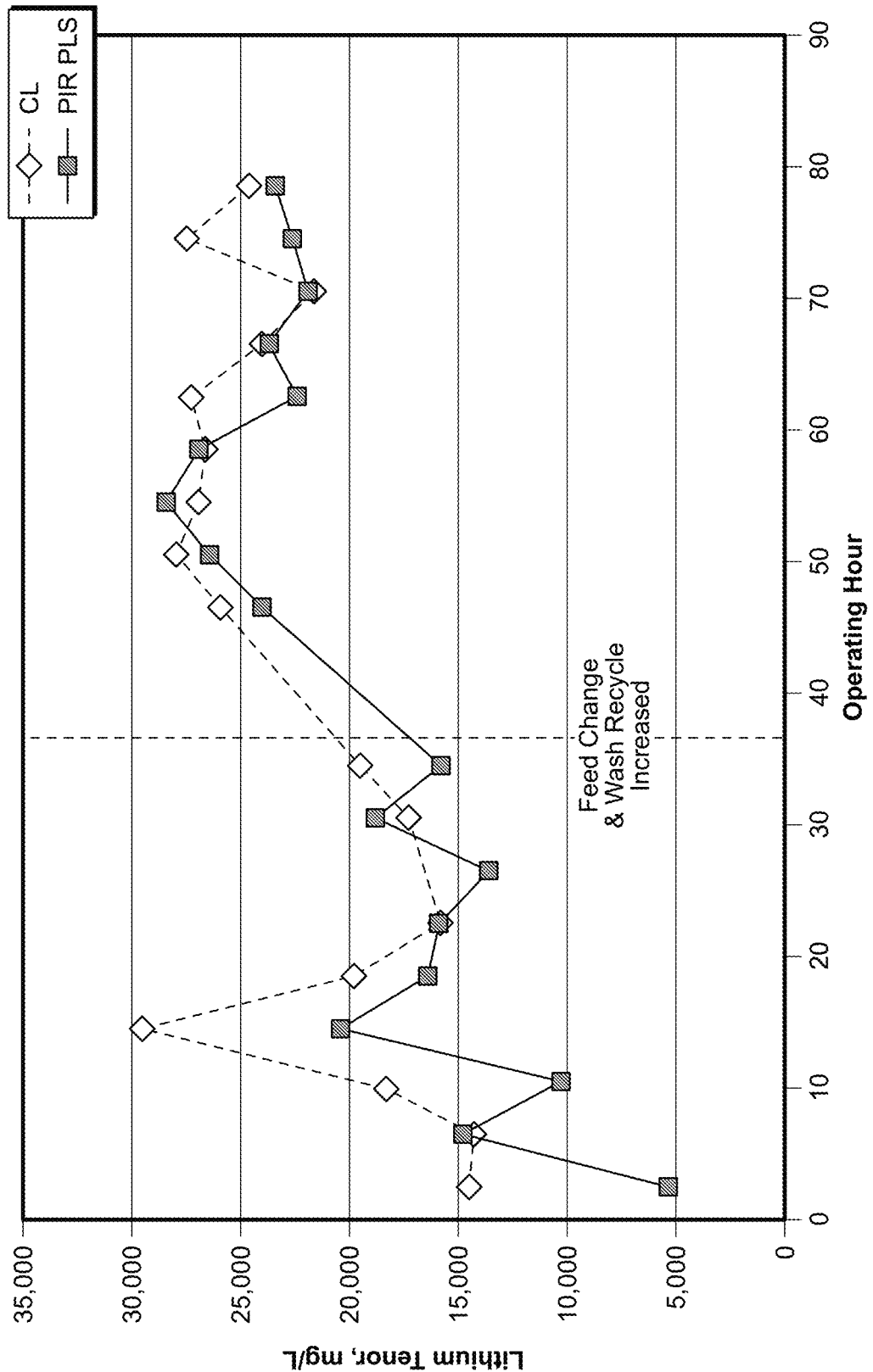
FIG. 3 is a plot showing lithium tenor as a function of time in another example of a process according to the present disclosure.

The lithium tenors in CL and PIR are presented in FIG. 3. At hour 9, the first wash fraction from PIR was recycled back to the CL tank to make-up half of the water addition to the leach. Lithium tenors increased throughout the circuit to about 18 g/L (about 142.6 g/L of $Li_2SO_4$) as a result. At hour 37.5, the recycle rate was increased to make-up 60% of the water to the leach and lithium tenors increased to about 25 g/L (about 198 g/L of $Li_2SO_4$). The PIR first wash lithium tenors ranged from about 12 to about 15 g/L (about 95 g/L to about 118.8 g/L of $Li_2SO_4$).

The pH was substantially steady throughout the operation once the throughput was reduced. The ORP of the slurry in PIR tank 3 was substantially steady and above about 350 mV during the operation. The iron tenors for CL and PIR are presented in FIG. 4. At hours 10 and 54, the pH of PIR3 was near a value of about 5.6 and yet the iron tenor in the PIR3 liquor increased.

Figure 4:
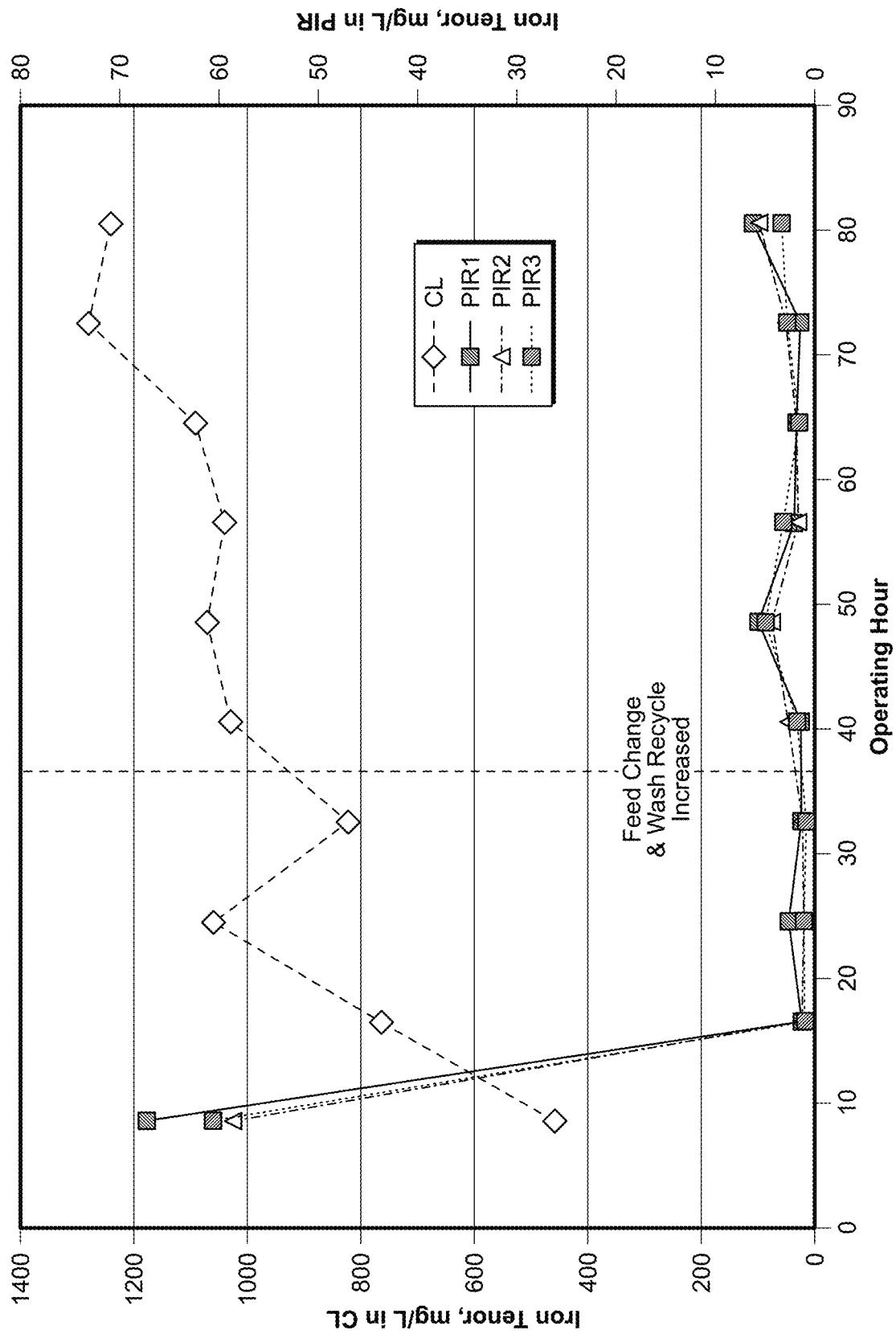
FIG. 4 is a plot showing iron tenor as a function of time in another example of a process according to the present disclosure.
Figure 5:
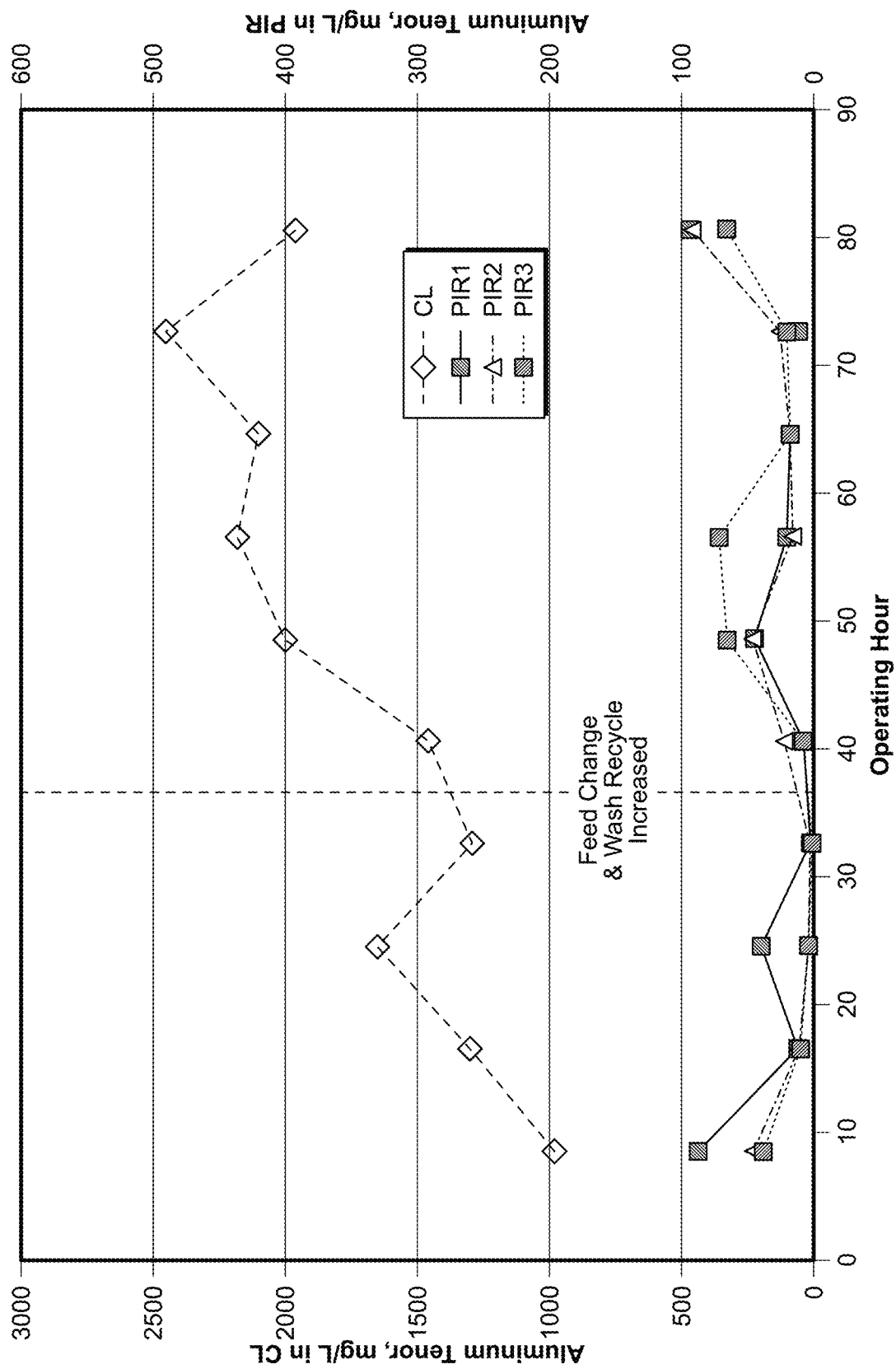
FIG. 5 is a plot showing aluminum tenor as a function of time in another example of a process according to the present disclosure.

Iron and aluminum profiles are presented in FIGS. 4 and 5. Both iron and aluminum showed increasing levels in the CL tank throughout the run. Iron levels maintained below about 5 mg/L in PIR3 for most of the run regardless of the increase observed in CL. Aluminum in PIR3 was less than about 10 mg/L for the first 40 hours, and then ranged between about 20 and about 65 mg/L for the remainder of the operating time.

A mass balance for the CL and PIR circuits is shown in Table 2. Lithium extraction and impurity precipitation is calculated based on solids assays. The mass balance shows that overall about 82% of the lithium present in the AR β-spodumene feed proceeded to Secondary Impurity Removal (SIR). Specifically, about 79% lithium extraction was achieved for the 75/25 blend and about 86% for the 50/50 blend. The portions of aluminum and iron that either did not leach or precipitated totaled about 96% and about 99%, respectively. Other tests have demonstrated that yields of about 95% of extraction from the AR β-spodumene can be obtained.

TABLE 2

Mass Balance of CL and PIR circuits

| Process Streams | Op Hr | Quantity, kg | Li % or mg/L | Al | Fe g/t or mg/L | Cr | Zn |
|---|---|---|---|---|---|---|---|
| INPUTS | | | | | | | |
| AR B-Spodumene | 13.5 | 485 | 2.25 | 106909 | 9792 | 173 | 130 |
| | 25.5 | 436 | 2.19 | 102675 | 10072 | 192 | 154 |
| | 37.5 | 323 | 2.15 | 101087 | 10352 | 211 | 177 |
| | 49.5 | 407 | 2.21 | 104792 | 11261 | 212 | 148 |
| | 61.5 | 435 | 2.28 | 106909 | 8883 | 212 | 119 |
| | 73.5 | 363 | 2.31 | 107438 | 8813 | 182 | 88 |
| | 80.0 | 205 | *2.31* | *107438* | *8813* | *182* | *88* |
| PIR Wash 1 | 13.5 | 113 | *11200* | 77 | *11.2* | *<0.2* | *5.6* |
| | 25.5 | 252 | 11200 | 77 | 11.2 | <0.2 | 5.6 |
| | 37.5 | 214 | 11200 | 77 | 11.2 | <0.2 | 5.6 |
| | 49.5 | 273 | 15300 | 65 | 4.3 | <0.2 | 5.9 |
| | 61.5 | 273 | *15300* | 65 | *4.3* | *<0.2* | *5.9* |
| | 73.5 | 249 | 12300 | 64 | 3.1 | <0.2 | 3.5 |
| | 80.0 | 157 | 12600 | 62 | 1.5 | <0.2 | 3.6 |
| OUTPUTS | | | | | | | |
| PIR3 Solids | 13.5 | 536 | 0.60 | 126491 | 11960 | 247 | 133 |
| | 25.5 | 277 | 0.40 | 121198 | 11471 | *229* | *160* |
| | 37.5 | 268 | 0.58 | 119611 | 13219 | 211 | 187 |
| | 49.5 | 333 | 0.31 | 123315 | 13079 | *211* | *164* |
| | 61.5 | 294 | 0.46 | 126491 | 11051 | 210 | 140 |
| | 73.5 | 282 | 0.48 | 124374 | 10771 | 201 | 141 |
| | 80.0 | 169 | 0.50 | 125962 | 11051 | *201* | *141* |

TABLE 2-continued

Mass Balance of CL and PIR circuits

| | | | | | | | |
|---|---|---|---|---|---|---|---|
| PIR3 Solution | 13.5 | 600 | 10700 | 37.3 | 60.5 | <0.2 | 5.5 |
| | 25.5 | 642 | 20100 | 6.95 | 1.05 | <0.2 | 3.9 |
| | 37.5 | 470 | 16400 | 1.3 | 0.8 | <0.2 | 1.7 |
| | 49.5 | 515 | 24550 | 36.45 | 3.3 | <0.2 | 5.4 |
| | 61.5 | 582 | 23500 | 71 | 3.2 | <0.2 | 4.6 |
| | 73.5 | 484 | 22800 | 19.5 | 2.15 | <0.2 | 3.45 |
| | 80.0 | 290 | 25900 | 65.5 | 3.4 | <0.2 | 4.8 |

| Process Streams | | Density | | Metal Units, g | | | | |
|---|---|---|---|---|---|---|---|---|
| | Op Hr | kg/L | % Solids | Li | Al | Fe | Cr | Zn |
| INPUTS | | | | | | | | |
| AR B-Spodumene | 13.5 | | | 10912 | 51847 | 4749 | 84 | 63 |
| | 25.5 | | | 9555 | 44797 | 4394 | 84 | 67 |
| | 37.5 | | | 6938 | 32621 | 3340 | 68 | 57 |
| | 49.5 | | | 8995 | 42653 | 4583 | 86 | 60 |
| | 61.5 | | | 9907 | 46455 | 3860 | 92 | 52 |
| | 73.5 | | | 8397 | 39053 | 3203 | 66 | 32 |
| | 80.0 | | | 4732 | 22007 | 1805 | 37 | 18 |
| PIR Wash 1 | 13.5 | 1.06 | | 1195 | 8 | 1 | 0 | 1 |
| | 25.5 | 1.07 | | 2631 | 18 | 3 | 0 | 1 |
| | 37.5 | 1.06 | | 2262 | 15 | 2 | 0 | 1 |
| | 49.5 | 1.10 | | 3800 | 16 | 1 | 0 | 1 |
| | 61.5 | 1.12 | | 3748 | 16 | 1 | 0 | 1 |
| | 73.5 | 1.09 | | 2821 | 15 | 1 | 0 | 1 |
| | 80.0 | 1.08 | | 1829 | 9 | 0 | 0 | 1 |
| OUTPUTS | | | | | | | | |
| PIR3 Solids | 13.5 | | 47.2 | 3218 | 67836 | 6414 | 132 | 71 |
| | 25.5 | | 30.1 | 1107 | 33534 | 3174 | 63 | 44 |
| | 37.5 | | 36.3 | 1556 | 32094 | 3547 | 57 | 50 |
| | 49.5 | | 39.3 | 1032 | 41042 | 4353 | 70 | 54 |
| | 61.5 | | 33.6 | 1354 | 37238 | 3253 | 62 | 41 |
| | 73.5 | | 36.8 | 1353 | 35070 | 3037 | 57 | 40 |
| | 80.0 | | 36.8 | 844 | 21268 | 1866 | 34 | 24 |
| PIR3 Solution | 13.5 | 1.07 | | 5995 | 21 | 34 | 0 | 3 |
| | 25.5 | 1.12 | | 11477 | 4 | 1 | 0 | 2 |
| | 37.5 | 1.11 | | 6970 | 1 | 0 | 0 | 1 |
| | 49.5 | 1.15 | | 10953 | 16 | 1 | 0 | 2 |
| | 61.5 | 1.15 | | 11926 | 36 | 2 | 0 | 2 |
| | 73.5 | 1.15 | | 9580 | 8 | 1 | 0 | 1 |
| | 80.0 | 1.16 | | 6464 | 16 | 1 | 0 | 1 |
| Units IN | 13.5 | | | 12107 | 51855 | 4750 | 84 | 64 |
| | 25.5 | | | 12186 | 44815 | 4397 | 84 | 68 |
| | 37.5 | | | 9200 | 32636 | 3343 | 68 | 58 |
| | 49.5 | | | 12795 | 42669 | 4585 | 86 | 62 |
| | 61.5 | | | 13655 | 46471 | 3861 | 92 | 53 |
| | 73.5 | | | 11218 | 39068 | 3204 | 66 | 33 |
| | 80.0 | | | 6560 | 22017 | 1805 | 37 | 19 |
| | TOTAL | | | 77722 | 279532 | 25945 | 517 | 356 |
| Units OUT | 13.5 | | | 9212 | 67857 | 6448 | 132 | 74 |
| | 25.5 | | | 12584 | 33538 | 3174 | 63 | 46 |
| | 37.5 | | | 8527 | 32095 | 3547 | 57 | 51 |
| | 49.5 | | | 11985 | 41058 | 4355 | 70 | 57 |
| | 61.5 | | | 13281 | 37274 | 3255 | 62 | 44 |
| | 73.5 | | | 10934 | 35078 | 3038 | 57 | 41 |
| | 80.0 | | | 7308 | 21284 | 1867 | 34 | 25 |
| | TOTAL | | | 73830 | 268184 | 25684 | 475 | 338 |
| Extraction | 13.5 | | | 71 | | | | |
| | 25.5 | | | 88 | | | | |
| | 37.5 | | | 78 | | | | |
| | 49.5 | | | 89 | | | | |
| | 61.5 | | | 86 | | | | |
| | 73.5 | | | 84 | | | | |
| | 80.0 | | | 82 | | | | |
| | TOTAL | | | 82 | | | | |
| Precipitation | 13.5 | | | | 131 | 135 | 158 | 113 |
| | 25.5 | | | | 75 | 72 | 76 | 66 |
| | 37.5 | | | | 98 | 106 | 83 | 88 |
| | 49.5 | | | | 96 | 95 | 81 | 90 |
| | 61.5 | | | | 80 | 84 | 67 | 80 |

TABLE 2-continued

| Mass Balance of CL and PIR circuits | | | | | | |
|---|---|---|---|---|---|---|
| | 73.5 | | 90 | 95 | 86 | 124 |
| | 80.0 | | 97 | 103 | 91 | 132 |
| | TOTAL | | 96 | 99 | 92 | 93 |
| Accountability, OUT/IN % | | 76 | 131 | 136 | 158 | 117 |
| | | 103 | 75 | 72 | 76 | 68 |
| | | 93 | 98 | 106 | 83 | 87 |
| | | 94 | 96 | 95 | 81 | 92 |
| | | 97 | 80 | 84 | 67 | 82 |
| | | 97 | 90 | 95 | 86 | 126 |
| | | 111 | 97 | 103 | 91 | 135 |
| | TOTAL | 95 | 96 | 99 | 92 | 95 |

*Averages if shown in italics

Secondary Impurity Removal

Secondary Impurity Removal (SIR) was performed on the PIR filtrate (aqueous composition comprising lithium ions and having a reduced content of the above mentioned metals (such as Fe, Al and Si)) to substantially precipitate and remove Ca, Mg and Mn impurities therefrom. Feed addition to the SIR circuit started at operating hour 6 (six hours after overflow from the CL tank). There are four process tanks arranged in a cascade (see FIG. 2). The tank volumes could be adjusted during the run from about 11.8 to about 17.5 L by changing the tank overflow ports. All tanks are baffled and agitated by overhead mixers. pH, ORP and temperature were monitored in all tanks.

In the first two agitated tanks, the pH was increased to about 10 using about 2 M sodium hydroxide (NaOH) (another base). Following this pH adjustment, an excess of sodium carbonate ($Na_2CO_3$) based on levels of targeted impurities in the feed was added to the third tank to convert the remaining divalent impurities to insoluble carbonates. The slurry from the third tank was pumped to a clarifier. Underflow solids were removed and recovered by filtration while the overflow solution was collected in a 1000 L tote.

Figure 6:
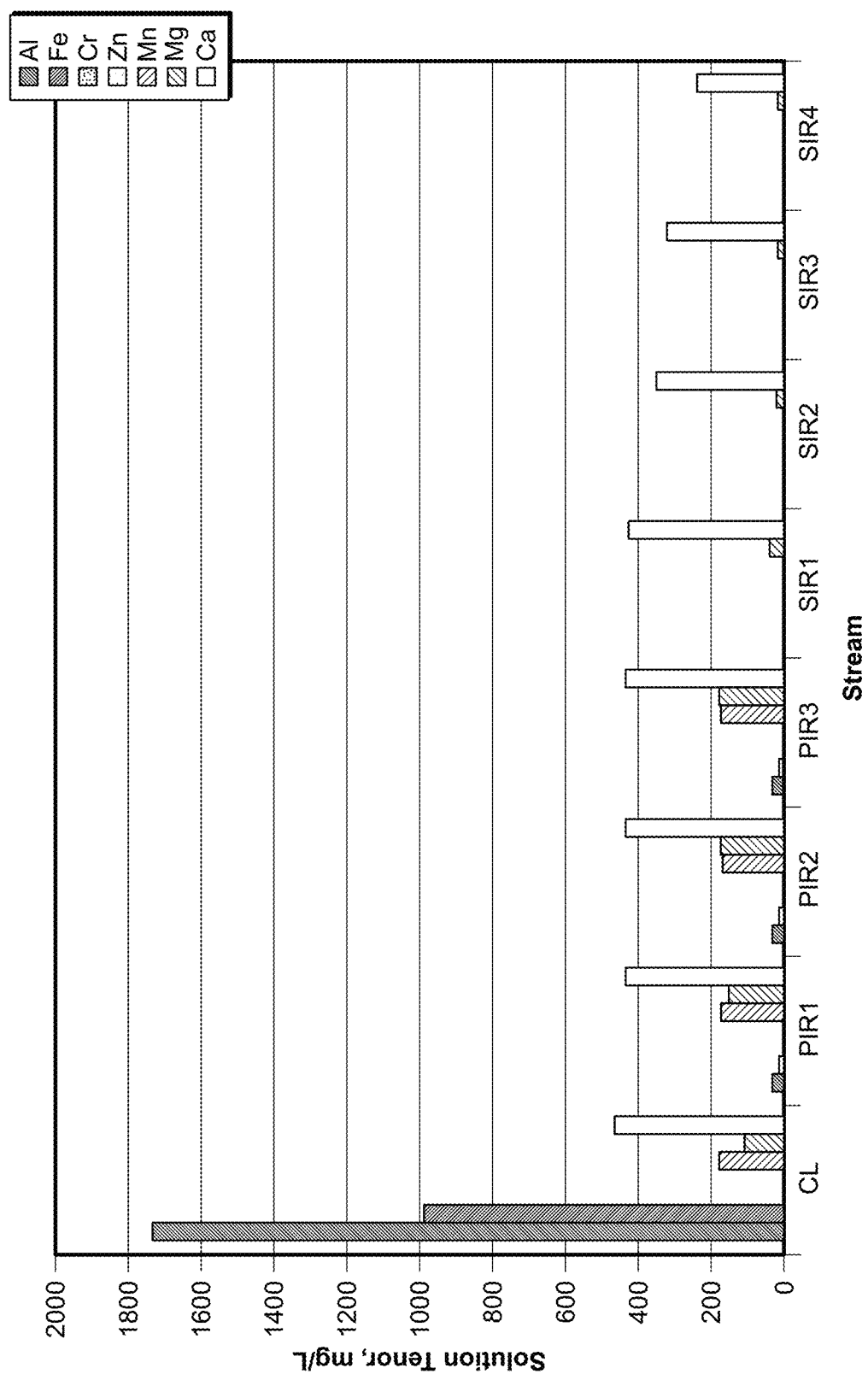
FIG. 6 is a diagram showing various metals tenor as a function of time in another example of a process according to the present disclosure.

Averaged impurity tenors of solutions from the Concentrate Leach stage through to the final tank of Secondary Impurity Removal are shown in Table 3 and FIG. 6.

TABLE 3

| Profile of Selected Impurities | | | | | | | | |
|---|---|---|---|---|---|---|---|---|
| Stream | Li mg/L | Al mg/L | Fe mg/L | Cr mg/L | Zn mg/L | Mn mg/L | Mg mg/L | Ca mg/L |
| CL | 23880 | 1737 | 985 | 5.9 | 9.1 | 178 | 109 | 468 |
| PIR1 | 21290 | 34 | 9 | 0.0 | 4.3 | 174 | 153 | 435 |
| PIR2 | 21240 | 28 | 8 | 0.0 | 4.0 | 173 | 175 | 433 |
| PIR3 | 21140 | 30 | 8 | 0.0 | 4.2 | 174 | 179 | 434 |
| SIR1 | 20093 | 1 | 0 | 0.0 | 0.0 | 2 | 43 | 426 |
| SIR2 | 22500 | 0 | 0 | 0.0 | 0.0 | 1 | 19 | 352 |
| SIR3 | 19050 | 1 | 0 | 0.0 | 0.0 | 1 | 16 | 322 |
| SIR4 | 22400 | 0 | 0 | 0.0 | 0.0 | 1 | 14 | 241 |

Impurities introduced in the leach stage included iron, aluminum, chromium, zinc, magnesium, manganese and calcium. Substantially all of the chromium and over about 98% of the iron and aluminum substantially precipitated in the first PIR tank (PIR1). Minimal precipitation occurred in the next two tanks of PIR (PIR2 and PIR3). By the first tank of SIR (SIR1), the only impurities substantially remaining in solution were magnesium and calcium. All other elements were less than about 1 mg/L. Although most of the precipitation occurred in SIR1, the extra retention time of SIR2 dropped the magnesium tenor from about 40 to about 20 mg/L. From SIR2 through SIR4, magnesium and calcium tenors showed a steady decline with more retention time. Impurity levels for SIR4 averaged to about 1 mg/L Mn, about 14 mg/L Mg and about 241 mg/L Ca during the pilot plant run. However, levels as low as about 200 mg/L Ca and about 2 mg/L Mg were attained by the optimization of key parameters.

pH and ORP were monitored throughout the operation. pH was only controlled in the first two tanks. Initially, the selected pH for SIR2 was about 10. At operating hour 30, the pH in SIR2 was increased to about 10.5. With the exception of a 2 hour period at hour 50, where the pH in SIR2 dropped to about 10, pH remained at about 10.5 for the remainder of the run. The average pH values achieved over the two periods were about 10.1 and about 10.5 and the resulting sodium hydroxide consumptions were about 0.022 and about 0.024 kg sodium hydroxide per hour, respectively. The overall sodium hydroxide consumption was about 10 kilograms of sodium hydroxide solution per about 1000 kg of lithium carbonate equivalent (LCE).

Figure 7:
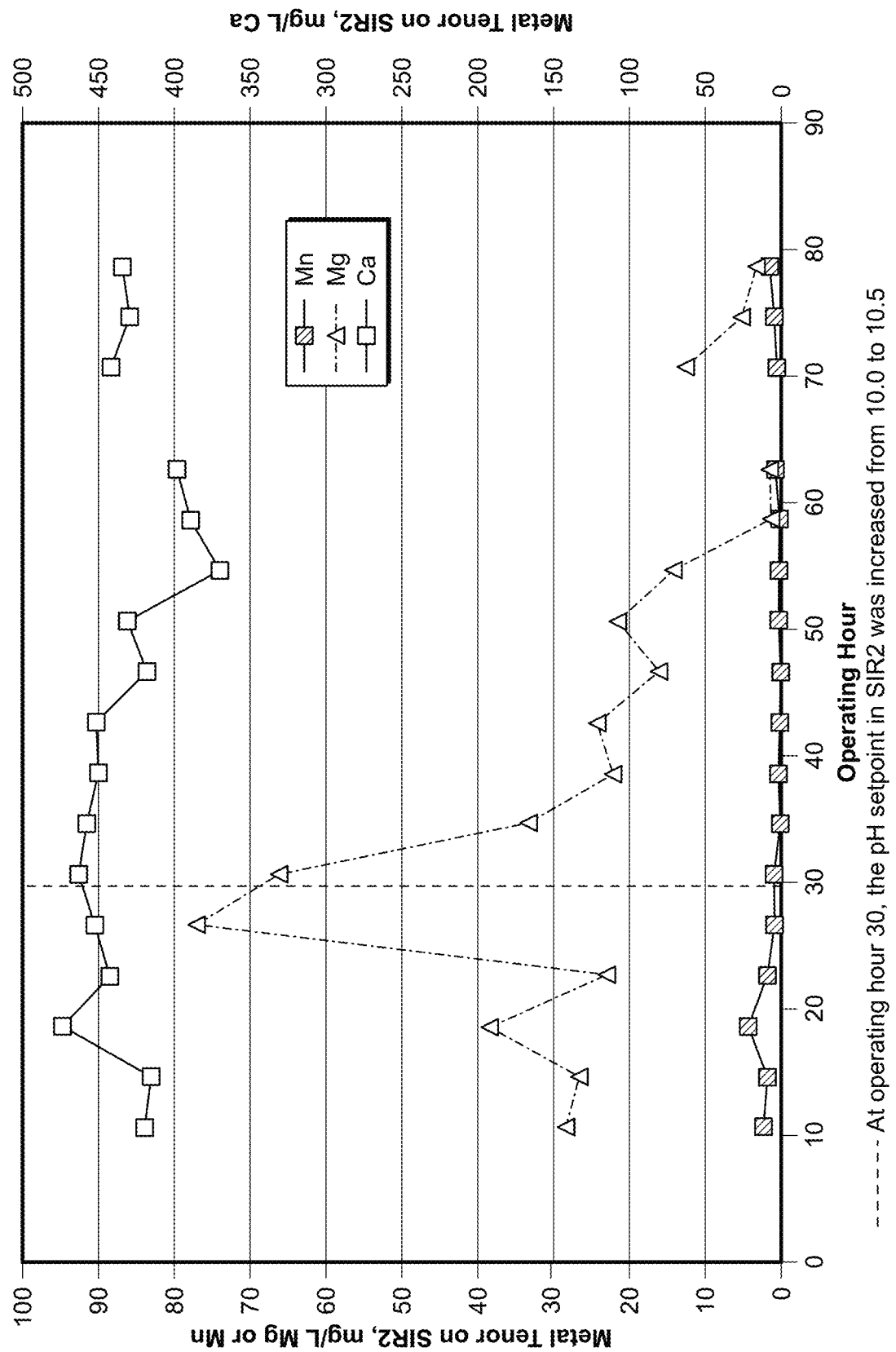
FIG. 7 is a plot showing various metals tenor as a function of time in another example of a process according to the present disclosure.

The impurity tenors of SIR2 solutions are plotted over time in FIG. 7. These solutions have been pH adjusted by sodium hydroxide to above 10, but have not yet been dosed with sodium carbonate. Magnesium tenors are lower after the adjustment, but the levels show a gradual trend downwards that appears to begin prior to the set point change. It should be noted that later in the pilot plant, the retention time was increased for all SIR tanks, which may have also contributed to improved precipitation performance.

Figure 8:
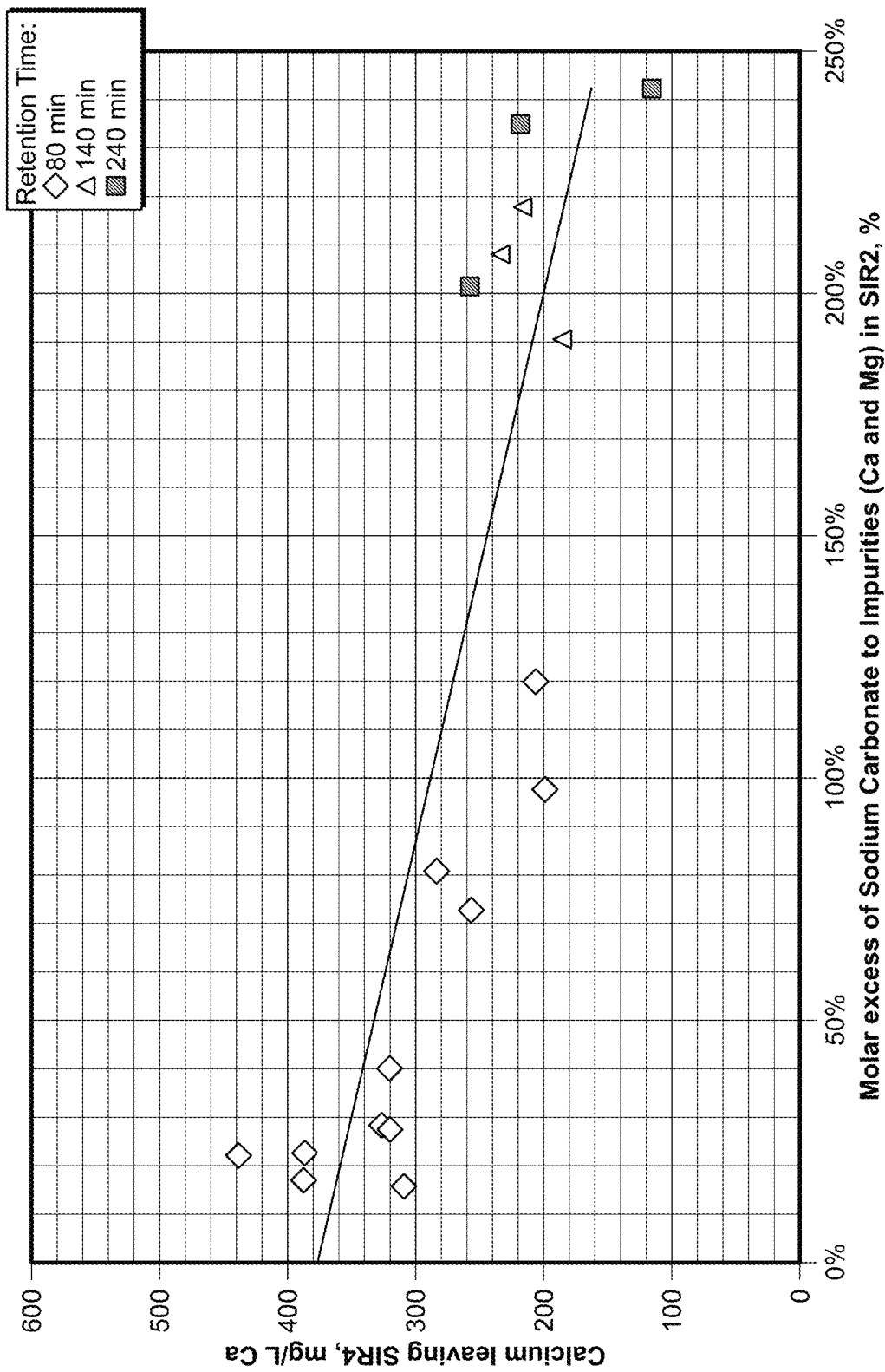
FIG. 8 is a plot showing calcium tenor as a function of molar excess of sodium carbonate in another example of a process according to the present disclosure.
Figure 9:
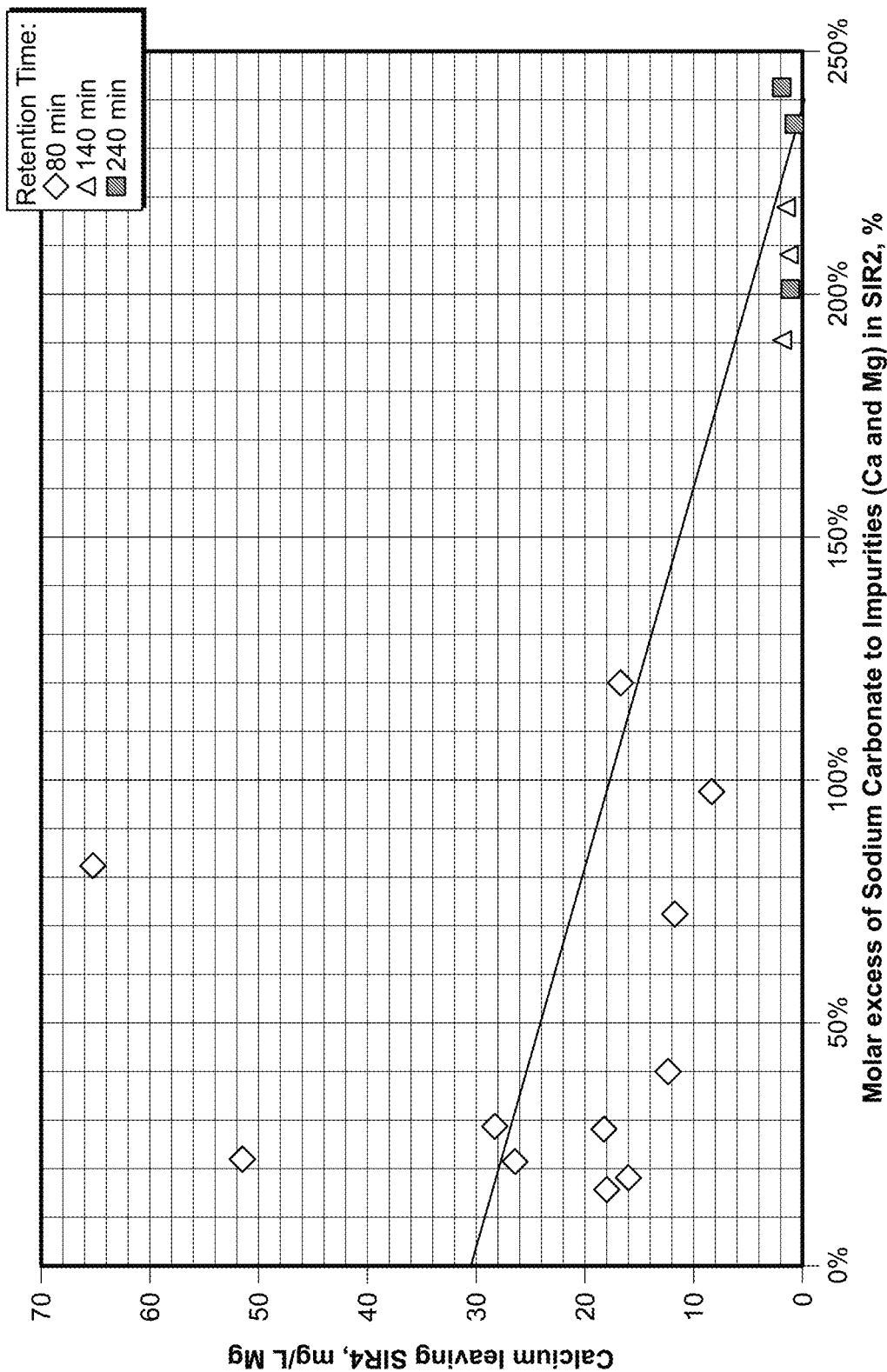
FIG. 9 is a plot showing magnesium tenor as a function of molar excess of sodium carbonate in another example of a process according to the present disclosure.

Calcium and magnesium tenors in solutions leaving SIR4 are plotted in FIGS. 8 and 9. These Figures relate impurity tenor (Mg and Ca only) with the sodium carbonate dosage used at the time the sample was taken. Additionally, the data are plotted based on the retention times of the entire SIR circuit at the time of each sample. Within the range tested, as the sodium carbonate increased, metal tenors decreased. It should be noted that the lowest impurity tenors also corresponded with greater circuit retention time. Sodium carbonate dosage is expressed as molar excess of calcium impurities present prior to sodium carbonate addition (using assays from SIR2). The data indicated that the solution tenor of Ca can decrease to below about 200 mg/L.

Product from the SIR circuit was assayed every 4 hours as it left the final tank (SIR4) (see FIG. 2). The SIR4 product was pumped into a 100 L clarifier and the overflow from the clarifier was filtered through a 0.5 μm spiral wound cartridge filter and then collected in 1000 L plastic totes. These totes were assayed again to confirm bulk calcium feed tenors for Ion Exchange (IX). When the totes were sampled, light brown solids were observed in the bottom of each tote. Assays revealed a significant drop in calcium tenor from the solutions leaving the final tank of the circuit (SIR4) to the solution sitting unmixed in the totes. A comparison of the average assays for both streams is presented in Table 4, below.

TABLE 4

Effect of Aging on SIR Product

| Stream | Mg mg/L | Ca mg/L |
| --- | --- | --- |
| SIR4 Product | 17 | 286 |
| IX Feed Tote | 15 | 140 |

A mass balance for the SIR circuit is shown in Table 5. The mass balance shows that overall about 92% of the magnesium and all of the manganese reported to the solids. The distribution of lithium to the solids is about 0.9% for an overall SIR lithium recovery of about 99.1%.

TABLE 5

Mass Balance of SIR circuit

| Process Streams | | Metal Content, mg/L or % | | |
| --- | --- | --- | --- | --- |
| | Op Hr | Quantity, kg | | g/t or mg/L |
| | | | Mn | Mg | Ca |
| INPUTS | | | | | |
| SIR Feed | 13.5 | 600 | 72 | 69 | 438 |
| | 25.5 | 642 | 109 | 111 | 463 |
| | 37.5 | 470 | 146 | 209 | 459 |
| | 49.5 | 515 | 199 | 216 | 451 |
| | 61.5 | 582 | 227 | 181 | 415 |
| | 73.5 | 484 | 203 | 154 | 441 |
| | 80.0 | 290 | 195 | 150 | 443 |
| OUTPUTS SIR Solids | | | | | |
| Solids Pail 1 | | 3.17 | 64700 | 63600 | 86300 |
| Solids Pail 2 | | 4.03 | 68000 | 54700 | 85200 |
| SIR4 Solution | 13.5 | 176 | 0.7 | 18 | 309 |
| | 25.5 | 383 | 1.2 | 21 | 358 |
| | 37.5 | 426 | 1.6 | 48 | 370 |
| | 49.5 | 395 | 0.1 | 20 | 325 |
| | 61.5 | 208 | 0.2 | 7.6 | 191 |
| | 73.5 | 214 | 0.2 | 1.4 | 220 |
| | 80.0 | 206 | 0.4 | 1.5 | 225 |

| Process Streams | | Density | Metal Units, g | | |
| --- | --- | --- | --- | --- | --- |
| | Op Hr | kg/L | Mn | Mg | Ca |
| INPUTS | | | | | |
| SIR Feed | 13.5 | 1.08 | 40 | 38 | 242 |
| | 25.5 | 1.03 | 68 | 69 | 288 |
| | 37.5 | 1.12 | 62 | 88 | 193 |
| | 49.5 | 1.14 | 90 | 97 | 203 |
| | 61.5 | 1.10 | 121 | 96 | 220 |
| | 73.5 | 1.20 | 81 | 62 | 177 |
| | 80.0 | 1.17 | 48 | 37 | 109 |
| OUTPUTS SIR Solids | | | | | |
| Solids Pail 1 | | | 205 | 201 | 273 |
| Solids Pail 2 | | | 274 | 221 | 343 |
| SIR4 Solution | 13.5 | 1.05 | 0 | 3 | 52 |
| | 25.5 | 1.09 | 0 | 7 | 126 |
| | 37.5 | 1.11 | 1 | 18 | 143 |
| | 49.5 | 1.15 | 0 | 7 | 112 |
| | 61.5 | 1.15 | 0 | 1 | 35 |
| | 73.5 | 1.20 | 0 | 0 | 39 |
| | 80.0 | 1.21 | 0 | 0 | 38 |
| Precipitation = | 13.5 | | 100 | 92 | 79 |
| (1 − SIR4 solution/ | 25.5 | | 99 | 89 | 56 |
| SIR Feed) * 100 | 37.5 | | 99 | 79 | 26 |
| | 49.5 | | 100 | 93 | 45 |
| | 61.5 | | 100 | 99 | 84 |
| | 73.5 | | 100 | 100 | 78 |
| | 80.0 | | 100 | 99 | 65 |
| TOTAL | | | 100 | 92 | 62 |
| Accountability, OUT/IN % | | | 94 | 94 | 81 |
| Distribution to Solids | | | 100 | 92 | 53 |

| SIR Lithium Recovery | |
| --- | --- |
| SIR solids, kg Li | 0.3 |
| SIR total out, kg Li | 36.3 |
| Lithium Recovery, % | 99.1 |

Ion Exchange

The SIR product is processed through an ion-exchange (IX) circuit to further reduce the Ca and Mg tenors prior to lithium product production. The IX circuit comprises three columns packed with Purolite™ S950, a cationic resin that can be used in the sodium form that is selective towards divalent and trivalent metal ions. Purolite™ S950 comprises an aminophosphonic resin supported on a macroporous cross-linked polymer. It can be used for the removal of heavy metal cations. At high pH it can be active in the removal of Group 2 metal cations (Mg, Ca and Ba) and Cd, Ni and Co. At high pH divalent metal cations are preferentially absorbed over monovalent metal cations (e.g. Li, Na, K). Any ion exchange resin that would be suitable for substantially selectively removing of divalent metal cations such as $Ca^{2+}$ and $Mg^{2+}$ and/or trivalent metal cations could be alternatively used in the present disclosure. Alternatively, more than one type of resin can be used to selectively remove the various metal cations. Thus, different ion exchange resins can be used for different metal cations.

Figure 10:
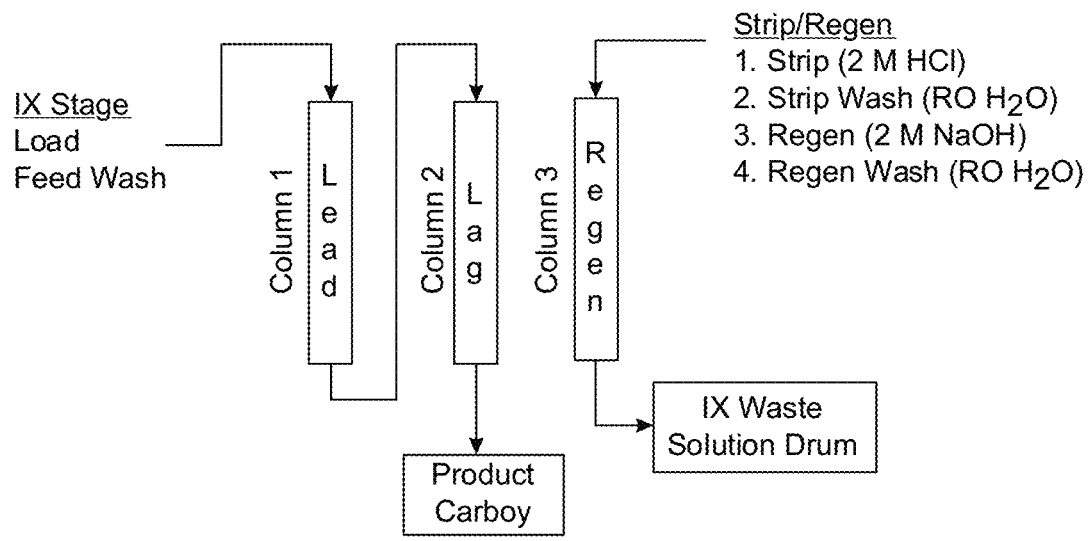
FIG. 10 is a schematic representation of another example of a process according to the present disclosure.
Figure 10:
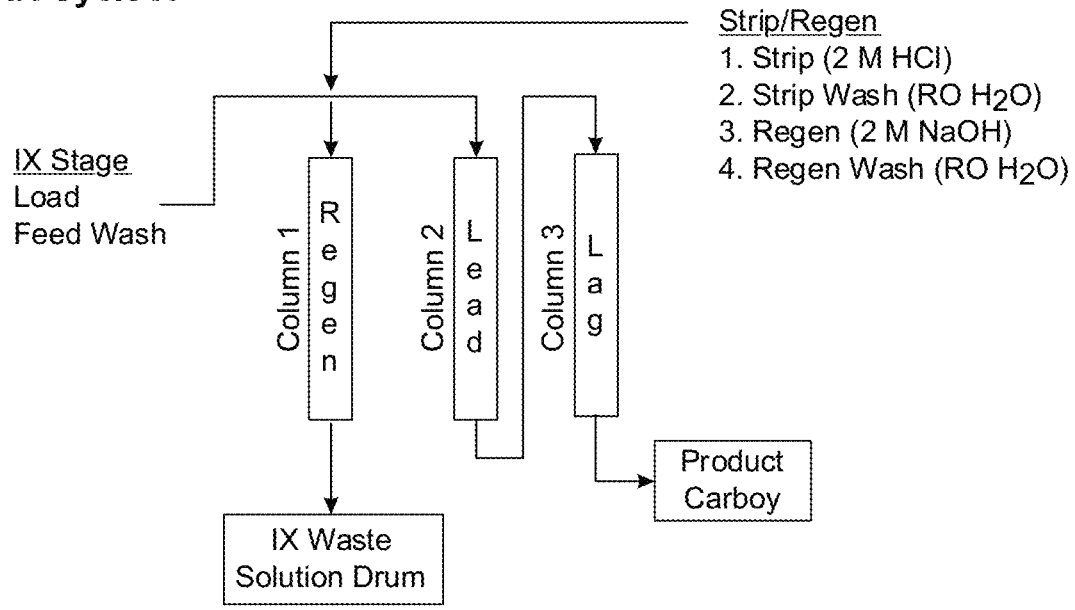

The operating philosophy used for the IX circuit was a Lead-Lag Regeneration process (see FIGS. 2 and 10). Two of the IX columns of the circuit are involved with Ca and Mg removal, while the resin regeneration cycle is conducted on the third column. A schematic illustrating the solution flow through the IX circuit and the lead-lag regeneration operation is provided in FIG. 10. The loading of Ca and Mg will take place on two columns denoted lead and lag and will produce an effluent having both Ca and Mg solution tenors below about 10 mg/L. The loaded column undergoes stripping and regeneration stages prior to being reintroduced as the lag column for the next loading cycle. The columns were constructed from clear PVC pipe. Each column had a diameter of about 15 cm and a height of about 76 cm. The bed volume of each column was about 10 L.

The parameters for the IX operation are summarized in Table 6. These parameters were based on the laboratory tests results and the Lead-Lag column configuration was designed to process 75 bed volumes (BV) of feed solution before the Ca and Mg tenors in the Lag effluent exceeded the established upper limit that was about 10 mg/L that was established for each cation. After processing 75 BV's of feed solution, the combined absorption capacity of the resin in the Lead and Lag columns would not be sufficient to produce a final effluent with the Ca and Mg tenors each below about 10 mg/L. At this point the loading cycle is complete. The Lead column is promoted to the Regeneration stage. The Lag column takes the Lead position. The Regenerated column becomes the Lag column.

The Regeneration stage involved washing the Lead column with reverse osmosis (RO) water to flush out the Li rich solution within the column. This solution is passed to the Lag column. The Feed Wash stage is followed by Acid Strip using about 2 M HCl. This removes the absorbed Ca, Mg, Li and other metal cations from the resin. The resin is now in the acid form. An Acid Wash stage follows to rinse the remaining HCl(aq) from the column. The resin is then converted to the Na form by passing about 2 M NaOH through the column (Regeneration Stage). The final step involves washing the excess NaOH from the column using reverse osmosis (RO) water. The resin is now regenerated and ready to be promoted to the Lag position for the next Loading cycle. The effluent from the Acid Strip cycle was collected separately. The effluents from the Acid Wash, Regeneration and Regeneration Wash cycles were all captured in the same drum.

The Acid Strip stage produces a solution that contains Li, Ca, and Mg. The data indicated that Li elutes from the column first followed by Ca and Mg. It can be possible to separately capture the Li fraction and as a result produce a lithium chloride solution.

TABLE 6

IX Pilot Operation Parameters

| IX Stage | Solution | Bed Volume (BV) | Rate, BV/h |
| --- | --- | --- | --- |
| Loading | IX Feed | 75 | 5 |
| Feed Wash | RO Water | 1.5 | 5 |
| Acid Strip | 2M HCl | 3 | 5 |
| Acid Wash | RO Water | 5 | 5 |
| Regeneration | 2M NaOH | 3 | 5 |
| Regeneration Wash | RO Water | 3 | 5 |

1 BV = 10 L

A total of about 2154 L of SIR Product solution was processed through the IX circuit in four cycles. The average Li, Ca, and Mg tenors of the feed solutions for each cycle are summarized in Table 7.

TABLE 7

IX - Average Feed Solution Li, Ca and Mg Tenors

| IX Cycle | Average Feed Solution Tenor, mg/L | | |
| --- | --- | --- | --- |
| | Li | Ca | Mg |
| C1 | 16480 | 176 | 28.2 |
| C2 | 17600 | 140 | 12.9 |
| C3 & C4 | 21940 | 78.7 | 3.6 |

A cycle was initially designed to operate the Loading stage for 75 BV's. The average loading flow rate was about 832 mL/min (about 49.9 L/h). Cycle 1 was the only cycle where 75 BVs of feed solution was passed through the Lead-Lag columns.

The Ca Loading curve for Cycle 1, where the Ca tenor of the effluents from the Lead and Lag columns are plotted against cumulative bed volume processed, is presented in FIG. 11. Also plotted on this plot is the average Ca tenor in the feed solution and the selected limit for Ca tenor in the Lag effluent (about 10 mg/L) for the present example. The breakthrough point for Ca of the Lead column occurred at 7.5 BV. The Ca tenor of the Lead effluent was about 82.3 mg/L after 75 BV's indicating that the loading capacity of the Lead column was not reached for Ca. The breakthrough point for Ca of the Lag column occurred at about 35 BV. The Ca tenor in the Lag effluent increased above about 10 mg/L between the $60^{th}$ and $65^{th}$ BV. It was decided to continue the Loading stage of Cycle 1 through to the $75^{th}$ BV point even though the Lag effluent was above about 10 mg/L of Ca. The effluent from the $65^{th}$ to $75^{th}$ BV point was diverted to a 200 L drum and kept separate from the main product solution of Cycle 1. The diverted solution was later combined with the main Cycle 1 product when it was determined that the Ca tenor in the resulting combined solution would not exceed about 10 mg/L.

A similar loading profile for Mg for Cycle 1 is presented in FIG. 12. The average Mg tenor in the feed solution and for example an upper limit of Mg tenor in the Lag effluent (about 10 mg/L) are also included in this plot. The breakthrough point for Mg of the Lead column occurred at 7.5 BV's. After 75 BV's the Mg tenor of the Lead effluent was about 9.5 mg/L. The breakthrough point for Mg of the Lag column occurred at 52.5 BV's. After 75 BV's the Mg tenor of the Lag effluent was about 0.8 mg/L, well below the selected limit level for Mg in the IX product solution, according to this example.

Cycles 2 and 3 had to be stopped before 75 BV's of feed solution could be processed through the columns. The Ca tenors of the Lag effluent for each IX cycle are plotted against cumulative BV in FIG. 13. In the case of Cycle 2, the Ca breakthrough points for the Lead and Lag columns occurred at < about 7.5 and about 23 BV, respectively. Cycle 2 was stopped after about 68 BV. The Ca in the Lag effluent had reached about 13 mg/L at after about 60 BV's. Breakthrough of Ca for the Lag column of Cycle 3 occurred within the first 5 BV's. Cycle 3 was stopped after about 30 BV's. The tenor of the Ca in the Lag effluent at the 30 BV point was about 7.7 mg/L.

The balance of the Cycle 3 feed solution was processed over about 36.4 BV's in Cycle 4. The Ca breakthrough points for the Lead and Lag columns for Cycle occurred at<about 7.5 and about 7.5 BV, respectively. Extrapolation of the Cycle 4 Lag effluent Ca tenor data indicated that the product solution would have a Ca tenor>about 10 mg/L after 60 BV's.

The Mg tenors of the Lag effluent for each IX cycle are plotted against cumulative BV in FIG. 14. It is clear that the Mg tenor in the Lag effluent never approached a level close to the level of about 10 mg/L.

The average Li tenors of the Lead effluent for each IX cycle are plotted against cumulative BV in FIG. 15. Also included in this plot are the average Li tenors of the feed solutions. The data indicated that substantially no Li loaded onto the resin.

The Li, Ca and Mg tenors in the Acid Strip effluents of Cycle 1 and 2 are plotted against cumulative BV in FIG. 16. The data indicate that Li is stripped first from the resin and reaches for example an upper limit tenor in the range of about 0.5 and about 1.5 BV's. The Ca and Mg eluted from the resin starting around 1 BV and both reach for example an upper limit tenor at about 2 BV. The three metals are eluted from the resin after 3 BV's. The Ca and Mg profiles for Cycle 3 and 4 were similar.

Reagent consumptions are reported relative to the LCE produced on a kg per about 1000 kg basis. The lithium sulphate stream produced from Ion Exchange contained about 39.1 kg of Li (this includes 100% of the lithium units in a PIR PLS sample that did not undergo SIR and IX). The equivalent mass of lithium carbonate that could be produced given no losses in downstream processes would equal about 187.7 kg.

The IX circuit produced about 2006 L of product solution. The assay data of the IX Product solutions are summarized in Table 8. The Li tenor ranged from about 15.7 to about 21.9 g/L. The ranges of the Ca and Mg tenors were about 2.4 to about 5.7 mg/L and < about 0.07 to about 0.2 mg/L, respectively. Other constituents of note were Na and K at about 3.5 g/L and about 0.1 g/L on average, respectively. The elements that assayed below the detection limits of the analytical technique are also listed in Table 8.

TABLE 8

IX Product Solution Assays

| IX Product | Solution Tenor, mg/L | | | | | | | | |
|---|---|---|---|---|---|---|---|---|---|
| | Li | SO4 | Cl | Na | K | Ca | Sr | Mg | Ba |
| Carboy 1 | 15700 | 120000 | 5 | 3980 | 107 | 3.8 | 0.61 | 0.2 | 0.03 |
| Carboy 2 | 16700 | 120000 | 4 | 1990 | 105 | 5.7 | 0.9 | 0.18 | 0.043 |
| Carboy 3 | 21900 | 160000 | 5 | 4470 | 117 | 2.4 | 0.74 | <0.07 | 0.05 |

Elements Assaying below Detection (Detection Limits provided in mg/L)

| Ag | Al | As | Be | Bi | Cd | Co | Cr | Cu | Fe |
|---|---|---|---|---|---|---|---|---|---|
| <0.5 | <0.8 | <3 | <0.002 | <1 | <0.3 | <0.3 | <0.2 | <0.1 | <0.2 |
| Mn | Mo | Ni | P | Pb | Sb | Se | Sn | Ti | Ti |
| <0.04 | <0.6 | <1 | <5 | <2 | <1 | <3 | <2 | <0.1 | <3 |
| U | | V | | W | | Y | | Zn | |
| <1 | | <0.07 | | <2 | | <0.02 | | <0.7 | |

The mass balance of for the IX circuit is provided in Table 9. Good accountability for Li was obtained. About 2.7% of the Li was lost in the Strip/Regeneration process solution. The process removed about 97.6% of the Ca and about 99.0% of the Mg contained in the feed solutions.

The IX circuit met the process objectives by reducing the Ca and Mg tenors in the product solution to below about 10 mg/L for each metal cation. Further, a high quality lithium sulphate solution was produced.

TABLE 9

IX Mass Balance

| | | Assays, mg/L or % | | |
|---|---|---|---|---|
| Process Stream | Kg or L | Li | Ca | Mg |
| SIR Feed C1 | 750 | 16480 | 176 | 28.2 |
| SIR Feed C2 | 682 | 17600 | 140 | 12.9 |
| SIR Feed C3 | 359 | 21940 | 78.7 | 3.6 |
| SIR Feed C4 | 364 | 21940 | 78.7 | 3.6 |
| IX Product Carboy 1 | 914 | 15700 | 3.8 | 0.2 |
| IX Product Carboy 2 | 478 | 16700 | 5.7 | 0.18 |
| IX Product Carboy 3 | 614 | 21900 | 2.4 | <0.07 |
| IX Regen Reject Drum 1 | 202 | 16.9 | 35.5 | 2.47 |
| IX Regen Reject Drum 2 | 208 | 12.2 | 16.7 | <0.07 |
| IX Strip - Solids | 0.8 | 0.002 | 26.5 | 0.0004 |
| IX Strip - Solution | 111 | 8760 | 718 | 229 |
| Elemental Masses IN, kg | | | | |
| SIR Feed C1 | | 12.36 | 0.13 | 0.02 |
| SIR Feed C2 | | 11.99 | 0.10 | 0.01 |

TABLE 9-continued

IX Mass Balance

| | | Assays, mg/L or % | | |
|---|---|---|---|---|
| Process Stream | Kg or L | Li | Ca | Mg |
| SIR Feed C3 | | 7.87 | 0.03 | 0.00 |
| SIR Feed C4 | | 7.99 | 0.03 | 0.00 |
| Total IN, kg | | 40.2 | 0.28 | 0.03 |
| Elemental Masses OUT, kg | | | | |
| IX Product Carboy 1 | | 14.35 | 0.00 | 0.00 |
| IX Product Carboy 2 | | 7.99 | 0.00 | 0.00 |
| IX Product Carboy 3 | | 13.45 | 0.00 | 0 |
| IX Regen Reject Drum 1 | | 0.00 | 0.01 | 0.00 |
| IX Regen Reject Drum 2 | | 0.00 | 0.00 | 0 |
| IX Strip - Solids | | 0.00 | 0.22 | 0.00 |
| IX Strip - Solution | | 0.97 | 0.08 | 0.03 |
| Total OUT, kg | | 36.8 | 0.32 | 0.03 |
| Distribution, % | | | | |
| Product | | 97.3 | 2.4 | 1.0 |
| Trails | | 2.7 | 97.6 | 99.0 |
| Distribution Total | | 100.0 | 100.0 | 100.0 |
| OUT/IN, % | | 91.4 | 112.4 | 80.3 |
| Li Loss, % | | 2.7 | | |
| M Removed, % | | | 97.6 | 99.0 |

Examination of the semi-quantitative x-ray diffraction (SQ-XRD) data of composite samples of the CL/PIR residues showed that each sample contains both α- and β-spodumene. The SQ-XRD data for the CL/PIR residues generated from each of the two feed samples (75/25 and 50/50) are summarized in Table 10. The presence of α-spodumene indicates that the phase transition step that was conducted by a third party vendor (acid roast of α-spodumene) was not 100% efficient. Any Li present in this form would thus not be chemically available to the hydrometallurgical process. It should be noted that the efficiency of the phase transition step (conversion from α-spodumene to β-spodumene) is not 100% and therefore a percentage of the contained Li in the feed to the Hydrometallurgical process is as α-spodumene.

TABLE 10

SQ-XRD Data of the two CL/PIR Residue Types

| Chemical Composition | 75/25 CL/PIR Residue Drum 1-5, wt % | 50/50 CL/PIR Residue Drum 7-14, wt % |
|---|---|---|
| $H(AlSi_2)O_6$ | 60.6 | 67.3 |
| Spodumene beta | 12.0 | 9.4 |
| $SiO_2$ | 11.6 | 7.5 |
| $NaAlSi_3O_8$ | 3.6 | 3.8 |
| $CaSO_4 \cdot (H_2O)$ | 2.7 | 4.4 |
| $KAlSi_3O_8$ | 1.6 | 3.6 |
| $LiAlSi_2O_6$ | 2.2 | 2.5 |
| $Ca(SO_4)(H_2O)_{0.5}$ | 2.5 | — |
| αFeO·OH | 1.9 | — |
| $Fe_3O_4$ | — | 1.6 |
| $CaSO_4 \cdot 2H_2O$ | 1.1 | — |
| gamma-$Mn_3O_4$ | 0.3 | — |
| | 100.1 | 100.1 |
| Li Bearing Mineral | Relative Distribution of Li, % | |
| Spodumene beta | 94.9 | 92.7 |
| $LiAlSi_2O_6$ | 5.1 | 7.3 |

The Li units that are in the CL/PIR residues as β-spodumene were never available to the process and as a result provide a false low Li recovery value.

An adjusted Li recovery was calculated that did not consider the Li units tied up as β-spodumene in the CL/PIR residue. The data for this calculation are summarized in Table 11. The total Li in all of the out process streams was about 63.2 kg. This included about 11.7 kg of Li in the CL/PIR residue that was present as β-spodumene. The adjusted total Li out value thus becomes about 51.6 kg. The total recoverable Li by the overall process was about 46.9 kg. The adjusted total Li recovery is then calculated to be about 95.8%.

TABLE 11

Adjusted Total Li Recovery

| | Li Mass, g |
|---|---|
| Total Li OUT based on Assays | 60615 |
| Total Li Recovered | 46884 |
| Total Li in CL/PIR Residue as β-Spodumene | 11655 |
| Total Li OUT minus Li as β-Spodumene | 48960 |
| Adjusted Total Li Recovery, % | 95.8 |

A high grade lithium sulphate solution was thus produced. In accordance with FIG. 1, this solution can be used, for example, as the lithium source in the production of a solution of high quality lithium hydroxide and/or high quality lithium carbonate. This high grade lithium sulphate solution can also be used as a feed in the production of other high grade lithium products.

Example 2

Electrolysis: Conversion of $Li_2SO_4$ into LiOH

I. Introduction

Nafion™ 324 cation exchange membrane was used. This membrane is a reinforced perfluorinated bi-layer membrane with sulfonic acid exchange groups designed, for example to reduce the backmigration of hydroxide groups (resulting in a higher current efficiency). This can be achieved by placing the higher equivalent weight polymer layer facing the cathode. It can also be used at elevated temperatures. Some alternate, for example less expensive cation exchange membranes may also be suitable for the processes of the present disclosure, such as Nafion 902, Fumatech FKB and Neosepta CMB Two different anion exchange membranes were tested herein. The Asahi™ AAV anion exchange membrane is a weakly basic, proton blocking membrane used, for example in acid concentration applications. This membrane was tested at about 40° C. The second anion exchange membrane tested herein was the Fumatech FAB membrane. This membrane is an acid stable proton blocking membrane with excellent mechanical stability, and can withstand higher temperatures. It was tested at about 60° C. Higher operating temperatures may, for example require less cooling of the process feed solution before it enters the electrolysis process as well as reduce the overall energy consumption by increasing solution and membrane conductivities. It may also, for example decrease the amount of heating required for the lithium hydroxide stream in the crystallization loop and for the feed returned to the dissolution step.

II. Experimental

The present experiments were carried out in an Electrocell MP cell equipped with a DSA-$O_2$ anode, stainless steel cathode, and one pair of anion/cation exchange membranes. The feed loop consisted of an insulated about 5 liter glass reservoir with a 600 watt tape heater wrapped around it. The solution was circulated with an Iwaki™ WMD-30LFX centrifugal circulating pump. The solution pH, flow rate, temperature, and inlet pressure (to the cell) were all monitored and controlled. The solution conductivity was also monitored. Acid (or base) when needed, was added to the feed solution for pH control using a peristaltic pump and a graduated cylinder as a reservoir.

The anolyte loop comprised an insulated about 2 liter glass reservoir with a 300 watt heating tape wrapped around it. The solution was circulated with a similar pump to the one described above. The solution flow rate, temperature and inlet pressures were also monitored and controlled. Dilution water (for control of the concentration) was added directly to the reservoir using an adjustable flow rate peristaltic pump. This reservoir was allowed to overflow into a larger polypropylene collection reservoir from which the solution was then circulated back to the glass reservoir via peristaltic pump. The catholyte loop was substantially similar to the anolyte loop.

The electrode reactions are as follows:

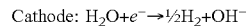

Cathode: $H_2O + e^- \rightarrow \frac{1}{2}H_2 + OH^-$

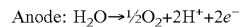

Anode: $H_2O \rightarrow \frac{1}{2}O_2 + 2H^+ + 2e^-$

A diagram of the cell configuration is shown in FIG. 17.

The entire electrolysis setup was contained within a fume hood to facilitate proper venting of the hydrogen and oxygen produced at the electrodes.

Samples were taken during the experiments and analyzed for acidity and alkalinity using a simple acid/base titration. Selected samples were also analyzed for anions (sulfate) and cations (lithium and sodium) by Ion Chromatography.

III. Results and Discussion

Experiments with Nafion 324/Asahi AAV Membranes at about 40° C.

Two experiments (856-04 and 856-11) were conducted in this configuration. Table 12 summarizes the parameters used in this experiment. A constant about 6.8 volts was applied for both experiments. This voltage was initially chosen based on prior experience regarding the operating conditions of these membranes.

TABLE 12

Summary of Results with AAV.

| Experiment# | 856-04 | 856-11 |
|---|---|---|
| Membranes | NAF324/AAV | NAF324/AAV |
| Temperature (° C.) | 40 | 40 |
| Mode | Constant 6.8 V | Constant 6.8 V |
| Charge Passed (moles e/% theory Li) | 5.73/58.3 | 5.01/100.7 |
| Time (hr) | 14.25 | 12.78 |
| Avg CD (mA/cm$^2$) | 107.7 | 105 |
| Init [$H_2SO_4$] (molar) | 0.24 | 0.49 |
| Final [$H_2SO_4$] (molar) | 0.97 | 0.53 |
| Acid CE | 62.4 | 65.1 |
| Acid water transport (mol/mol $SO_4$) | 1.6 | −2.7 |
| [Li] and [Na] in initial acid (mMolar) | 0/0* | 0/2.4* |
| [Li] and [Na]* in final acid (mMolar) | 0/0* | 0/2.1* |
| Init Base [Li]/[Na]/[OH] (molar) | 0.49/0/0.46 | 3.1/0.18/2.85 |
| Final Base [Li]/[Na]/[OH] (molar) | 2.97/0.18/3.13 | 3.55/0.23/3.63 |
| Base CE | 82.4 | 73.3 |
| Base water transport (mol/mol Li + Na) | 7.4 | 7.0 |

TABLE 12-continued

Summary of Results with AAV.

| Experiment# | 856-04 | 856-11 |
|---|---|---|
| [SO$_4$] in base initial/final (mMolar) | 0.4/1.9 | 1.9/1.8 |
| Init Feed [Li]/[Na]/[SO$_4$] (molar) | 3.27/0.18/1.68 | 3.18/0.18/1.65 |
| Final Feed [Li]/[Na]/[SO$_4$] (molar) | 2.39/0.08/1.25 | 1.95/0.05/0.90 |
| % Li Removal | 33.4 | 62.3 |
| LiOH for pH control at 4.0 (% of charge) | 18.2 | 5.7 |
| Li mass balance % | 103 | 99 |
| SO4 mass balance % | 101.5 | 97 |

*Corrected for Na added by KOH used for neutralization of sample prior to IC analysis.

In the first experiment (#856-04), both acid and base concentrations started at approx. 0.5 N (about 0.25 M sulfuric acid) and were allowed to increase through the electrolysis. The acid strength was allowed to reach about 1 M before being held constant there by the addition of dilution water, whereas the base concentration was allowed to continue increasing. A graph of the concentrations and the resultant current efficiencies is shown in FIG. 18.

A final base concentration of about 3.13 M was achieved at an overall current efficiency of about 82%. The overall acid current efficiency was about 62% with a final acid strength of about 0.97 M.

The feed pH was reduced initially during the experiment down to approximately 4 by the addition of acid and then maintained there. This required metering in lithium hydroxide under pH control, which also indicates that the cation exchange membrane was performing more efficiently than the anion exchange membrane. The amount of lithium hydroxide required to maintain this pH accounts for about 18% of the charge and, as expected, is close to the difference between base and acid current efficiencies. The overall current density was about 108 mA/cm$^2$ for an about 33% of theory lithium removal.

The water transport, which is a measure of the amount of water transported with the ions across the membranes was measured at about 7.4 moles/mole of Li+Na across the Nafion 324 membrane into the base compartment and about 1.6 moles/mole sulfate across the Asahi AAV membrane into the acid compartment.

In the second experiment (#856-11) with this membrane configuration, the acid strength was kept constant at a reduced concentration of about 0.5 M, and a higher base concentration (about 2.85 M) was used initially and allowed to rise up to about 3.63 M. In addition, less starting feed was used so that higher depletion could be achieved. Under these conditions, less lithium hydroxide (corresponding to about 6% of the current) was needed to maintain the feed pH at about 4.0, indicating that while the efficiency of both membranes were closer together, the Nafion 324 membrane efficiency remained higher than that of the AAV membrane. A graph of the concentrations and the resultant current efficiencies is shown in FIG. 19.

The overall base current efficiency was about 73% and the acid current efficiency was about 65%. The difference in efficiencies again corresponds well to the amount of lithium hydroxide required to maintain feed pH (about 6%). The overall current density for this experiment was very similar to the previous run at about 105 mA/cm$^2$ for about 62% of theory lithium removal. The water transport rate across the Nafion 324 was similar at about 7.0 moles/mole Li+Na. Water transport across the Asahi AAV was measured at about −2.7 moles/mole sulfate. (i.e. water transport was from acid to feed due to the lower acid concentration used).

Experiments with Nafion324/Fumatech FAB Membranes at about 60° C.

Initial Baseline Tests

A total of six experiments (#856-22 to #856-63) were conducted in this configuration. Table 13 summarizes the results of the first three experiments, which were used to determine various effects when process variables were manipulated.

TABLE 13

Summary of Results with FAB.

| Experiment# | 856-22 | 856-31 | 856-40 |
|---|---|---|---|
| Membranes | NAF324/FAB | NAF324/FAB | NAF324/FAB |
| Temperature ° C. | 60 | 60 | 60 |
| Mode | Constant 6.8 V | Constant 6.8 V | Constant 6.8 V |
| Charge Passed (moles e/% theory Li) | 6.08/95.9 | 11.11/136.9 | 14.11/124.7 |
| Time (hr) | 15.95 | 44.38 | 45.53 |
| Avg CD (mA/cm$^2$) | 102.2 | 67.1 | 83.1 |
| Init [H$_2$SO$_4$] (molar) | 0.46 | 0.48 | 0.70 |
| Final [H$_2$SO$_4$] (molar) | 0.99 | 0.79 | 0.915 |
| Acid CE | 64.9 | 76.8 | 76.7 |
| Acid water transport (mol/mol SO$_4$) | 3.0 | 0.14 | 1.17 |
| [Li] and [Na] in initial acid (mMolar) | 0/1.6* | 0/3.7* | 0/0* |
| [Li] and [Na]* in final acid (mMolar) | 0/4.6* | 0/10* | 0/0* |
| Init Base [Li]/[Na]/[OH] (molar) | 3.08/0.20/3.08 | 1.97/0.11/1.90 | 2.43/0.12/2.61 |
| Final Base [Li]/[Na]/[OH] (molar) | 3.44/0.24/3.52 | 2.69/0.14/2.61 | 2.81/0.12/2.70 |
| Base CE | 70 | 72.7 | 74.5 |
| Base water transport (mol/mol Li + Na) | 7.3 | 8.3 | 7.1 |
| [SO$_4$] in base initial/final (mMolar) | 1.6/1.8 | 0.9/1.9 | 1.8/1.9 |
| Init Feed [Li]/[Na]/[SO$_4$] (molar) | 3.10/0.17/1.62 | 3.16/0.15/1.59 | 3.23/0.16/1.68 |
| Final Feed [Li]/[Na]/[SO$_4$] (molar) | 1.93/0.06/1.00 | 0.03/.003/0.018 | 0.67/0.007/0.42 |
| % Li Removal | 55.8 | 99.7 | 91 |
| Feed pH | Controlled at 4.0 | No pH control 3 to 1.6 to 3.3 | No pH control 3 to 1.8 |

TABLE 13-continued

Summary of Results with FAB.

| Experiment# | 856-22 | 856-31 | 856-40 |
|---|---|---|---|
| Li mass balance % | 100 | 102 | 104 |
| SO4 mass balance % | 101 | 104 | 94.3 |

*Corrected for Na added by KOH used for neutralization of sample prior to IC analysis.

In the first experiment (#85622) the acid strength was initially about 0.46 M and was allowed to rise to approx 1 M before being held constant by the addition of dilution water. The initial lithium hydroxide strength was about 3.08 M and allowed to rise to approx. 3.5 M before being held constant; also by the addition of dilution water. A graph of the concentrations and the resultant current efficiencies is shown in FIG. 20.

The feed pH was preadjusted to about 4.0 and then held there. This initially required addition of acid (the FAB membrane was more efficient than the Nafion 324) but later required addition of lithium hydroxide (Nafion 324 became more efficient) as the acid strength increased about twofold and the proton backmigration into the feed compartment increased. The cell was run under the same constant voltage (about 6.8V at the cell) as the experiments with the Asahi AAV membrane. The overall acid current efficiency was measured at about 65% and the base current efficiency at about 70%.

The average current density achieved was about 102 mA/cm$^2$. A graph of the profiles for current density, pH and conductivity is shown in FIG. 21.

A sudden increase in current density up to about 123 mA/cm$^2$ was observed during the first portion of the experiment, followed by a gradual decline over the rest of the experiment. While not wishing to be limited by theory, this increase is thought to be related to the increase in sulfuric acid strength during this time which helps to decrease the resistance of the FAB membrane. The conductivity of the FAB membrane can be dependent on its pH (for example, the FAB membrane can have a resistance of about 50 Ωcm$^2$ in about neutral sodium sulfate solution but it can decrease to about 16 Ωcm$^2$ in about 0.5 M sulfuric acid solution (both measurements at about 25° C.) which is a function of the two solutions that it divides i.e. it is a function of both the feed pH and the concentration of the acid. The peak of current density and conductivity occurring midway through the experiment was due to the solution temperatures exceeding the setpoint of about 60° C. at the start of the second day of the two day experiment before settling down.

The amount of lithium removal in this run was low at about 56%, which was due to the length of time required to treat a minimal volume of feed. The apparatus was modified so that it could be run continuously overnight which would allow larger volumes to be treated to completion. The next experiment was run in this manner and other modifications were made, for example to try to increase current density and efficiency. The acid and base concentrations were started at lower concentrations with the goal to run for the majority of the time at lower concentration with higher efficiency and then, by stopping water addition, allow the concentration of both to increase to the desired values. The other change made was to run the feed at a lower pH (pH about 3 or below) to try to decrease the resistance of the FAB membrane.

A significantly different and lower current density profile was observed as shown in FIG. 22. The lower acid and base concentrations would have a lower conductivity and would contribute to the lower current density but is not large enough to account for all of the decrease observed. While not wishing to be limited by theory, observations on disassembly of cells after later runs suggest that the main contribution may be fouling at the surface of the Nafion N324 membrane. This fouling seems to be carbonate formation at the membrane surface (on the feed side) and is likely formed during periods of time when the system is not running. Membranes removed later in the work had a small amount of white precipitate which was easily removed with acid (gas was formed). It is unclear if this formed when running the feed at higher pH or when the cell was drained and carbon dioxide from air was allowed to react at the surface of the membrane (with high pH). In either case, low current density was not seen to be a problem when the system was run at lower pH.

The current density improved considerably once the feed pH reached about 2 (setting on the pH meter did not allow logging of pH below about 2). The experiment was set to turn off during the night at an estimated amount of charge. However, since the efficiency of the process was slightly better than estimated, the cell continued to run and the feed was almost totally depleted (about 99.7% Li removal). Although about full depletion was possible, the current density plummeted. Full depletion can also be detrimental to the membrane as any impurities in the system are forced to transport through the membrane. The pH at the end of the experiment also increased dramatically, as the lithium/sodium concentration became comparable to the proton transport. At this point the concentration of sulfate was about 18 mM and was mostly present as bisulfate.

The final acid and base concentrations were lower than the previous run at about 0.8 M and about 2.6 M respectively. The lower concentrations produced higher overall current efficiencies at about 77% for acid production and about 73% for base production. The concentrations and current efficiency calculated over the course of the run are shown in FIG. 23.

The current efficiency for lithium hydroxide production is dependent primarily on its concentration and also on the pH of the feed solution. Higher concentrations of lithium hydroxide result in higher backmigration of hydroxyl species across the cation membrane and thus lower current efficiencies. Likewise, the lower the pH of the feed solution, the more protons are available to compete with lithium ion for transport into the catholyte compartment, also resulting in lower current efficiency. The lithium hydroxide concentration was also impacted by running the feed to completion. During the period of low current, lower current efficiency would have occurred, along with a large amount of osmotic water shift from the low concentration feed into the base. This effect is reflected in the relatively high rate of water transport measured of about 8.3 mol water per mol of lithium/sodium transported.

In addition, the pH of the feed compartment is also very dependent on the concentration of acid being produced. The higher the concentration of acid product, the more protons migrate across the anion membrane into the feed compartment, resulting in lower acid current efficiency as well as lower feed pH (which impacts the caustic current efficiency as discussed above).

The cell was rebuilt with new membranes and a repeat of the previous experiment was performed except that higher start acid and base concentrations were used. FIG. 24 shows that the acid concentration was kept from about 0.9 to about 1.0 M throughout the experiment. The base started at about 2.4 M and was allowed to increase to almost about 3 M throughout the run. Current efficiencies for acid and base production were about 77% and about 75% respectively.

FIG. 25 shows that the current density for this run was still relatively low compared to the first run (856-22). It was more similar to the second run (856-34), but since this run was stopped earlier than 856-34, (at about 91% lithium removal instead of about 99.7%), the average current density was considerably higher at about 83 mA/cm$^2$.

The end pH of the solution was about 1.8 due to the amount of proton back migration. At this pH, about 60% of the sulfate is in solution as bisulfate with only about 0.015 M protons in solution.

N324/FAB Runs with Lower Feed pH (Production Runs)

The final set of three experiments was used to generate product for use in crystallization studies. The summary of the tests is shown in Table 14. Larger volumes were used and an attempt was made to increase the current density of previous runs by running the system at constant acid concentration and lower feed pH. By running at lower feed pH, there was not any problem with membrane fouling between runs as was seen when running the feed at the higher pH (> about 3). However, both the acid and base current efficiencies suffered. The other difference in these runs was that additional voltage was applied to the cell: about 7.8 V instead of about 6.8 V. This change was made early during 856-49, resulting in an increase in current density from about 55 mA/cm$^2$ to about 95 mA/cm$^2$. The higher voltage numbers will be used in determining power consumption details.

Graphs showing concentrations and current efficiencies are shown in FIGS. 26 to 31. Starting the system at a lower pH and allowing the feed pH to decrease was detrimental to the current efficiency of the process. The feed pH can be better controlled in a commercial plant situation than in these laboratory experiments. In the longer term runs, sulfuric acid was added to the feed to bring its pH from about 10 down to about 3 before the start of the experiment. This was done for the complete volume of feed, and then the feed pH continued to decrease in operation. However, in a plant, a smaller heal of feed solution could be acidified and more feed at pH about 10 can be added as the experiment continues. Similar benefits occur if the process is run continuously instead of in batch mode. It is estimated from these experiments that over half of the acid in the feed at the end of the experiment was due to acid pretreatment. By adding the feed continuously, the proton concentration can be decreased from about 0.15 M to about 0.075 M which would increase the measured current efficiencies.

Although small changes were made in the last three runs to increase the achievable current density, the results obtained were very consistent and reproducible. Slight changes in the base current efficiency and water transport are due to changes in feed pH. During the testing about 25 L of lithium hydroxide and about 45 L of sulfuric acid was produced.

III. Conclusions

It has been shown that lithium hydroxide can be successfully recovered at high efficiencies from a lithium sulfate process stream at temperatures of about 40° C. or about 60° C., using electrolysis with Nafion 324 cation exchange membrane and either Asahi AAV or Fumatech FAB anion exchange membranes. Both anion membranes were efficient at acid production, but the FAB membrane allowed higher acid concentrations at similar current efficiencies. The FAB

TABLE 14

Summary of Production Runs with FAB.

| Experiment# | 856-49 | 856-56 | 856-63 |
|---|---|---|---|
| Membranes | NAF324/FAB | NAF324/FAB | NAF324/FAB |
| Temperature ° C. | 60 | 60 | 60 |
| Mode | Constant 7.8 V | Constant 7.8 V | Constant 7.8 V |
| Charge Passed (moles e/% theory Li) | 24.8/125.9 | 24.8/124.6 | 14.0/146.4 |
| Time (hr) | 55.2 | 51.56 | 28.5 |
| Avg CD (mA/cm$^2$) | 120.5 | 129 | 131.7 |
| Init [H$_2$SO$_4$] (molar) | 0.879 | 0.848 | 0.855 |
| Final [H$_2$SO$_4$] (molar) | 0.910 | 0.895 | 0.888 |
| Acid CE | 58.9 | 58.9 | 58.4 |
| Acid water transport (mol/mol SO$_4$) | 0.65 | −0.59 | 0.2 |
| [Li] and [Na] in initial acid (mMolar) | 0/1* | 0/0* | 0/0* |
| [Li] and [Na]* in final acid (mMolar) | 0/2* | 0/0* | 0/0* |
| Init Base [Li]/[Na]/[OH] (molar) | 2.57/0.14/2.57 | 2.55/0.13/2.45 | 3.04/0.14/3.08 |
| Final Base [Li]/[Na]/[OH] (molar) | 2.93/0.16/2.84 | 2.82/0.15/2.68 | 3.09/0.15/3.14 |
| Base CE | 68.6 | 65.5 | 63.7 |
| Base water transport (mol/mol Li + Na) | 7.7 | 8.0 | 8.2 |
| [SO$_4$] in base initial/final (mMolar) | 1.9/2.0 | 1.5/2.0 | 1.5/2.3 |
| Init Feed [Li]/[Na]/[SO$_4$] (molar) | 3.24/0.17/1.71 | 3.27/0.17/1.78 | 3.11/0.13/1.87 |
| Final Feed [Li]/[Na]/[SO$_4$] (molar) | 1.03/0.03/1.07 | 1.20/0.04/1.32 | 1.01/0.02/1.18 |
| % Li Removal | 85.4 | 81.6 | 84.4 |
| Feed pH | No pH control 3 down to 0.8 | Acid added initially to maintain 1.5, then pH went down to 0.73 | Add added initially to maintain 1.5, then pH went down to 0.79 |
| Li mass balance % | 104 | 104 | 105 |
| SO4 mass balance % | 103 | 102 | 104 |

*Corrected for Na added by KOH used for neutralization of sample prior to IC analysis.

membrane can also be run at higher temperatures (about 60° C.) which therefore, for example may decrease the amount of required cooling. Based on these considerations, the following process was defined using a combination of N324 and FAB.

Process Using N324/FAB Membranes

Based on the testing performed, the process would be expected to have the following characteristics:
- Sulfuric acid produced at a concentration of about 0.75 M
- Lithium Hydroxide produced at a concentration of about 3.2 M
- Average Current Density of about 100 mA/cm$^2$
- Current efficiency of about 75%
- Cell Voltage of about 6 V (see below for calculations)
- Water transport from feed to base of about 8 mol water per mol cation
- Water transport from feed to acid of < about 1 mol water per mol cation.

The cell voltage for the process in the MP cell was about 7.8 V. However, the lab cell has very large flow gaps between electrode and membranes (about 10 mm) which would be substantially reduced in the larger plant cell. The gap can typically be reduced to about 2 mm which will remove about 1.8 V from the total cell voltage (based on acid, base and feed conductivities of about 275 mS/cm, about 400 mS/cm and about 70 mS/cm, respectively). Using this reduced cell voltage and predicted current efficiency, the process would require a power consumption of about 8.9 kWh/kg of LiOH. (in an about 3.2 M solution). For a plant producing about 3 tonne/hour of LiOH, the plant would contain about 4500 m$^2$ of cell area, which would be a large electrochemical plant comparable to a moderate sized chlor-alkali plant. Other than when running at higher pH, there were no stability issues found for the membranes or electrodes.

SUMMARY

It has been shown in the studies of the present disclosure that lithium hydroxide can be successfully recovered at high efficiencies from a lithium sulfate process stream at temperatures of about 40° C. or about 60° C., using electrolysis with a Nafion 324 cation exchange membrane and either an Asahi AAV or a Fumatech FAB anion exchange membrane. In both cases, sulfuric acid was produced as the coproduct.

The Nafion 324 membrane was used in both electrolysis configurations tested. The cation membrane had very good efficiency for lithium production, making up to about 3.6 M hydroxide at a current efficiency of over about 70%. A higher efficiency at a lower concentration was shown to be possible, but the inefficiency of the anion membranes limits this need. While not wishing to be limited by theory, a lower acid efficiency effectively decreases the pH of the feed solution, resulting in either the use of some of the produced lithium hydroxide to maintain the pH or the competition of proton with lithium/sodium across the cation membrane. This effectively makes the efficiency of the process equal to the lowest efficiency of the two membranes.

The lithium sulfate feed contains a large concentration of sodium ion. The cation membrane is not selective and therefore the produced base contains sodium ion in roughly the same ratio as that found in the feed. The base also contained about 2 mM (about 200 ppm) of sulfate.

It was possible to obtain similar current densities of about 100 mA/cm$^2$ incorporating both Asahi AAV (at about 40° C.) and Fumatech FAB membrane (at about 60° C.). However, the AAV membrane gave current efficiencies of less than about 65% when the acid concentration was above about 0.5 M. The FAB acid efficiency was more dependent on acid concentration, giving about 75% current efficiency at about 0.9 M acid concentration. The acid efficiency dropped considerably above this value.

The current densities achieved when using the FAB membrane were very dependent on the pH of the feed solution (due to its higher resistance at higher pH). It was necessary to maintain a lower feed pH in order to achieve similar current densities to those with AAV membrane. This was done either by increasing the strength of the acid produced and thus also the backmigration of protons across the anion membrane into the feed compartment, or by running at a lower feed pH. Both conditions were found to result in a lower current efficiency for acid production as well as for production of lithium hydroxide by increasing the proton/Li ratio in the feed and thus also proton competition into the catholyte compartment.

Based on the testing performed in the studies of the present disclosure, the process would be expected to have the following characteristics:
- Sulfuric acid produced at a concentration of about 0.75 M
- Lithium hydroxide produced at a concentration of about 3.2 M
- Average current density of about 100 mA/cm$^2$
- Current efficiency of about 75%
- Cell voltage of about 6 V (in an engineered cell for the process)
- Water transport from feed to base of about 8 mol water per mol cation
- Water transport from feed to acid of < about 1 mol water per mol cation.

Although the above-described process shows promise, an alternate process where ammonium sulfate is produced instead of sulfuric acid may also be employed and details of that process along with at least some of its benefits are given below.

Example 3

Conversion of LiOH into $Li_2CO_3$

The lithium carbonate production mini-pilot plant comprised two circuits—the Lithium Hydroxide Carbonization Circuit (LC) and the Lithium Bicarbonate Decomposition Circuit (DC). All equipment that came in contact with the process solutions was made of either glass, plastic or Teflon®. Due to the highly corrosive and quality sensitive nature of the fluids, no metal was introduced to the process.

Lithium hydroxide solution produced from Example 2 was used as a feed for the lithium carbonate production. Tenors of select metals in the feed are listed in Table 15. The tenor in Li thus ranged from about 14 g/L to about 15.5 g/L (or the tenor of LiOH ranged from about 48.3 g/L to about 53.5 g/L).

TABLE 15

Select Assay Data of the Lithium Hydroxide Solution

| | Element tenor, mg/L | | | | | | | |
|---|---|---|---|---|---|---|---|---|
| Sampling | Li | Na | K | Ca | Mg | Ba | Sr | Fe |
| Feed Start | 15100 | 3830 | 110 | 3.2 | <0.07 | 0.061 | 0.589 | <0.2 |
| 28MAR 0600 | 15300 | 3780 | 123 | 3.8 | <0.07 | 0.064 | 0.602 | <0.2 |
| 29 Mar 0600 | 14000 | 3640 | 112 | 3.2 | <0.07 | 0.057 | 0.562 | <0.2 |

TABLE 15-continued

Select Assay Data of the Lithium Hydroxide Solution

| | Element tenor, mg/L | | | | | | | |
|---|---|---|---|---|---|---|---|---|
| Sampling | Li | Na | K | Ca | Mg | Ba | Sr | Fe |
| 30MAR 0600 | 14300 | 3630 | 120 | 3.7 | <0.07 | 0.065 | 0.637 | <0.2 |
| Average | 14675 | 3720 | 116 | 3.5 | <0.07 | 0.062 | 0.598 | <0.2 |

The LC circuit scheme is provided in FIG. 32. The lithium hydroxide carbonization (LC) process was conducted in an enclosed 4 L Pyrex® reactor. The reactor was equipped with an overhead impeller, sparger, level controller, pH probe and thermocouple. For example, a burp-type sparger can be used for $CO_2$ addition. The sparger was located below the impeller. For example, the below disposed sparger can ensure full dispersion of the gas. The $CO_2$ flow was controlled by pH of reaction slurry using a solenoid valve.

Peristaltic pumps were used for transferring solutions and slurries. The process slurry from LC was continuously pumped to the LC clarifier, where the solids were permitted to settle and the solution phase could continuously overflow back into the LC reactor. The clarifier solids were harvested from the clarifier underflow on a per shift basis and filtered through Whatman® #3 filter paper. The filter cakes were flood-washed in triplicate with hot reverse osmosis water and then dried on Pyrex® trays in an oven set to about 105 to about 110° C. The recovered filtrate was returned back to the LC circuit.

The LC reactor level was maintained at a constant volume of about 3 L by the level sensor controlling the bleed pump to the DC circuit. The LC circuit bleed line advanced LC clarifier overflow to the DC reactor. The DC circuit scheme is provided in FIG. 33. The DC process was conducted in an enclosed 4 L Pyrex® reactor. The reactor was placed in an electric heating mantle and equipped with an overhead impeller, pH probe and thermocouple. The solution in the DC Reactor was heated to about 95° C. in order to decompose lithium bicarbonate and drive the remaining lithium carbonate from solution. The resulting slurry was pumped to a heated clarifier. A bleed was taken from the top of the clarifier and collected in a DC Filtrate drum. The slurry level in the DC reactor was maintained by positioning the DC bleed tubing inlet in the clarifier at a fixed level and setting the bleed pump to a greater flow rate than that of the feed to the DC reactor. The thickened pulp was harvested on a per shift basis. The filtered cake was treated in the same manner as the LC reactor solids. The resulting solids represented a secondary lithium carbonate product. This DC solid stream was kept separate from the primary carbonate stream and was independently characterized.

Pilot Plant Operation

The Lithium Carbonate Production pilot plant ran continuously for 3 days, 24 hours per day, with three shifts of 8 hours each. Hourly readings were taken to monitor temperature and pH in LC and DC reactors as well as input and discharge rates of feed, $CO_2$ and spent solution. Grab samples from the LC circuit bleed and DC circuit bleed were collected every 4 hours and submitted for Atomic Absorption Spectroscopy for lithium analysis (referred to as Li-AAS). These assays provided a quick feedback on the performance of the process. Composite samples were collected from the LC and DC bleed streams every 4 hours and combined into 12-hour composite samples. The composite samples were analysed for Li-AAS and a spectrum of other elements using Inductively-Coupled Plasma (ICP scan). Feed grab samples were taken daily and submitted for Li-AAS and ICP scan assays.

During the operation of the pilot plant, the feed flow to the LC reactor was increased from about 30 to about 60 mL/min to observe the effect of retention time on LiOH carbonization efficiency. The operation conditions of the pilot plant are listed in Table 16.

TABLE 16

Conditions of Pilot Plant Operation

| | LC circuit | | | $CO_2$ | DC circuit | | |
|---|---|---|---|---|---|---|---|
| Period | Temp ° C. | Mixing RPM | Feed flow mL/min | flow actuated L/min | Reactor temp ° C. | Clarifier temp. ° C. | Mixing RPM |
| Start-up | 15-32 | 600 | 0 | 0.5-1 | | | |
| Day1 Cont. | 29-34 | 600 | 38-41 | 1-2 | 90-97 | 91-95 | 400 |
| Night 1 | 34-37 | 600 | 39-40 | 1.4-2.2 | 92-95 | 92-93 | 400 |
| Day 2 | 34-36 | 600 | 39-45 | 1-2.2 | 91-97 | 92-94 | 400 |
| Night 2 Cont. | 31-36 | 600 | 44-45 | 1.4 | 91-96 | 92-93 | 400 |
| Night 2 Batch | 36 | 600 | 0 | 1.4-1.6 | 92-95 | 92-93 | 400 |
| Day 3 | 31-35 | 600 | 44-64 | 1.2-2.4 | 84-96 | 92-93 | 400 |
| Night 3 | 32-35 | 600 | 58-61 | 1.2-2.5 | 82-99 | 92-93 | 400 |

During the 3-day pilot plant campaign, about 12.5 kg of lithium carbonate was produced; about 9.9 kg of product was harvested from the LC reactor and about 2.6 kg from the DC reactor. The masses of $Li_2CO_3$ solids produced during the pilot plant run are summarized in Tables 17 and 18.

TABLE 17

Lithium Carbonate Solids Harvested from LC Circuit

| Batch # | Date | Sample Time | Identifier | Wet Cake g | Moisture % | Dry Product weight g |
|---|---|---|---|---|---|---|
| 1 | March 27 | 12:00 | LC-Solids | June 24 | 38.3 | 334 |
| 2 | March 27 | 20:17 | LC-Solids | December 11 | 36.7 | 681.3 |
| 3 | March 28 | 1:30 | LC-Solids | January 25 | 52.6 | 704.2 |
| 4 | March 28 | 10:15 | LC solids | January 18 | 45.1 | 812.2 |
| 5 | March 28 | 17:28 | LC solids | September 13 | 38.2 | 610.2 |
| 6 | March 28 | 22:00 | LC solids | April 4 | 51.0 | 762.3 |
| 7 | March 29 | 3:00 | LC solids | March 31 | 51.4 | 399.2 |
| 8 | March 29 | 10:30 | LC solids | November 29 | 45.5 | 778.6 |
| 9 | March 29 | 19:36 | LC solids | December 22 | 35.7 | 933 |
| 10 | March 29 | 10:30 | LC solids | March 22 | 45.0 | 848.2 |
| 11 | March 30 | 3:45 | LC solids | July 21 | 46.6 | 694 |

TABLE 17-continued

Lithium Carbonate Solids Harvested from LC Circuit

| Batch # | Date | Sample Time | Identifier | Wet Cake g | Moisture % | Dry Product weight g |
|---|---|---|---|---|---|---|
| 12 | March 30 | 8:30 | LC solids | October 14 | 58.4 | 423.4 |
| 13 | March 30 | 10:17 | LC solids R | April 7 | 11.8 | 86.6 |
| 14 | March 30 | 10:30 | LC solids R | August 4 | 39.7 | 351.7 |
| 15 | April 2 | 8:52 | LC SolidsPost | Sepember 27 | 12.0 | 881.6 |
|  | April 2 |  | Reactor Scale |  |  | 520 |
|  | April 5 |  | Clarifier Scale |  |  | 76.5 |
|  |  |  | Total Solids | 16373 |  | 9897 |

TABLE 18

Lithium Carbonate Solids Harvested from DC Circuit

| Batch # | Date | Sample Time | Identifier | Wet Cake g | Moisture % | Dry Product weight g |
|---|---|---|---|---|---|---|
| 1 | March 28 | 7:00 | DC solids | May 28 | 27.1 | 374.7 |
| 2 | March 29 | 6:00 | DC solids | March 8 | 17.9 | 355.8 |
| 3 | March 30 | 0:30 | DC solids | August 16 | 29.5 | 419.7 |
| 4 | March 30 | 4:40 | DC Solids | June 10 | 55.8 | 233.5 |
| 5 | March 30 | 11:16 | DC Solids | Sepember 10 | 37.6 | 158.6 |
| 6 | March 30 | 12:00 | DC Solids R | January 5 | 15.5 | 930.8 |
|  | April 8 |  | Reactor scale |  |  | 140.0 |
|  | April 11 |  | Clarifier scale |  |  | 6.3 |
|  |  |  | Total Solids | 3426 |  | 2619 |

About 184 liters of lithium hydroxide solution containing about 14.7 g/L of lithium was processed (or about 50.8 g/L of lithium hydroxide) and about 161 litres of spent $Li_2CO_3$ solution containing about 1.39 g/L lithium were produced (or about 7.39 g/L of lithium carbonate). Masses and volumes of materials used daily are summarized in Table 19.

TABLE 19

Materials Used for Pilot Plant Operations

| Period | Feed Weight kg | Feed Volume L | DC Filtrate Weight kg | DC Filtrate Volume L | $CO_2$ Weight kg | $CO_2$ Volume L |
|---|---|---|---|---|---|---|
| Initial | 3.17 | 3.0 |  |  |  |  |
| Day 1 | 26.2 | 24.7 | 14.1 | 13.9 | 1.45 | 736 |
| Night 1 | 29.0 | 27.4 | 26.4 | 26.1 | 1.4 | 701 |
| Day 2 | 31.7 | 30.0 | 28.5 | 28.2 | 1.6 | 810 |
| Night 2 | 27.7 | 26.2 | 22.78 | 22.5 | 1.38 | 702 |
| Day 3 | 36.0 | 34.1 | 30.4 | 30.0 | 1.8 | 910 |
| Night 3 | 44.3 | 41.9 | 41.2 | 40.7 | 2.2 | 1096 |
| Total | 194.9 | 184.4 | 163.4 | 161.4 | 9.7 | 4954 |

Results and Discussion

At the start of the test, the LC reactor was charged with lithium hydroxide solution and agitated. The carbon dioxide flow was initiated and within one and a half hours the pH of the reaction slurry was lowered from about 12.6 to the set point of about pH 11.0.

When the target pH was approached the continuous mode of the pilot plant operation started. Addition of fresh lithium hydroxide solution to the LC reactor was started and the pH of the reaction slurry was maintained at a value of about pH 11.0 by controlled addition of $CO_2(g)$.

After about 2.5 hours of operation the overflow from the LC clarifier started and a bleed from the LC circuit was advanced to the DC reactor. It was expected that bleed solution from the LC reactor would contain about 3.5 to about 4 g/L Li as lithium carbonate. The Li tenor in LC circuit overflow fluctuated around 4 g/L and the tenor values are plotted against elapsed time in FIG. 34.

Analytical data of the composite solutions from the LC circuit for metals with concentrations exceeding the analytical detection limits are summarized in Table 20. A comparison of the LC bleed tenors to that of the LC feed solution (Table 15) indicated that Na and K tenors are only minimally affected by the LC process.

TABLE 20

Tenors of Selected Metals in Composite Samples from LC Circuit Bleed

| Sample ID | Tenor mg/L | | | | | | |
|---|---|---|---|---|---|---|---|
|  | Li | Na | K | Ca | Mg | Ba | Sr |
| 27Mar 1800 | 4150 | 3780 | 106 | 2.3 | 0.07 | <0.007 | 0.188 |
| 28Mar 0600 | 3940 | 3700 | 105 | 2.2 | <0.07 | <0.007 | 0.164 |
| 28Mar 1800 | 4618 | 3380 | 99 | 1.7 | <0.07 | <0.007 | 0.162 |
| 29Mar 0600 | 4030 | 3600 | 105 | 1.9 | <0.07 | 0.009 | 0.148 |
| 29Mar 1800 | 4315 | 3640 | 106 | 2.3 | <0.07 | 0.02 | 0.197 |
| 30Mar 0600 | 4510 | 3710 | 110 | 2.4 | <0.07 | <0.007 | 0.175 |

The lithium tenor in the DC bleed was about 1240 to about 1490 mg/L during the pilot plant. A considerable depletion of Li tenor in lithium carbonate solution was observed in the DC process (compared with about 2800 to about 4760 mg/L of Li in the LC bleed). Assay results for selected metals in the bleed from the DC circuit are summarized in Table 21. Similar to the LC process, a minimal change in Na and K tenors across the DC process was observed (compared to the LC bleed and the DC bleed in Table 20 and Table 21).

The assay data of the lithium carbonate solids produced during pilot plant are summarized in Tables 23 and 24.

Lithium carbonate samples from all batches, except "LC solids batch 13R" (Table 23), met the required specifications for lithium carbonate of about 99.9% purity. The $Li_2CO_3$ solids from batches "LC solids batch 12" and "LC solids batch 13R" were re-pulped and rewashed in an attempt to reduce the Na and K content of the solids. Dried products were submitted for assay. The re-pulped lithium carbonate contained significantly lower amounts of Na and K. It follows from the washing test that Na and K, can be removed from lithium carbonate solids by additional washing.

TABLE 21

Tenors of Selected Metals in Composite Samples of Bleed from DC Circuit

| Sample ID | Tenor mg/L | | | | | | |
|---|---|---|---|---|---|---|---|
| | Li | Na | K | Ca | Mg | Ba | Sr |
| 28Mar 0600 | 1450 | 3850 | 115 | 1.1 | <0.07 | <0.007 | 0.075 |
| 28Mar 1800 | 1449 | 3380 | 108 | 1.4 | <0.07 | <0.007 | 0.081 |
| 29 Mar 0600 | 1230 | 3590 | 107 | 2 | <0.07 | 0.021 | 0.068 |
| 29Mar 1800 | 1406 | 3610 | 102 | 1.2 | <0.07 | 0.011 | 0.079 |
| 30Mar 0600 | 1310 | 3530 | 103 | 2 | 0.1 | <0.007 | 0.074 |
| Bleed Drum | 1390 | 4010 | 103 | 1.4 | <0.07 | <0.007 | 0.08 |

The lithium tenor in the bleed from DC circuit is plotted against operation time in FIG. 35.

Table 22 summarizes the data on the LiOH feed solution and carbon dioxide gas usage for each 12-hour period of pilot plant operation. Also included in Table 22 are the data on materials used for the periods of batch or continuous modes and for test with increased feed flow rate. Carbon dioxide was utilized with an efficiency of about 90.2% for the overall pilot plant. Increasing the feed flow rate to the LC reactor from about 30 to about 60 mL/min had little impact on the $CO_2$ utilization efficiency.

TABLE 22

Data on Carbon Dioxide Utilization

| | Feed | | Li | | $CO_2$ | |
|---|---|---|---|---|---|---|
| Test ID | Used L | Li tenor g/L | Converted g | Needed kg | Used kg | Utilization % |
| Start-up | 3.0 | 15.1 | 45.4 | 0.14 | 0.1 | 119.8 |
| Day1 Cont | 21.7 | 15.1 | 328.3 | 1.04 | 1.3 | 78.5 |
| Day 1 total | 24.7 | 15.1 | 373.7 | 1.18 | 1.4 | 81.9 |
| Night 1 | 27.4 | 15.1 | 413.6 | 1.31 | 1.4 | 95.3 |
| Day 2 | 30.0 | 15.3 | 459.5 | 1.46 | 1.6 | 91.6 |
| Night 2 Cont1 | 18.8 | 15.3 | 287.7 | 0.91 | 1.0 | 95.5 |
| Night 2 Batch | 2.94 | 15.3 | 45.0 | 0.14 | 0.2 | 78.0 |
| Night 2 | 26.2 | 15.3 | 401.5 | 1.27 | 1.4 | 92.2 |
| Day 3 | 19.1 | 14 | 267.0 | 0.85 | 1.0 | 82.2 |
| 60 mL/min | | | | | | |
| Day 3 total | 34.1 | 14 | 477.1 | 1.51 | 1.8 | 84.6 |
| Night 3 | 41.9 | 14.3 | 598.8 | 1.90 | 2.15 | 88.2 |
| Overall PP | 184.4 | | 2769.5 | 8.78 | 9.7 | 90.2 |

TABLE 23

Assay Results for $Li_2CO_3$ Solids Harvested from LC Circuit

| | Elements, % | | | |
|---|---|---|---|---|
| Sample ID | Na | K | Ca | Mg |
| LC Solids Batch 1 | 0.007 | <0.002 | 0.0025 | <0.00007 |
| LC Solids Batch 2 | 0.009 | <0.002 | 0.0028 | <0.00007 |
| LC Solids Batch 3 | 0.014 | <0.002 | 0.0023 | <0.00007 |
| LC Solids Batch 4 | 0.007 | <0.002 | 0.0026 | <0.00007 |
| LC Solids Batch 5 | 0.006 | <0.002 | 0.0025 | <0.00007 |
| LC Solids Batch 6 | 0.004 | <0.002 | 0.0027 | <0.00007 |
| LC Solids Batch 7 | 0.004 | <0.002 | 0.0028 | <0.00007 |
| LC Solids Batch 8 | 0.013 | <0.002 | 0.0021 | <0.00007 |
| LC Solids Batch 9 | 0.011 | <0.002 | 0.0026 | <0.00007 |
| LC Solids Batch 10 | 0.010 | <0.002 | 0.0025 | <0.00007 |
| LC Solids Batch 11 | 0.012 | <0.002 | 0.0028 | <0.00007 |
| LC Solids Batch 12 | 0.032 | 0.002 | 0.0027 | <0.00007 |
| Repulped Batch 12 | 0.007 | <0.002 | 0.0026 | <0.00007 |
| LC Solids Batch 13 R | 0.042 | 0.003 | 0.0055 | <0.00007 |
| Repulped Batch 13 R | 0.024 | <0.002 | 0.0052 | <0.00007 |
| LC Solids Batch 14R | 0.009 | <0.002 | 0.0028 | <0.00007 |
| Post LC Prod | 0.011 | <0.002 | 0.0042 | <0.00007 |

TABLE 24

Assay Results for $Li_2CO_3$ Solids Harvested from DC Circuit

| | Elements, % | | | |
|---|---|---|---|---|
| Sample ID | Na | K | Ca | Mg |
| DC Solids Batch 1 | <0.002 | <0.002 | 0.003 | <0.00007 |
| DC Solids Batch 2 | <0.002 | <0.002 | 0.0019 | <0.00007 |
| DC Solids Batch 3 | <0.002 | <0.002 | 0.0019 | <0.00007 |
| DC Solids Batch 4 | <0.002 | <0.002 | 0.0014 | <0.00007 |
| DC Solids Batch 5 | <0.002 | <0.002 | 0.0019 | <0.00007 |
| DC Solids Batch 6 R | 0.009 | <0.002 | 0.0083 | <0.00007 |

TABLE 25

Assay data for combined $Li_2CO_3$ products

| Analyte | Spec | LC Prod Low Na | LC Prod High Na | DC Prod Low Ca | DC Prod High Ca | LC Post Solids |
|---|---|---|---|---|---|---|
| Na | <400 ppm | 60 | 100 | <20 | 70 | 100 |
| Sulphur (S) | <200 ppm | <100 | <100 | <100 | <100 | <100 |
| Chlorides (Cl) | <100 ppm | 19 | 14 | 22 | 21 | 22 |
| Ca | <100 ppm | 28 | 28 | 18 | 64 | 49 |
| Mg | <100 ppm | <0.7 | <0.7 | <0.7 | <0.7 | <0.7 |
| K | <50 ppm | <20 | <20 | <20 | <20 | <20 |
| B | <10 ppm | <4 | <4 | <4 | <4 | <4 |
| Fe | <5 ppm | <2 | <2 | <2 | <2 | <2 |

TABLE 25-continued

Assay data for combined Li$_2$CO$_3$ products

| Analyte | Spec | LC Prod Low Na | LC Prod High Na | DC Prod Low Ca | DC Prod High Ca | LC Post Solids |
|---|---|---|---|---|---|---|
| Cr | <5 ppm | <1 | <1 | <1 | <1 | <1 |
| Ni | <5 ppm | <1 | <1 | <1 | <1 | <1 |
| Cu | <5 ppm | <1 | <1 | <1 | <1 | <1 |
| Pb | <5 ppm | <0.2 | 0.4 | <0.2 | <0.2 | <0.2 |
| Al | <5 ppm | <4 | <4 | <4 | <4 | <4 |
| Zn | <5 ppm | <1 | 1 | <1 | <1 | <1 |
| Mn | <5 ppm | <0.4 | <0.4 | <0.4 | <0.4 | <0.4 |
| Li$_2$CO$_3$ Grade, % | >99.5% | 99.9893 | 99.9858 | 99.994 | 99.9845 | 99.9829 |
| LOD @ 110° C. % | | 0.35 | 0.42 | 0.32 | 0.29 | 0.33 |
| LOI @ 500° C., % | | 0.58 | 0.47 | <0.1 | <0.1 | 0.5 |

Note:
Li$_2$CO$_3$ grade determined by difference

Moreover, the DC circuit product has a finer particle size than the solids from the LC circuit: about 80% of particles in the DC product are under about 57 μm compared to about 80% being under about 104 μm in the LC product.

A mass balance of the overall pilot plant is summarized in Table 26. It is evident from the data provided in the table that about 88% of the lithium was converted to the lithium carbonate solids. Sodium and potassium does not precipitate with lithium carbonate.

TABLE 26

Mass Balance Summary:

| Materials | Vol | Wt | Assays mg/L, g/t, % | | | |
|---|---|---|---|---|---|---|
| IN | L | g | Li | Na | K | Ca |
| Feed Day 1 | 39.0 | | 15100 | 3830 | 110 | 3.2 |
| Feed Day 2 | 58.0 | | 15300 | 3780 | 123 | 3.8 |
| Feed Day 3 | 65.8 | | 14000 | 3640 | 112 | 3.2 |
| Feed Day 4 | 21.6 | | 14300 | 3630 | 120 | 3.7 |
| CO$_2$ | 4954 | | 0 | 0.00 | 0.00 | 0.00 |
| OUT | L | g | Li | Na | K | Ca |
| DC Bleed | 161.5 | | 1390 | 4010 | 103 | 1.4 |
| DC filtrate | 2.6 | | 1680 | 4320 | 129 | 1.3 |
| LC filtrate | 0.4 | | 3060 | 3680 | 109 | 1.7 |
| Post LC filtrate | 2.1 | | 1300 | 3860 | 119 | <0.9 |
| Wash | 46.1 | | 1850 | 851 | 25 | 1 |
| Post LC wash | 1.0 | | 1890 | 851 | 25 | 1 |
| LC Prod Low Na | 4023 | | 17.9 | 0.01 | <0.002 | 28 |
| LC Prod High Na | 4310 | | 18.3 | 0.01 | <0.002 | 28 |
| DC Prod Low Ca | 1168 | | 18.8 | <0.002 | <0.002 | 18 |
| DC Prod High Ca | 1306 | | 19.2 | 0.01 | <0.002 | 64 |
| LC Post Solids | 881.6 | | 17.9 | 0.01 | <0.002 | 49 |
| Scale solids | 829.4 | | 19.2 | 0.01 | <0.002 | 64 |

| Materials | Wt | Weights, g | | | |
|---|---|---|---|---|---|
| IN | kg | Li | Na | K | Ca |
| Feed Day 1 | 41.2 | 588.5 | 149.3 | 4.3 | 0.1 |
| Feed Day 2 | 61.3 | 887.1 | 219.2 | 7.1 | 0.2 |
| Feed Day 3 | 69.6 | 921.8 | 239.7 | 7.4 | 0.2 |
| Feed Day 4 | 22.8 | 308.4 | 78.3 | 2.6 | 0.1 |
| CO2 | 9.7 | 0 | 0 | 0 | 0 |
| Sum IN | 205 | 2706 | 686 | 21.4 | 0.64 |
| OUT | kg | Li | Na | K | Ca |
| DC Bleed | 163.5 | 224.5 | 647.6 | 16.6 | 0.2 |
| DC filtrate | 2.6 | 4.31 | 11.1 | 0.33 | 0.003 |
| LC filtrate | 0.4 | 1.1 | 1.3 | 0.04 | 0.001 |
| Post LC filtrate | 2.2 | 2.8 | 8.3 | 0.3 | 0 |

TABLE 26-continued

Mass Balance Summary:

| | | | | | |
|---|---|---|---|---|---|
| Wash | 46.6 | 85.4 | 39.3 | 1.2 | 0.05 |
| Post LC wash | 1.0 | 1.9 | 0.9 | 0.0 | 0.001 |
| LC Prod Low Na | 4.0 | 720 | 0.2 | 0 | 0.1 |
| LC Prod High Na | 4.3 | 789 | 0.4 | 0 | 0.1 |
| DC Prod Low Ca | 1.2 | 220 | 0 | 0 | 0.02 |
| DC Prod High Ca | 1.3 | 251 | 0.1 | 0 | 0.1 |
| LC Post Solids | 0.9 | 158 | 0.1 | 0 | 0.04 |
| Scale solids | 0.8 | 159 | 0.1 | 0 | 0.1 |
| Sum OUT | 170 | 2616 | 709 | 18.4 | 0.7 |
| IN-OUT | 35.1 | 89.9 | −22.9 | 3.0 | −0.1 |
| Accountability % | 82.9 | 96.7 | 103.3 | 86.1 | 111.9 |

| Distribution % | | | | |
|---|---|---|---|---|
| Calculated Head | Li | Na | K | Ca |
| Solids | 87.8 | 0.1 | 0.0 | 61.0 |
| Spent | 8.9 | 94.2 | 93.7 | 32.3 |
| Wash | 3.3 | 5.7 | 6.3 | 6.6 |
| Sumcheck | 100 | 100 | 100 | 100 |

It was thus demonstrated that sparging a lithium hydroxide solution with carbon dioxide gas is an effective method for conversion of lithium hydroxide to high-purity and high quality lithium carbonate. In fact, the average carbon dioxide utilization efficiency of the process was about 90%. It was also demonstrated that lithium carbonate production from lithium hydroxide could operate in a continuous manner. A lithium carbonate production process comprising: i) lithium hydroxide carbonization and ii) lithium bicarbonate decomposition and precipitation, was shown to be efficient. Both (i) and (ii) produced a high grade lithium carbonate product. The pilot plant produced about 12.5 kg of lithium carbonate solids having a Li$_2$CO$_3$ grade of >99.9%. The achieved Li conversion from LiOH to Li$_2$CO$_3$ was about 88%. Sodium and potassium did not co-precipitate with the Li$_2$CO$_3$.

Example 4

Alternate Process Using Ammonia to Neutralize Acid

Applicant has previously shown in WO 2014/138933 (hereby incorporated by reference in its entirety) that lithium hydroxide can be successfully recovered at high efficiencies from a lithium sulfate process stream at temperatures of about 40° C. or about 60° C., using electrolysis with a Nafion 324 cation exchange membrane and either an Asahi AAV or a Fumatech FAB anion exchange membrane. In both cases, sulfuric acid was produced as a coproduct. An alternate process where ammonium sulfate is produced instead of sulfuric acid may be useful and the present disclosure details work demonstrating its feasibility. Tests were performed using a similar electrolysis cell as in WO 2014/138933, except that the highly resistive proton-blocking Fumatech™ FAB membrane was replaced with a Neosepta™ AHA membrane. The AHA membrane is an anion membrane manufactured by Astom™ (Japan) with a higher temperature stability (about 80° C.) that have good electrical resistance for sulfate transport.

Current efficiency for hydroxide production (about 80% at about 3 M) matched the highest obtained in the previous studies when the feed was kept at an about neutral pH. Salt production at very high efficiency was initially possible. However, as the batch proceeded the hydroxide inefficiency (about 20%) caused an increase in the feed pH and the hydroxide in the feed competed with sulfate transport across the AHA membrane.

Based on the testing performed in the present studies, a continuous process using Nafion 324 and AHA membranes at about 60° C. would be expected to have the following characteristics, and is compared with results for the known Sulfuric Acid Process in Table 27 below.

TABLE 27

Comparison of Sulfuric Acid and Ammonium Sulfate Processes

| | Sulfuric Acid Process | Ammonium Sulfate Process |
|---|---|---|
| Recommended Process | Batch | Continuous |
| Membranes | N324/FAB | N324/AHA |
| Sulfuric Acid/Ammonium Sulfate | 0.75M | 3M |
| Lithium Hydroxide | 3-3.2M | 3-3.2M |
| Average Current Density | 100 mA/cm$^2$ | 150 mA/cm$^2$ |
| Current Efficiency for Hydroxide | 75% | 80% |
| Cell Voltage in Custom Cell | 6 V | 4.6 V |
| Water Transport: Feed to Base | 8 mol water per mol cation | 8 mol water per mol cation |
| Water Transport: Feed to Acid | <1 mol water per mol cation | 12 mol water per mol cation |

Previous studies by Applicant (WO 2014/138933) have shown that lithium hydroxide can be successfully recovered at high efficiencies from a lithium sulfate process stream at temperatures of about 40° C. or about 60° C., using electrolysis with a Nafion 324 cation exchange membrane and either an Asahi AAV or a Fumatech FAB anion exchange membrane. In both cases, sulfuric acid was produced as a coproduct. The production of sulfuric acid can limit, for example the choice of anion membrane in the system, the acid concentration which can be achieved and the temperature of operation.

Certain anion exchange membranes such as a proton-blocking membrane which has a high resistance especially for sulfate transport such as the Fumatech FAB membrane or a similar membrane, may, for example limit the current density achieved in a process for preparing lithium hydroxide. However, these membranes can be limited to a temperature of about 60° C.

Highly concentrated ammonium sulfate (> about 2 M) can be produced in a similar electrolysis cell, and due, for example to the buffering capacity of bisulfate and the ability to dissolve ammonia in solution, it is possible to make the anolyte solution non-acidic as shown in FIG. 36. In this way, proton-blocking anion exchange membranes, for example may not be required and alternative membranes, for example a Neosepta AHA membrane which is capable of running at a temperature of about 80° C. and that should have lower resistance can be used.

Such a process may, for example remove the higher resistance FAB membrane possibly allowing operation at either higher current density (thereby reducing membrane area), lower voltage (thereby reducing power consumption) or a combination of the two. It may also, for example, generate an alternate commercial material. Ammonium sulfate can be sold as an ingredient for fertilizer and should have a higher value than the sulfuric acid. It is also, for example expected to remove more water during the electrolysis from the feed thereby allowing more efficient operation over a wider range of feed conversion. It may also, for example, allow operation of the process at a higher temperature requiring less cooling of solutions. Solutions and membranes are also less resistive at these higher temperatures decreasing power consumption.

The tests performed on this system, where the anion membrane used in the previous process (Fumatech FAB) is replaced by a Neosepata AHA (Astom Corp.) membrane and ammonia is used to control the pH of the "acid" compartment of the cell are summarized below.

The experiments were carried out in an Electrocell MP cell similarly equipped to that used in the previous studies by Applicant (WO 2014/138933) but wherein the anion membrane was replaced with a Neosepta AHA (Astom Corp.) membrane.

The various electrolyte circuits were similar to those used in the previous studies (WO 2014/138933), except that pH control was added to the anolyte (acid/salt) circuit. The pH controller actuated a solenoid valve which allowed addition of ammonia gas directly to the anolyte reservoir. Care was taken to not allow the anolyte pH to increase above about 5 as the DSA-O$_2$ coating can be removed at high pH. In addition to those analyses previously performed, ammonium ion was analyzed by cation ion chromatography. All other aspects of the experimental setup were the same as described previously.

During the course of the present studies, experiments of varying duration were performed. These experiments evaluated the effect of temperature, current density, feed conversion, acid/salt concentration, base concentration and pH control strategy on current efficiencies, voltage and water transport. Concentration ranges and current efficiencies are summarized in Table 28. In the first two experiments, the concentration of base and acid/salt were allowed to increase from their starting values. The second experiment ran over two days to provide a greater amount of sulfate removal. In this case, due to volume limitations of the setup, water had to be added to the feed to obtain more than about 90% removal. In the remaining experiments water was only added to the acid and base compartments in an effort to maintain about constant salt and base concentrations (simulating continuous production). Experiments 856-81 through 856-86 were run under about constant acid (about 2.5-3 M sulfate) and base (about 2.8-3.1 M hydroxide) to probe the effect of varying temperature and current density. The final two experiments varied the control pH of the acid compartment in an effort to mediate problems with the resulting feed pH.

Figure 39A:
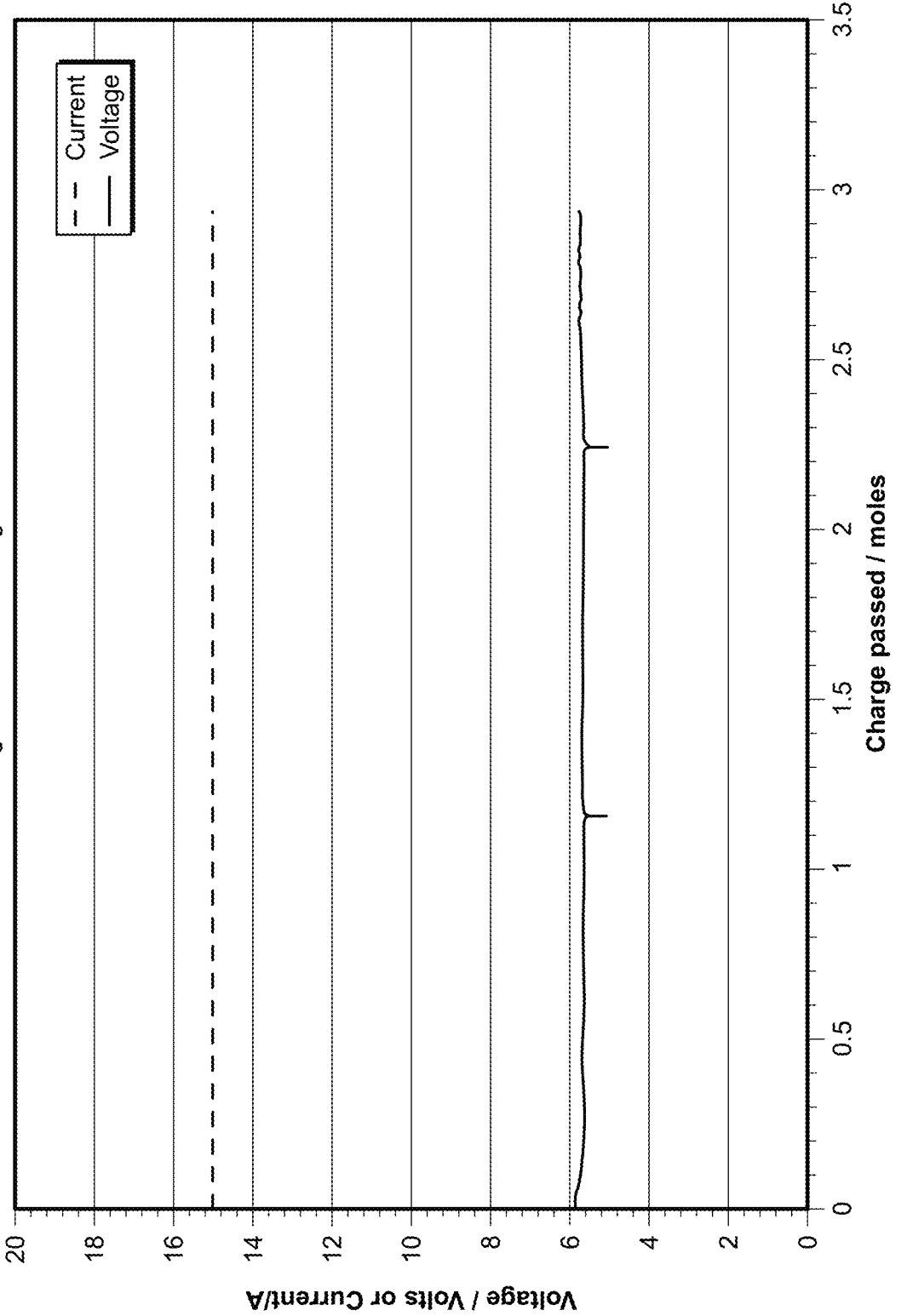
Figure 39B:
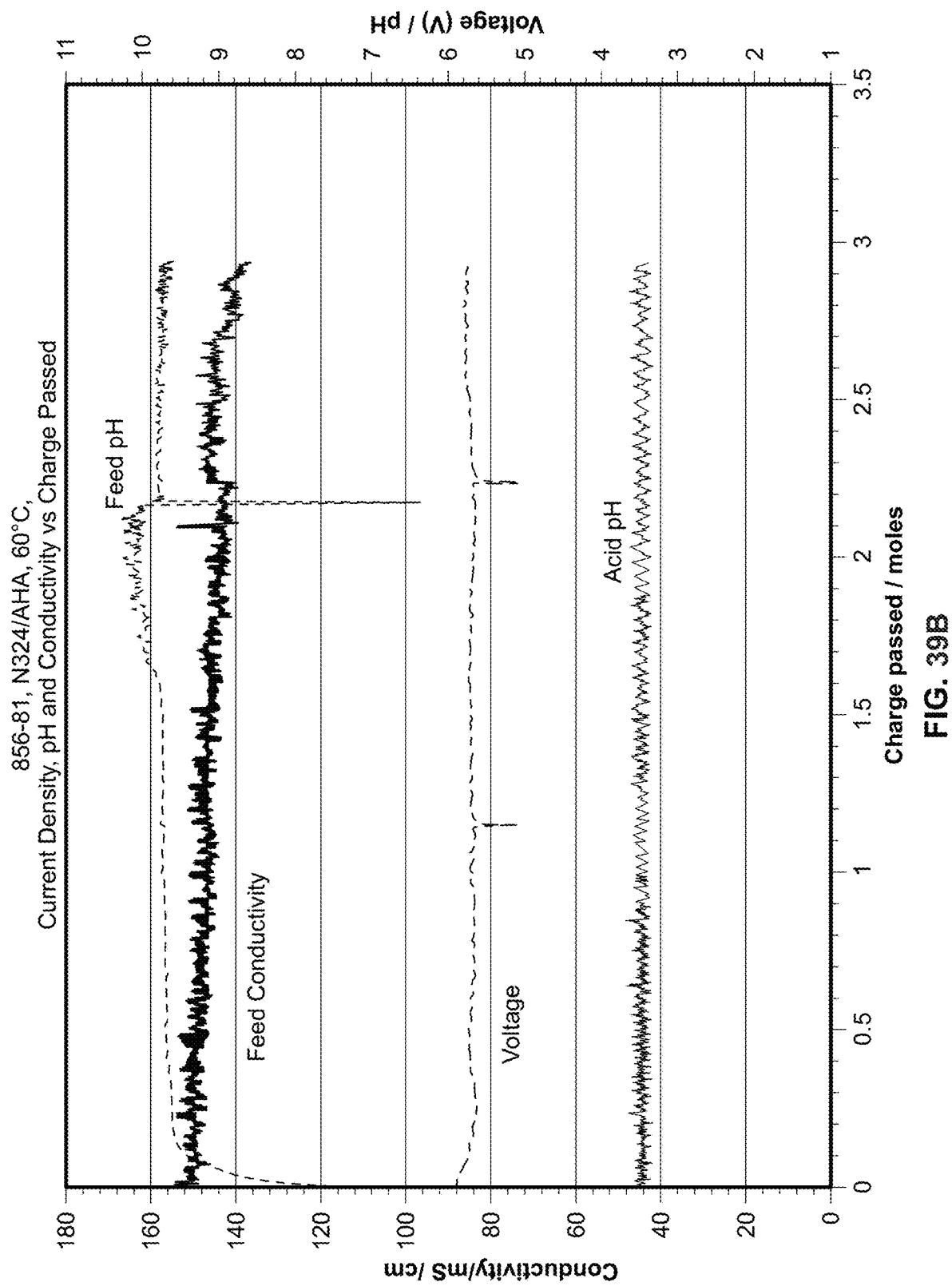
Figure 39C:
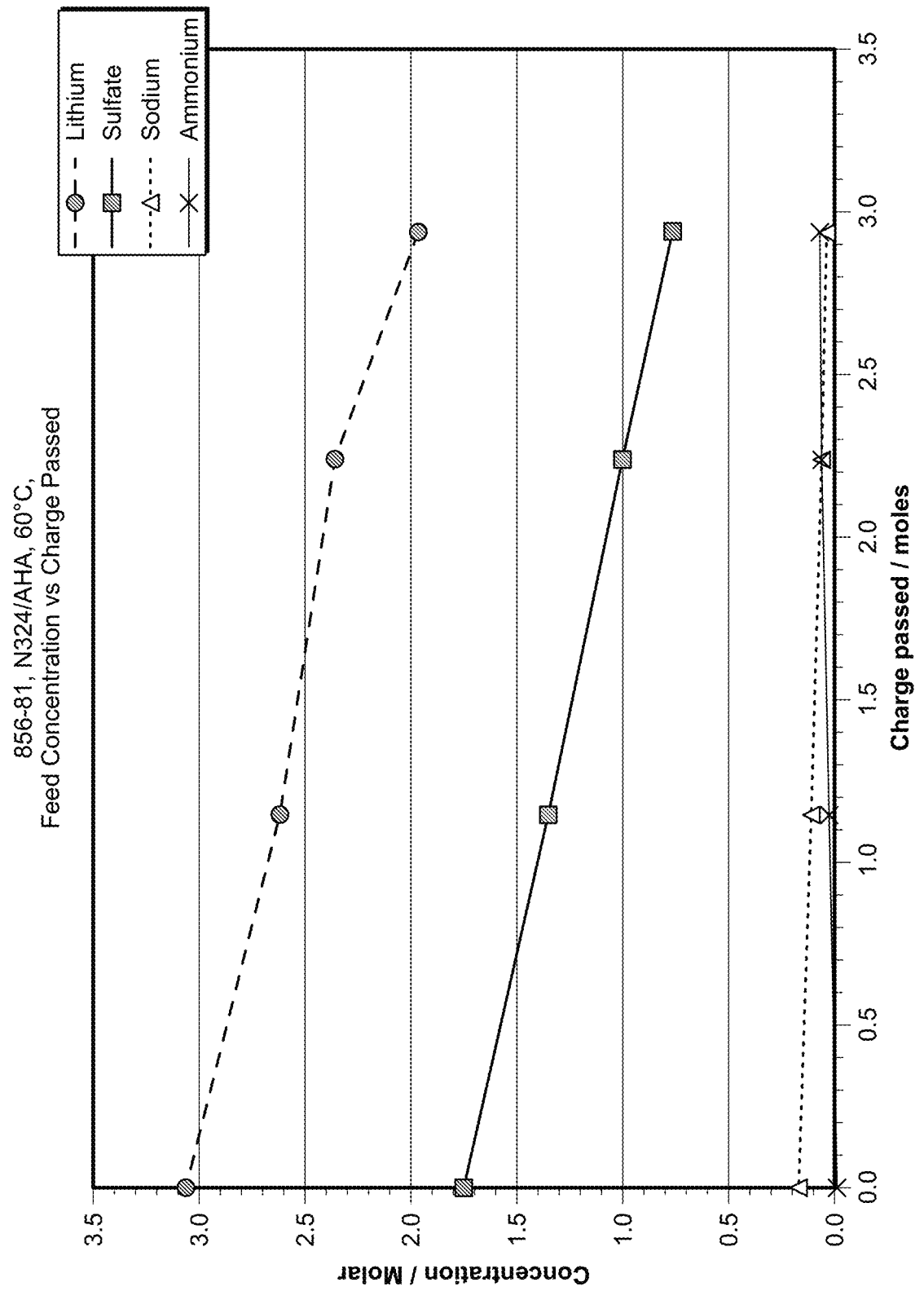
Figure 39D:
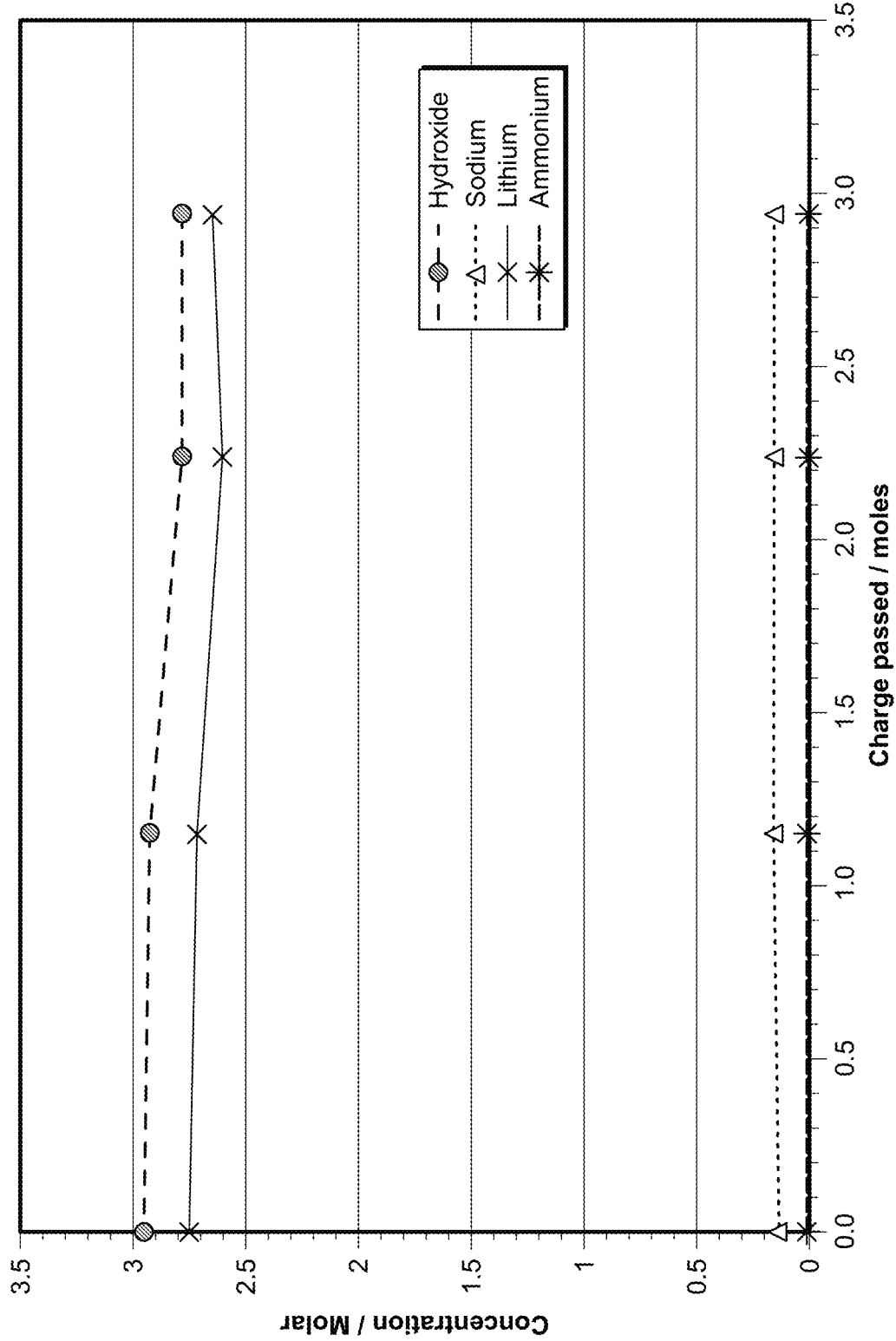

As shown in FIG. 39D, the composition of the hydroxide was mostly as lithium/sodium hydroxide with the ratio of lithium and sodium similar to that found in the feed.

Ammonium Sulfate Production

Figure 39E:
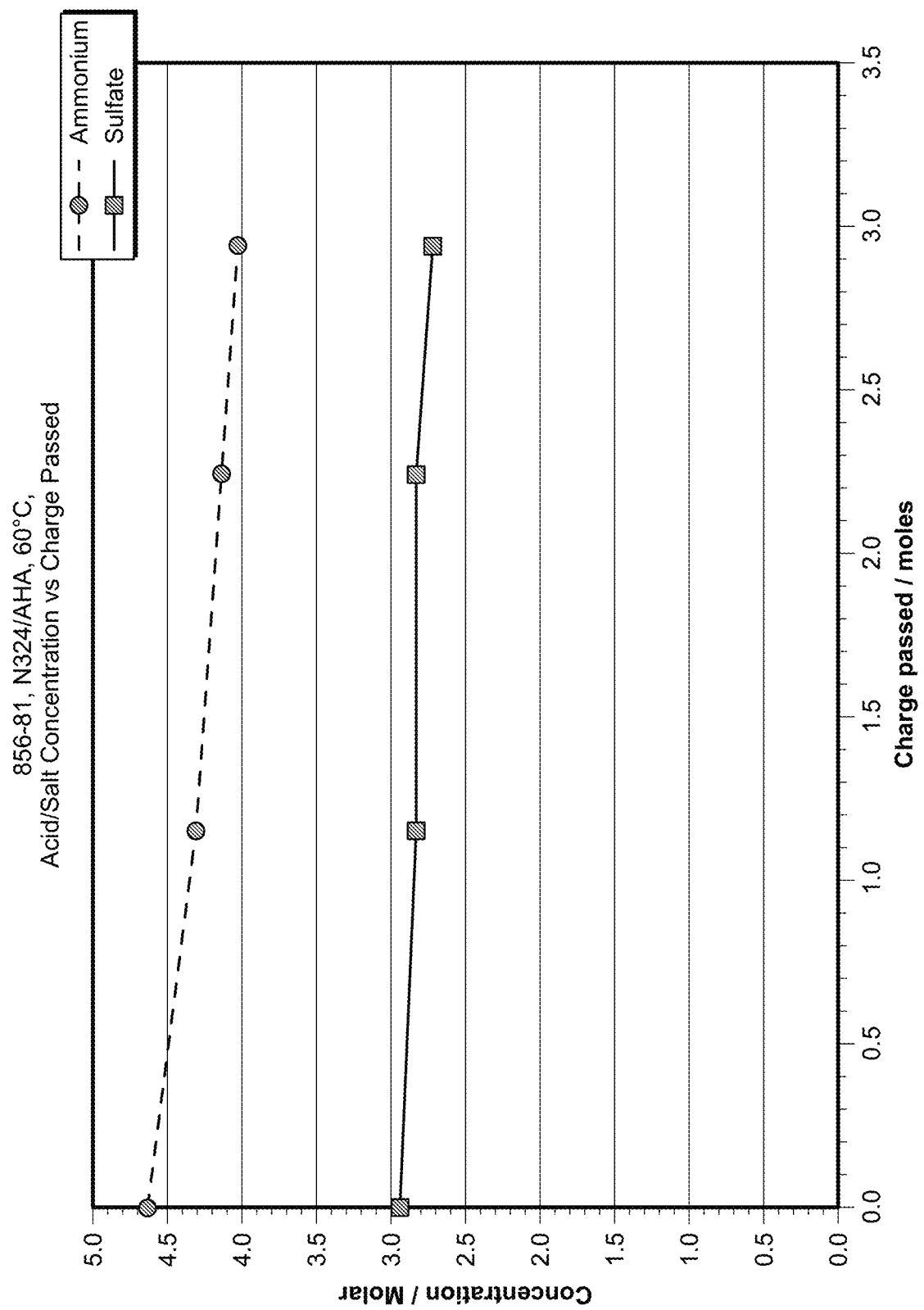
Figure 39F:
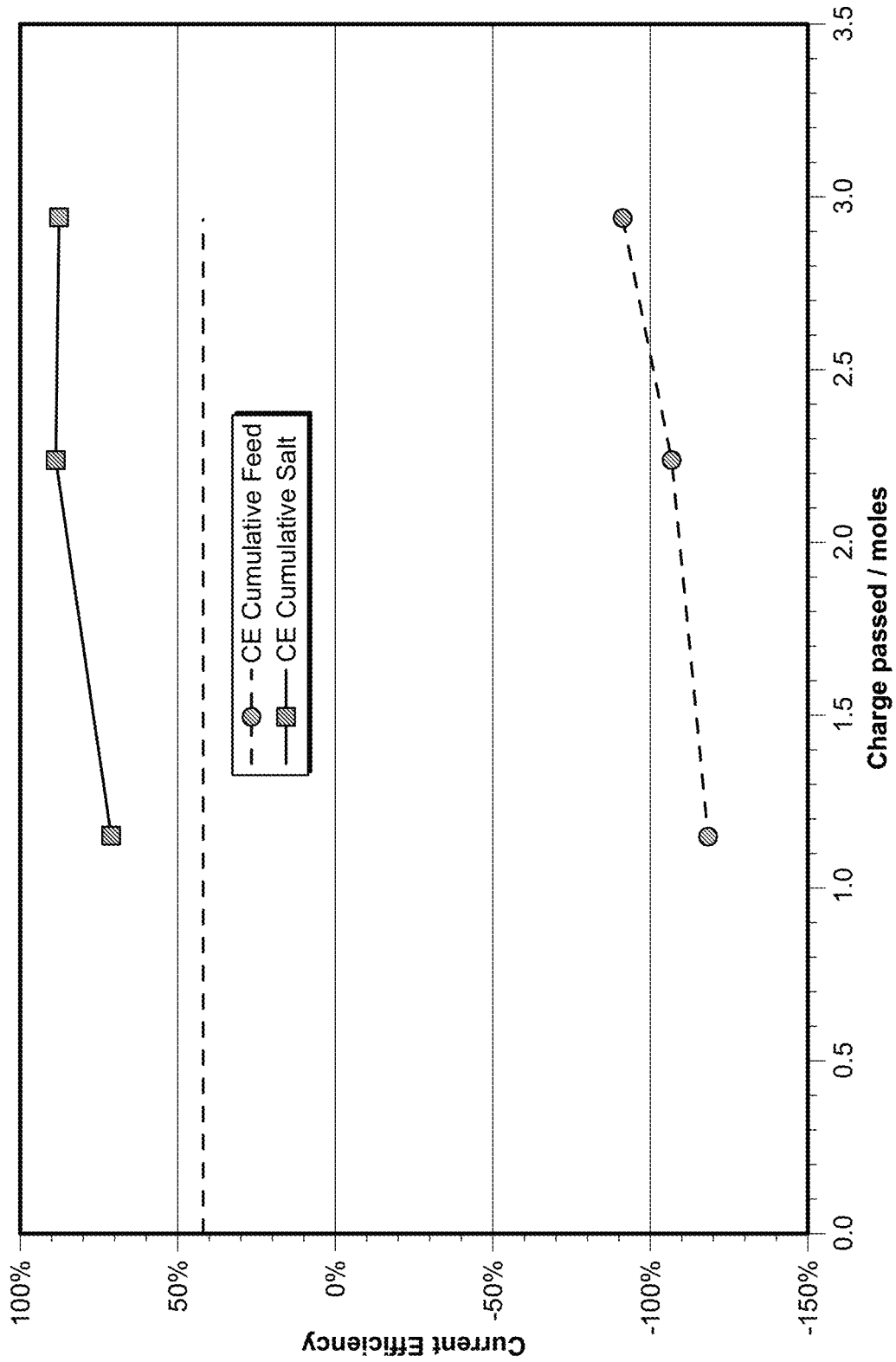

In the majority of the experiments, the ammonium sulfate concentration was kept at about 2.5 to about 3 M sulfate as shown in FIG. 39E, which provided current efficiencies of about 90%. The loss of efficiency could not be accounted for by ammonium back migration. In the first experiment where the ammonium sulfate was at low concentration, very little ammonium was found in the feed (< about 20 mM) which

TABLE 28

Summary of Results for Ammonium Sulfate Production.
Sulfate current efficiency (CE) reported for each of the product streams.

| | | FEED | | | ACID | | BASE | |
|---|---|---|---|---|---|---|---|---|
| Experiment | Conditions | $[SO_4^{2-}]$/M | $SO_4^{2-}$ $CE^3$ | % REMOVAL | $[SO_4^{2-}]$/M | $SO_4^{2-}$ CE | $[OH^-]$/ M | $OH^-$ CE |
| 856-71 | 150 mA/cm², 60° C., no water | 1.60-1.06 | 94% | 61% | 1.00-1.26 | 93% | 1.43-2.97 | 76% |
| 856-78 | 150 mA/cm², 60° C., water to base and feed | 1.74-0.18 | 84% | 95% | 2.69-3.37 | 77% | 2.34-3.38 | 77% |
| 856-81 | 150 mA/cm², 60° C., water to base and acid | 1.77-0.78 | 91% | 80% | 2.95-2.74 | 88% | 2.97-2.79 | 79% |
| 856-84 | 200 mA/cm², 60° C., water to base and acid | 1.56-0.67 | 80% | 83% | 2.47-2.38 | 88% | 2.79-3.08 | 83% |
| 856-86 | 200 mA/cm², 80° C., water to base and acid | 1.67-0.63 | 83% | 86% | 2.39-2.63 | 88% | 3.08-2.97 | 80% |
| 856-88 | 200 mA/cm², 60° C., lower acid pH | 1.73-0.82 | 83% | 78% | 2.53-2.70 | 87% | 2.97-3.20 | 80% |
| 856-90 | cont. 856-88 with new feed | 1.73-0.75 | 72% | 81% | 2.70-3.72 | 75% | 3.20-3.49 | 73% |

Typically the sulfate current efficiency in the feed should equal the sulfate current efficiency in the acid. As shown in Table 28, there is a discrepancy of up to about 8% in some of the experiments. While not wishing to be limited by theory, the majority of this error is likely due to volume measurement error due to hold in the setup, for example when dealing with solutions of high concentration.

FIGS. 37-43 are plots relating to the experiments summarized in Table 28: FIGS. 37A-D relate to experiment 856-71; FIGS. 38A-G relate to experiment 856-78; FIGS. 39A-G relate to experiment 856-81; FIGS. 40A-F relate to experiment 856-84, FIGS. 41A-G relate to experiment 856-86; FIGS. 42A-G relate to experiment 856-88; and FIG. 43 relates to experiment 856-90. The following sections further discuss the results of the present studies and aspects of the processes.

Lithium Hydroxide Production

The process produced lithium hydroxide at hydroxide concentrations of about 3 M. The efficiency was fairly consistent throughout the testing, giving numbers slightly below about 80% at about 150 mA/cm², increasing to over about 80% at the higher current density. In the last experiment, the lithium hydroxide concentration was allowed to increase to about 3.5 M and the current efficiency decreased by about 7%. In these experiments, the efficiency is predominantly hydroxide back migration as, unlike the previous studies, the pH of the feed was always greater than about 7 eliminating any proton transport. However, there may also be some inefficiency associated with ammonium transport.

accounts for less than about 1% of the charge. When the ammonium concentration was increased, the ammonium concentration increased to about 100 mM, which is still less than about 2% of the charge. Further analysis suggests that the remaining charge was due to hydroxide transport from the feed to the acid. The hydroxide back migration across the N324 membrane caused the feed pH to increase. Since experiment 856-78 was run to a greater percent removal, the experiment ran for a longer period of time at the higher hydroxide concentration, thereby decreasing the current efficiency of sulfate across the AHA membrane. Further details of this effect and its consequences are discussed in the next section.

Lithium Sulfate Feed Depletion

Figure 39G:
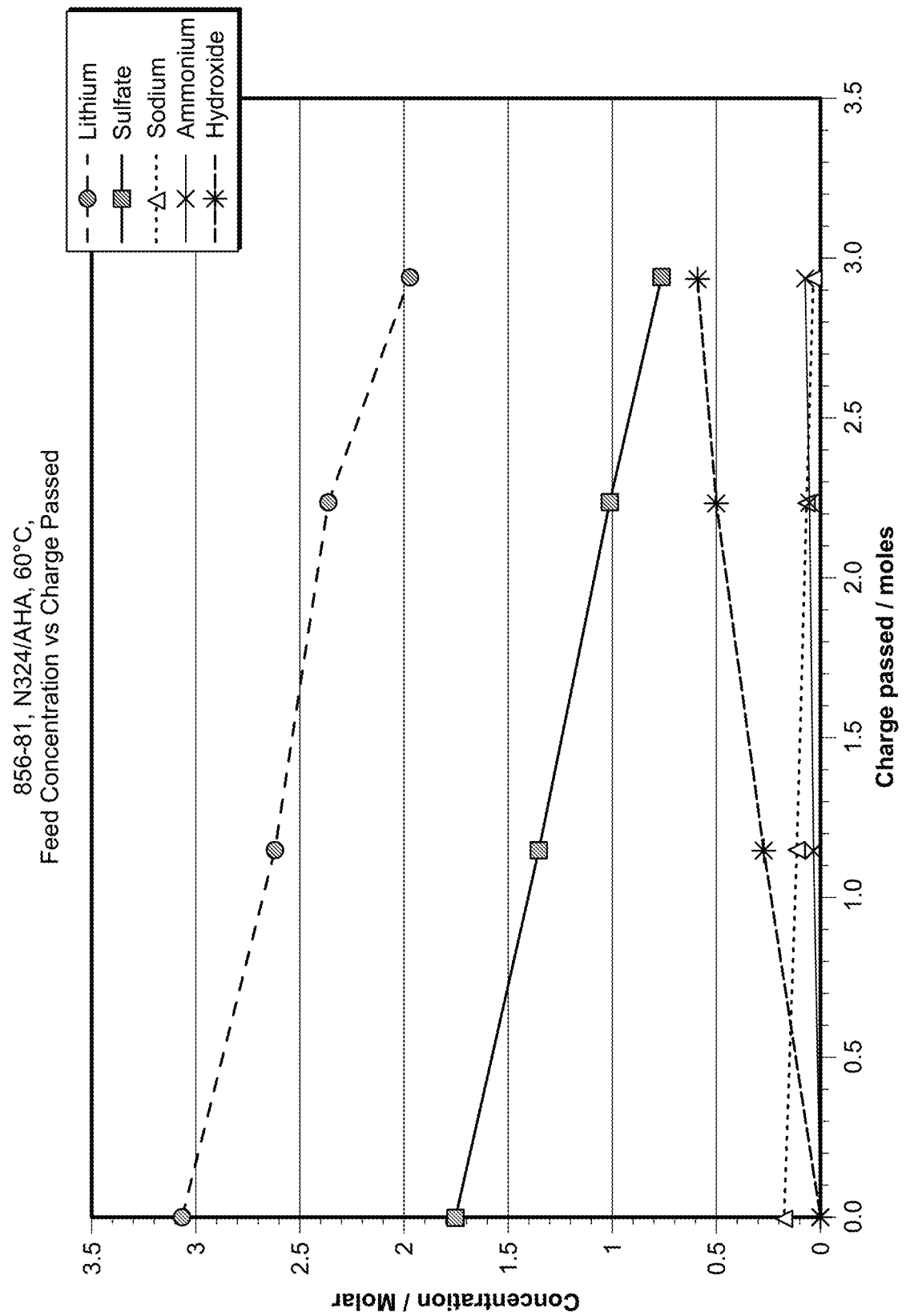
Figure 40A:
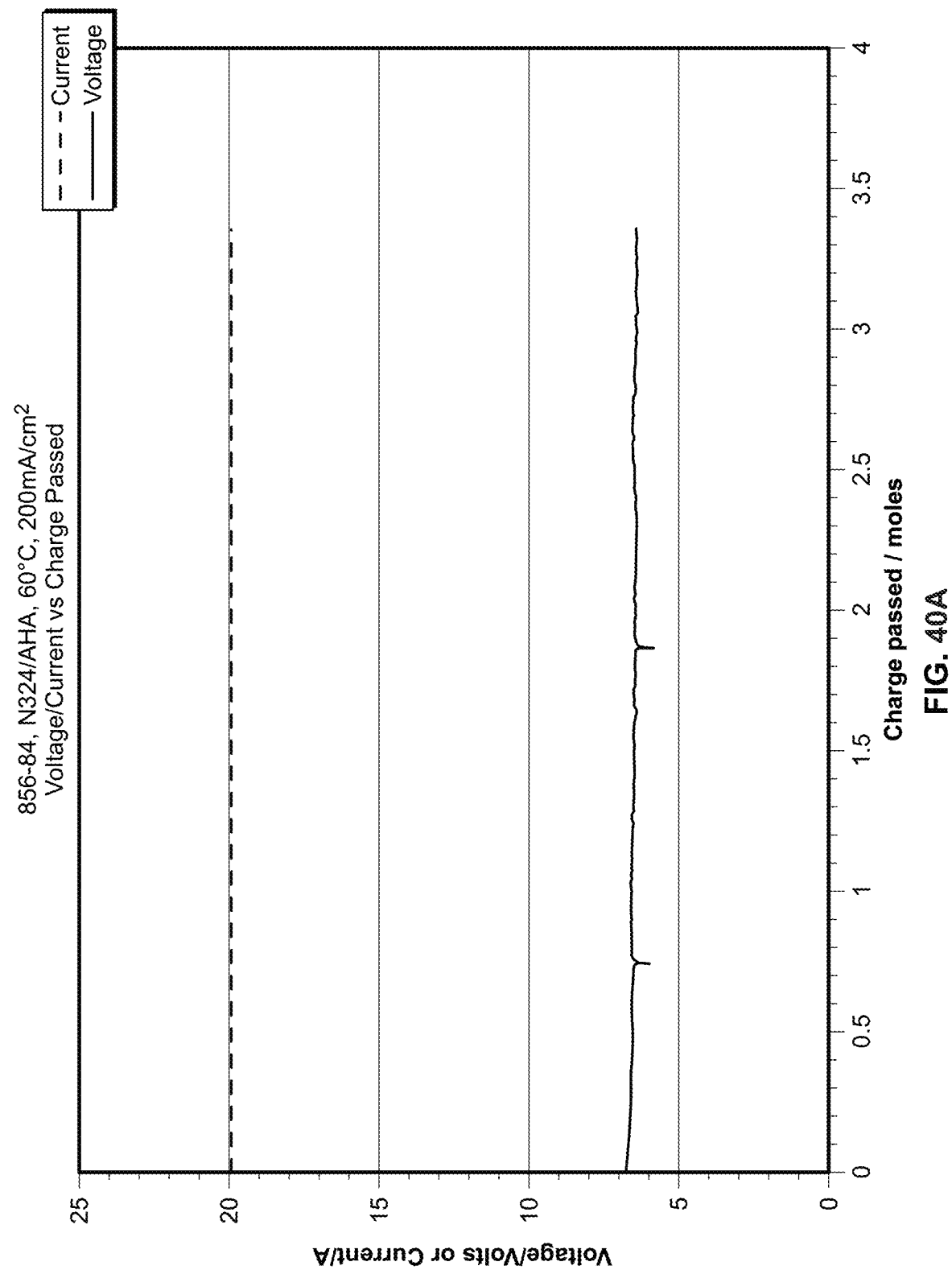
Figure 40B:
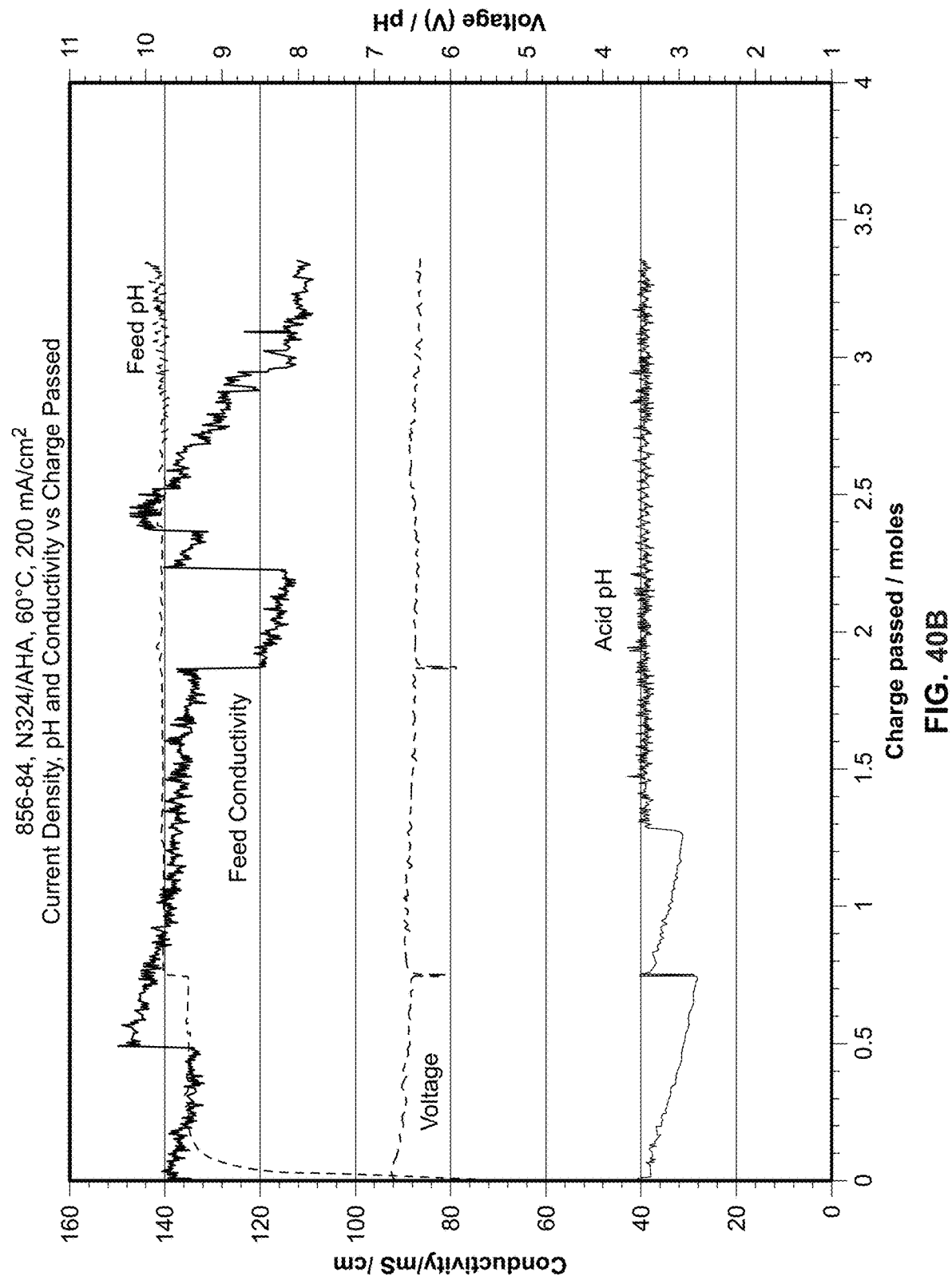
Figure 40C:
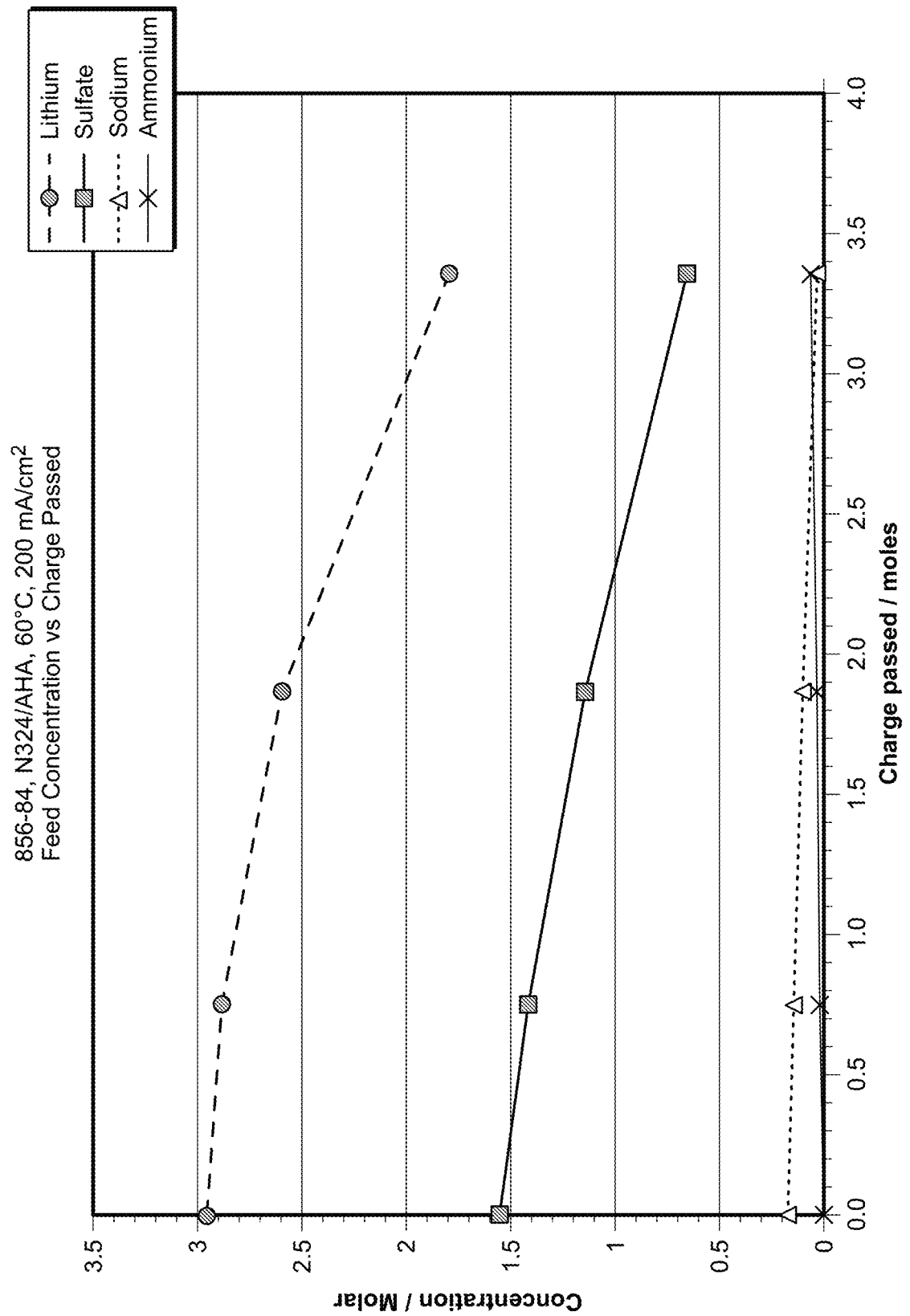
Figure 40D:
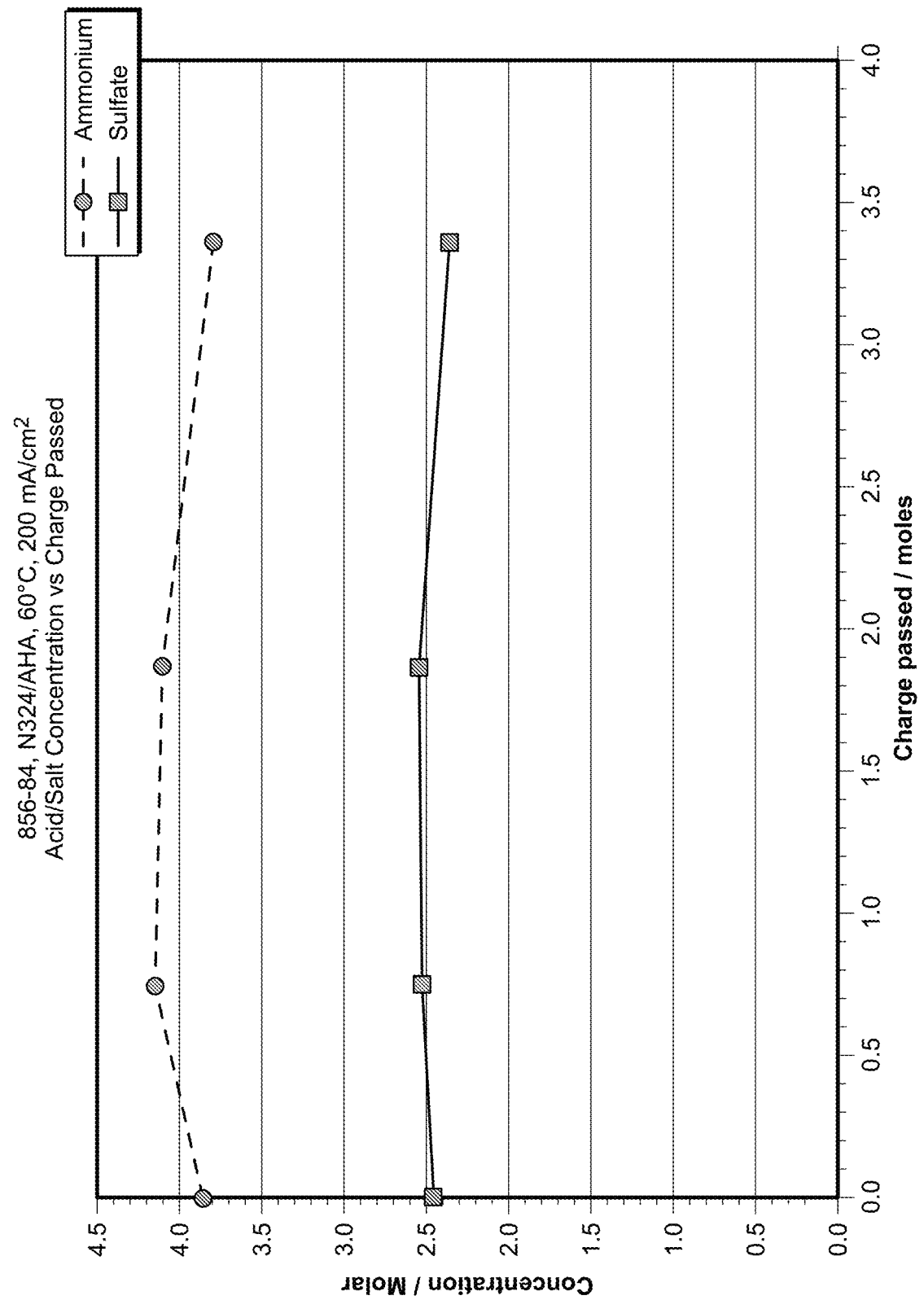
Figure 40E:
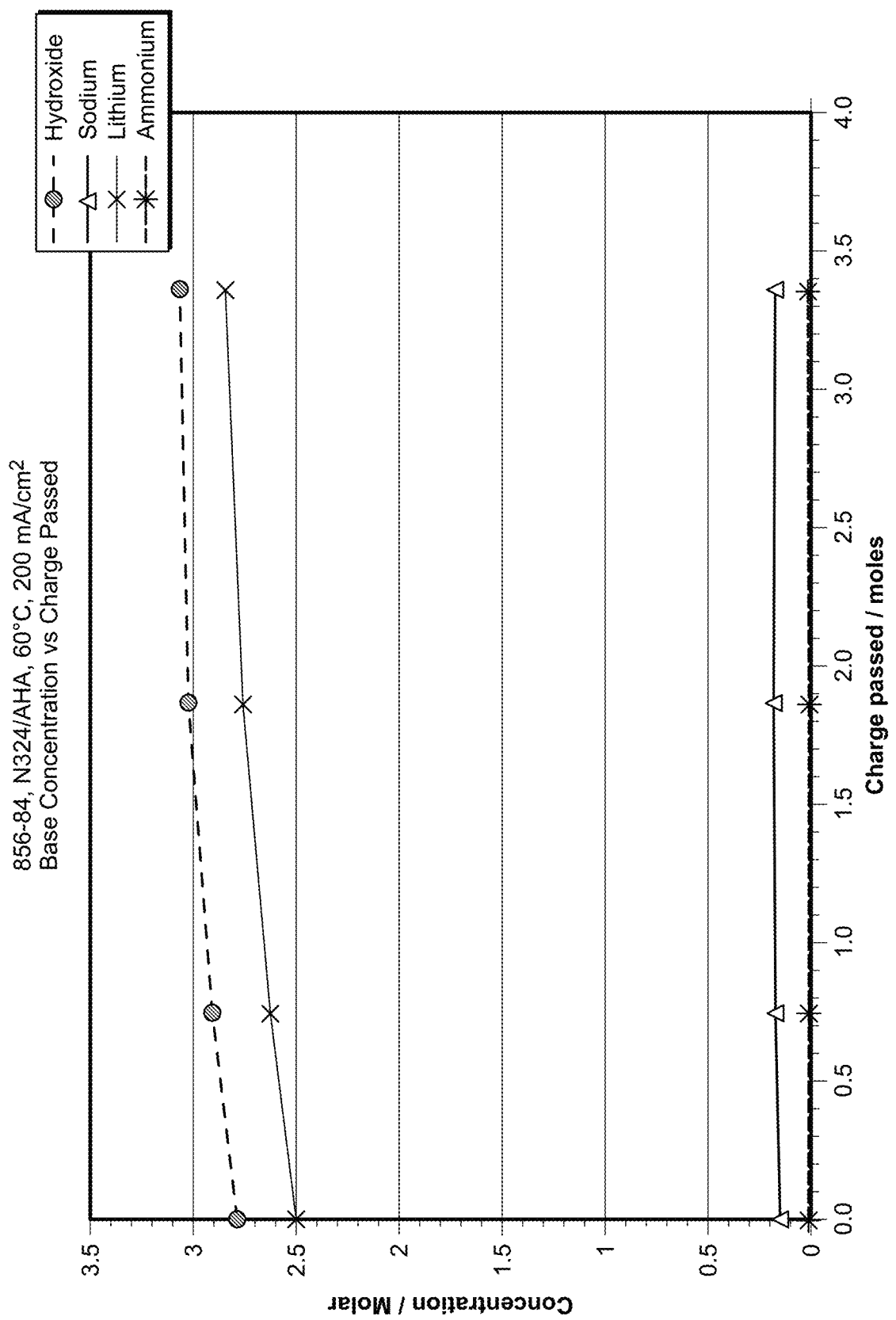
Figure 40F:
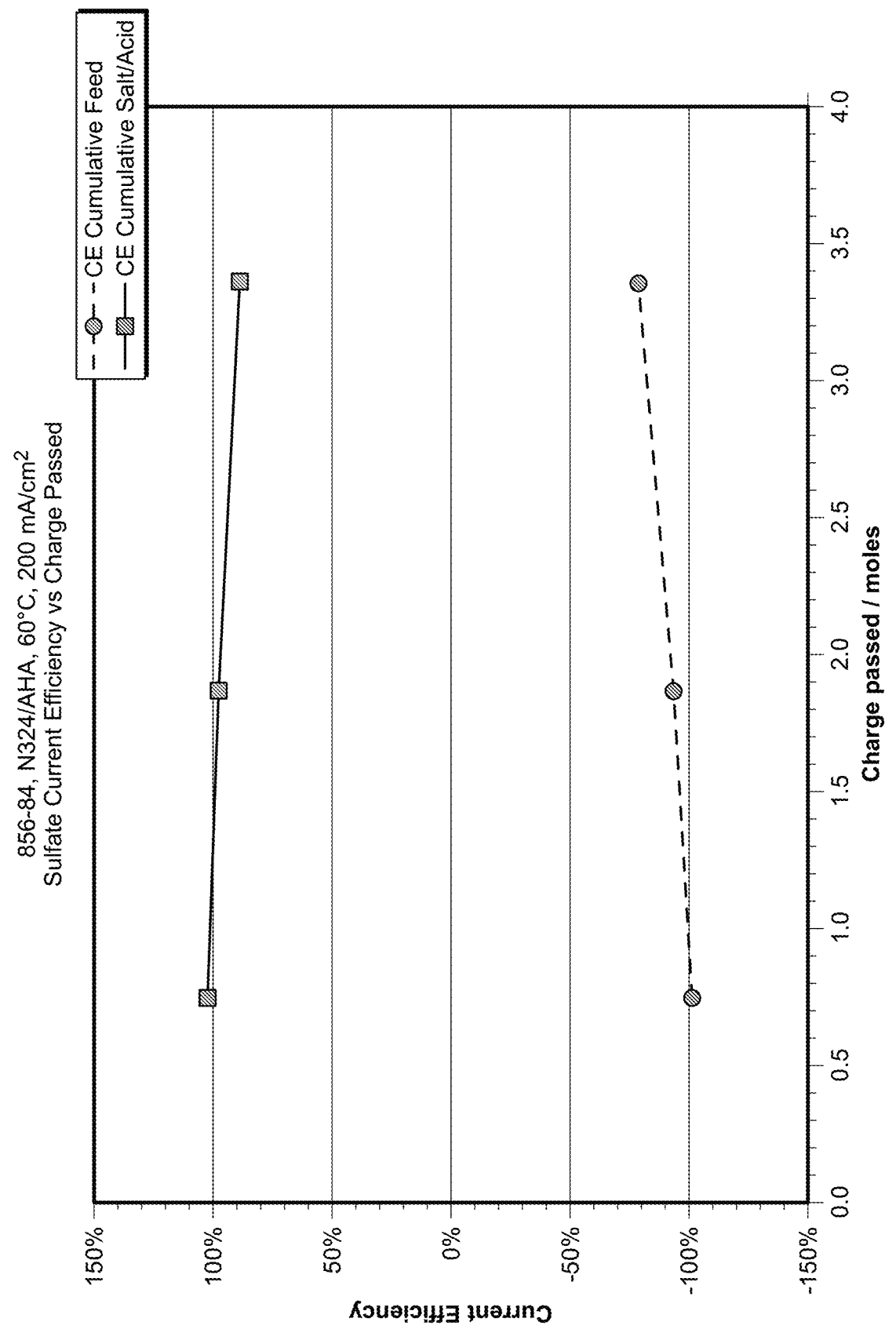
Figure 41A:
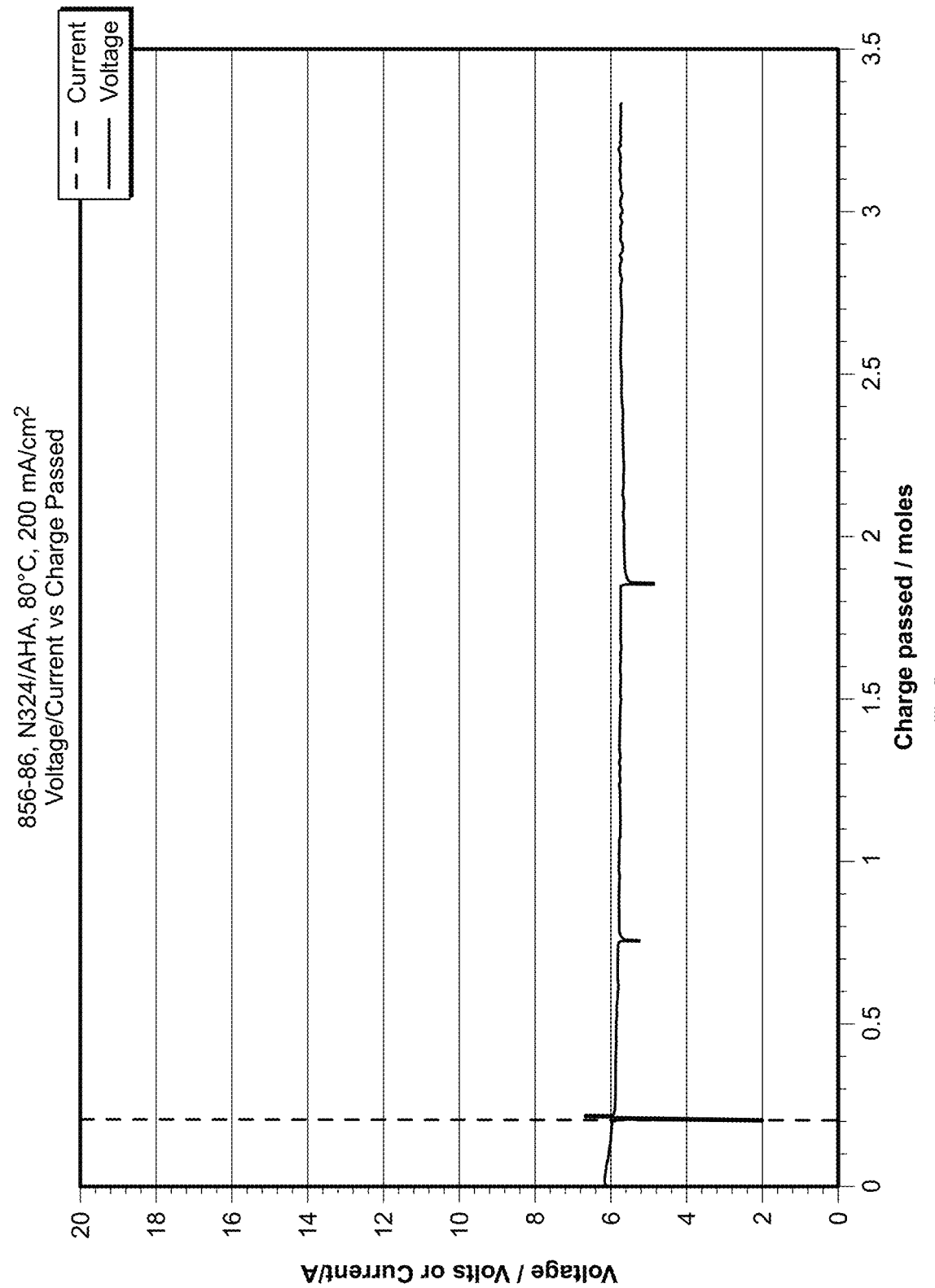
Figure 41B:
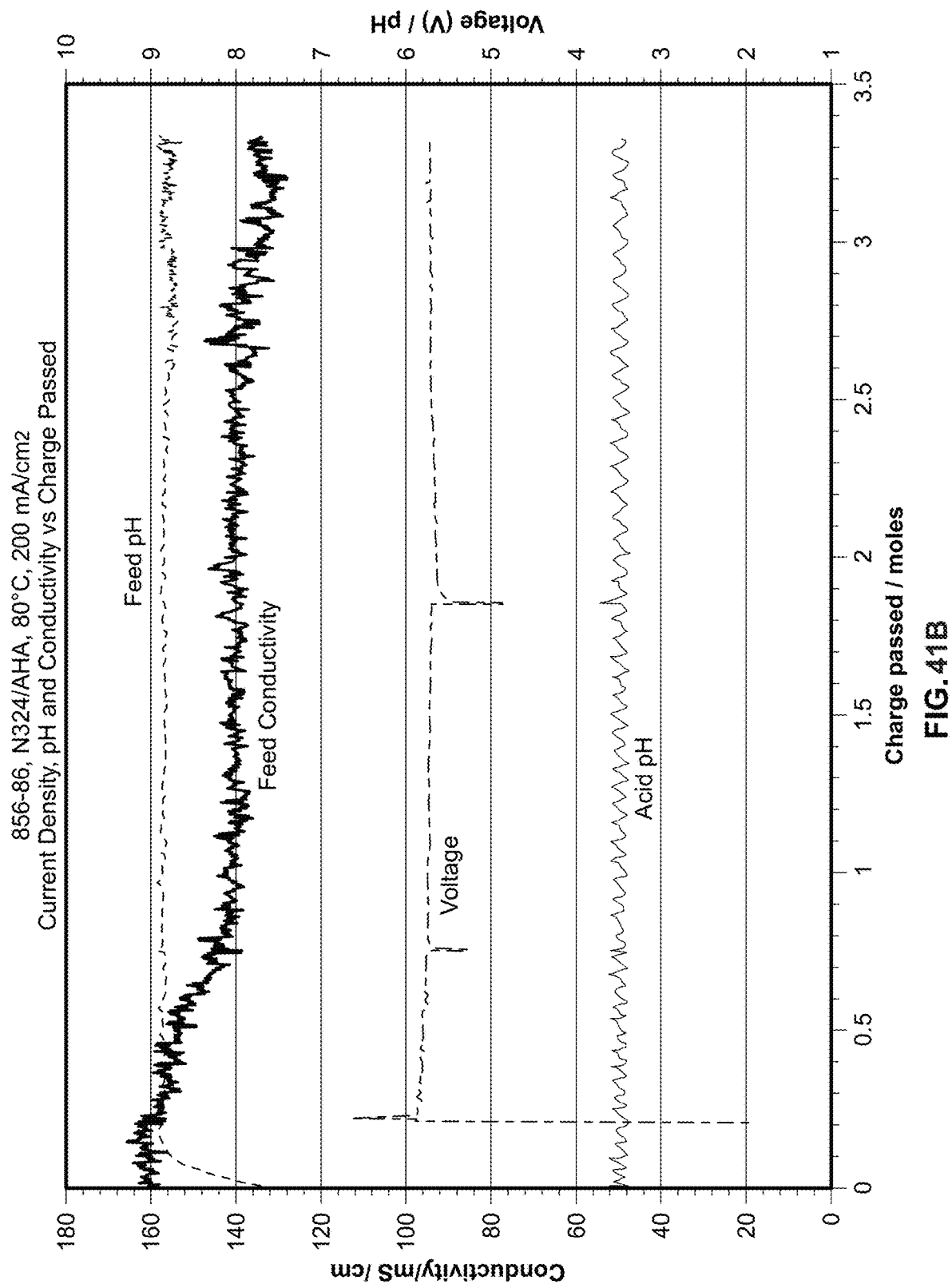
Figure 41C:
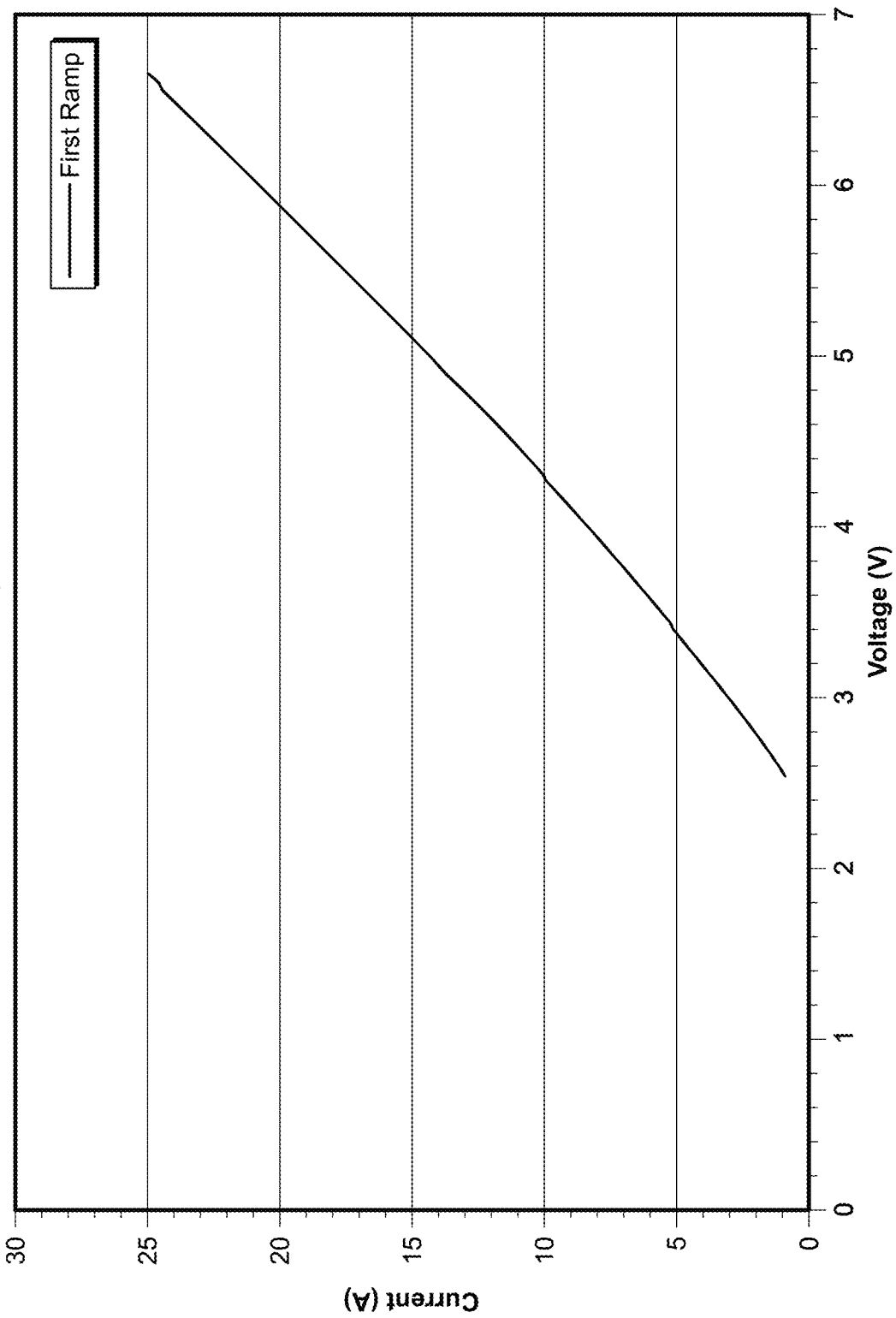
Figure 41D:
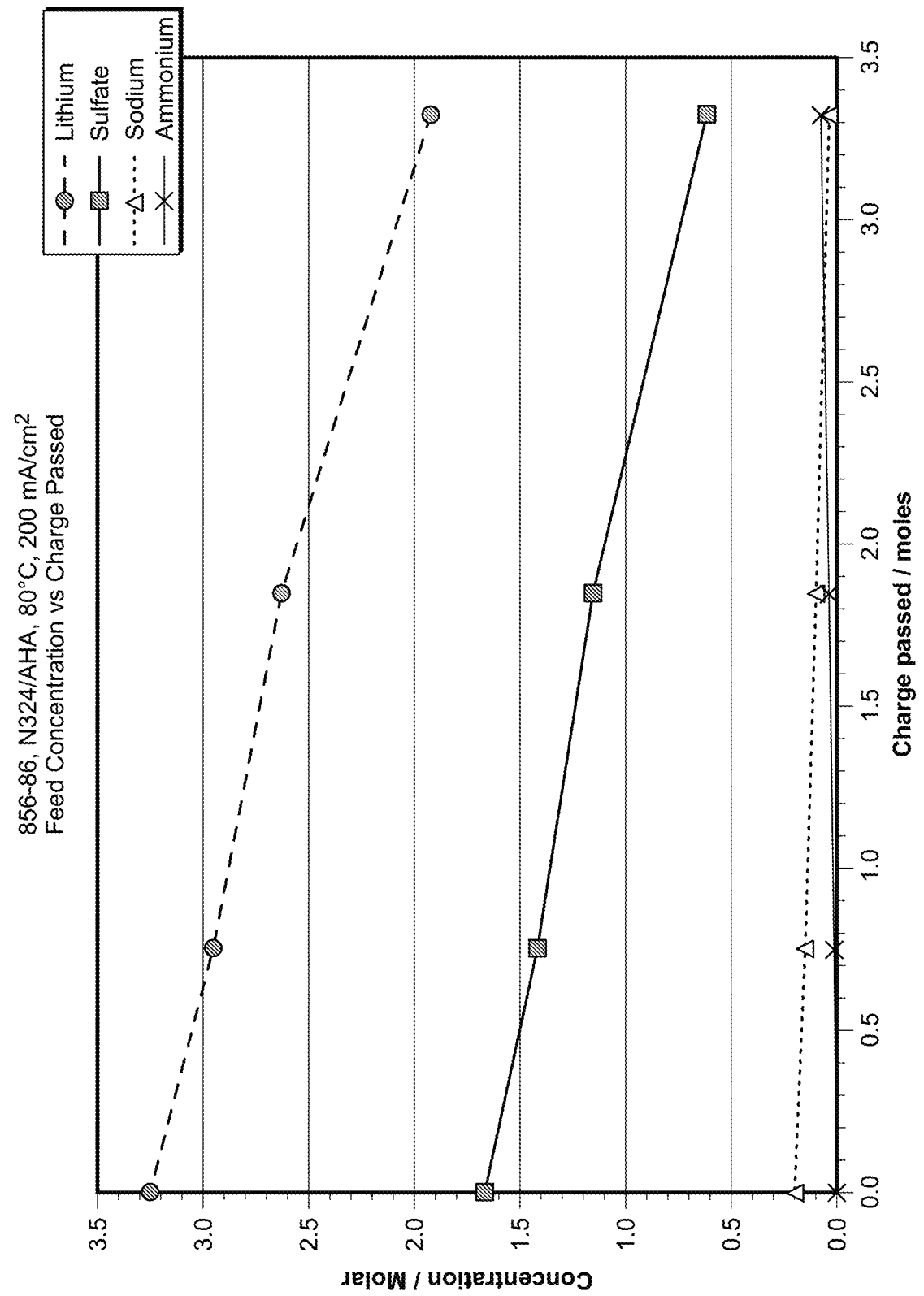
Figure 41E:
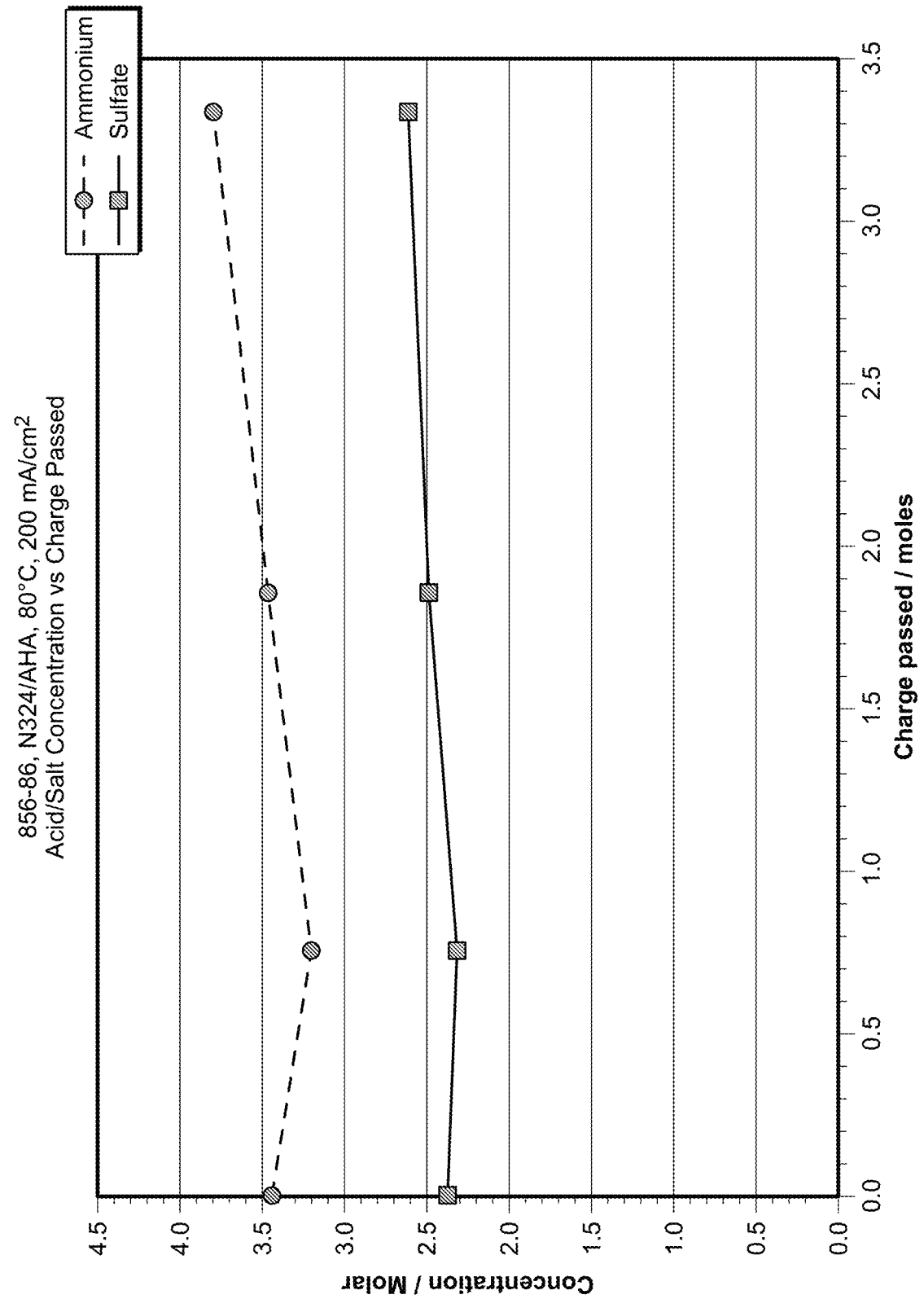
Figure 41F:
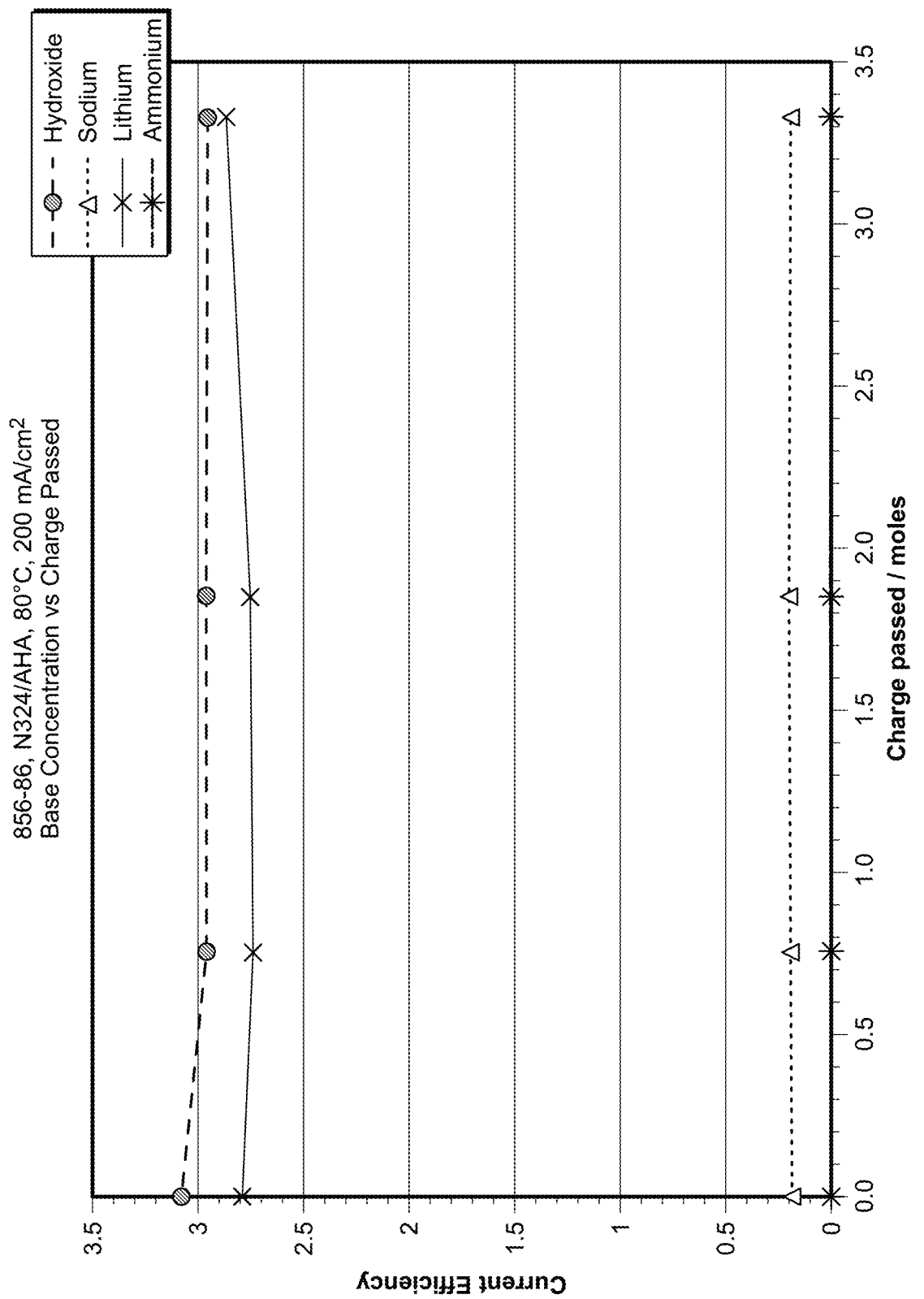
Figure 41G:
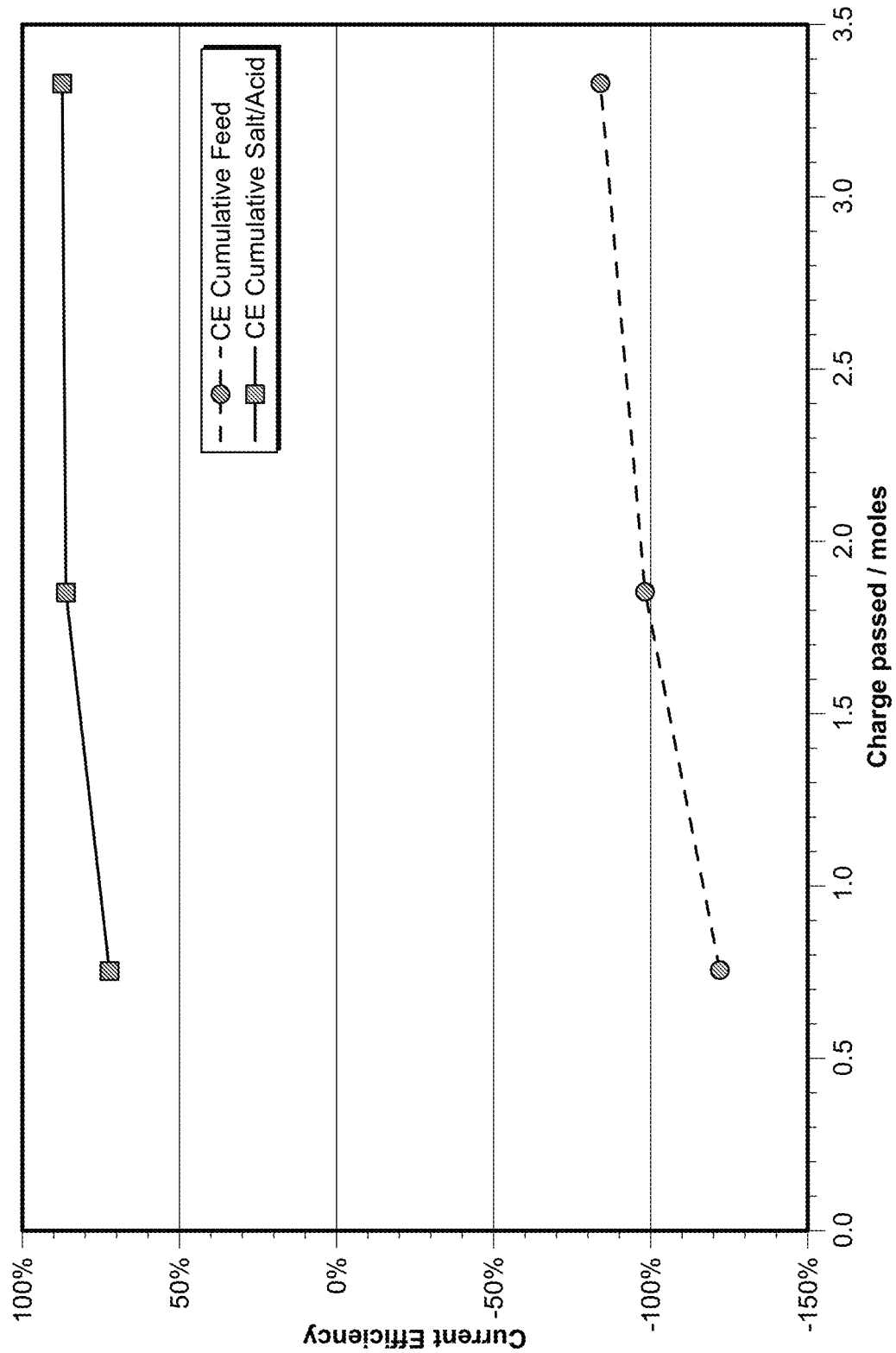

In the majority of the experiments (except 856-78), no water was added to the feed. Due to limitations of the setup (and time required for larger batches), most experiments were stopped after about 80% conversion. With the amount of water transport, the lithium sulfate concentration was still high at the end of the test as shown in FIG. 39G. If no water transport had occurred, that the end sulfate concentration would have been about 0.35 M.

FIG. 39G also shows the hydroxide concentration in the feed as a function of the charge passed. As shown, even at the end of the experiment, the hydroxide concentration is still increasing as hydroxide back migrates across the N324 membrane from the base. By the end of the experiment, the hydroxide concentration was similar to the sulfate concentration which decreased the efficiency of the process. Eventually, the amount of hydroxide leaving the feed to the acid compartment will equal the amount entering from base and the hydroxide concentration will reach a steady-state. This concentration may approach about 1 M hydroxide concentration.

Experimental Trial at Lower Acid pH (Anolyte pH)

For example, in some experiments of the present studies, the feed pH was allowed to increase due to the hydroxide back migration in the feed. One control method that could be used to circumvent this issue is to add sulfuric acid into the feed to maintain its pH between about 7 and 10. Since the hydroxide production efficiency is about 80%, acid equaling about 20% of the charge would be required.

Alternatively, the pH setpoint on the acid/salt could be modified to allow for some proton back migration. In this case, if the feed pH is above a certain measured setpoint (for example about 9.5, about 9.7 or about 10), then the ammonia addition to the acid is stopped. The pH on the acid drops allowing for proton back migration until the feed pH decreases below the required setpoint. Ammonia is then added to the acid to increase the pH and the process is repeated. The above method allows for self-correction of the process and does not require any external sulfuric acid. It will be appreciated that pH measurement in solutions of high concentration salt may be inaccurate, as the sodium (and lithium) ions may, for example interfere with the measured pH. Typically the measured pH can be a couple of pH units different than the actual pH; typically lower in alkaline salt solutions and higher in acid. It will be appreciated that care must be taken to calibrate and offset for this effect, for example when using pH as a control algorithm. Graphs shown in the present disclosure are as measured.

Figure 42A:
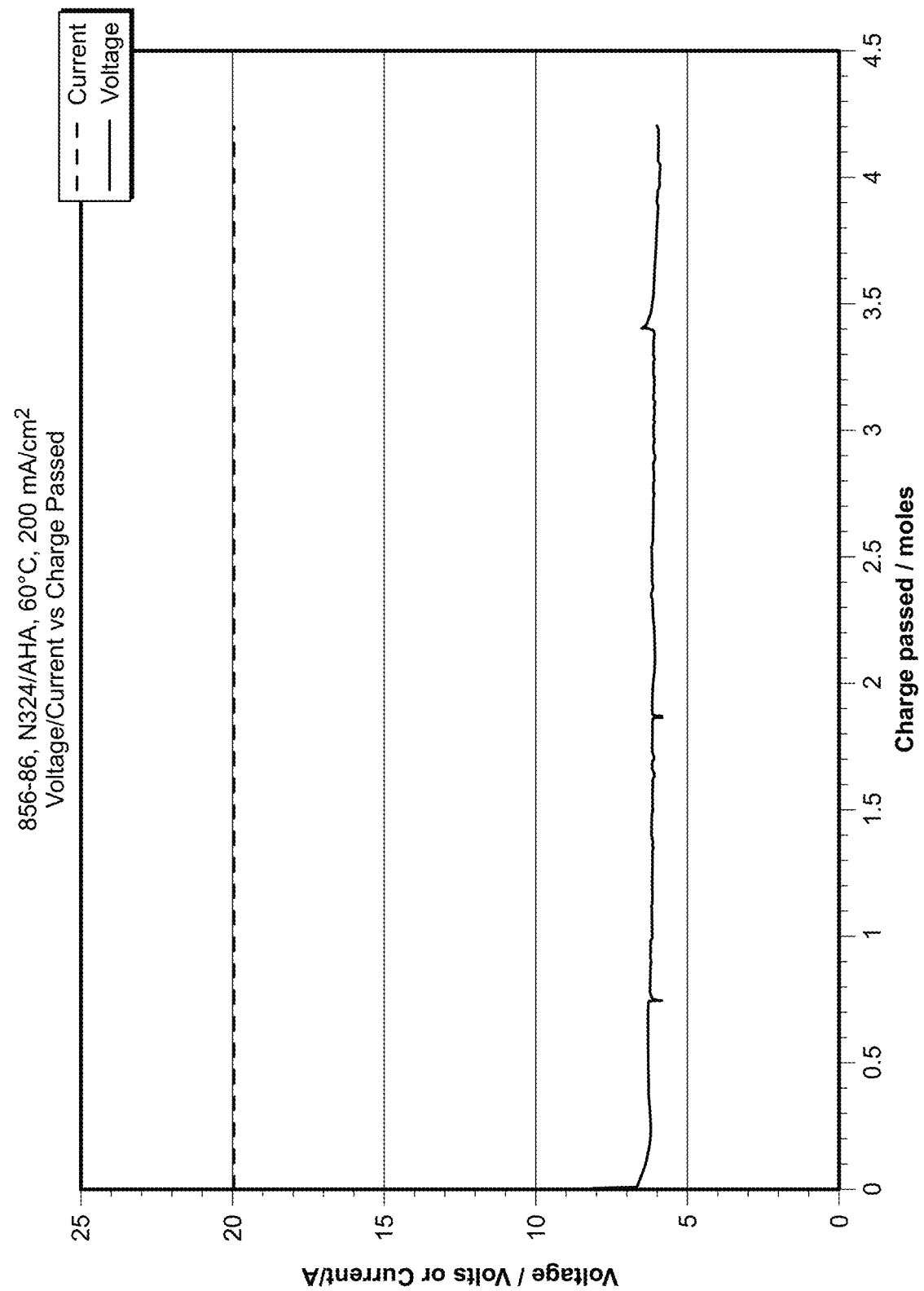
Figure 42B:
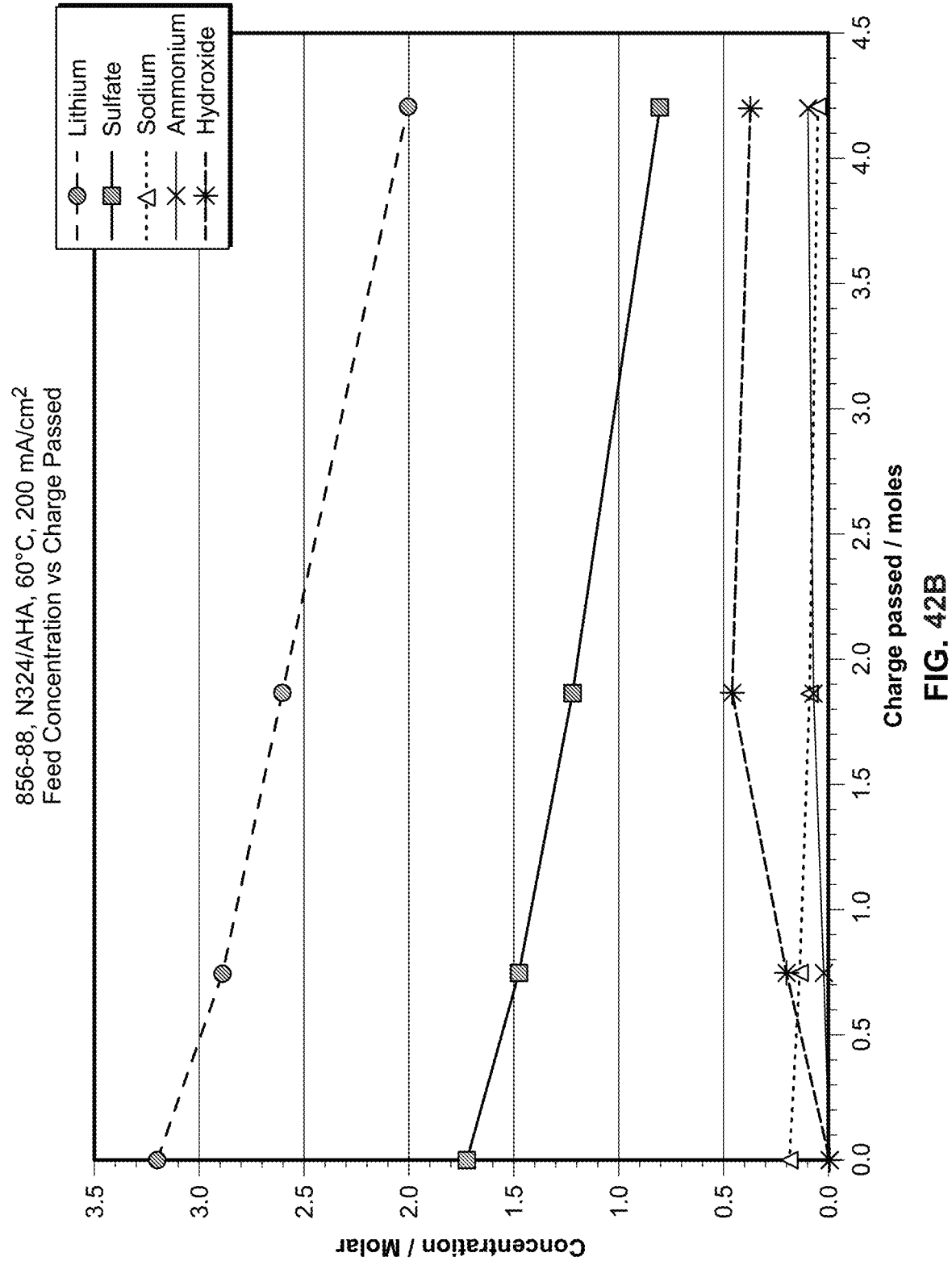
Figure 42C:
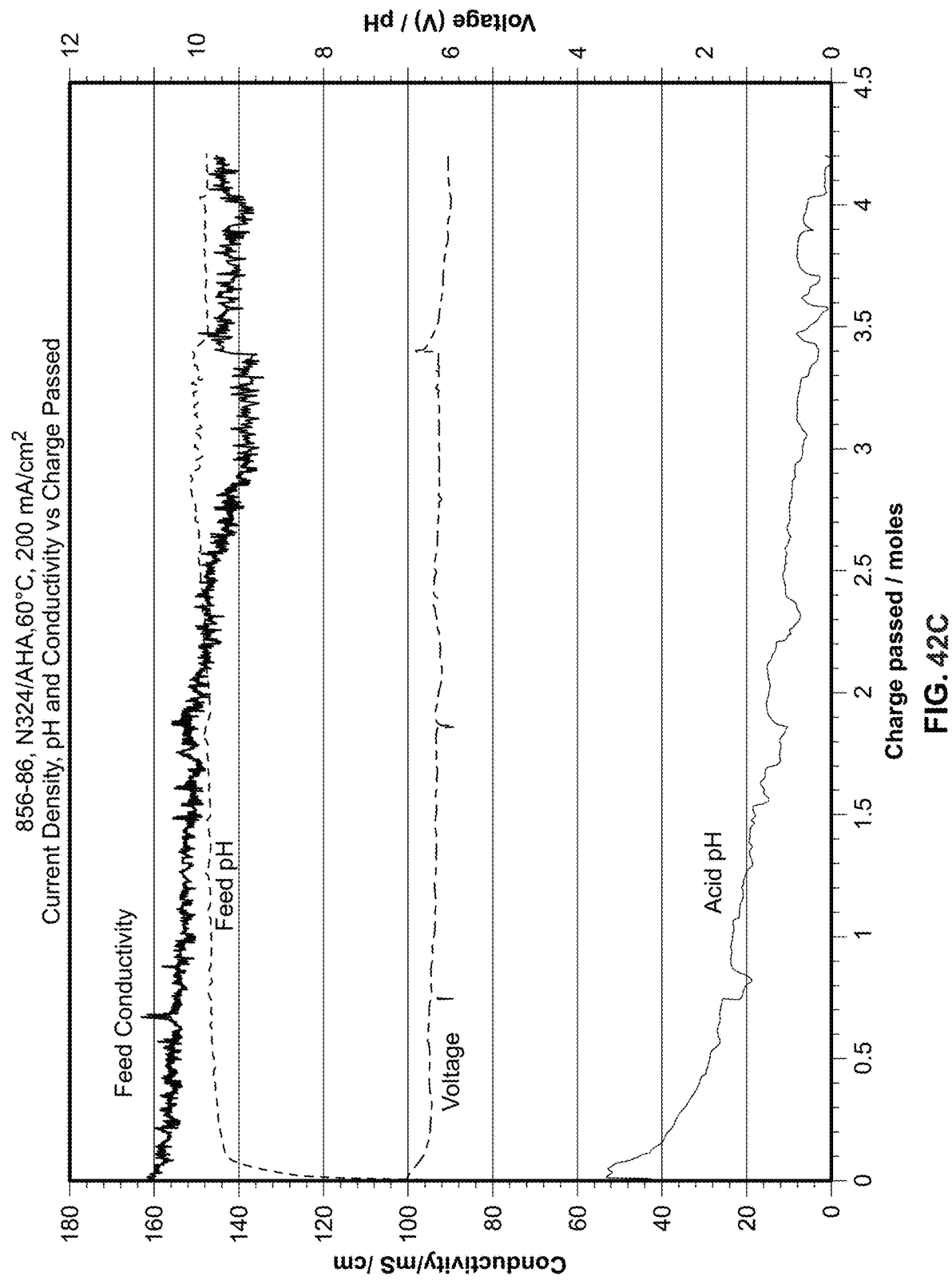
Figure 42D:
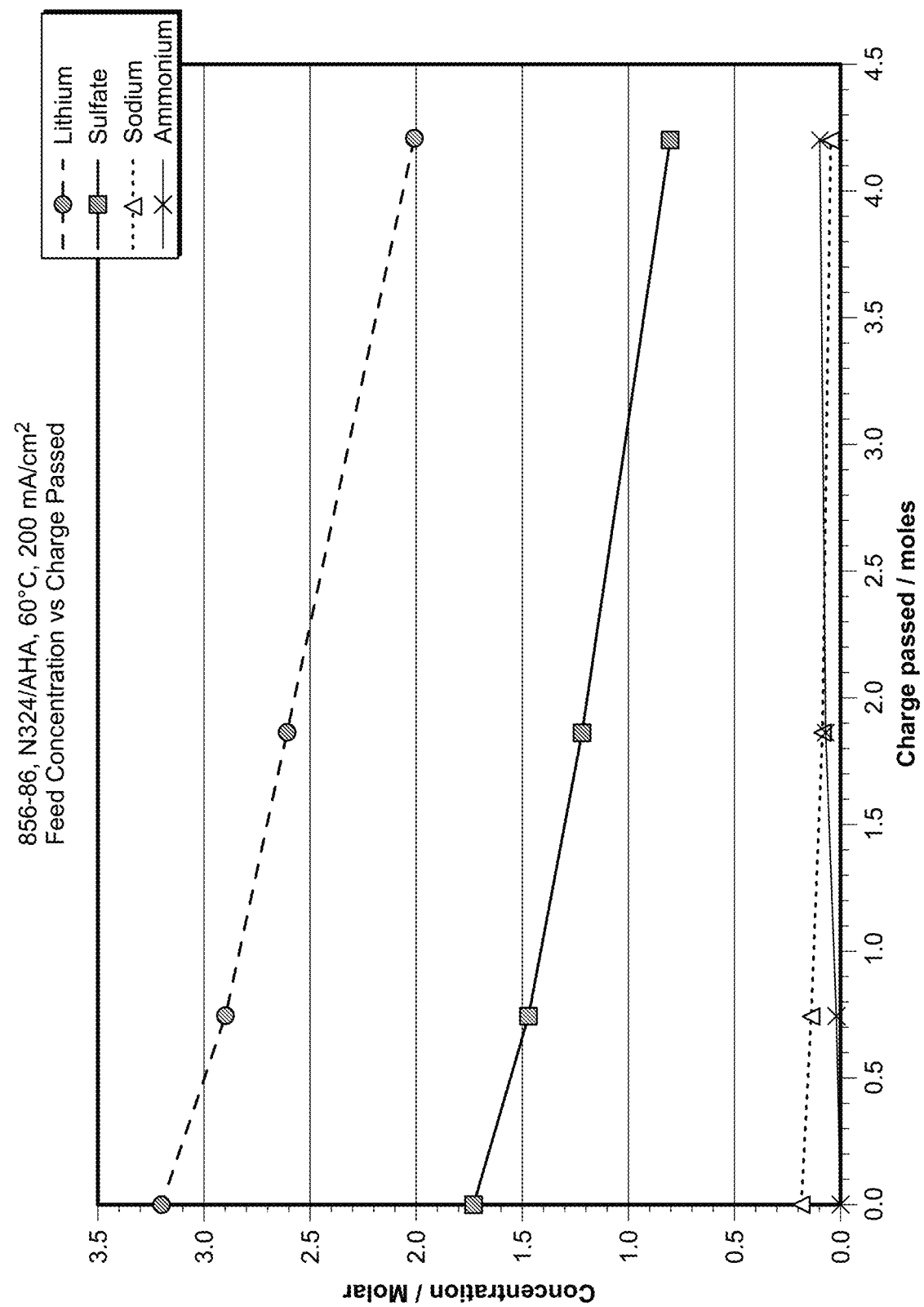
Figure 42E:
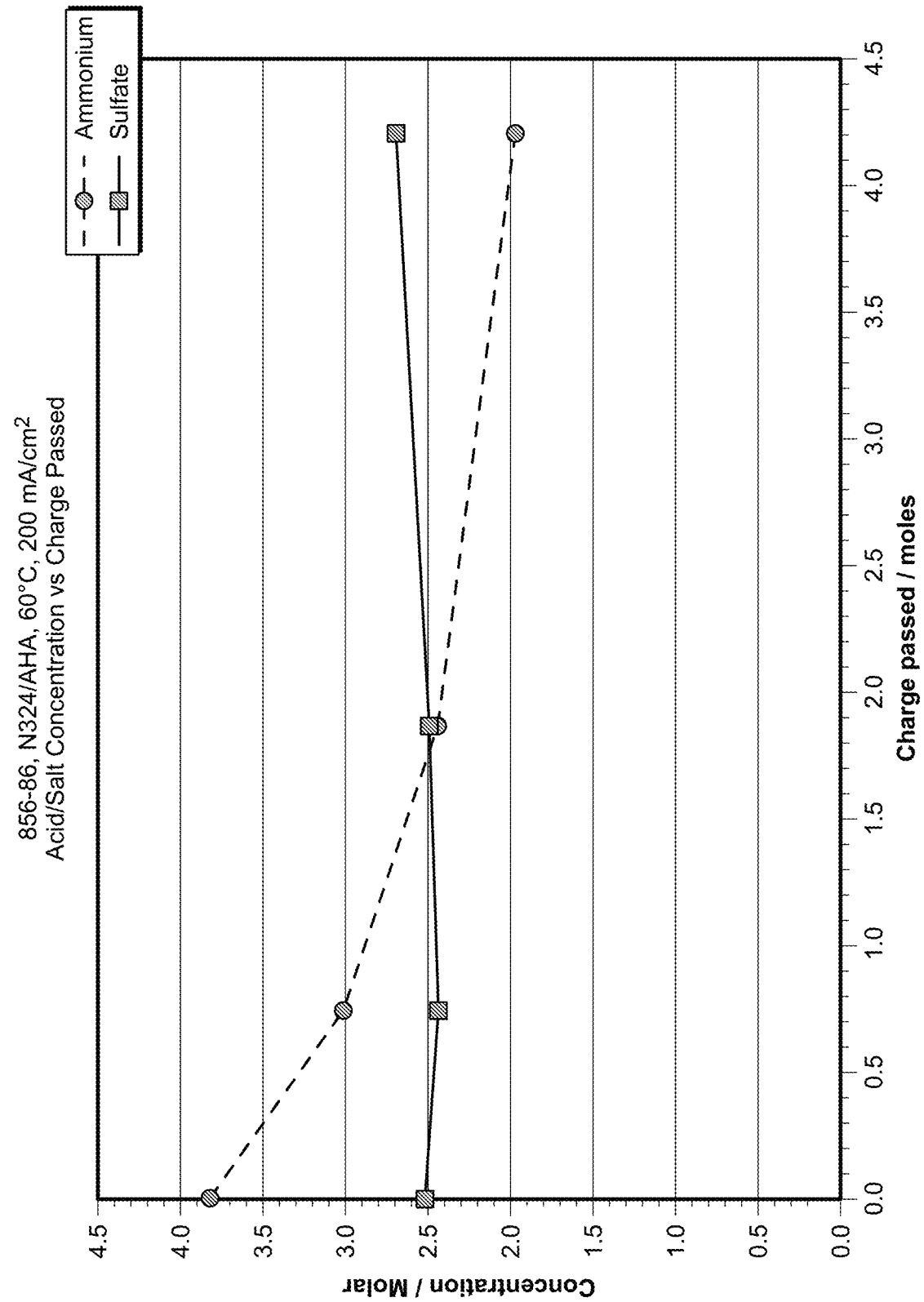
Figure 42F:
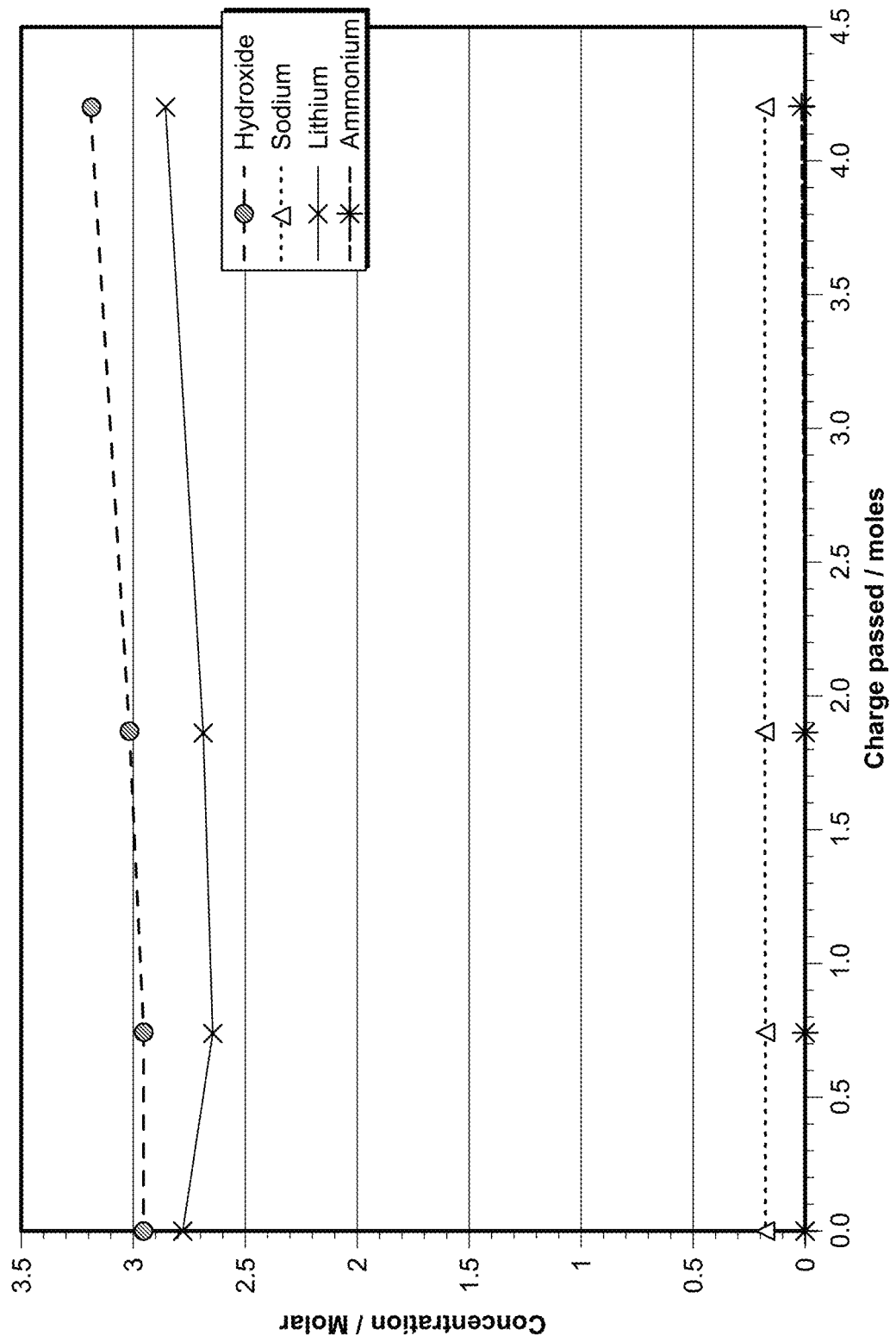
Figure 42G:
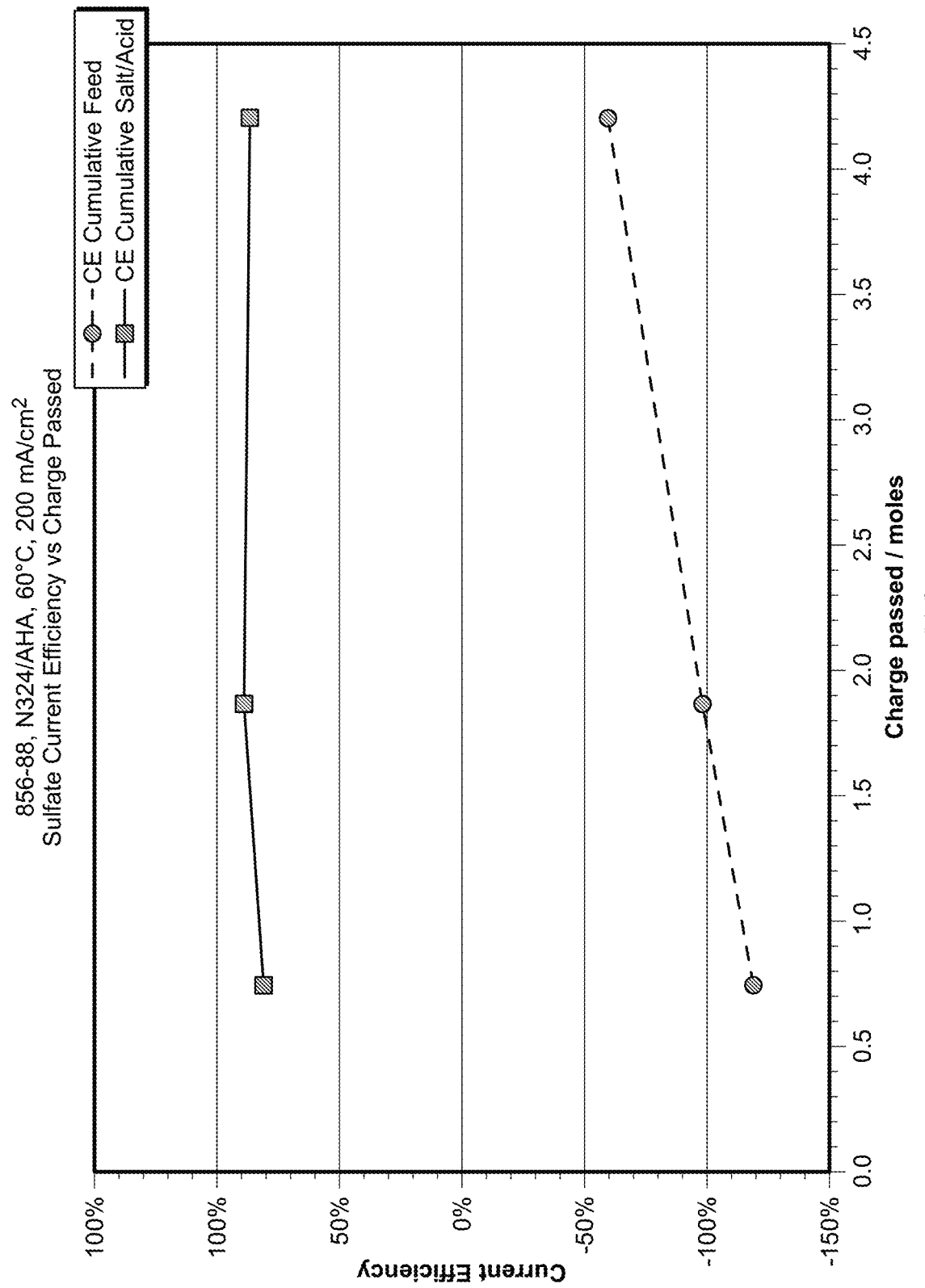

The last two experiments used this type of control. 856-88 started with about 2.5 M ammonium sulfate at a pH of about 3.5 and was allowed to run without any further ammonia addition. As shown in FIG. 42B, the hydroxide concentration in the feed continued to increase until about half way through the run, and then the concentration started to decrease slightly. This occurred with a measured feed pH of about 10 and a measured acid pH of about 0.5 as shown in FIG. 42C. However, there still had not been enough proton transport to eliminate the feed pH increase. The point at which some conversion had occurred also corresponds to the point where all of the sulfate in the feed had been converted to bisulfate thereby producing some free acid. As shown in FIG. 42E, the ammonium concentration equaled the sulfate concentration at about 1.9 mol of charge (about 2.5 M $(NH_4)HSO_4$).

The final experiment, 856-90, was a continuation of the previous experiment, except that new feed solution was used. As shown in FIG. 43, the feed pH increased slightly and then stabilized before dropping to a pH of about 7, while the acid pH continued to decrease. At about a recorded acid pH of −0.25, the feed pH started to decrease rapidly, and ammonia addition was restarted. The acid pH increased again to a point where proton back migration was limited and the feed pH started to increase. Samples of the acid were taken just before ammonia addition was restarted and after it was stopped. The sample before addition was analyzed as about 3.4 M sulfate with about 0.6 M proton (indicating about 3.1 M $NH_4HSO_4$ plus about 0.3 M $H_2SO_4$). After ammonia addition, the solution was again about 3.4 M sulfate, but contained about 3.3 M bisulfate and about 0.1 M sulfate, indicating that the free proton had been neutralized.

The present tests demonstrated that it is possible to run the process in this way. The current efficiencies for hydroxide production, feed sulfate removal and acid sulfate production (as shown in Table 28) were more closely balanced. However, the caustic strength was slightly higher for this run, making the overall current efficiency closer to about 73%.

The concentration of ammonium in the salt running at a measured pH of about zero is about half the concentration of the same sulfate concentration solution running at a pH of about 3.5 (i.e. $NH_4HSO_4$ instead of $(NH_4)_2SO_4$) which would decrease the amount of ammonium back migration and therefore the amount of ammonium transport into the base.

Cell Voltage and Water Transport

An advantage of the ammonium sulfate system over the sulfuric acid system was the potentially higher current density and lower cell voltage that could be obtained when the highly resistive Fumatech FAB membrane was removed from the process.

Table 29 shows the cell voltage ranges obtained for the current work, requiring about 6 V at about 150 mA/cm² and about 6.5 V at about 200 mA/cm². In previous work, a constant cell voltage of about 7.8 V was used to obtain an average current density of about 100 mA/cm². Therefore higher current densities have been obtained at lower voltages. a cell with about 2 mm solution gaps run as low as about 4.6 V at about 60° C. It will be appreciated that there is less change from the Prodcell to the commercial cell since the feed can be run at higher conductivity. Running the cell at about 80° C. decreased the cell voltage by about 0.6 V when running at about 200 mA/cm². However, this impact may be less in the commercial cells as the main improvement is in solution conductivity and the commercial cell has smaller solution gaps.

TABLE 29

Cell Voltage Range and Water Transport Numbers.

| Experiment | Conditions | Voltage/V | Water Transport (mol $H_2O$/mol Q)⁵ | | |
|---|---|---|---|---|---|
| | | | Feed | Acid | Base |
| 856-71 | 150 mA/cm², 60° C., no water addition | 6.4-5.5 | 9.3 | 4.4 | 4.7 |
| 856-78 | 150 mA/cm², 60° C., water addition to base and feed | 5.6-6.3 | 10.9 | 4.4 | 6.2 |
| 856-81 | 150 mA/cm², 60° C., water addition to base and acid | 5.9-5.8 | 9.6 | 8.8 | 5.9 |
| 856-84 | 200 mA/cm², 60° C., water addition to base and acid | 6.8-6.4 | 10.7 | 5.9 | 7.5 |
| 856-86 | 200 mA/cm², 80° C., water addition to base and acid | 6.0-5.7 | 10.2 | 3.8 | 6.5 |
| 856-88 | 200 mA/cm², 60° C., lower acid pH | 6.0-6.3 | 9.0 | 4.6 | 6.3 |
| 856-90 | cont. 856-88 with new feed | 6.5-6.8 | 8 | 2.4 | 7.7 |

Water transport in this system was fairly high, averaging about 10 mol of water transport per mol of charge (about 22 mol water per mol of lithium sulfate transport). This is about half the water required in order to maintain a constant feed concentration and therefore allow the system to run in a completely continuous process. It may be possible to incorporate a reverse osmosis unit on the feed stream to remove the remaining water, thereby allowing full conversion of the feed. The experiments running at lower acid pH had lower associated water transport. While not wishing to be limited by theory, this effect is likely due to some water transport associated with proton back migration and lower osmotic drag into the acid. Although the sulfate concentration was about the same in the two solutions, there was much less ammonium in the last two experiments.

The water transport numbers are quoted per mole of charge. Per mole of cation in the base, these numbers need to be divided by the current efficiency. Per mole of sulfate into the acid, these numbers need to be multiplied by two and divided by the current efficiency.

Based on the testing performed in the present studies, the process may, for example produce ammonium sulfate at a concentration of about 3 M or higher if lower pH control was used, produce lithium hydroxide at a concentration of about 3 M, have an average current density of about 150 mA/cm$^2$, have a current efficiency of about 80% for hydroxide production, have a cell voltage of about 4.6 V for a custom-designed cell, have water transport from feed to base of about 8 mol water per mol cation and have water transport from feed to acid/salt of about 12 mol water per mol sulfate or less if a lower pH on acid is used, for example.

When compared to the previous sulfuric acid process, these conditions may, for example decrease the required cell area for a plant producing about 3 tonne/hour of LiOH, by over about 35%. It may also, for example decrease the power consumption for a commercially designed cell from about 8.9 kWh/kg of LiOH to about 6.4 kWh/kg of LiOH (in an about 3 M solution). It also may, for example produce between about 8-10 tonne/hour of ammonium sulfate (dry basis) depending on the feed pH control regime.

Hydroxide back migration across the N324 membrane increases the pH of the feed. This transport may affect the overall process and different control strategies may be used to provide steady operation. Three different control strategies may, for example be used:

For example sulfuric acid may be used to control the feed pH around a neutral to slightly basic pH (about 7-9). This method, for example require an additional control circuit and may, for example require purchase of sulfuric acid. The additional sulfuric acid purchased is converted into ammonium sulfate. Lithium hydroxide production may still be at about 80% current efficiency and ammonium sulfate may be between about 90%-100%. An inefficiency may be ammonium back-migration across the AHA. This option may be useful if, for example a suitable sulfuric acid source, and an outlet for the ammonium sulfate produced exists.

For example, no remediation may be performed and the feed pH may increase until the inefficiency of hydroxide across the AHA matches that of hydroxide across the N324. This may, for example make both lithium hydroxide and ammonium sulfate efficiencies the same. Although it may be the easiest to implement, the stability of the anion exchange membrane in high pH solution and temperature may, for example need to be considered. For example, a base stable anion exchange membrane may be used.

For example, variation in the pH of the ammonium sulfate may be allowed so that some proton back-migration is allowed. If the feed pH increases the amount of ammonia added to the acid/salt is stopped, proton is produced at the anode until enough proton has migrated across the AHA to bring the feed pH lower, and then ammonia addition occurs again. This method again matches lithium hydroxide and ammonium sulfate production, but may keep the pH at the AHA low. It also, for example has a benefit of running the acid/salt with a lower ammonium concentration. For example, an about 3 M sulfate solution might comprise about 0.5 M sulfuric acid with about 2.5 M ammonium bisulfate at a pH of about zero, but may comprise almost about 6 M ammonium sulfate at pH of about 4. This may, for example decrease the amount of ammonium back migration on the AHA membrane. The acid/salt solution could then, for example be post neutralized with ammonia to produce the required about 3 M $(NH_4)_2SO_4$ solution. Higher sulfate concentrations could also, for example be used.

Example 5

Further concerning conversion of $Li_2SO_4$ into LiOH

EXAMPLES

An exemplary flow diagram for the process of the present disclosure is shown in FIG. 44. The process 10 exemplified therein is for preparing lithium hydroxide. Referring to FIG. 44, in the process exemplified therein, an aqueous composition comprising a lithium compound such as lithium sulfate and/or lithium bisulfate is submitted to a first electromembrane process, for example a first electromembrane process that comprises a two-compartment membrane process such as a two-compartment monopolar membrane electrolysis process under suitable conditions for consumption of the lithium compound such as lithium sulfate and/or lithium bisulfate to prepare lithium hydroxide, optionally wherein the consumption of the lithium compound such as lithium sulfate and/or lithium bisulfate to prepare lithium hydroxide proceeds to a pre-determined extent. Referring to FIG. 44, the two-compartment membrane process such as a two-compartment monopolar membrane electrolysis process can be carried out in a first electrochemical cell 12 comprising an anolyte compartment 14 separated from a catholyte compartment 16 by a membrane such as a cation exchange membrane 18.

It will be appreciated that the term "consumption" as used herein in respect of a lithium compound such as lithium sulfate and/or lithium bisulfate refers to a reduction in the amount of the lithium compound such as lithium sulfate and/or lithium bisulfate present in the aqueous composition. For example, a person skilled in the art would readily understand that during a two-compartment monopolar membrane electrolysis process such as that shown in FIG. 44, water ($H_2O$) can be converted into proton ($H^+$) and oxygen gas ($O_2$) at an anode 20, water can be converted into hydroxide ion ($OH^-$) and hydrogen gas ($H_2$) at a cathode 22 and lithium ions ($Li^+$) initially present in the aqueous composition comprising a lithium compound such as lithium sulfate and/or lithium bisulfate can be driven by an electric potential difference from the anolyte compartment 14 across the membrane such as a cation exchange membrane 18 into the catholyte compartment 16. A first lithium-reduced aqueous stream 24 and a first lithium hydroxide-enriched aqueous stream 26 are thereby obtained which, as shown in FIG. 44, can be removed from the anolyte compartment 14 and catholyte compartment 16, respectively, of the first electrochemical cell 12. The $Li^+$ ions migrate through membrane 18 in view of the electrical current, thereby converting $Li_2SO_4$ into LiOH.

A first oxygen-containing stream 27 and a first hydrogen-containing stream 28 can also be obtained, which, as shown in FIG. 44, can be removed from the anolyte compartment 14 and catholyte compartment 16, respectively, of the first electrochemical cell 12. Alternatively, the oxygen and/or hydrogen gas produced as a product of the electrolysis reactions can also, for example remain in an aqueous solution and be removed from the anolyte compartment 14 and catholyte compartment 16, respectively, of the first electrochemical cell 12 as a component of the first lithium-reduced aqueous stream 24 and the first lithium hydroxide-enriched aqueous stream 26, respectively.

As shown in FIG. 44, an aqueous stream 29 comprising a lithium compound such as lithium sulfate and/or lithium bisulfate can be used to introduce the lithium compound such as lithium sulfate and/or lithium bisulfate into the anolyte compartment 14 of the first electrochemical cell 12.

As shown in FIG. 44, the first lithium-reduced aqueous stream 24 can then be submitted to a second electromembrane process, for example a second electromembrane process that comprises a three-compartment membrane process such as a three-compartment membrane electrolysis process under suitable conditions to prepare at least a further portion of lithium hydroxide. As shown in FIG. 44, the three-compartment membrane process such as a three-compartment membrane electrolysis process can be carried out in a second electrochemical cell 30 comprising an anolyte compartment 32 separated from a central compartment 34 by a membrane such as an anion exchange membrane 36 and a catholyte compartment 38 separated from the central compartment 34 by a membrane such as a cation exchange membrane 40.

For example, a person skilled in the art would readily understand that during a three-compartment monopolar membrane electrolysis process such as that shown in FIG. 44, water ($H_2O$) can be converted into proton ($H^+$) and oxygen gas ($O_2$) at an anode 42, water can be converted into hydroxide ion ($OH^-$) and hydrogen gas ($H_2$) at a cathode 44, lithium ions ($Li^+$) initially present in the first lithium-reduced aqueous stream 24 can be driven by an electric potential difference from the central compartment 34 across the membrane such as a cation exchange membrane 40 into the catholyte compartment 38 and sulfate ions ($SO_4^{2-}$) initially present in the first lithium-reduced aqueous stream 24 can be driven by an electric potential difference from the central compartment 34 across the membrane such as an anion exchange membrane 36 into the anolyte compartment 32. A second lithium-reduced aqueous stream 46 and a second lithium hydroxide-enriched aqueous stream 48 are thereby obtained which, as shown in FIG. 44, can be removed from the central compartment 34 and catholyte compartment 38, respectively, of the second electrochemical cell 30. In fact, the second lithium-reduced aqueous stream 46 can be conveyed into the anolyte compartment 14, while the second lithium hydroxide-enriched aqueous stream 48 can be conveyed into the catholyte compartment 16.

As shown in FIG. 44, during the three-compartment monopolar membrane electrolysis process, the first lithium-reduced aqueous stream can be introduced into the central compartment 34 of the second electrochemical cell 30, the second lithium-reduced aqueous stream 46 can be removed from the central compartment 34 of the second electrochemical cell 30 and the second lithium hydroxide-enriched aqueous stream 48 can be removed from the catholyte compartment 38 of the second electrochemical cell 30.

In the processes of the present disclosure, the three-compartment monopolar membrane electrolysis process can further comprise producing sulfuric acid in the anolyte compartment 32. As shown in FIG. 44, stream 50 that is a sulfuric acid-containing aqueous stream can thus be removed from the anolyte compartment 32 of the second electrochemical cell 30.

Alternatively, the three compartment monopolar membrane electrolysis process can further comprise introducing ammonia into the anolyte compartment 32 of the second electrochemical cell 30, for example via stream 52 and producing ammonium sulfate in the anolyte compartment 32 of the second electrochemical cell 30. As shown in FIG. 44, stream 50 that is an ammonium sulfate-containing aqueous stream can thus be removed from the anolyte compartment 32 of the second electrochemical cell 30.

A second oxygen-containing stream 54 and a second hydrogen-containing stream 56 can also be obtained, which, as shown in FIG. 44, can be removed from the anolyte compartment 32 and catholyte compartment 38, respectively, of the second electrochemical cell 30. Alternatively, the oxygen and/or hydrogen gas produced as a product of the electrolysis reactions can also, for example remain in an aqueous solution and be removed from the anolyte compartment 32 and catholyte compartment 38, respectively, of the second electrochemical cell 30 as a component of stream 50 and the second lithium hydroxide-enriched aqueous stream 48, respectively.

It will be appreciated by a person skilled in the art that other streams such as stream 58, stream 60 and stream 62 can be used, for example to introduce other reagents and/or solvents into the catholyte compartment 16 of the first electrochemical cell 12, the catholyte compartment 38 of the second electrochemical cell 30 and/or the anolyte compartment 62 of the second electrochemical cell 30. For example, such streams may be used to add acid (for example $H_2SO_4$) and/or base (for example LiOH), for example to maintain or change a pH; and/or water, for example to maintain or change a concentration in a compartment of the electrochemical cells 12,30 of the process 10. It will also be appreciated by a person skilled in the art that such reagents and/or solvents may also be introduced into various compartments of the electrochemical cells 12,30 shown in FIG. 44 as a component of other streams either shown or not shown in FIG. 44 so as to maintain or change a parameter such as pH and/or concentration of the reactants (such as $Li_2SO_4$, $LiHSO_4$, $LiOH$, $NH_3$, $NH_4HSO_4$, $(NH_4)_2SO_4$) in a compartment of the electrochemical cells 12,30.

As shown in FIG. 44, the processes of the present disclosure can further comprise recycling at least a portion of the second lithium-reduced aqueous stream 46 to the first electromembrane process. For example, as shown in FIG. 44, the second lithium-reduced aqueous stream 46 can be introduced into the anolyte compartment 14 of the first electrochemical cell 12. For example, the at least a portion of the second lithium-reduced aqueous stream 46 can be passed from the second electrochemical cell 30 to the first electrochemical cell 12 via a suitable conduit by means of a pump.

As shown in FIG. 44, the processes of the present disclosure can also further comprise recycling at least a portion of the second lithium hydroxide-enriched aqueous stream 48 to the first electromembrane process. For example, as shown in FIG. 44, at least a portion of the second lithium hydroxide-enriched aqueous stream 48 can be introduced into the catholyte compartment 16 of the first electrochemical cell 12 as a component of stream 58. It will be appreciated by a person skilled in the art that alternative ways of introducing the at least a portion of the second lithium hydroxide-enriched aqueous stream 48 into the catholyte compartment 16 of the first electrochemical cell 12 are possible. For example, the at least a portion of the second lithium hydroxide-enriched aqueous stream 48 can be introduced as a separate stream into the catholyte compartment 16. For example, the at least a portion of the second lithium hydroxide-enriched aqueous stream 48 can be conveyed from the second electrochemical cell 30 to the first electrochemical cell 12 via a suitable conduit by means of a pump.

For example, when the electrolysis of $Li_2SO_4$ and/or $LiHSO_4$ in cell 12 has reached a certain predetermined extent in terms of consumption of $Li_2SO_4$ and/or $LiHSO_4$ (for example observed by a drop of current efficiency) or when the pH of the anolyte in the anolyte compartment 14 (for example pH measured by means of a pH meter) is below a predetermined value, the content of the anolyte compartment 14 (stream 24) can be conveyed to the central compartment 34 of the cell 30. It was observed that in cell 12, the pH in the anolyte compartment 14 can have tendency to decrease and thus, when the reaction is less efficient or no more efficient, the stream 24 is transferred into the compartment 34 in which the pH can have tendency to increase until a certain point is reached at which the electrolysis is less efficient or no longer efficient. In such a case, the stream 46 can be conveyed into the compartment 14 in which the pH will be decreased. Transfers of $Li_2SO_4$ and/or $LiHSO_4$ between the compartments 14 and 34 can be made by the same conveying means or different one. Such means can be a conduit combined with a pump. The person skilled in the art would understand that in the processes of the present disclosure, depending on the pH of the starting solution (or feed solution) (for example aqueous solution of $Li_2SO_4$ and/or $LiHSO_4$), the starting solution can be treated first in the two-compartment monopolar membrane electrolysis process cell (for example if pH is neutral or basic) and then in the three-compartment monopolar membrane electrolysis process. Alternatively, the starting solution can be treated first in the three-compartment monopolar membrane electrolysis process cell (for example if pH is neutral or acidic) and then in the two-compartment monopolar membrane electrolysis process cell.

When a certain concentration of LiOH is reached in the compartment 38, the stream 48 can be conveyed to the compartment 16 in which LiOH can be further concentrated.

The processes of the present disclosure can be operated, for example as a batch process. Alternatively, the processes of the present disclosure can be operated as a semi-continuous process or a continuous process.

It will be appreciated by a person skilled in the art that one or more parameters of the processes of the present disclosure such as but not limited to pH, temperature, current density, voltage, current efficiency and concentration can be monitored, for example by means known in the art. The selection of a suitable means for monitoring a particular parameter in a process of the present disclosure can be made by a person skilled in the art. Such parameters can also be maintained and/or changed by a person skilled in the art, for example in light of their common general knowledge and with reference to the present disclosure.

Certain known processes have, for example incorporated the use of a three-compartment cell, since in the two-compartment configuration shown in FIG. 45, the anodic reaction produces oxygen and protons which results in a decrease in pH of the anolyte solution. Full removal of the cation when using a two-compartment cell can become inefficient as the proton competes with lithium ion transport for charge transfer across the cation membrane. Nevertheless, partial conversion of a lithium compound such as lithium sulfate to lithium bisulfate should be possible with a two-compartment membrane electrolysis cell.

Bisulfate has a pKa of 1.9, and therefore sulfate will buffer the pH of an aqueous lithium sulfate solution such that the proton concentration will be about 0.01 M at conversion of up to half of the sulfate to bisulfate (i.e. 25% conversion). At this concentration the inefficiency due to proton at the Nafion 324 (N324) membrane will be negligible.

Previous work has shown that the pH of a solution which has been fully converted to bisulfate (i.e. 50% conversion) is about 0.9 or a proton concentration of just over 0.1 M. In this case, since a proton is more mobile than a lithium ion, the proton transport across the N324 membrane will likely be significant which can, for example decrease the current efficiency for lithium hydroxide production. Consequently, the complete conversion of lithium sulfate will not be possible, and test work summarized in the present disclosure focused on determining the efficiency as a function of conversion.

In the processes of the present disclosure, after the lithium sulfate in an aqueous solution is partially converted (in order to convert more of the lithium into lithium hydroxide) using a two-compartment membrane electrolysis process, the solution can then be sent to a three-compartment General Experimental Details The two-compartment experiments were carried out in an ICI FM-01 lab electrolysis cell (64 cm², ICI Chemicals, UK) equipped with DSA-$O_2$ anode, stainless steel (SS316) cathode and Nafion 324 membrane. The three-compartment work was performed in an Electrocell MP cell (100 cm²) similarly equipped to the three-compartment membrane electrolysis cells used in previous studies, and other aspects of the experimental setup were the same as those described previously in other applications (WO 2013/159194 and WO 2014/138933).

Example 5A: Two-Compartment Membrane Electrolysis Cell Trials

Tests were performed using the two-compartment configuration with an aqueous solution comprising lithium sulfate as the feed solution. Since a main purpose of these runs was to evaluate the current efficiency as a function of conversion (bisulfate/sulfate), the tests were performed with about 2 M LiOH in the catholyte compartment. This is lower than the about 3 M concentration produced in previous work. However, at an about 3 M concentration, small variations in the hydroxide concentration can considerably decrease the lithium hydroxide current efficiency. In contrast, a small variation in hydroxide concentration around a concentration of about 2 M does not greatly affect the lithium hydroxide current efficiency, and therefore any changes in the efficiency can generally be attributed to proton transport from the feed.

Various runs were performed using the two-compartment cell at varying current densities. FIGS. 46-48 are plots relating to the experiments summarized in Table 30: FIGS. 46A-46D relate to experiment no. 856-96; FIGS. 47A-47D relate to experiment no. 856-99; and FIGS. 48A-48D relate to experiment no. 879-1. The results of the experiments using the two-compartment cell and aspects of the processes of these runs are discussed below.

As each run progressed, lithium and sodium ions were removed from the feed as shown, for example in FIG. 46A. As water is removed from the feed, the sulfate ion concentration is concentrated from about 1.7 M up to about 2.3 M which, along with lithium ion transport out of the feed, changes the ratio of lithium ion to sulfate ion in the feed from over about 2 at the beginning of the electrolysis to less than about 1 at the end. In this run, slightly more than about 50% of the conversion was performed so that the final anolyte solution contains only lithium bisulfite and a small amount of sulfuric acid.

Samples of the two compartments were periodically taken during the run and evaluated for current efficiency. FIG. 46B shows the cumulative current efficiency for hydroxide production in the catholyte and cation loss from the feed. As shown, the current efficiency starts to decrease between the samples taken at about 35% conversion and about 45% conversion. Although the change in the cumulative current efficiency looks small, the change in the incremental current efficiency (not shown) is considerable. This change seems to occur when the measured feed pH reaches about 0.6.

The runs at higher current density had similar trends. Table 30 provides results for the three runs performed with the current density at about 3 kA/m² (experiment no. 856-96), about 4 kA/m² (experiment no. 856-99) and about 5 kA/m² (experiment no. 879-1) The current efficiencies of hydroxide for the runs were close to about 80% for the initial portion of the run. The point at which the current efficiency started to decrease seemed to occur slightly later (i.e. at a higher conversion) for runs carried out using a higher current density.

Example 5B: Three-Compartment Membrane Electrolysis Cell Trials with Converted Lithium Sulfate/Lithium Bisulfate The two-compartment work is useful for producing lithium hydroxide from lithium sulfate solution to an about 40% conversion. As the amount of process solution available was small, two initial runs were performed with synthetically made lithium bisulfate/sulfate solutions in order to properly define conditions for the test. The end solutions from the two-compartment work were remixed, and adjusted to an about 42% converted solution by addition of some lithium hydroxide. In order to remove possible hydroxide concentration effects, the lithium hydroxide concentration was dropped to about 2 M.

A. N324/AHA Three-Compartment Cell to Produce Ammonium Sulfate

The three-compartment cell used in previous studies (WO 2013/159194 and WO 2014/138933) was reused for the test work of the present studies and contained a Nafion N324 cation exchange membrane and an Astom AHA anion exchange membrane. FIGS. 49A-D are plots relating to this experiment. The results of the experiment using the three-

TABLE 30

Characteristics for two-compartment runs with lithium sulfate feed.

| Experiment No. | Current Density (kA/m²) | Voltage Range (V) | FEED [$SO_4^{2-}$] (M) | [$Li^+$] (M) | [$Na^+$] (M) | BASE [$OH^-$] (M) | Hydroxide (CE) | At % Conversion | Water Transport (mol $H_2O$/molQ) Feed | Base |
|---|---|---|---|---|---|---|---|---|---|---|
| 856-96 | 3 | 5.9-6.8 | 1.7-2.3 | 3.3-2.1 | 0.2-0.1 | 1.9-2.4 | 82% | 35-45 | −3.6 | 4.6 |
| 856-99 | 4 | 6.5-8.3 | 1.7-2.3 | 3.3-2.0 | 0.2-0.1 | 1.8-2.3 | 75% | 42-46 | −5.0 | 4.6 |
| 879-1 | 5 | 7.1-9.4 | 1.7-2.5 | 3.2-1.8 | 0.2-0.1 | 1.8-2.0 | 78% | 47-51 | −4.6 | 4.6 |

Figure 47A:
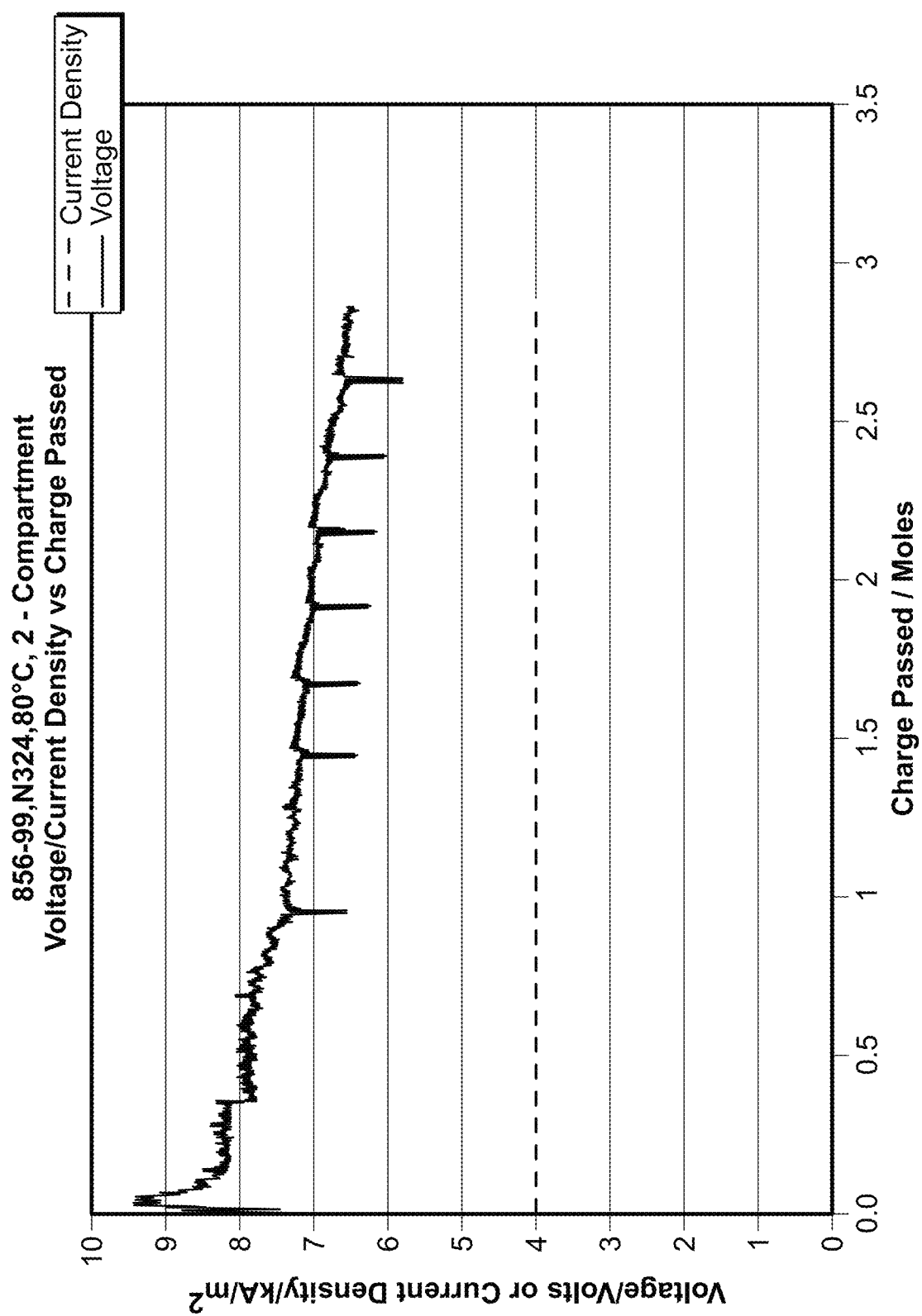
Figure 47B:
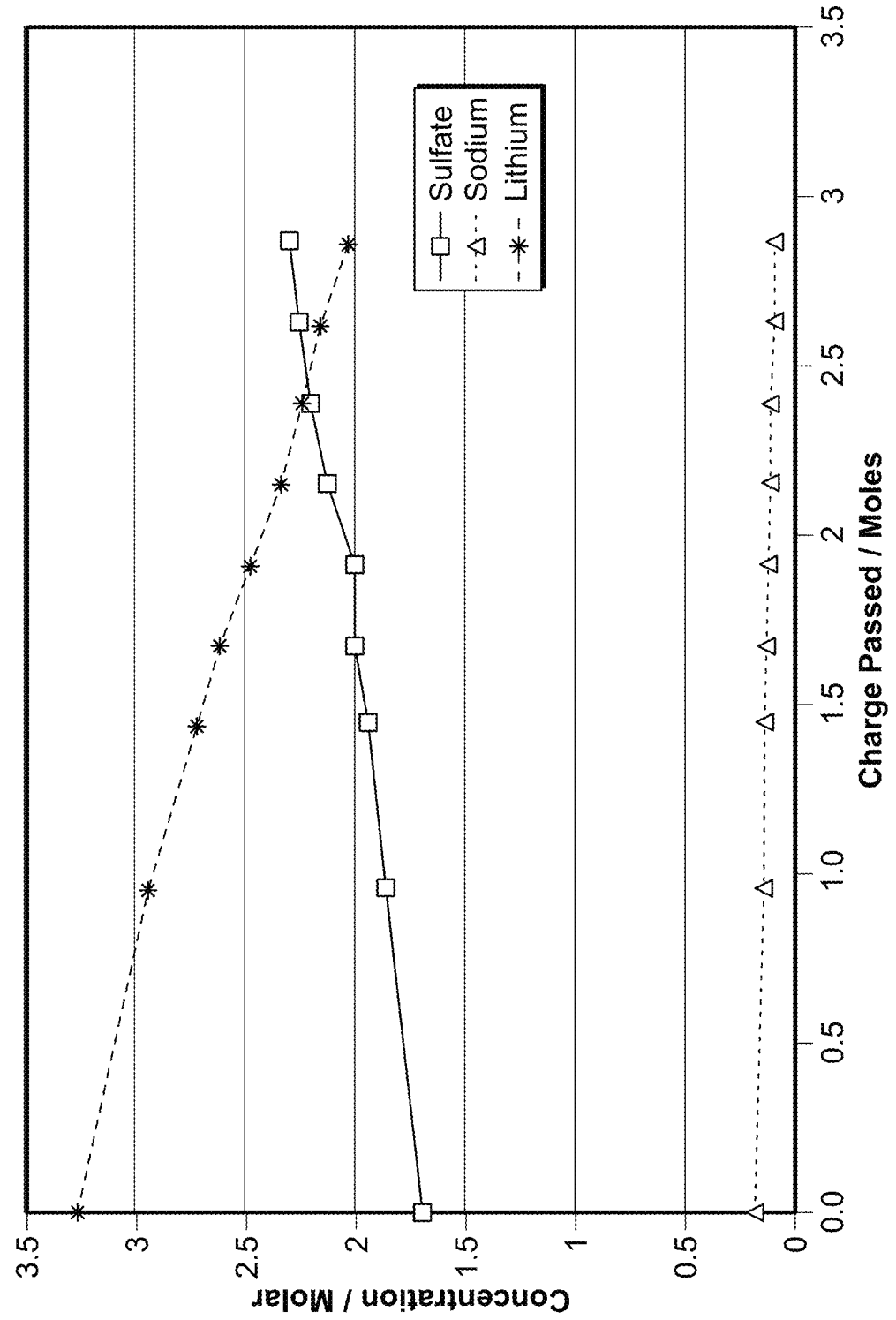
Figure 47C:
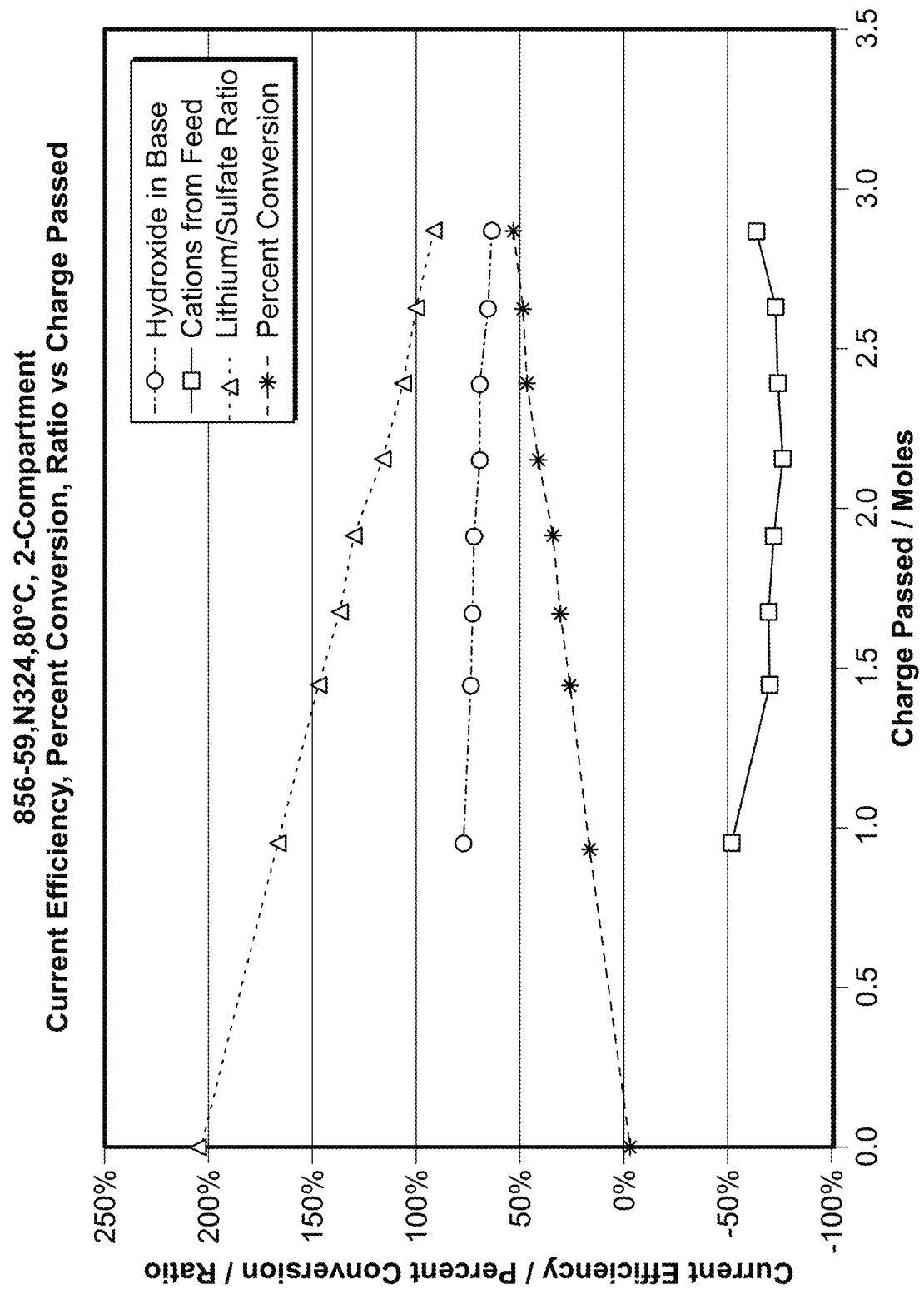
Figure 47D:
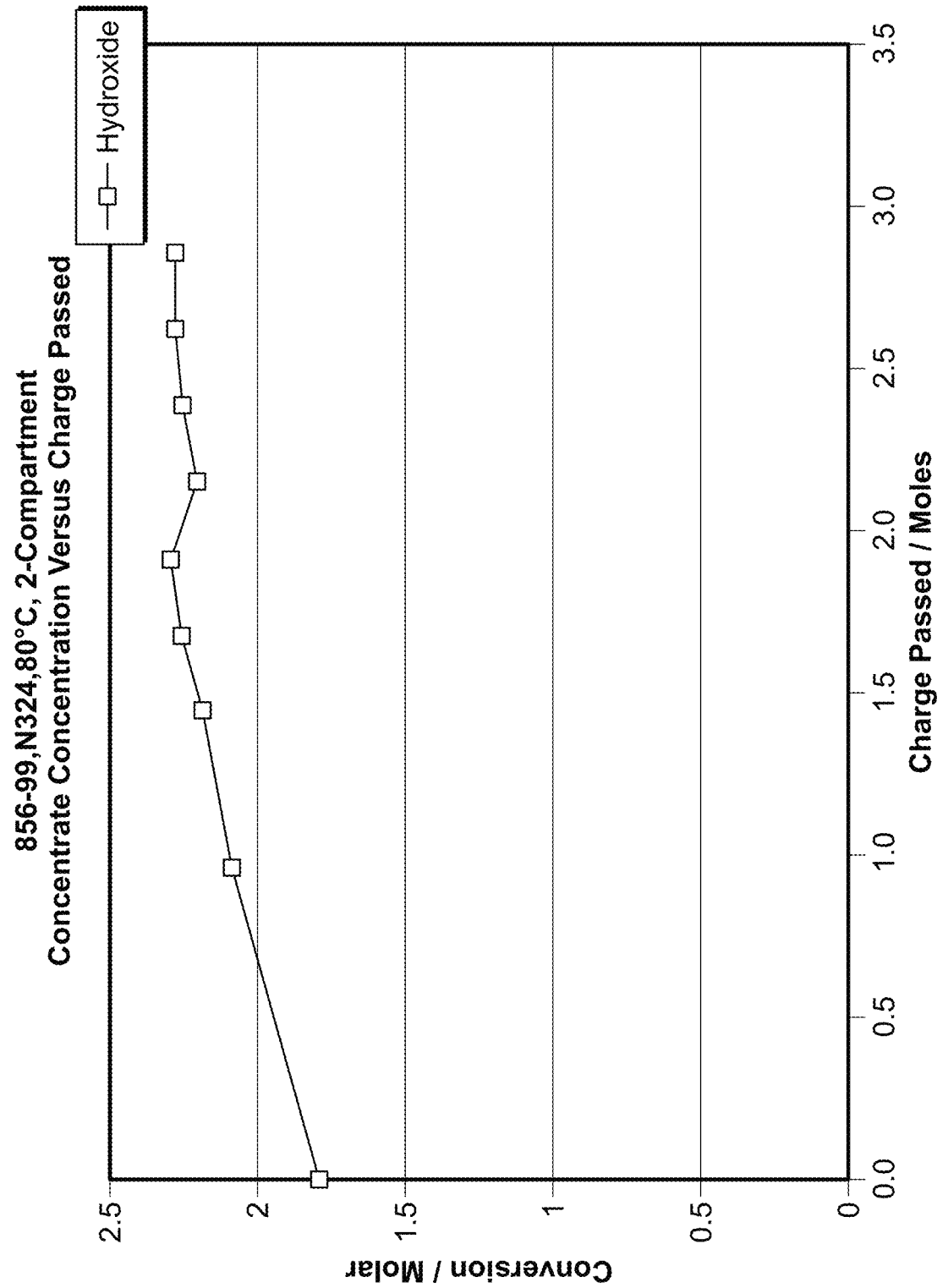
Figure 48A:
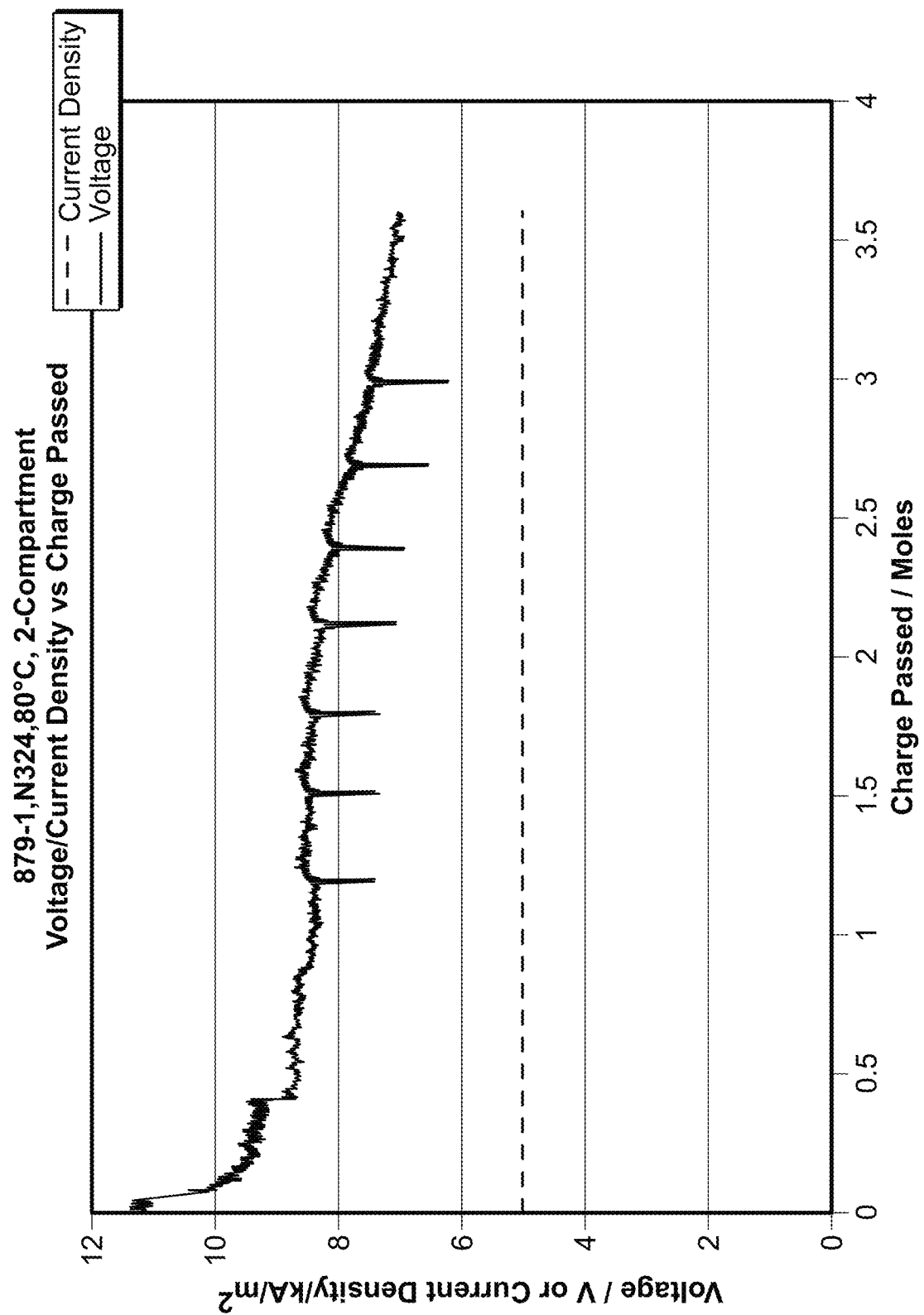
Figure 48B:
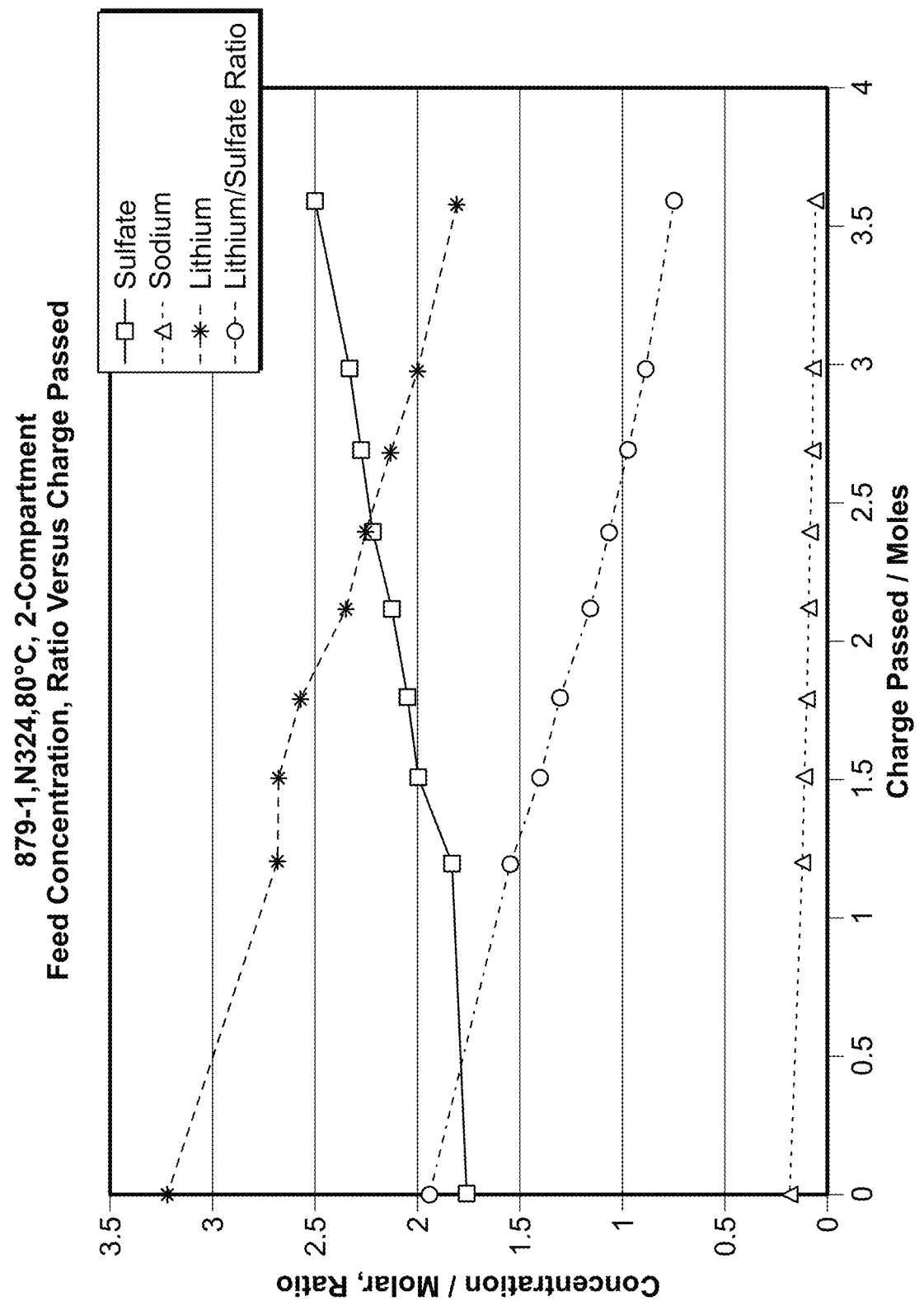
Figure 48C:
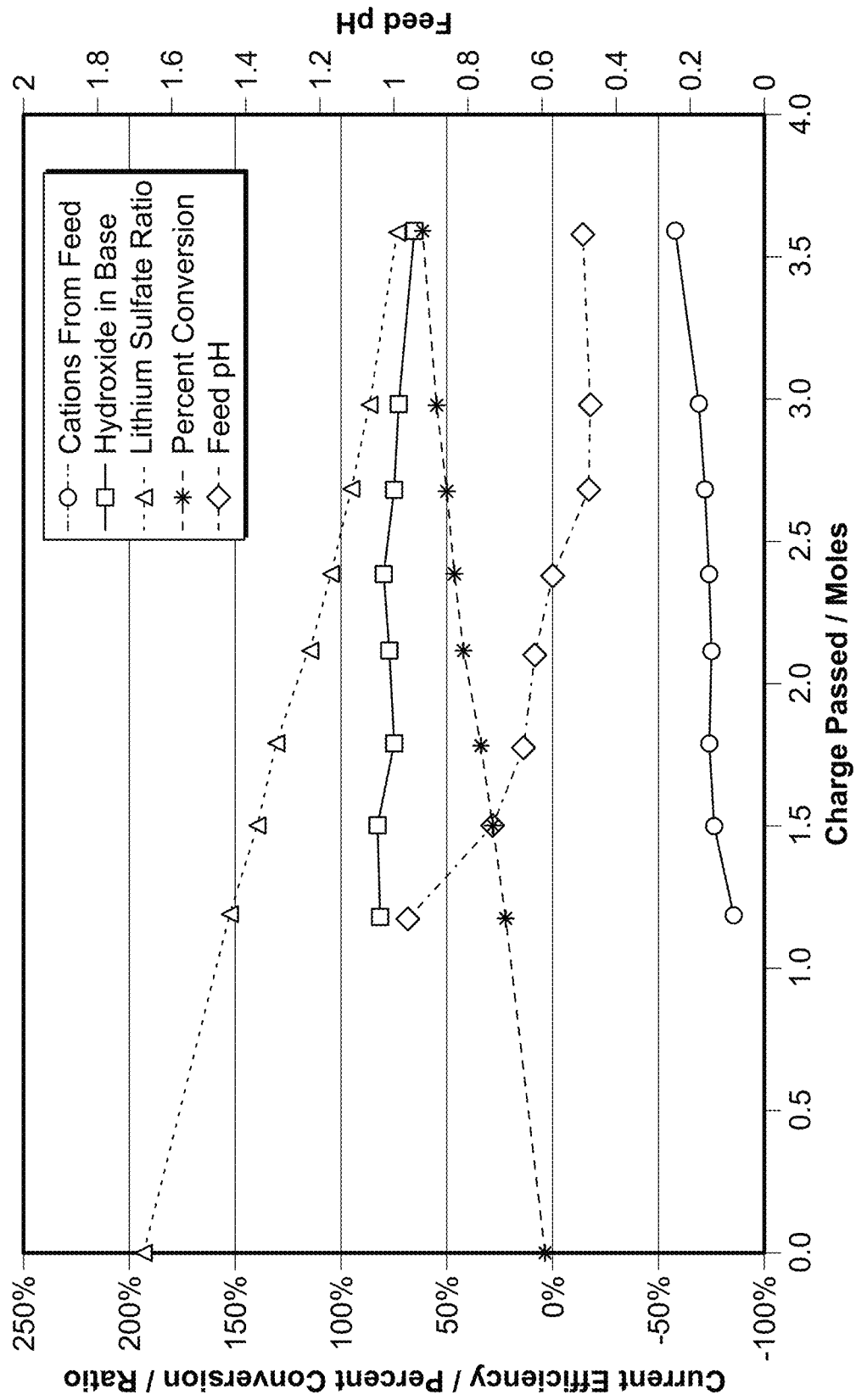
Figure 48D:
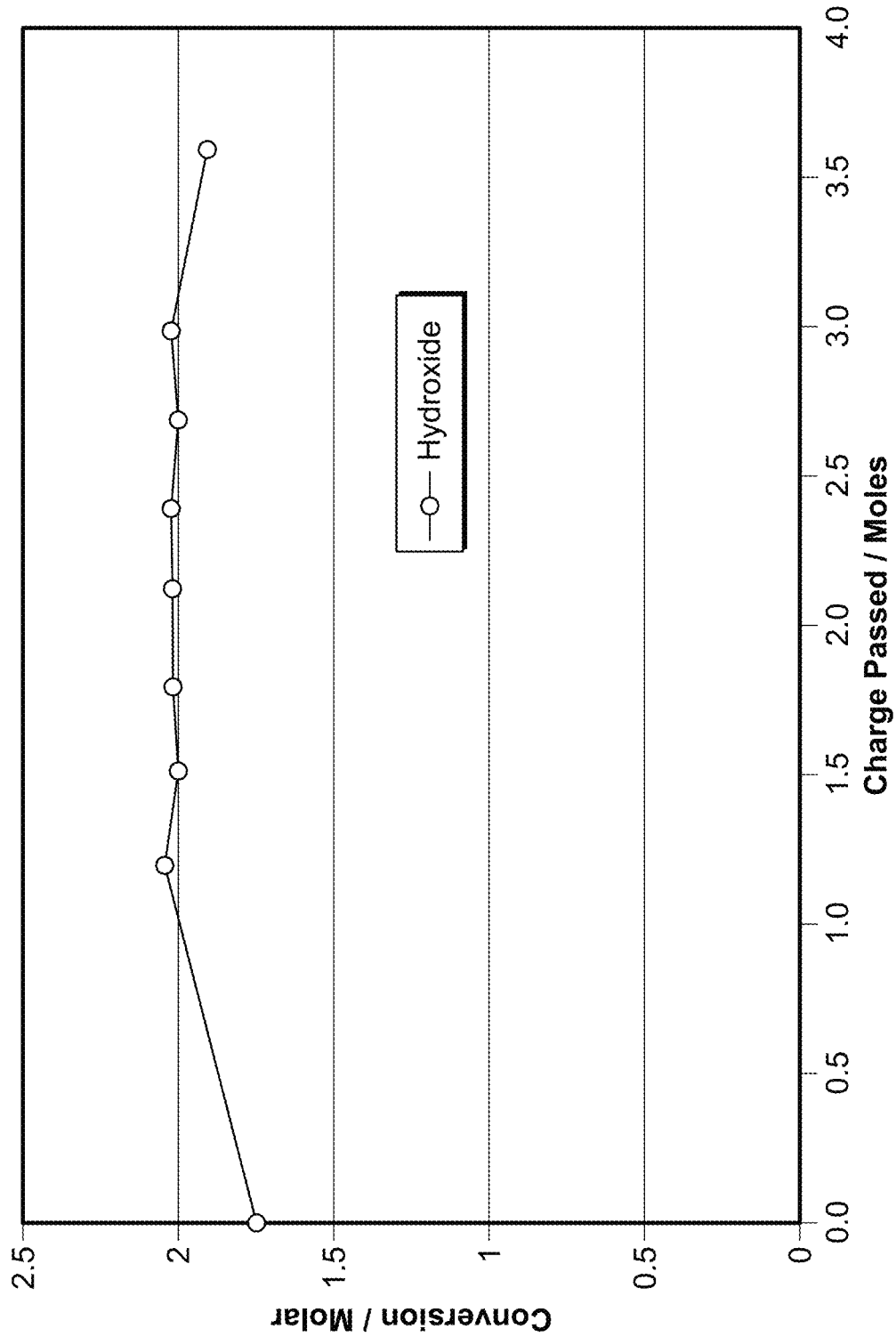

The voltage profile for the run using a current density of 4 kA/m² is shown in FIG. 47A. The voltage in most of the runs started high and decreased as the run progressed. In FIG. 47A, the hydroxide concentration increased from about 1.9 M to about 2.4 M over the course of the run, which decreased the voltage drop in the catholyte compartment.

The ICI FM-01 cell as built had about a 7 mm electrode/membrane gap. In a larger commercial cell where the gap can be decreased to about 2 mm, it is estimated that the overall cell voltage would be between about 4.5-5 V when using a catholyte solution that is an about 3 M aqueous solution comprising lithium hydroxide. Therefore, the power consumption for a two-compartment membrane electrolysis process running at a current density of about 4 kA/m² would be about 7 kWh/kg (LiOH in 3 M solution). This is comparable to the power observed to be required for a three-compartment cell coproducing ammonium sulfate except that process was only running at a current density of about 1.5 kA/m².

If a two-compartment cell was utilized to convert about 40% of the lithium sulfate in an about 3 tonne/hour LiOH plant, the cell area running at a current density of about 400 mA/cm² would be about 430 m². The remaining about 60% of the lithium sulfate can then be processed by a three-compartment cell, as discussed herein. Cell area estimates will be discussed further hereinbelow after discussion of the three-compartment work.

compartment cell coproducing ammonium sulfate and aspects of this process are discussed in this section.

The start solution which contained about 1.64 M LiHSO₄ and about 0.2 M Li₂SO₄ (i.e. about 85% bisulfate) was run in the cell at a current density of about 200 mA/cm² with removal of the lithium sulfate producing lithium/sodium hydroxide in the catholyte and ammonium sulfate in the anolyte (ammonia was added to the feed under pH control). Water was transported from the feed but additional water was added to the anolyte and catholyte in order to substantially maintain concentrations as shown in FIG. 49A. The experiment was run with about 93% removal of the sulfate from the feed.

During the course of the run, the feed pH (which started at about 0.6) increased as sulfate was removed more efficiently than lithium reaching just over about 2 by the end of the experiment as shown in FIG. 49B. As such, the percentage of bisulfate in the feed decreased throughout the run until most of the solution was present as sulfate. The cell voltage was fairly constant at about 7 V until near the end of the run, where the feed started to be depleted.

The current efficiencies measured for the various compartments are shown in FIG. 49C which verifies more efficient sulfate removal. The hydroxide production efficiency was about 72% while sulfate removal was about 114%. The higher than 100% sulfate removal is due to the calculation assuming the "sulfate" is transported as sulfate ($SO_4^{2-}$) through the membrane whereas, at these pH's, some of the transport must be as bisulfate ($HSO_4^-$).

B. N324/FAB Three-Compartment Cell to Produce Sulfuric Acid

The three-compartment electrochemical cell was rebuilt replacing the Astom AHA membrane with a new piece of Fumatech FAB membrane and similar tests were performed producing sulfuric acid in the anolyte. FIGS. 50A-D are plots relating to this experiment. The results of the experiment using the three-compartment cell coproducing sulfuric acid and aspects of this process are discussed in this section.

In this experiment, more water was added to the anolyte to keep the sulfuric acid strength below about 0.8 M as shown in FIG. 50A. Similar trends in current efficiencies (FIG. 50B) and feed pH (FIG. 50C) were observed. In this case only about 73% of the sulfate was removed as a lower current density (about 100 mA/cm$^2$) was used and less conversion occurred over the experimental run than the experiment discussed in Example 5B, section A.

Although the current density for this test was half that of the previous test, a similar cell voltage was obtained. While not wishing to be limited by theory, this was mostly due to the high resistance of the FAB membrane.

The hydroxide current efficiency in these tests was lower by about 10%-15% in comparison to previous studies (WO 2013/159194 and WO 2014/138933). The cell was taken apart and a tear in the N324 membrane was observed. The tear was in the gasket area and should not have caused a problem. While not wishing to be limited by theory, the tear may have been formed by slight deformation of the plastic frames (at the higher temperature) with multiple rebuilds. A new run was performed with a new piece of N324 membrane and the current efficiency improved slightly. A final run was performed replacing the lithium bisulfate/sulfate solution with a higher pH lithium sulfate solution, and the current efficiency improved close to normal. While not wishing to be limited by theory, the lower feed pH seems to affect the three-compartment production. The current efficiency did not noticeably increase as the feed pH increased, which would have been expected.

While not wishing to be limited by theory, calcium in the feed can also cause loss of efficiency as known, for example in the chlor-alkali industry.

It was thus shown that processes incorporating a combination of two-compartment and three-compartment membrane electrolysis cells are useful to convert lithium sulfate to lithium hydroxide. The two-compartment cell is efficient at making hydroxide until about 40% conversion. The present testing also showed that a decrease in current efficiency for hydroxide production of between about 10-15% occurred when the resulting solution was processed in a three-compartment cell. Processes which co-produced either ammonium sulfate or sulfuric acid were observed to behave similarly for hydroxide formation.

Processing about 40% of the lithium value in a two-compartment cell significantly decreases the total cell area required for production of 3 tonnes per hour of LiOH. Power cost would be similar for this process as the two-compartment cell is operated at a higher current density of about 400 mA/cm$^2$. It would be appreciated by a person skilled in the art that using a lower current density would decrease the power, but increase the cell area required.

TABLE 31

Cell Area and Power for the Various Processes

| Process (current density) | Cell Area (m$^2$) | Power[1] |
|---|---|---|
| Sulfuric acid (1 kA/m$^2$) | 4500 | 8.9 |
| Ammonium sulfate (1.5 kA/m$^2$) | 2850 | 6.4 |
| Two-compartment (4 kA/m$^2$) then sulfuric acid (1 kA/m$^2$) | 430 (2 compartment) ~2700 (3 compartment) | 8.1 |
| Two-compartment (4 kA/m$^2$) then ammonium sulfate (1.5 kA/m$^2$) | 430 (2 compartment) ~1700 (3 compartment) | 6.6 |

[1]kWh/kg LiOH in 3M solution.

Benefits to the present system are obtained, for example due to the high current density utilized in the two-compartment cell. However, it will be appreciated by a person skilled in the art that at these current densities, the lifetime of the DSA-O$_2$ anode decreases.

The lower current efficiency for hydroxide production obtained in the process of the present studies would increase the cell area slightly for the three-compartment process. However, this inefficiency assumes sequential processing of the solutions where solution is fed from the two-compartment system to a separate system running the three-compartment cells. Alternatively, both types of cells could be run off of the same solution and therefore the process could be run at any pH required and the pH of the solution could be increased or decreased, for example by changing the percentage processed by one cell or the other. For example, if pH needs to be decreased, the current density of the two-compartment cell could be increased and/or the three-compartment cell could be decreased. In the case of sulfuric acid generation with the Fumatech FAB membrane, the pH would be controlled at around 1.5, for example to keep the FAB membrane conductive and minimize proton transport.

In the case of ammonium sulfate production with Astom AHA, one of the issues reported in previous studies was stopping the feed pH from increasing as the caustic current efficiency was much lower than the sulfate removal. The two-compartment cell used in the present processes could be used to maintain the overall feed pH at a much lower pH.

The combination of the two processes (i.e. the two-compartment and three-compartment processes) may also allow better utilization of the feed solution as a larger amount of water is removed from the feed, possibility allowing for more continuous operation.

The present disclosure has been described with regard to specific examples. The description was intended to help the understanding of the disclosure, rather than to limit its scope. It will be apparent to one skilled in the art that various modifications can be made to the disclosure without departing from the scope of the disclosure as described herein, and such modifications are intended to be covered by the present document.

It was thus observed that the processes and systems of the present disclosure are effective for converting $Li_2SO_4$ and/or $LiHSO_4$ into LiOH at low costs by using a high current efficiency and requiring a low total cell area. It was found that by combining a two-compartment monopolar or bipolar membrane electrolysis process and a two-compartment monopolar or bipolar membrane electrolysis process, such higher current efficiencies were possible, thereby leading to such an economy in terms of current and space.

While a description was made with particular reference to the specific embodiments, it will be understood that numerous modifications thereto will appear to those skilled in the art. Accordingly, the above description and accompanying drawings should be taken as specific examples and not in a limiting sense.

What is claimed is:

1. A system for preparing lithium hydroxide, said system comprising:

an electrochemical cell, said electrochemical cell defining an anodic compartment separated from a central compartment by an anion exchange membrane and a cathodic compartment separated from said central compartment by a cation exchange membrane, said central compartment comprising at least one inlet for receiving an aqueous composition comprising lithium compound, said cathodic compartment comprising at least one cathode wherein said cathode is configured to produce a lithium hydroxide-enriched aqueous composition, said anodic compartment comprising at least one anode, wherein said system further comprises a pH probe and at least one inlet for receiving acid or base for at least maintaining the pH of said aqueous composition comprising said lithium compound at about 2, wherein said electrochemical cell is a monopolar electrolysis cell, wherein "about" means ±10% of the value of the pH.

2. The system of claim 1, wherein said cathodic compartment further comprises at least one inlet for receiving an aqueous composition comprising lithium hydroxide.

3. The system of claim 1, wherein said anodic compartment further comprises at least one inlet for receiving an aqueous composition comprising an acid.

4. The system of claim 1, wherein said system further comprises a thermometer, and a temperature control device for at least maintaining said aqueous composition comprising said lithium compound at a temperature of about 20° C. to about 80° C., wherein "about" means ±10% of the value of the temperature.

5. The system of claim 1, wherein said system further comprises a power supply comprising an ammeter for at least maintaining an electrical current of said electrochemical cell of about 400 to about 3000 A/m$^2$, wherein "about" means ±10% of the indicated value of the electric current.

* * * * *